(12) United States Patent
Chapel et al.

(10) Patent No.: US 12,731,950 B2
(45) Date of Patent: Sep. 8, 2026

(54) ELECTRICAL CORD CAP WITH EASY CONNECT HOUSING PORTIONS

(71) Applicant: Zonit Structured Solutions, LLC, Boulder, CO (US)

(72) Inventors: Steve Chapel, Iliff, CO (US); William Pachoud, Boulder, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 0 days.

(21) Appl. No.: 18/658,895

(22) Filed: May 8, 2024

(65) Prior Publication Data

US 2025/0132534 A1 Apr. 24, 2025

Related U.S. Application Data

(63) Continuation of application No. 18/602,966, filed on Mar. 12, 2024, now abandoned, and a continuation of (Continued)

(51) Int. Cl.
*H01R 29/00* (2006.01)
*H01R 13/703* (2006.01)

(Continued)

(52) U.S. Cl.
CPC ......... *H01R 29/00* (2013.01); *H01R 13/7038* (2013.01); *H01R 25/003* (2013.01); *H02J 9/06* (2013.01); *H01H 2300/018* (2013.01)

(58) Field of Classification Search
CPC .. H01R 29/00; H01R 13/7038; H01R 25/003; H02J 9/06; H01H 2300/018
See application file for complete search history.

(56) References Cited

U.S. PATENT DOCUMENTS 5,046,961 A 9/1991 Hoffman
5,082,450 A * 1/1992 Warren, Sr. ............ H01R 13/44 439/270

(Continued)

FOREIGN PATENT DOCUMENTS

CN 109473831 A 3/2019
GB 2480091 A 11/2011

(Continued)

*Primary Examiner* — Carlos Amaya
(74) *Attorney, Agent, or Firm* — Davis Graham & Stubbs LLP

(57) ABSTRACT

An electrical connector body is provided includes first and second housing portions formed from molded plastic. The housing portions include first and second interface surfaces that are configured to butt against one another to define a housing and one or more electrical components are disposed within an interior of the housing. The one or more electrical components may comprise connectors of a male or female cord cap, an in-line surge suppression circuit, and/or a compact automatic transfer switch. In one implementation, each of the first and second connector body portions may include a strain relief extension for engaging an electrical cord and a compression member (3691) may be disposed over the strain relief extensions to secure together the first and second connector body portions. The compression member may be selected from a set of compression members based on a size of the electrical cord.

19 Claims, 139 Drawing Sheets

Related U.S. Application Data application No. 17/707,862, filed on Mar. 29, 2022, now Pat. No. 11,990,702, which is a continuation of application No. 16/827,626, filed on Mar. 23, 2020, now Pat. No. 11,289,844, which is a continuation of application No. 16/817,504, filed on Mar. 12, 2020, now Pat. No. 11,929,582, said application No. 18/602,966 is a continuation of application No. 16/817,504, filed on Mar. 12, 2020, now Pat. No. 11,929,582.

(60) Provisional application No. 63/465,096, filed on May 9, 2023, provisional application No. 63/464,896, filed on May 8, 2023, provisional application No. 62/817,456, filed on Mar. 12, 2019.

(51) Int. Cl.
*H01R 25/00* (2006.01)
*H02J 9/06* (2006.01)

(56) References Cited

U.S. PATENT DOCUMENTS 5,108,301 A * 4/1992 Torok .................... H01R 13/20 439/324
5,352,132 A 10/1994 O'Keefe et al.
5,685,730 A 11/1997 Cameron et al.
8,616,904 B1 12/2013 Martin et al.
2003/0117761 A1 6/2003 Pebles et al.
2004/0147157 A1* 7/2004 Burton ................ H01R 9/2475 439/346
2010/0035481 A1* 2/2010 Grieff ................. H01R 13/639 439/692
2010/0141038 A1 6/2010 Chapel et al.
2011/0317453 A1 12/2011 Fan et al.
2016/0036269 A1 2/2016 Yoshida et al.
2017/0279267 A1 9/2017 Cheng et al.

FOREIGN PATENT DOCUMENTS

JP S5128492 U 3/1976
JP 1981128779 U 9/1981
JP 1985127678 A 7/1985
JP 1996339843 A 12/1996
JP 2000021493 A 1/2000
JP 2001210426 A 8/2001
JP 2003022717 A 7/2003
JP 3099411 U 4/2004
JP 2006114288 A 4/2006
JP 2007048611 A 2/2007
WO 2003034548 A1 4/2003
WO 2011090354 A2 7/2011
WO 2022035987 A1 2/2022

* cited by examiner 16
18
12
16
12
14
18
10

16
12
16
12
14
10

16
12
16
12
14
10

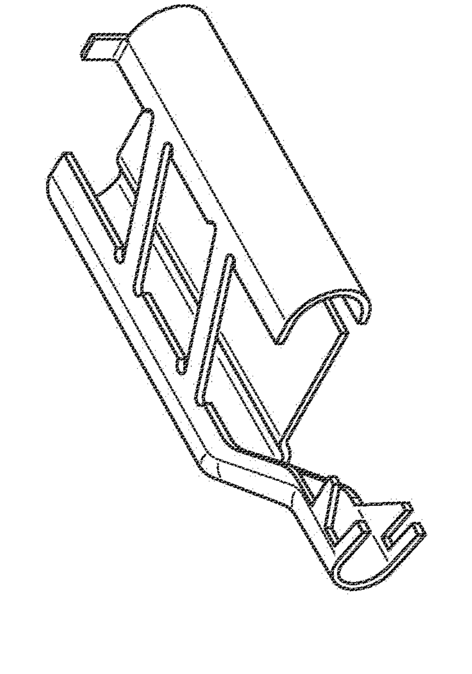
FIG.1J
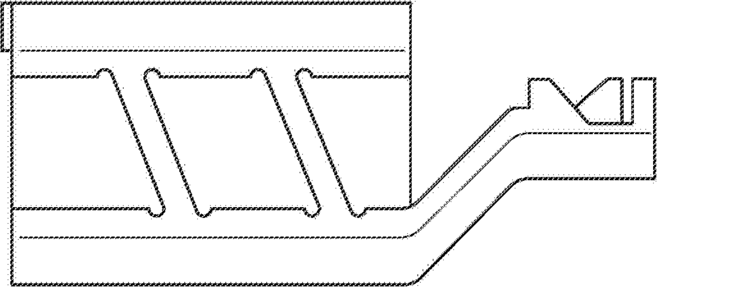
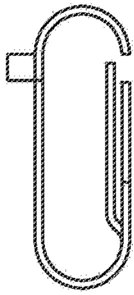

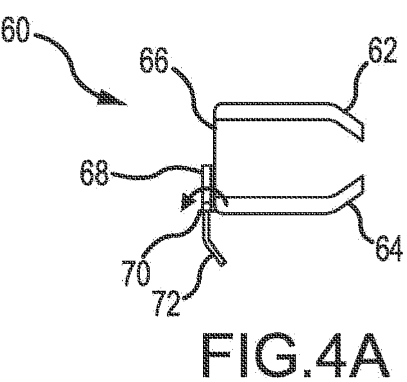
FIG.4A
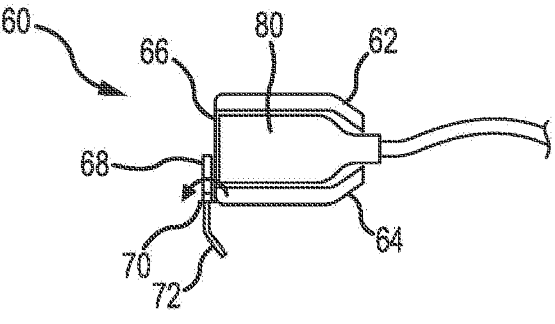
FIG.4B
60
80
84
62
68
86
64
70
72
FIG.4C 1413
1409
1408
1402
1404
1403
1412
1405
1401
1411
1410

1530
1540
1401
1541

3100
3050
3020
3060
3040
3020
3050
3040
3010
TURN
3030

3200
3050
3020
3060
3040
3020
3050
3040
3010
TURN
3030

3570
3566
2
3565
3567
3551
3571
3567
3551
3571
3564

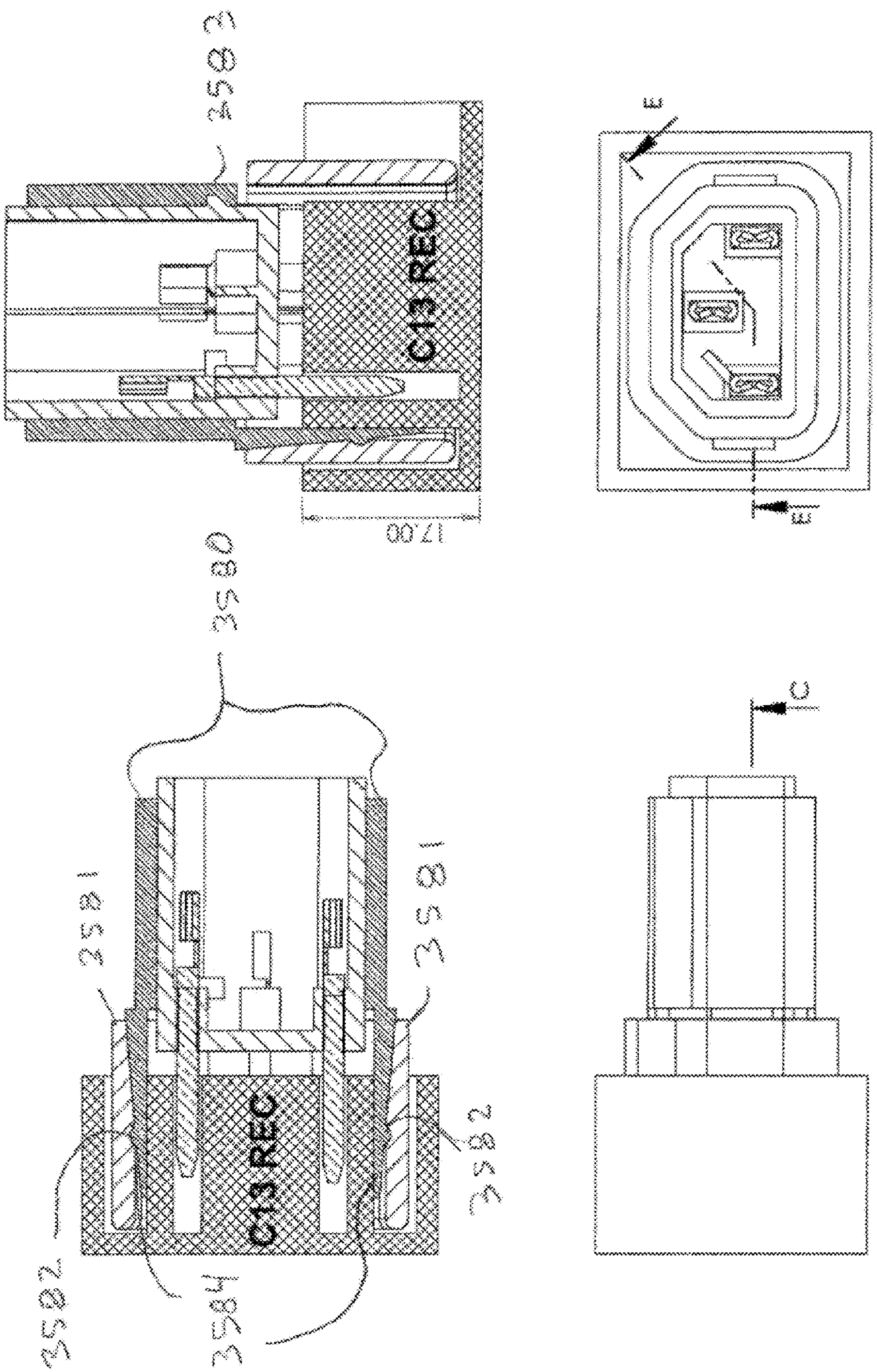
Figure 18-K 2

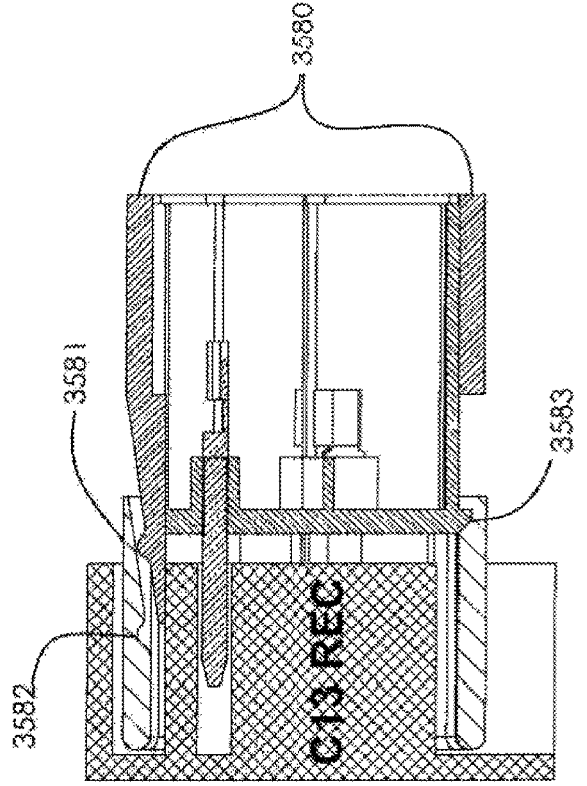
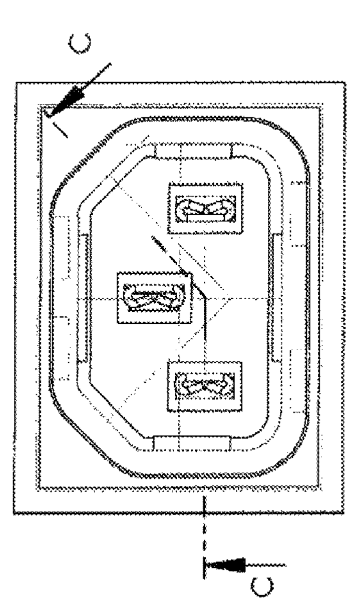
Figure 18-K 2b

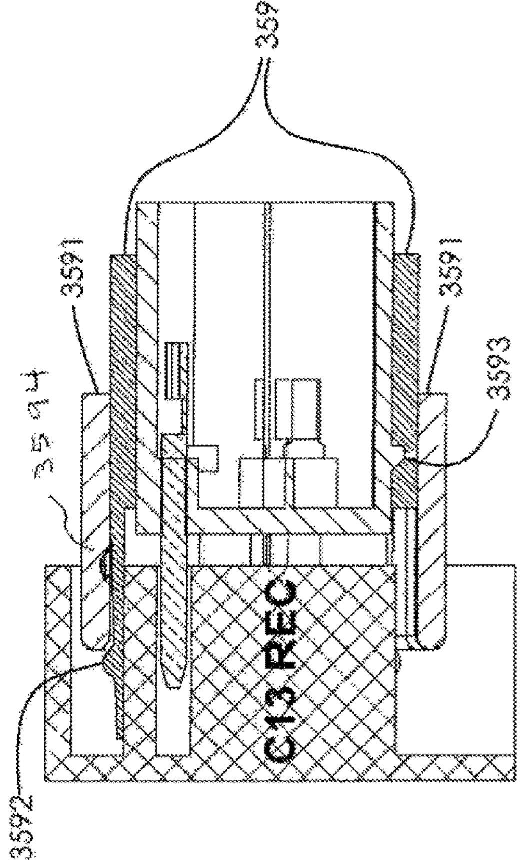
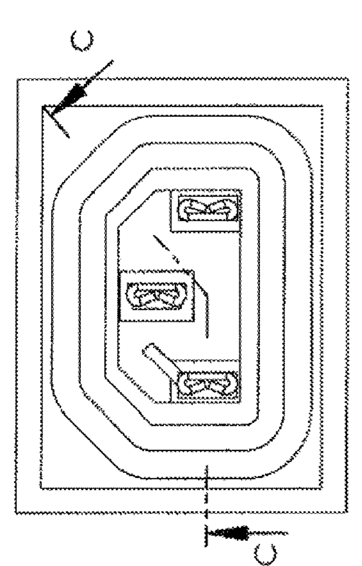
Figure 18-K 3

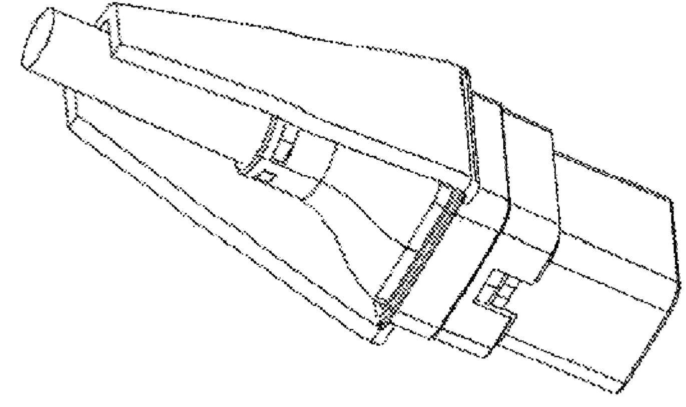
Figure 18 Z
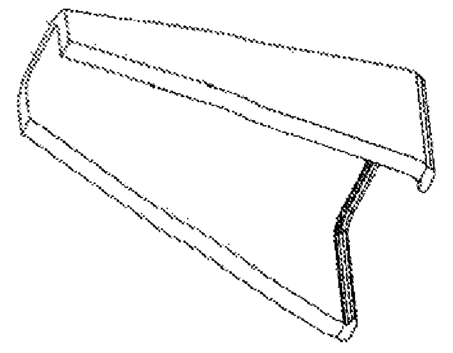

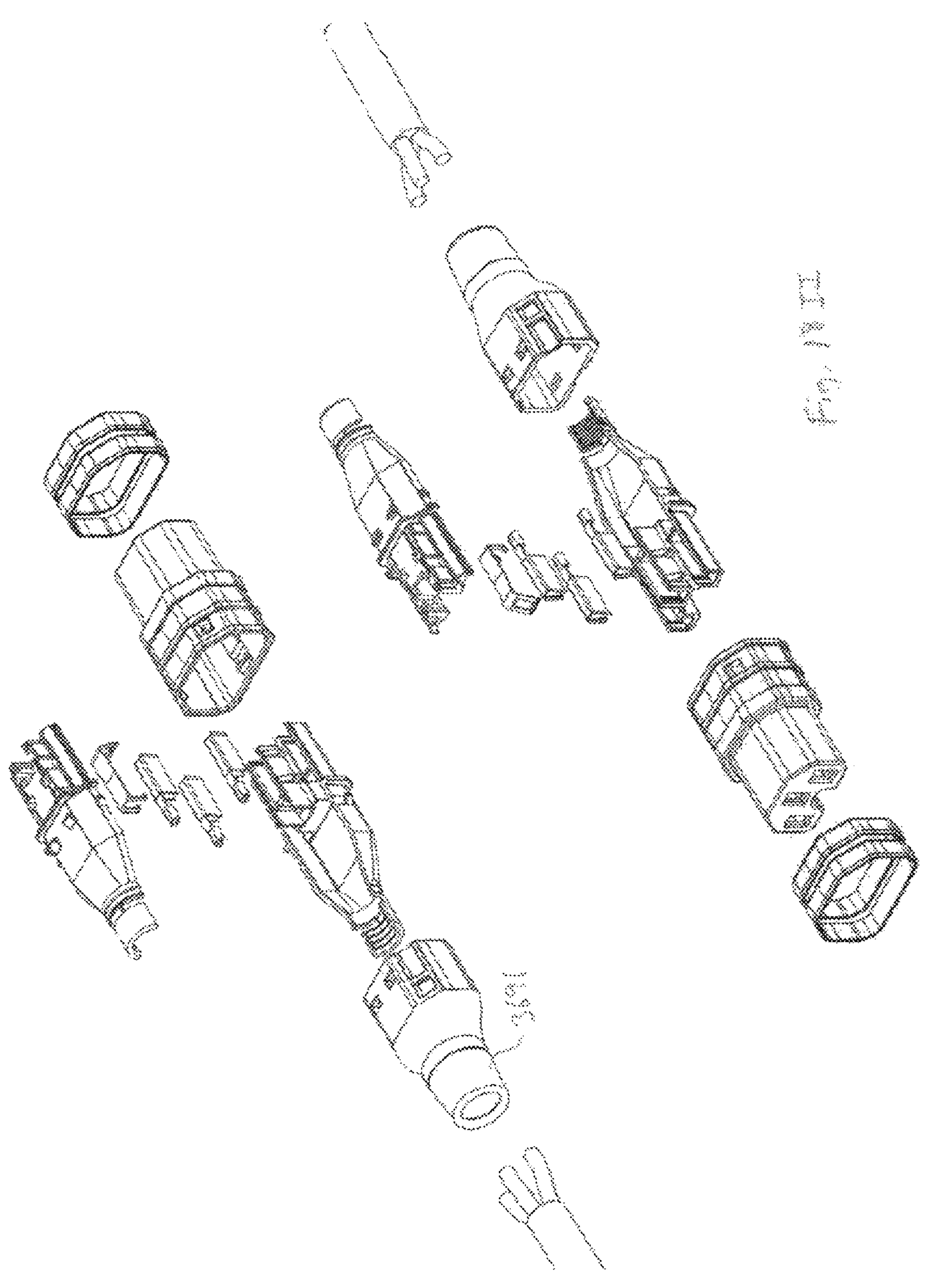

3691

Fig. 18MA
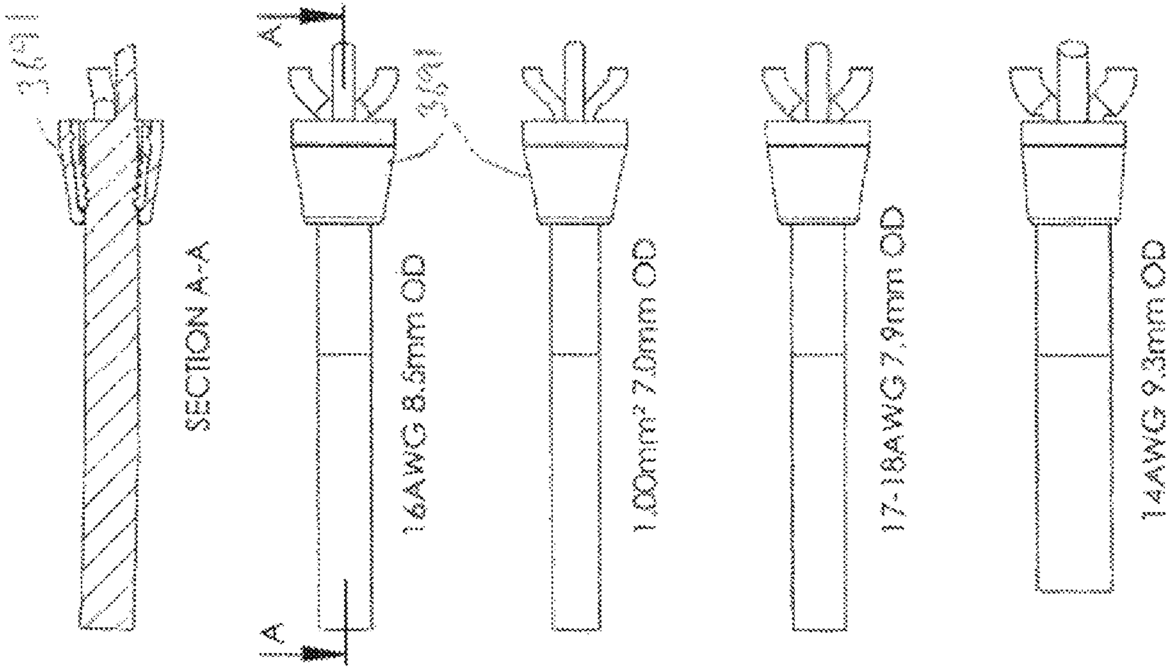
3691
SECTION A-A
A
3691
A
16AWG 8.5mm OD
1.00mm² 7.0mm OD
17-18AWG 7.9mm OD
14AWG 9.3mm OD

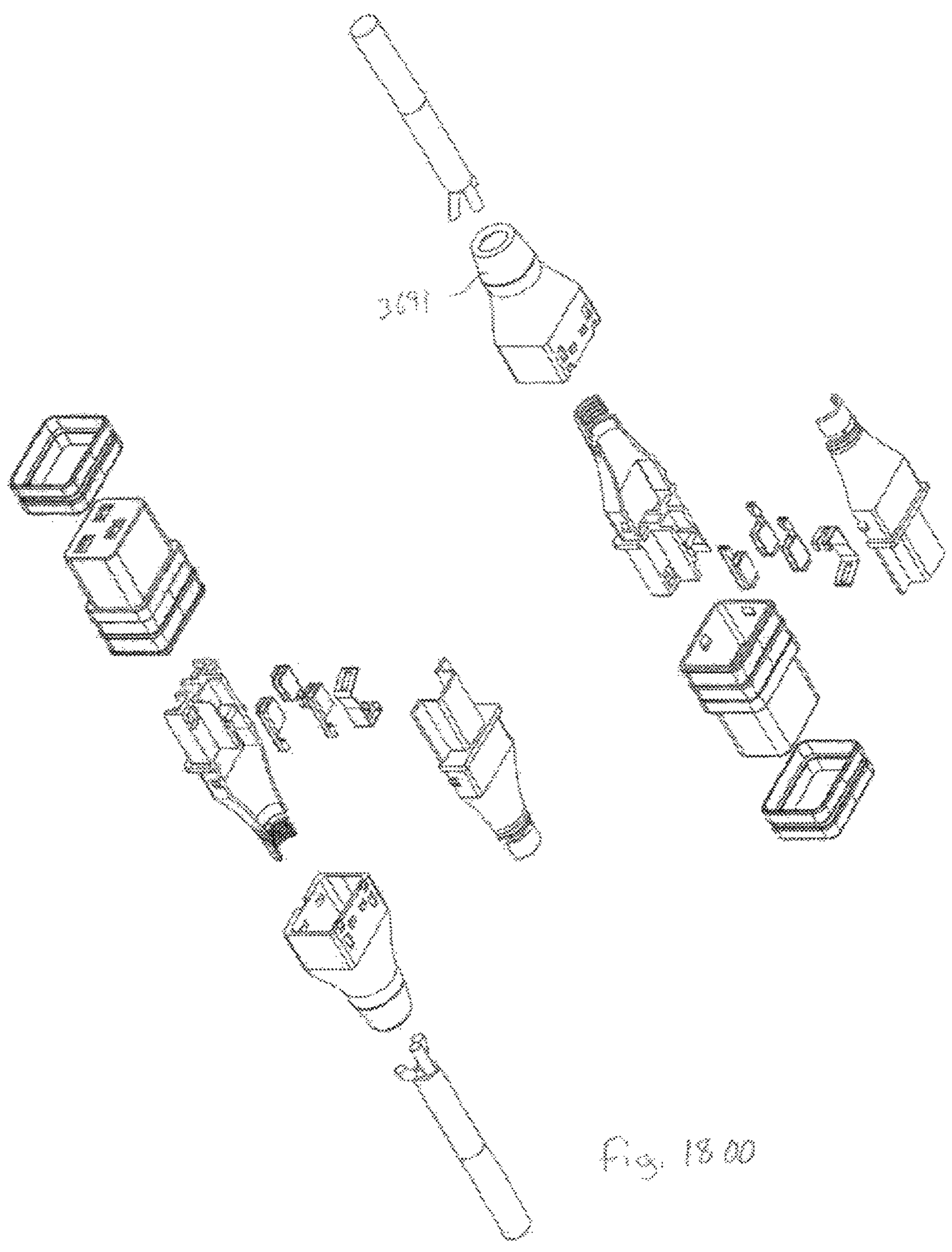
3691
Fig. 18.00

391

8100
8200
8020
8030
8020
8020
8030
8030
8000
8040
8040
8050

B Disconnect Relay Inline
With B Input Cord

B disconnect Relay with SSR Bypass solution (Mini Technology)

ELECTRICAL CORD CAP WITH EASY CONNECT HOUSING PORTIONS

CROSS-REFERENCE TO RELATED APPLICATION

This application claims priority to U.S. Patent Application No. 63/464,896, entitled "ELECTRICAL CORD CAP WITH EASY CONNECT HOUSING PORTIONS," filed May 8, 2023, and U.S. Provisional Patent Application No. 63,465,096, entitled 'ELECTRICAL CORD CAP WITH EASY CONNECT HOUSING PORTIONS," filed May 9, 2023.

This application claims priority to U.S. Non-provisional patent application Ser. No. 18/602,966, entitled "RELAY CONDITIONING AND POWER SURGE CONTROL," filed Mar. 12, 2024, which is a continuation of U.S. Non-provisional patent application Ser. No. 16/817,504, filed Mar. 12, 2020, now U.S. Pat. No. 11,929,582, issued Mar. 12, 2024, which claims priority to U.S. Provisional Patent Application No. 62/817,456 entitled, "RELAY CONDITIONING AND POWER SURGE CONTROL," filed Mar. 12, 2019.

This application claims priority to U.S. Non-provisional patent application Ser. No. 17/707,862 entitled, "ELECTRICAL CORD CAP WITH EASY CONNECT HOUSING PORTIONS," filed Mar. 29, 2022, which is a continuation of U.S. Non-provisional patent application Ser. No. 16/827,626, entitled, "ELECTRICAL CORD CAP WITH EASY CONNECT HOUSING PORTIONS," filed Mar. 23, 2020, now U.S. Pat. No. 11,289,844, issued Mar. 29, 2022, which is a continuation of U.S. Non-provisional patent application Ser. No. 16,817,504 entitled, "ELECTRICAL CORD CAP WITH EASY CONNECT HOUSING PORTIONS," filed Mar. 12, 2020, now U.S. Pat. No. 11,929,582, issued Mar. 12, 2024, which claims priority to U.S. Provisional Patent Application No. 62,817,456 entitled, "RELAY CONDITIONING AND POWER SURGE CONTROL," filed Mar. 1, 2019.

INCORPORATION BY REFERENCE

The following cases are incorporated by reference herein:

1. U.S. patent application Ser. No. 14/217,278, entitled, "FRICTIONAL LOCKING RECEPTACLE WITH PROGRAMMABLE RELEASE," filed on Mar. 17, 2014, which is a nonprovisional of from U.S. Provisional Patent Application No. 61/799,971, entitled, "SECURE ELECTRICAL RECEPTACLE," filed on Mar. 15, 2013, and claims the benefit of U.S. Provisional Patent Application No. 61/944,506, entitled, "FRICTIONAL LOCKING RECEPTACLE WITH PROGRAMMABLE RELEASE," filed on Feb. 25, 2014.
2. U.S. patent Ser. No. 13/228,331, entitled, "LOCKING ELECTRICAL RECEPTACLE WITH ELONGATE CLAMPING SURFACES," filed on Sep. 8, 2011, which is a continuation-in-part of and claims priority to U.S. patent Ser. No. 12/568,444, entitled, "LOCKING ELECTRICAL RECEPTACLE," filed on Sep. 28, 2009, which in turn is a continuation-in-part of U.S. patent application Ser. No. 12/531,235, entitled, "LOCKING ELECTRICAL RECEPTACLE," filed on Sep. 14, 2009, which is the U.S. National Stage of PCT Application US2008/57149, entitled, "LOCKING ELECTRICAL RECEPTACLE," filed Mar. 14, 2008, which claims priority from U.S. Provisional Application No. 60/894,849, entitled, "LOCKING ELECTRICAL RECEPTACLE," filed on Mar. 14, 2007.
3. U.S. application Ser. No. 13/088,234, entitled, "LOCKING ELECTRICAL RECEPTACLE" filed on Apr. 15, 2011, which claims priority from U.S. Provisional Application Ser. No. 61/324,557, filed Apr. 15, 2010, entitled "LOCKING ELECTRICAL RECEPTACLE SECURE LOCKING MECHANISM;" The contents of all of the above-noted applications are incorporated herein by reference as if set forth in full.
4. U.S. Provisional Patent Application No. 61/372,752, filed Feb. 26, 2013, entitled "HIGHLY PARALLEL REDUNDANT POWER DISTRIBUTION METHODS;"
5. U.S. Patent Application Publication No. US-2012/0181869-A1, published on Jul. 19, 2012, entitled, "PARALLEL REDUNDANT POWER DISTRIBUTION," U.S. patent application Ser. No. 13/208,333, ("the '333 Application") filed on Aug. 11, 2011, entitled, "PARALLEL REDUNDANT POWER DISTRIBUTION," which is a nonprovisional of and claims priority from U.S. Provisional Patent Application No. 61/372,752, filed Aug. 11, 2010, entitled "HIGHLY PARALLEL REDUNDANT POWER DISTRIBUTION METHODS," and U.S. Provisional Patent Application No. 61/372,756, filed Aug. 11, 2010, entitled "REDUNDANT POWER DISTRIBUTION,"
6. U.S. Pat. No. 8,004,115 from U.S. patent application Ser. No. 12/569,733, filed Sep. 29, 2009, entitled AUTOMATIC TRANSFER SWITCH MODULE, which, is a continuation-in-part of U.S. patent Ser. No. 12/531,212, filed on Sep. 14, 2009, entitled "AUTOMATIC TRANSFER SWITCH,", which is the U.S. National Stage of PCT Application US2008/57140, filed on Mar. 14, 2008, entitled "AUTOMATIC TRANSFER SWITCH MODULE," which claims priority from U.S. Provisional Application No. 60/894,842, filed on Mar. 14, 2007, entitled "AUTOMATIC TRANSFER SWITCH MODULE;" and
7. U.S. Patent Application Publication No. US-2012-0092811 for U.S. patent application Ser. No. 13/108,824, filed on May 16, 2011, entitled "POWER DISTRIBUTION SYSTEMS AND METHODOLOGY," is a continuation of U.S. patent application Ser. No. 12/891,500, filed on Sep. 27, 2010, entitled, "POWER DISTRIBUTION METHODOLOGY," which is a continuation-in-part of International Patent Application No. PCT/US2009/038427, filed on Mar. 26, 2009, entitled, "POWER DISTRIBUTION SYSTEMS AND METHODOLOGY," which claims priority from U.S. Provisional Application No. 61/039,716, filed on Mar. 26, 2008, entitled, "POWER DISTRIBUTION METHODOLOGY."
8. U.S. Pat. No. 8,374,729, from U.S. patent application Ser. No. 12/569,377, entitled, "SMART ELECTRICAL OUTLETS AND ASSOCIATED NETWORKS," filed Sep. 29, 2009, which is a continuation of U.S. patent application Ser. No. 12/531,226, entitled, "SMART ELECTRICAL OUTLETS AND ASSOCIATED NETWORKS," filed on Feb. 16, 2010, which is the U.S. National Stage of PCT/US2008/057150, entitled, "SMART NEMA OUTLETS AND ASSOCIATED NETWORKS," filed on Mar. 14, 2008, which in turn claims priority to U.S. Provisional Application No. 60/894,846, entitled, "SMART NEMA OUTLETS AND ASSOCIATED NETWORKS," filed on Mar. 14, 2007.

BACKGROUND

A wide variety of electrical connectors are known to provide electrical contact between power supplies and electrical devices. Connectors typically include prong type terminals, generally referred to as plugs, and female connectors designed for receiving the prong type terminals, generally referred to as receptacles, often described as electrical outlets, or simply outlets. The most common types of outlets include a pair of terminal contacts that receive the prongs of a plug that are coupled to "hot" and "neutral" conductors. Further, outlets may include a terminal contact that receives a ground prong of a plug. A variety of standards have been developed for outlets in various regions of the world.

Regardless of the standard at issue, the design of the aforementioned most common plug and receptacle system generally incorporates a friction only between metallic contacts means of securing the two in the mated position. The frictional coefficient varies depending on a variety of conditions, including, but not limited to, manufacturing processes, foreign materials acting as lubricants, and wear and distortion of the assemblies. This characteristic results in a non-secure means of interconnecting power between two devices. It is arguably the weakest link in the power delivery system to electrical or electronic devices utilizing the system. However, it has been adopted worldwide as a standard, and is used primarily due to low cost of manufacture, case of quality control during manufacture, and efficient use of space for the power delivery it is intended to perform.

The primary limitation of this connection technique is simply the friction fit component. In some applications where the continuity of power may be critical, such as data or medical applications, a technique to secure the mated connection may be desirable to improve the reliability. This may especially be true in mechanically active locations, such as where vibration is present, or where external activity may cause the cords attached to the plugs and receptacles to be mechanically deflected or strained in any manner.

Moreover, recently OEM AC to DC power supply manufacturers have introduced to the market power supplies—often used for electronic data processing (EDP) equipment—) that have an unusually large capacitance directly connected across the AC mains, to construct a low-pass common mode filter, which is designed to capture any high-order ringing energy going into or coming out of the AC to DC power supply on the AC line. This is done to minimize cost and achieve FCC certifications. In more traditional power supply design practice, a relatively small inductor is placed between the matched size filter capacitor and the AC mains to control the exposure of the AC mains to discharge of that capacitor directly applied across the AC mains. However, the manufacturers of those power supplies have found it is cheaper to add a relatively large capacitor across the AC main and use cheaper and noiser parts in the power supply and also to not increase the capacity of the inductor (the more expensive part) to match the larger capacity of the filter capacitor. The downside of this approach is that under certain conditions the energy stored in the capacitor can be discharged quickly down the AC line and cause high transient currents.

These unusual power supplies with excess capacitance have capacitors that are up to 10× or more the size of previous designs. This is not good design practice, but there are no electrical design or safety standards that regulate this design practice.

SUMMARY

The present invention is directed to electrical connector bodies and methods for constructing such bodies. Electrical connector bodies include housings for electrical components that terminate or are interposed on electrical cords. Common examples are cord caps that form a male plug or female receptacle for connecting cords to wall outlets, power strips, other cords, electrical equipment, or other connectors. The present invention discloses embodiments implementing locking cord caps that inhibit unintentional breaking of such connections. The present invention also includes connector bodies embodying in-line surge suppression circuits and compact automatic transfer switches mounted on electrical power cords (typically at least two input power cords and an output that may connect to a cord or directly to a piece of equipment), among other things. The invention simplifies construction by reducing or eliminating the need for PVC over-molding and enabling electrical connector bodies to be formed by joining injection molded housing portions. In one implementation, the housing portions can be joined by slipping a compression cone over strain relief extensions of the housings to concomitantly join the housing portions and compressingly engage the electrical cord. This greatly simplifies construction and allows for construction and assembly to be distributed across manufacturers and geographies to facilitate various business and distribution strategies.

In accordance with one aspect of the present invention, a method is provided for assembling an electrical cord connector body. The method involves providing first and second connector body housing portions formed from injection molded plastic. The first and second connector body housing portions include first and second interface surfaces that are configured to butt against one another to define a housing interface. The method further involves disposing one or more electrical components on the first connector body housing portion and positioning the second connector body housing portion over the first connector body housing portion so that the first and second interface surfaces are in an aligned, butting relationship. The first and second connector body housing portions are then secured together to form the electrical cord connector body.

As noted above, the electrical cord connector body can embody a number of different types of electrical components. In this regard, the electrical components may include connection contacts for forming an electrical connection between an electrical plug and an electrical outlet. For example, the electrical cord connector body may form a cord cap for a male plug or female outlet. The cord cap may be a locking cord cap. Alternatively or additionally, the electrical components may include a surge suppression circuit disposed on the electrical cord and/or a compact automatic transfer switch mounted on the electrical cord. In one implementation, the first and second housing portions are provided as a single molded piece. In this regard, the molded piece can be folded so that the second connector body housing portion is positioned over the first connector body housing portion. The housing portions may include alignment elements or mating connectors.

The housing portions can be secured together by various techniques including adhesives, welding, and/or snapping together. In one implementation, each of the housing portions includes a strain relief extension for engaging the electrical cord. The strain relief sections can be captured by a compression element that secures the strain relief extensions and the connector body portions together as well as compressively engaging the electrical cord. In this regard, a set of compression elements may be provided to fit different size electrical cords. The compression element may, for example, have a generally conical shape such that it progressively presses the housing portions together as it slides over the strain relief extensions. The strain relief extensions and compression element may be constructed so that they compression element snaps into place at the desired location over the strain relief extensions.

In accordance with another aspect of the present invention, an electrical connector body is provided. The connector body includes first and second housing portions formed from molded plastic. The housing portions include first and second interface surfaces that are configured to butt against one another to define a housing interface. One or more alignment features are disposed at the housing interface to assist in aligning the first and second connector body housing portions for securing the housing portions together to form a housing. In addition, one or more electrical components are disposed within an interior of the housing.

As discussed above, the one or more electrical components may comprise connectors of a male or female cord cap, an in-line surge suppression circuit, and/or a compact automatic transfer switch. The alignment features may include mating structures formed on opposing surfaces of the first and second housing portions or structure for snapping the housing portions together. In one implementation, housing portions are formed from a single piece of injection molded plastic that includes a fold line for folding the piece over so that the first and second housing portions are in aligned, butting relationship. In addition, each of the first and second connector body portions may include a strain relief extension for engaging an electrical cord. In this regard, the connector body may further include a compression member disposed over the strain relief extensions to secure together the first and second connector body portions. The compression member may be selected from a set of compression members based on a size of the electrical cord.

In accordance with another aspect of the present invention, a set of 2 or 4 compression flaps are provided which can be incorporated into a suitable housing or structure of the connector. Each flap may be subdivided into 2 or more sections, to create the desired mechanical characteristics. The function of the flaps is to deflect and be compressed against the walls of the mating connector when the locking mechanism is actuated. This mechanically deflects the wall of the connector to create a superior frictional lock, but also a mechanical lock between the connector and the receptacle. The locking prongs are extending underneath the compression flaps, wedging the connector against the walls of the mating receptacle. However, the compression flaps do not significantly move in the direction of travel that the connector is inserted or removed upon. Therefore, as the locking prongs are extended to create the frictional lock holding the connector and the receptacle together, the connector is not pushed out by the movement of the locking prongs. This is a significant improvement in the locking mechanism.

In accordance with another aspect of the present invention, the dimensions of the locking nut can be designed so that the wings of the nut do not exceed the dimensions of the rectangle that defines the body of the cordcap as the nut rotates. This allows the nut to be more easily turned when the cordcap is placed in a ganged receptacle, such as are commonly found in many plugstrips.

In accordance with another aspect of the present invention, the compression cone (or Outer Cord Clamp) can be designed so that it can flex, so that the power cord when bent at an angle coming out of the cordcap is better supported and its flex angle is lessened. This can insure that the power cord can function properly longer in environments where the power cord is frequently flexed in usage.

The present invention thus provides an electrical connector body that can be easily constructed by securing together housing portions formed from injection molded plastic. The housing portions can be secured together using a compression element thereby reducing or eliminating the need for plastic welding or other techniques that complicate assembly. The invention also reduces or eliminates the need for PVC over-molding such that construction and assembly can be implemented using inexpensive and readily available tools. Construction and assembly can thus be distributed over multiple manufacturers and geographies to facilitate various business and distribution strategies.

The present inventors have further recognized that these unusual power supplies with excess capacitance can cause a problem when transferring the AC from one source to another rapidly, such as in a manual or automatic transfer switch (ATS). If the AC line on the primary (A side in this example) disconnects at or near the peak of the AC cycle, the filter capacitor will be charged to that voltage. If, by chance, the ATS then transfers the load to the alternate power source (B side in this example) and it is in an opposite half cycle, or close to that in voltage state, the capacitor on the input of the equipment load may be connected to a low impedance voltage source of significant reverse polarity to the polarity of which it is charged. In this case, the capacitor may be charged to as much as 300 volts positive, and the opposing voltage on the transferred to source may be as much as 350 volts negative (or vise-versa); the resultant discharge is as much as 650 to 700 Volts at 1 to 3 micro-Farads. Considering the average resistance of most loads, this would not be a problem, the energy of the current would be absorbed without damage, but often the failover side of the ATS is connected to low impedance plugstrips which have multiple pieces of EDP equipment on them. Those pieces of EDP equipment often have the same input protection capacitors on them, reducing the instantaneous impedance to very low values. Thus, very high currents can be experienced at that instant when the relay contacts or thyristor first close on the ATS connected to the power supply in question. The results measured recently in laboratory tests indicate that short duration current flows of 250 Amps or more are easily attained, and this has the possibility of causing liquification of the part of the relay contact that is closest to the other relay contact. The transient current flow is so high that the effect across the contacts is very similar to an arc welder. This contact arcing can result in point micro-welding of the relay contacts or damage to solid-state switching components depending on the level and duration of the current flows and maximum voltage levels seen. The contact relays will then often stick upon re-solidifying causing a malfunction. The solid-state switching component can be damaged or catastrophically fail, and may actually emit smoke and/or catch on fire.

This issue can affect any relay based or solid-state based ATS, making them malfunction and/or fail. This can cause unintended downtime to occur for AC/DC powered equipment due to the ATS not working. This can cause serious problems if mission critical equipment goes down due to power delivery failing. It can be appreciated by the user that designers of EDP and other equipment types that are targeted for data center use often assume that the power quality in the data center is well controlled and of good quality. Therefore use of traditional methods to protect from transient power spikes is often limited and/or absent. The other problem with traditional methods are that they often are too big to be used in crowded data center cabinets with limited free space and form factor limited devices. The present invention provides a number of devices and methods to increase the odds or positively prevent ATS units or other devices from failing due to these conditions and meet the other constraints, such as form factor, energy efficiency, cost, etc. that data center and other environments often require.

Switching mechanisms for electrical connections currently are divided into solid-state based switching devices (triacs, etc.) that switch very fast but have the disadvantage of being inefficient, losing between approximately 0.5-2% of the power sent through them as heat, and mechanical based relays that switch much slower but are much more efficient with minimal heat loss. Many devices including ATS units use solid state switches and/or mechanical relays to control electricity with the advantages and drawbacks noted above. Regardless of the type of switch, solid-state or mechanical relay, in many applications, either or both transfer time and efficiency are important, and may be critical. ATS switches are available in the market that use one, the other or a combination of both switching technologies.

A key example is the design and management of power distribution in data centers because the power supplies used in modern Electronic Data Processing (EDP) equipment can often only tolerate very brief power interruptions. For example, the Computer and Business Equipment Manufacturers Association (CBEMA) guidelines used in power supply design recommend a maximum outage of 20 milliseconds or less. If the power delivery to the power supply is interrupted for longer than this, the EDP equipment being run will halt or reboot. Modern power supplies often only tolerate a maximum outage time of as low as approximately 12-14 milliseconds, we have measured and observed this in many past and current EPD devices.

This is a very important issue in the design of manual or automatic transfer switches (ATS), for switching between two or more power sources (e.g., due to power failures such as outages or power quality issues), as well as other power distribution devices used with EPD equipment. The number of modern devices that now incorporate embedded processor control is large and growing fast. Many of these devices do not have dual power supplies for a variety of reasons, such as cost or size. The programs running on these devices may incorporate algorithms that "learn" over time to improve the performance of the device. The data stored to do that may not be written to persistent data storage. In that case, it is common to use ATS units to insure that the connected devices run without any downtime. There are many other examples of devices incorporating electricity, where the speed and/or efficiency of the switching function is an important issue and reduction or elimination of vulnerability to these transient current and voltage issues would be of great benefit.

The present invention further relates to reducing or eliminating the vulnerability of certain devices, especially automatic transfer switches to high transient currents and/or voltage events (well above the rated capacity of the relay and/or solid-state switching device used in the ATS) that can damage or destroy the connected ATS unit(s). In particular, the invention relates to providing apparatus and methods for reducing or eliminating the vulnerability of the connected ATS unit(s). This can be done by external devices that can be retrofitted to already deployed automatic transfer switches, or design and/or relay conditioning methods that can be integrated into ATS construction that reduce or eliminate the vulnerability of the ATS to the high transient current &/or voltage problem.

Data center cabinets are very crowded and therefore meeting form factor and space constraints can be a very important part of the invention. A contributing factor is that a limiting consideration in many ATS designs is that the size the relays which can be used is limited by the requirement to have the ATS switch fast enough. This means that the relay must actuate fast enough to accomplish the power transfer in the required timeframe to keep the connected equipment running without downtime caused by a power delivery interruption. Therefore, the design of the relay must have a contact gap, armature mass and coil that meet the actuation speed requirement. This means that the relay gap needs to be small enough and the armature mass (including the size of the attached contacts) low enough to achieve the actuation speed necessary.

These required characteristics limit the ability of the relay to absorb energy and thus its ability to tolerate these high transient current and/or voltage events without damage or destruction. Silicon based switching devices also have limits on the energy they can absorb from high transient current and/or voltage events without damage or destruction. A further complicating factor is that relays and solid-state switching devices that have more tolerance to high current and/or voltage events are often larger and therefore may not fit in the space available in the desired application. Other solutions such as the use of inductors, chokes or other traditional methods for addressing surge currents also are often too large to fit in the space a particular application requires.

Some of the objectives of the invention include the following:

Providing apparatus, designs and methods to reduce or eliminate the vulnerability of ATS units or other vulnerable devices to high transient current and/or voltage events in the required form factors and space and cost limitations. The apparatus, designs and methods are able to be implemented as a retrofit solution to existing ATS installations and/or devices or be an upgrade to the design of current and future ATS devices or other devices that can be used to reduce or eliminate the issue.

These objectives and others are addressed in accordance with the present invention by providing various systems, components, designs and processes for improving ATS function. Many aspects of the invention, as discussed below, are applicable in a variety of contexts. However, the invention has particular advantages in connection with data center applications. In this regard, the invention provides considerable flexibility in dealing with the issue of high transient current and/or voltage issues related to ATS unit function. The invention is advantageous in designing the devices used in power distribution to server farms such as are used by companies such as Google or Amazon or cloud computing providers.

In accordance with another aspect of the present invention, a method and apparatus ("utility") is provided for suppressing transient currents in electrical circuits to prevent damage to switching devices such as relays and/or solid-state switching devices. The utility involves transfer switch system, such as an ATS, including a switch unit and a power surge suppression circuit. The switch unit has a first input for receiving a first power signal, a second input for receiving a second power signal, and an output for providing a power signal to a connected load. Each of the inputs provides a power signal via a power cord extending between the switch and a power outlet associated with a power source. The switch unit further includes a switch for selectively connecting one of the first and second inputs to the output depending on a power signal status of at least one of the first and second power signals. The power suppression circuit suppresses power surges at the switch unit. The circuit is disposed either between the switch unit and one of the power outlets or between switch unit and the load. The transfer switch system therefore resists damage to the switch associated with power surges.

One or more power surge suppression circuits may be associated with the automatic transfer switch system. In one implementation, each of the first and second power cords includes a first end for connecting to one of the power outlets, a second end for connecting to the switch unit and a power surge suppression circuit disposed in-line on one of the first and second power cords between the first and second ends of the power cord. Where the switch unit is configured such that the first power source is the primary power source, the power surge suppression circuit may be disposed between the switch unit and the second outlet. Alternatively, power surge suppression circuits may be provided on the output, on both inputs, on one input and the output, etc. The power outlets may be outlets of one or more power strips. For example, a first power strip or a first outlet of a power strip may be associated with a first power source and a second power strip or a second outlet of a power strip may be associated with the second source. In this manner, the first and second inputs of the switch unit may be connected to the first and second power sources. The power strip may have surge suppression functionality as well. In this regard, conventional surge suppression functionality of power strips has been found insufficient to protect the contact surfaces of automatic transfer switches in some cases, but appropriate surge protection could be added to one or more outlets of a plug strip in accordance with the present invention, e.g., an outlet designated as an automatic transfer switch outlet of the strip.

The switch unit is preferably operative for switching from a first state where the first input is connected to the output and a second state where the second input is connected to the output in response to detecting one of a power outage and a degradation of the first power signal from one of the power sources. The switch may comprise one or more electromechanical relays or a solid-state switch. The power surge suppression circuit may optionally be incorporated into the switch housing.

In accordance with another aspect of the present invention, a relay of an automatic transfer switch may be conditioned to better resist power surge events. It has been found that a relay will better resist malfunctions due to power surge events if a contact surface of the relay is conditioned by changing the shape, texture or other morphology of the contact surface. This can be accomplished by applying an electrical power signal to the relay sufficient to change the morphology of the contact surface.

The corresponding utility involves providing a switch unit including a contact surface and applying an electrical signal to the contact surface sufficient to cause the desired change in morphology of the contact surface. Specifically, the switch unit includes first and second inputs for receiving first and second power signals, an output for providing a power signal to a connected load, and a switch for selectively connecting one of the first and second inputs to the output depending on a power signal status of at least one of the first and second power signals. The switch unit includes an electromechanical relay having a contact surface for making an electrical contact between and armature of the relay and a connected circuit. For example, the contact surface may be mounted on the armature or may be part of an electrode for establishing an electrical connection with the armature. The electrical signal is preferably sufficient to cause at least a partial state change to the contact surface, e.g., a portion of the contact surface may become temporarily molten. The electrical signal may be applied directly to the contact surface or may be applied to the switch unit via the first and second inputs. Alternatively, the contact surface may be manufactured with the desired morphology to resist damage due to surges (e.g., by molding the contact surface to the desired morphology) or may be mechanically worked to the desired morphology.

In accordance with a still further aspect of the present invention, a system is provided for use in conditioning a contact surface of an automatic transfer switch. As noted above, it is been found that a contact surface can be conditioned to change the morphology of the contact surface, thereby rendering an automatic transfer switch less susceptible to damage due to power surges. A system can thus be provided to condition the contact surface by applying a power signal directly to the contact surface or to an automatic transfer switch including the contact surface.

The system includes a power signal generator, first and second outputs associated with the power signal generator, and a controller. The power signal generator is operative for producing an electrical power signal. The first and second outputs are adapted for connecting to first and second inputs connected to the contact surface, either directly or via the automatic transfer switch, where the automatic transfer switch includes an electromechanical relay and the contact surface is involved in making an electrical contact between and armature of the relay and a connected circuit. The controller is associated with the power signal generator for controlling the power signal generator to apply the electrical signal to the contact surface, wherein the electrical signal is sufficient to cause a change in morphology of the contact surface. It will be appreciated that parameters that may be involved in this regard include the voltage of the signal, the current of the signal, the time that the signal is applied, a frequency of the signal, the number of cycles during which the signal is applied, and the nature of any impedance capaciitance or other electrical characteristics associated with the flow path of the signal. In addition, the material of the contact surface, the shape of the contact surface, the dimensions of the contact surface and other characteristics of the contact surface may be taken into account in applying an appropriate signal.

An associated methodology involves providing a power signal generator, connecting outputs of the power signal generator to the contact surface (directly or indirectly), and controlling the power signal generator to apply one or more electrical signals to the contact surface sufficient to cause a change in morphology of the contact surface. In a preferred implementation, a series of signals, or cycles, of progressing power are applied to the contact surface, such that the earlier signals may render the contact surface, such that the earlier signals, may render the contact surface more tolerant of later signals. The methodology may further include separating the armature from the connected circuit at the contact surface and inspecting the contact surface to ensure that it has the desired characteristics to resist damage due to power surges.

In accordance with another aspect of the present invention, a utility is provided for supplying power to an electrical device. For example, the electrical device may be an automatic transfer switch or another device that is sensitive to power surges, such as a device including an electromechanical relay. The utility involves a first cord cap for connecting to the electrical device, a second cord cap for connecting to a power supply, a power cord extending between the first and second cord caps, and a power surge suppression circuit disposed in-line on said power cord between said first and second cord caps. For example, the first cord cap may be a female cord cap for mating with a male power port of the electrical device (e.g. an ATS unit), and the second cord cap may be a male cord cap for plugging into a female outlet of a power supply unit such as a power strip. As a further example, the first cord cap may be connected to the output of an ATS and the second cord cap may be connected to a piece of equipment. The power surge suppression circuit may be provided in a housing interposed in the power cord between the cord caps. The housing is preferably relatively small, for example, having a maximum dimension of no more than about 6 cm and a volume of no more than about 50 $cm^3$.

BRIEF DESCRIPTION OF THE DRAWINGS

For a more complete understanding of the present invention and further advantages thereof, reference is now made to the following detailed description, taken in conjunction with the drawings, in which:

FIGS. 1D-1F and 1H-1J illustrate the operation of another embodiment of a clamping mechanism in accordance with the present invention.

FIGS. 4A-4C illustrate an apparatus for providing a locking feature for a standard receptacle in accordance with the present invention.

Figures 1A, 1B, 1C:
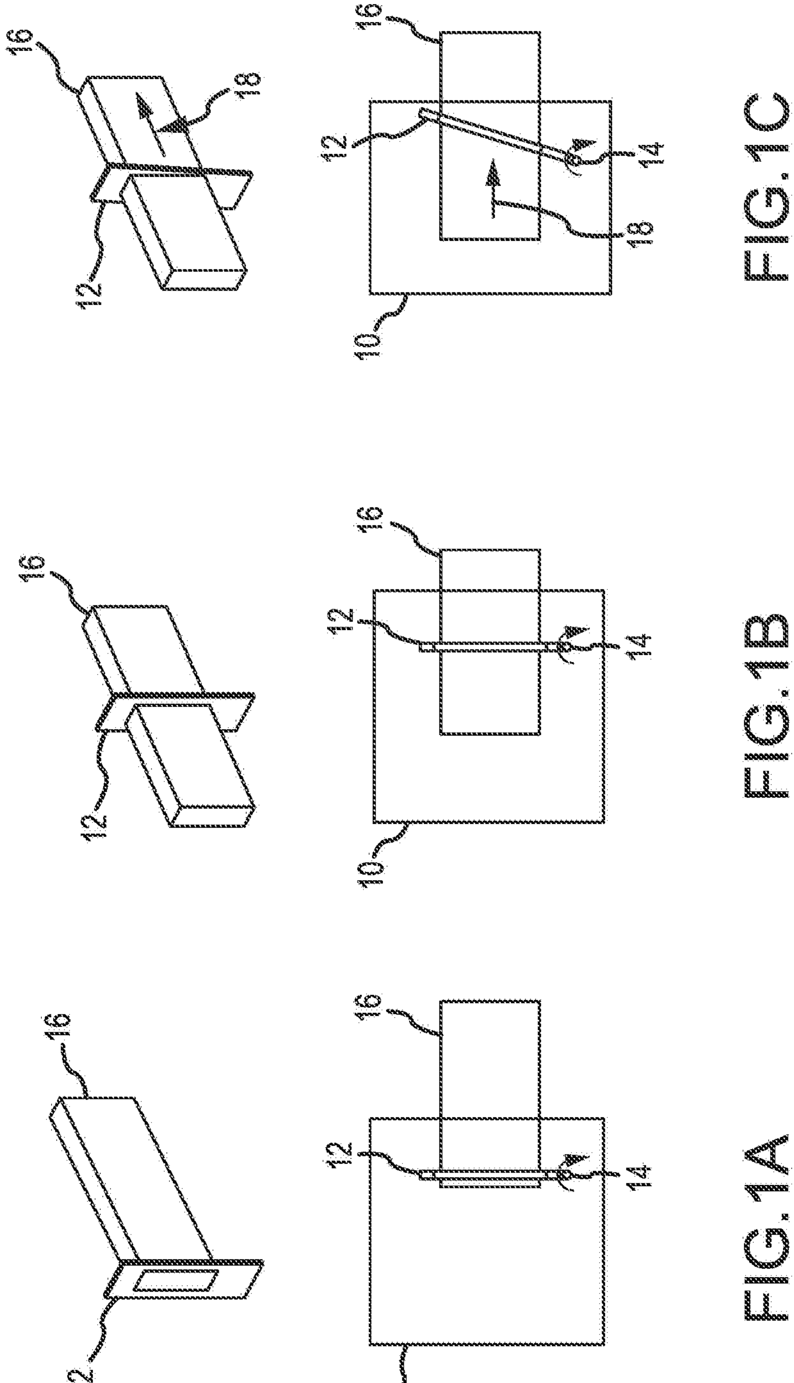
FIGS. 1A-1C illustrate the operation of an embodiment of a clamping mechanism in accordance with the present invention.

In the appended figures, similar components and/or features may have the same reference label. Further, various components of the same type may be distinguished by following a first, e.g., numerical label with a second, e.g., alphabetic label that distinguishes among the similar components. If only the first reference label is used in the specification, the description is applicable to any one of the similar components having the same first reference label irrespective of the second reference label or lack thereof.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

As discussed above, the present invention relates to various electrical connector bodies where the connector body housing can be formed in sections of injection molded plastic. The sections can then be secured together with the electrical components inside to form the electrical connector body. Such securement may be accomplished by sliding a compression component over strain relief extensions. This methodology may be used to form a variety of types of components including cord caps, in-line surge suppression circuits, and cord mounted compact automatic transfer switches, among others. The description below sets forth a number of embodiments of locking cord caps and other locking connectors and thereafter describes embodiments and methodology related to electrical connector bodies formed from injection molded plastic.

FIGS. 1A-1C illustrate the operation of an embodiment of a clamping mechanism for securing a mated electrical connection that may be included in a locking receptacle of the present invention. In each of the FIGS. 1A-1C, the bottom portion represents a side view of a prong 16 and a clamping mechanism 12, while the top portion represents a perspective view. Referring first to FIG. 1A, the prong 16 of a plug is shown prior to insertion into a receptacle 10. The prong 16 may be a ground prong of a standard plug (e.g., an IEC 320 plug, a NEMA 5-15, or the like) and may be various sizes and shapes. Further, the receptacle 10 may be the ground receptacle or other receptacle(s), of a standard outlet (e.g., a NEMA standard cord cap, an IEC 320 cord cap, or the like) that is operative to receive a standard plug. The receptacle 10 also includes the clamping mechanism 12 that is coupled to a pivot 14. The clamping mechanism 12 includes an aperture that is sized to be slightly larger than the prong 16, such that the prong 16 may only pass through the aperture when the length of the clamping mechanism is substantially perpendicular to the length of the prong 16. That is, the design of the clamping mechanism 12 is such that a simple slide on and capture technique is utilized.

FIG. 1B illustrates the prong 16 when inserted into the receptacle 10. As shown, the prong 16 passes through the aperture in the clamping mechanism 12 and into the receptacle 10, such that the corresponding plug and outlet are in a mated position. The clamping mechanism 12 further may include a stop (not shown) to prevent the clamping mechanism 12 from pivoting during the insertion of the prong 16. In this regard, during insertion of the prong 16, the length of the clamping mechanism 12 will remain substantially perpendicular to the length of the prong 16, which permits the passage of the prong through the aperture of the clamping mechanism 12.

FIG. 1C illustrates the gripping function of the clamping mechanism 12 in reaction to a force on the prong 16 that tends to withdrawal the prong 16 from the receptacle 10. In reaction to a withdrawal of the prong 16, the clamping mechanism 12 angularly deflects (i.e., rotates) about the spring pivot 14, causing the aperture in the clamping mechanism 12 to grip the prongs 16. Thus, the very force that tends to withdraw the prong 16 from the receptacle acts to actuate the clamping mechanism 12 to engage the prong 16, thereby preventing the withdrawal of the prong 16, and maintaining the electrical connection of the mated assembly. The clamping mechanism 12 may be constructed of any suitable material, including a high strength dielectric with an imbedded metallic gripping tooth. An all-metallic clamping mechanism may also be used if the prong 16 is a ground prong. In this regard, an all-metallic clamping mechanism may be used, e.g., for other prongs, though modifications may be required to obtain approval by underwriting bodies.

Figure 1D:
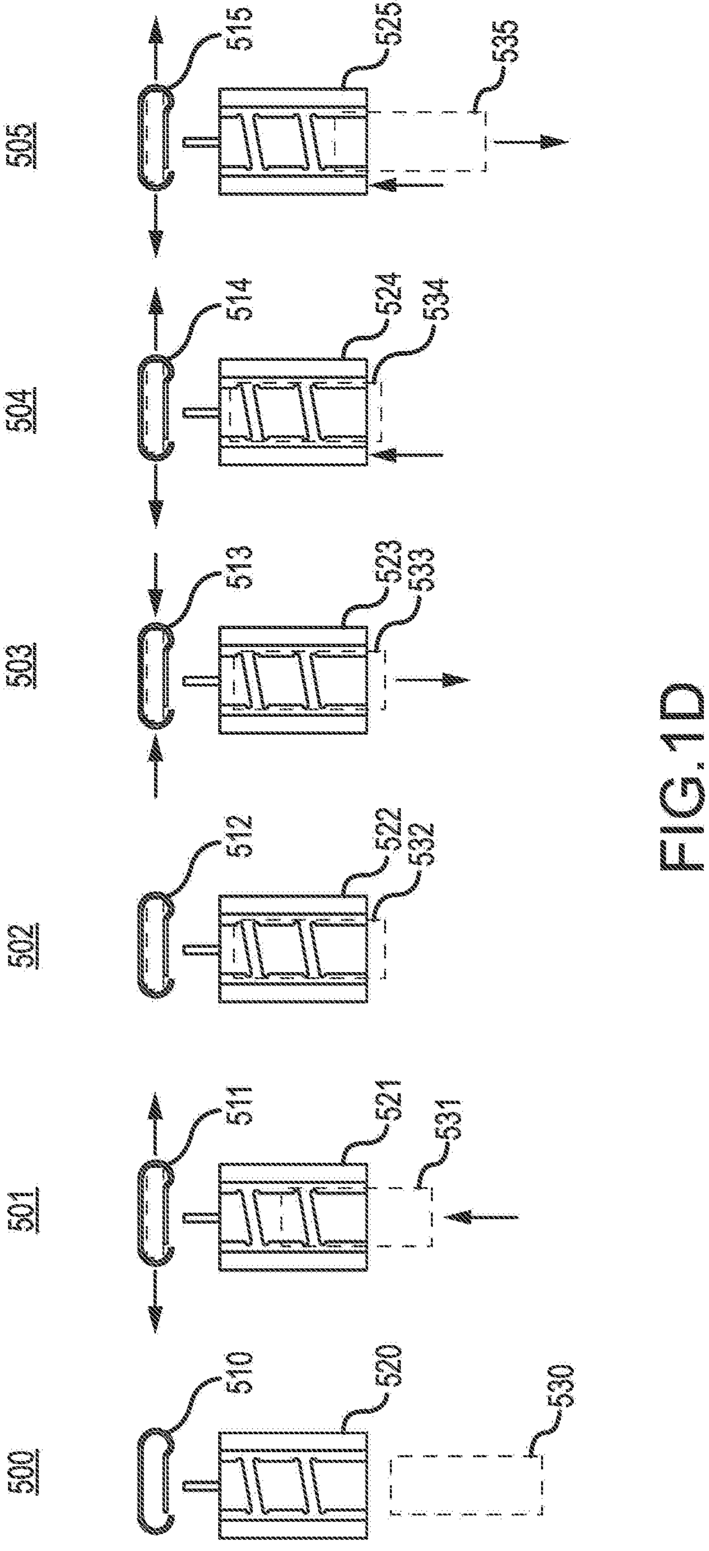
Figure 1E:
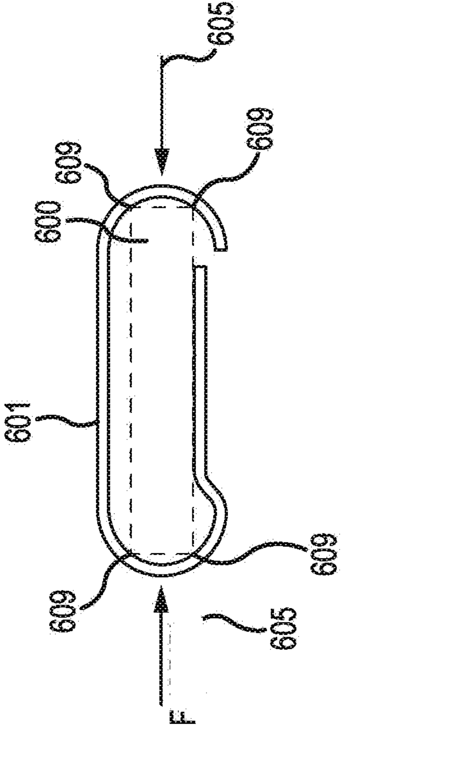
Figure 1F:
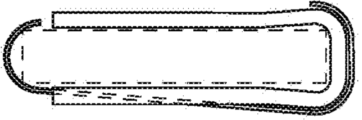
Figure 1F:
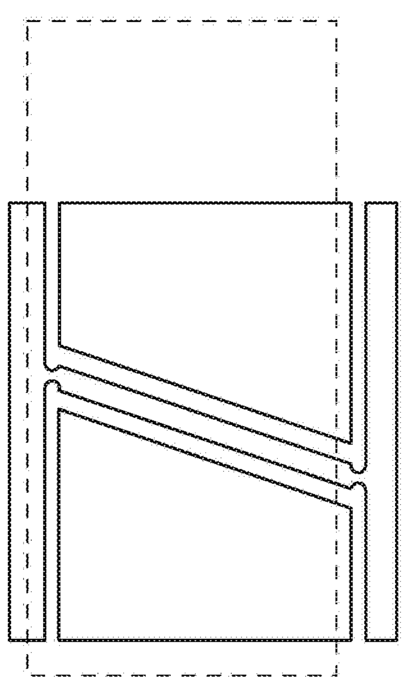
Figure 1G:
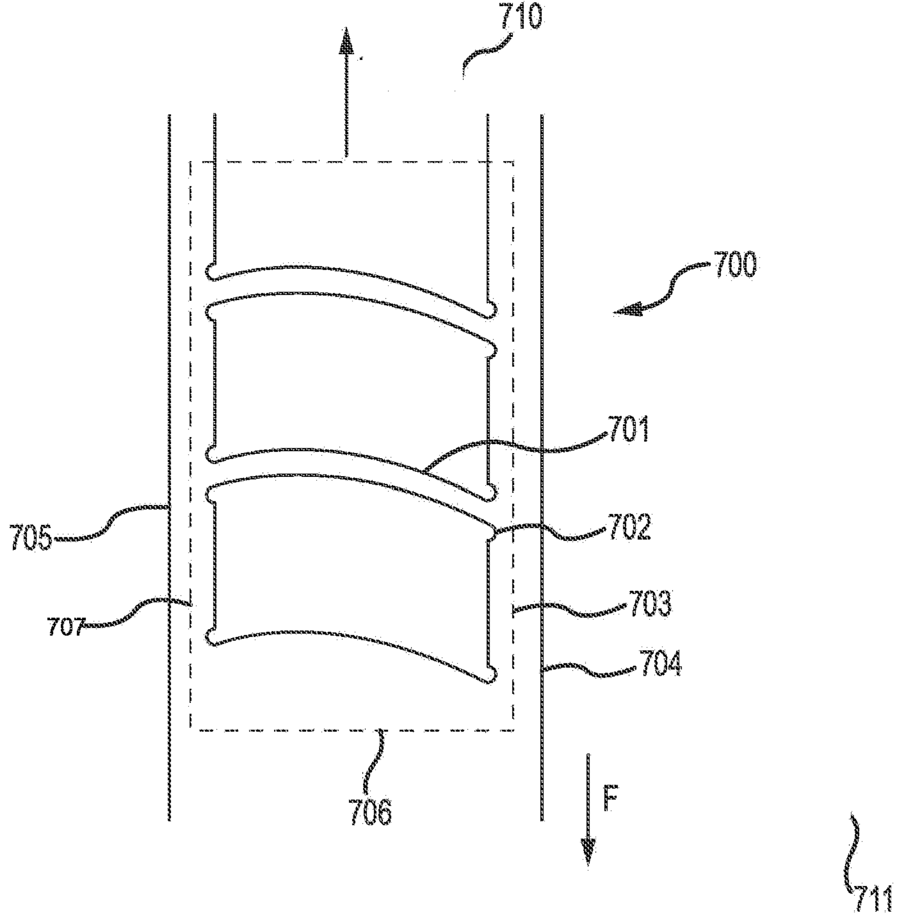
FIG. 1G illustrate the operation of another embodiment of a clamping mechanism in accordance with the present invention.
Figure 1H:
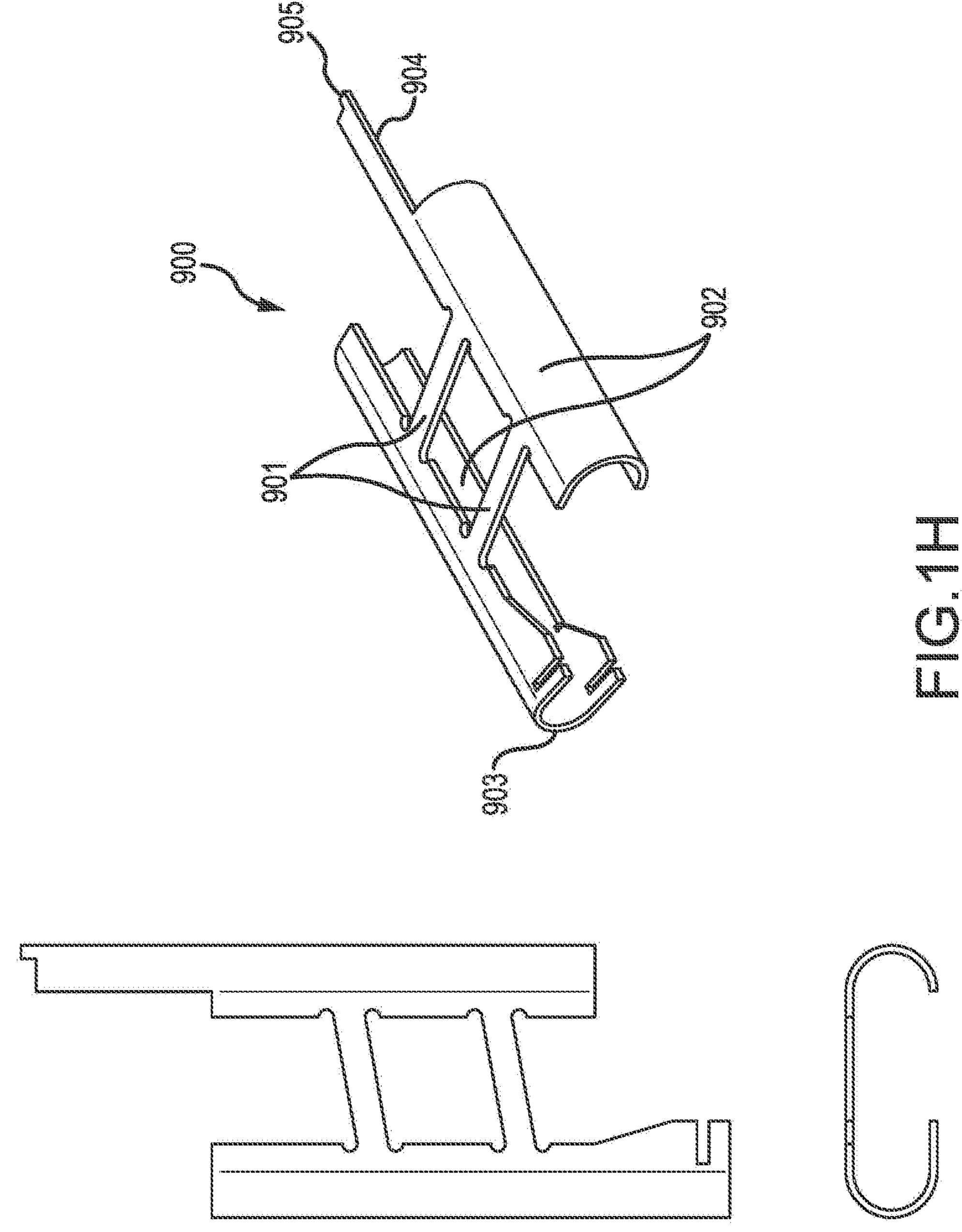
Figure 11:
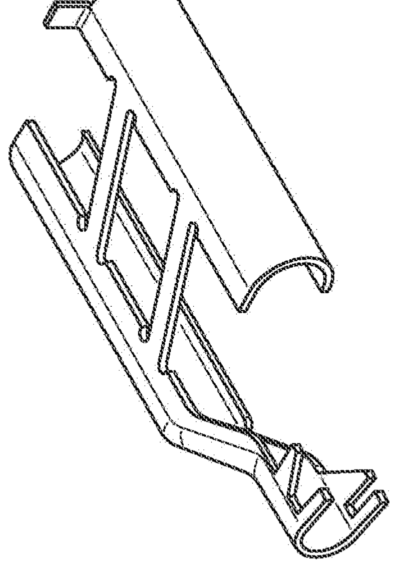
FIGS. 11A-11B illustrates an alternative shaping of a spring prong retainer in accordance with the present invention that enables improved cord retention and increased overall strength.
Figure 11:
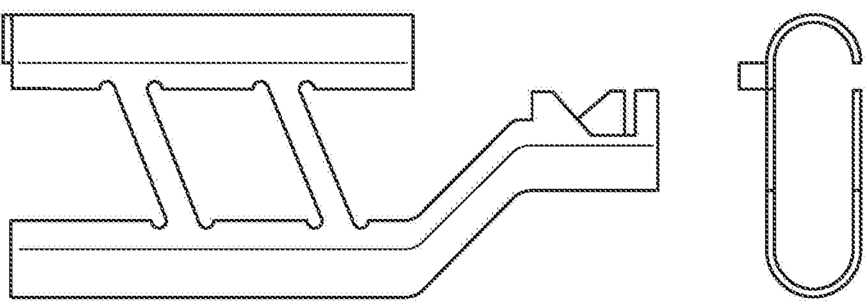

FIGS. 1D-1F & 1H-1J illustrate the operation of another embodiment of a clamping mechanism for securing a mated electrical connection that may be included in a locking receptacle of the present invention. In each of the illustrations 500-505 of FIG. 1D, the top row of figures represents the end-on views of the clamping mechanism and the bottom row represents side views of the clamping mechanism with an electrical contact prong in the states of: 1) disengagement 500, 2) being inserted 501, 3) fully inserted 502, 4) fully inserted under tension 503, 5) being released 504 and 6) during contact removal 505. The example clamping mechanism as shown in FIG. 1E has two channels 606 that grip the sides of the contact and cross-link springs 603 connecting the channels. It should be noted that the clamping mechanism can act as both the electrical contact and clamping mechanism together or can be only a clamping mechanism that is integrated with a separate electrical contact. FIGS. 1H-1J shows the clamping mechanism acting as both the electrical contact and clamping mechanism and FIG. 1F shows a clamping mechanism that is suitable for use with a separate electrical contact. Details of FIG. 1H include the gripping channels 902, the cross-link springs 901, the integrated electrical conductor crimp 903, the release shaft 904 and the release shaft contact nub 905. Possible instantiations can be made of one suitable material or several materials (for example steel and copper) to optimize the functionality of the clamping mechanism, electrical and mechanical properties, case of manufacture and cost. The materials can joined together or secured to function together by any suitable means such as mechanical interlock, fasteners, gluing, etc. as is needed to optimize their function and minimize their cost.

A possible example of this would be a clamping mechanism that is also an electrical contact made of annealed brass or phosphor bronze or other suitable material. Due to the expansion characteristics of the chosen materials, the expansion associated with heating of the retainer contact (receptacle) and more specifically the expansion of the cross-link springs, from any resistance in the connection of it to the inserted electrical prong (Note that the prong could be different shapes, it could be a pin for example), will result in progressive tightening of the grip function. Even if the receptacle is not “locked” to the prong upon initial insertion, e.g. no extraction force is applied to tighten the gripping mechanism, and the only bearing force applied to the contact surfaces is the force of the cross-link spring action, when current is applied, the resistance at the junction of the socket and prong will result in some degree of heating. If the resistance is high enough, say the prong is under-sized, or damaged and not uniformly in contact with the channels, the temperature of the assembly will start to rise. In addition, the electrical connection between the channels, that is the channel that is connected directly to the incoming wire and the opposing channel connected via the cross-link springs, can be manipulated in cross section to have additional heating at higher current levels such that more heating is occurring in the cross-link springs than elsewhere. In any case, heating of the cross-link springs will result in expansion. Since the heat sinking is largely via the inserted prong, and subsequently the wire of the associated connection, the temperature of the cross-link spring will be higher than the prong temperature average. Hence slightly less expansion of the prong will be present. At some point the differential will allow the natural tendency of the spring loaded and racked socket receptacle to overcome the molecular lock (static friction) between the channels and the edges of the prong. The channels will move slightly with regards to the prong and a new engagement will be established. At this point, the electrical resistance will drop due to the newly established, and slightly tighter connection between the channels and the prong, and the whole thing will start cooling. Now, the cross-link springs will shorten, and the force exerted on the bearing points between the channels and the prong will increase dramatically because the tangential force, similar to the force applied when pull-out force is applied, and the electrical connection will be re-established much more effectively. This in turn will reduce the resistance further and effectively "lock" the receptacle to the prong, and guarantee superior electrical connection, even with imperfect mating surfaces. It is a re-generative condition that is responsive to poor connections, and tends to self-heal a poor electrical connection.

FIG. 1E shows the mechanical properties of the clamping mechanism. An electrical contact 600 (or other plug structure) is inserted into the clamping mechanism 601. The dimensions of the clamping mechanism are set so that the contact will spread the clamping mechanism open. In this regard, the forward end of the clamping mechanism (the end that is first contacted by the electrical contact) may be flanged outwardly to capture the contact and facilitate spreading of the clamping mechanism. This spreading action is shown in FIG. 1D 511. The transverse cross-link springs 603 act to resist the spreading open of the clamping mechanism. This insures that the edges of the electrical contact 600 are biased to touch the channels at defined contact points 609. Differently shaped electrical contacts and/or clamping mechanisms would have different contact points and/or surfaces. In the illustrated embodiment, the contact points/surfaces where clamping occurs are primarily or exclusively on the top and bottom surfaces of the prong, rather than on the side surfaces where electrical connections are typically made. This may be desirable to avoid concerns about any potential degradation of the electrical contact surfaces thought it is noted that such degradation is unlikely given that the clamping forces are spread over a substantial length (and potentially width of the contact. Once the electrical contact prong 600 has been inserted into the clamping mechanism 601, any pulling force F(pull) 604 that acts to remove the prong 600 from the clamping mechanism 601 will result in a clamping force F(grip) 605 being exerted on the sides of the prong 600. The clamping force is generated by the action of the transverse cross-link link springs pulling on the channels 606 on each side of the clamping mechanism such that the channels are urged towards one another. The relationship of the forces will be generally F(grip)=F(pull)/tangent (angle theta). Thus, the clamping force F(grip) will increase faster than the force F(pull) that is acting to remove the prong 600 from the clamping mechanism 601. Therefore the grip of the clamping mechanism 601 on the prong 600 will become more secure as the force trying to extract the prong 600 increases. Once the gripping mechanism has been actuated by a pull force 604, friction will tend to keep the gripping mechanism tightly engaged. To release the gripping mechanism, the release rod 607 is pushed, generating a force F(release) 608. This force will decrease the angle theta and urge the channels away from one another, rapidly decreasing the gripping force F(grip) 605 and allowing the prong 600 to be easily removed from the gripping mechanism 601. The release force 608 needed to effect release can be very small.

In one possible embodiment, associated with a standard NEMA C-13 outlet, the transverse cross-link spring may be formed from copper or a copper alloy and have a thickness of about 50/1000-75/1000 of an inch. In such a case, the curve 602 may be generally circular in shape with a radius of curvature of about 75/1000 of an inch. The curve 602 may extend into the cross-link spring 603 so that a narrowed neck, from radius-to-radius, is formed in the cross-link spring 603. Such a curve 602, in addition to affecting the operational properties of the gripping mechanism as may be desired, avoids sharp corners that could become starting points for cracks or accelerate metal fatigue. The neck also helps to better define the pivot point of the cross-link spring 603 in relation to the channels as may be desired. It will be appreciated that specific operational characteristics, such as (without limitation) the amount of any slight movement allowed before locking, the total amount and location of clamping forces exerted on the prong, the force level (if any) where the clamping mechanism will release, and the durability of the clamping mechanism for frequent cycling, may be application specific and can be varied as desired. Many other configuration changes and construction techniques are possible to change these operational characteristics. For example, the cross-link spring (or a portion thereof) may be twisted (e.g., at a 90° angle to the plane of stamping of the material) to affect the pivot point and flexing properties of the spring as may be desired.

The choice of material, thickness and geometry and shaping of the apparatus affect the operational properties of the gripping mechanism 601. The transverse cross-link springs can have their spring constant affected by all of these variables. For example the radius, location and shape of the curve 602 and the thickness of the neck of the transverse cross-link spring 603 can be varied to achieve differing values of spring constants. This can be desirable to optimize the pre-tension gripping force exerted by the spring on a contact inserted into the retention mechanism or the range of contact sizes the gripping mechanism will function with. Note: The pre-tension gripping force is defined as the gripping force exerted on the contact 600 by the action of the transverse cross-link springs 603 before any pull force 604 is placed on the contact.

Referring to FIG. 1G another possible instantiation is shown. In this instantiation, the operation of the mechanism is similar to the operation described in (1-D through 1F). As tension is applied to the assembly between Force Pull 710 on the prong 706 and the Counter-Force Pull 711, bearing forces at the contact points (703,707) of the channels (704, 705) and the inserted contact prong 706 (note that the prong could have different shapes, it might be a pin for example) increase exponentially, resulting in immediate capture of the prong by the channels. As F Pull 710 increases, the tension in the cross-link springs 701 continue to increase as well. The cross-link springs are crescent shaped in this instantiation as opposed to the straight springs described in FIGS. 1D-1F & 1H-1J. The crescent shape allows the cross-link springs to now have two actions. First, they have a spring action at the connection point to the channels (704, 705) and secondly they have a spring action along the long axis of the cross-link spring (701). The addition of the spring action along the long axis allows the cross-link spring to have a predictable ability to lengthen, or stretch. As F Pull 710 continues to increase, the tension in the cross-link springs 701 continue to increase to a point where the cross-link spring begins to stretch along its long axis. At this point, the relationship between the F Pull 710 applied and the resulting grip forces at the contact points (703,707) of the channels (704, 705) and the inserted contact prong 706 ceases to increase. Now, increasing Force Pull 710 results in overcoming the friction at the contact points 703,704, and the contact pin 706 will move in relationship to the channels (704, 705) and hence the gripping mechanism 700. If Force Pull 710 is maintained, the contact prong 706 will become extracted from the channels (704, 705) completely. This condition allows the assembly 700 to have a predictable point in tensile relationships where a plug and receptacle can be separated without damage to either principal component, the prong or the gripping mechanism (which can be a gripping mechanism that is also an electrical contact or a separate gripping mechanism with integrated electrical contact as noted earlier).

Referring again to FIG. 1D, the prong 530 of a plug is shown prior to insertion into a receptacle with an electrical contact represented by 510. The prong 530 may be a ground prong or other prong of a standard plug (e.g., an IEC 320 plug, a NEMA 5-15, or the like) and may be various sizes and shapes. Further, the receptacle containing the electrical contact 510 may be the ground receptacle or other receptacle (s), of a standard outlet (e.g., a NEMA standard cord cap, an IEC 320 cord cap, or the like) that is operative to receive a standard plug. The receptacle includes the clamping mechanism 520 and may utilize more than one clamping mechanisms in one receptacle. The design of the clamping mechanism 520 is such that a simple slide on and capture technique is utilized.

Other clamping mechanisms are possible in accordance with the present invention. For example, a wire mesh, formed and dimensioned so as to receive a contact, prong or other plug structure (collectively, "contact") therein, may be utilized to provide the clamping mechanism. The wire mesh is dimensioned to frictionally engage at least one surface of the contact when plugged in. When a force is subsequently exerted tending to withdraw the contact from the receptacle, the wire mesh is stretched and concomitantly contracted in cross-section so as to clamp on the contact. A Kellem-style release mechanism may be employed to relax the weave of the mesh so that the contact is released. Such a gripping mechanism may be useful, for example, in gripping a cylindrical contact.

Figure 2A:
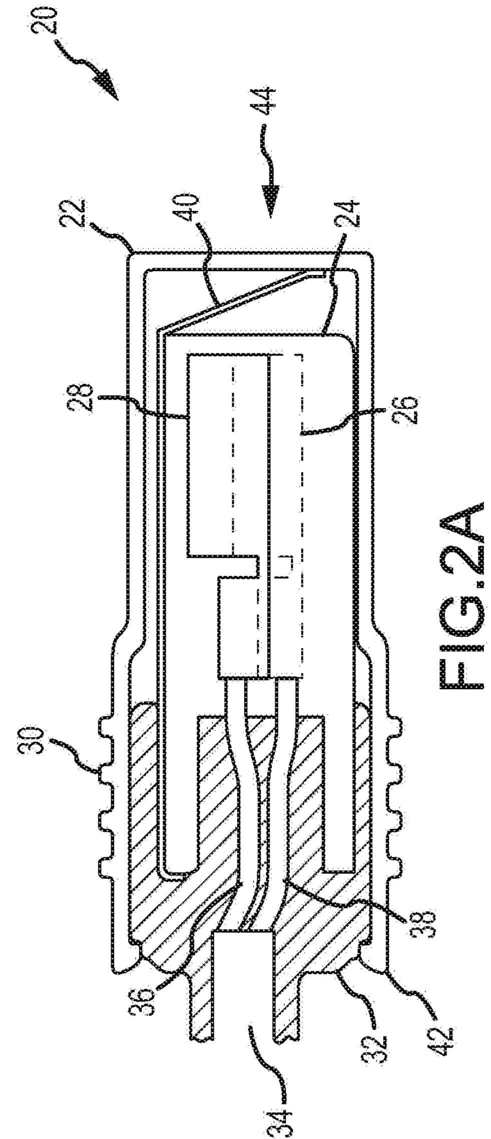
FIGS. 2A-2B illustrate an embodiment of a locking electrical receptacle in accordance with the present invention, using the clamping mechanism described in FIGS. 1A-1C.
Figure 2B:
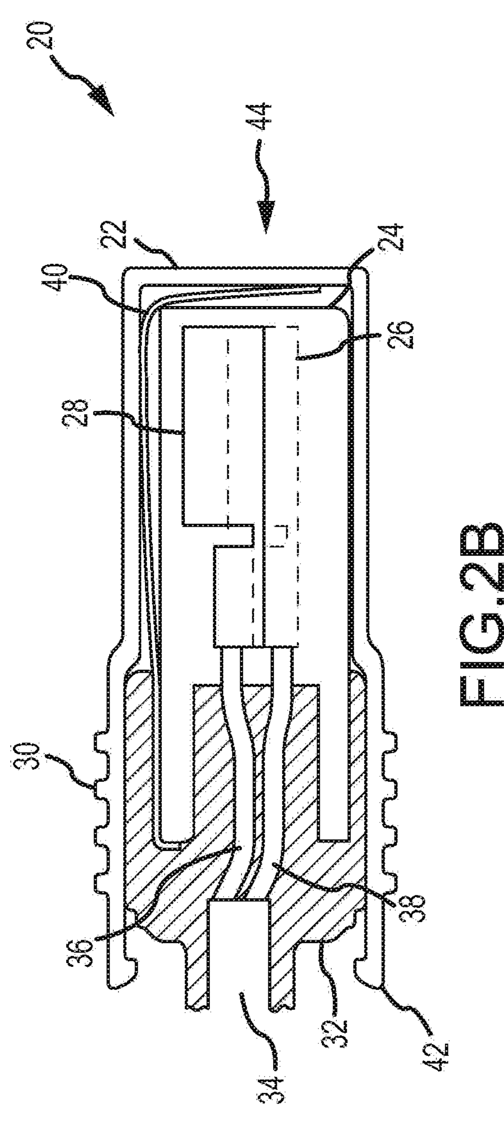
Figure 2C:
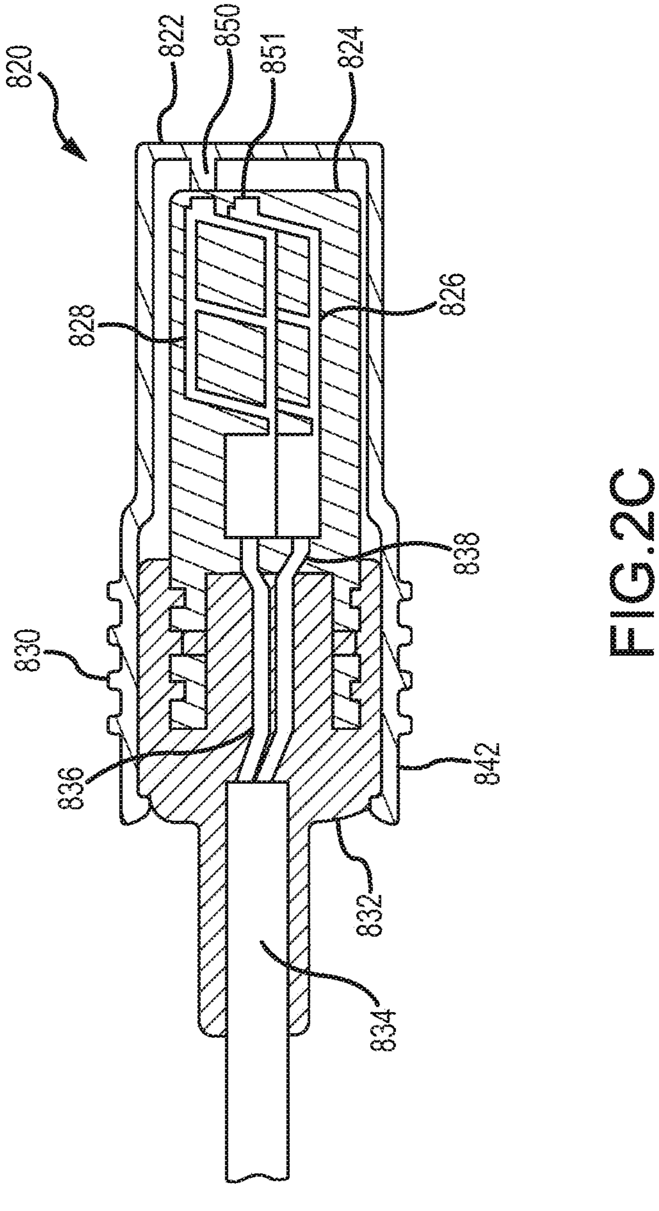
FIG. 2C illustrates an embodiment of a locking electrical receptacle in accordance with the present invention, using the clamping mechanism described in FIG. 1D-1F, 1H-1J or 1G.

FIG. 2C illustrate a cross section of one possible embodiment of a locking electrical receptacle 820. The receptacle 820 is an IEC type 320 cord cap receptacle that includes one or more gripping mechanisms 828. The receptacle 820 includes an inner contact carrier module 824 that contains a gripping mechanism and electrical contacts 826 and 828. Attached to the gripping mechanism and electrical contact sockets are wires 836 and 838 that extend out of the receptacle 820 though a cord 834. The carrier module 824 may be attached to a cord strain relief 832 that functions to prevent the cord from separating from the cord cap or otherwise resulting in damage to the assembly when a force is applied to the cord 834. FIG. 2C demonstrates one possible release mechanism actuation method. Specifically, the receptacle 820 is formed in telescoping fashion with a shell 822 that slides on the carrier module 824 and strain relief 832. A protrusion 850 on shell 822 engages a release 851 of mechanism 828 such that sliding the shell 822 engages the mechanism 828 to its release configuration. The clamping mechanisms described in FIGS. 1D-1J can be combined many of the other release mechanisms described in the incorporated filings.

FIGS. 2A-2B illustrate a cross section of one embodiment of a locking electrical receptacle 20. The receptacle 20 is an IEC type 320 cord cap receptacle that includes a locking mechanism. The receptacle 20 includes an inner contact carrier module 24 that houses contact sockets 26 and 28. Attached to the contact sockets are wires 36 and 38 that extend out of the receptacle 20 though a cord 34. The carrier module 24 may be attached to a cord strain relief 32 that functions to prevent the cord from separating from the cord cap or otherwise resulting in damage to the assembly when a force is applied to the cord 34. A spring prong retainer 40 is disposed adjacent to a surface of the carrier module 24, and extends across a prong-receiving portion 44 of the receptacle 20. One end of the spring prong retainer 40 is bent around the end of the inner contact carrier module 24, which secures it in the assembly (underneath the over-molded material 32).

Alternatively, the spring prong retainer 40 may be secured to the inner contact carrier module 24 by a screw or other fastener, and/or embedded in the module 24. A section of the spring prong retainer 40 that is embedded in the module 24 or alternatively secured in the cord cap via over molded material may be configured (e.g., by punching a hole in the embedded section and/or serrating the edges or otherwise shaping it) to enhance the anchoring strength in the embedded section. The other end of the spring prong retainer 40 is in contact with a telescopic lock release grip 22. Similar to the clamping mechanism 12 shown in FIGS. 1A-1C, the spring prong retainer 40 includes an aperture sized to permit the passage of the ground prong of a plug into the socket 26. The aperture in the spring prong retainer 40 may be sized to be slightly larger than one prong (e.g., the ground prong) in a standard plug such that the aperture may function as the clamping mechanism for the locking receptacle 20. It can be appreciated that prongs with different cross-section shapes, for example round prongs, can use the retention mechanism described herein, with a suitable modification of the aperture shape and geometry of the spring prong retainer. Such modifications may be specific to the various shapes of the cross section of various prong types. Such variations will function in substantially the same manner as the retention mechanism described herein. The spring prong retainer 40 may further be shaped and constructed, as will be discussed in more detail below, to inhibit contact with other prongs and provide a desired release tension. Moreover, the retainer 40 may be retained within a recessed channel formed in the module 24 to further inhibit transiting or side-to-side displacement of the retainer 40. The operation of the clamping feature of the spring prong retainer 40 is discussed in detail below.

FIG. 2A illustrates the locking receptacle 20 when there is little or no strain on the cord 34. As shown, the portion of the spring prong retainer 40 disposed in the prong-receiving portion 44 of the receptacle 20 is not in a substantially vertical position. Similar to the operation of the clamping mechanism 12 shown in FIGS. 1A-1C, the apertures of the spring prong retainer 40 in this configuration will allow the prongs of a plug to pass freely into the socket 26 when the prong is inserted. This is due to the unrestricted change of position of the spring prong retainer 40 to the substantially vertical position as the prongs of a plug acts upon it.

FIG. 2B illustrates the locking receptacle 20 when a force is applied to the cord 34 of the receptacle 20 in the opposite direction of the grip release handle 30. This is the "release position" of the receptacle 20 and is shown without the mating prongs for clarity of operation. Actions that initiate this position are illustrated in FIGS. 3A and 3B.

Figure 3A:
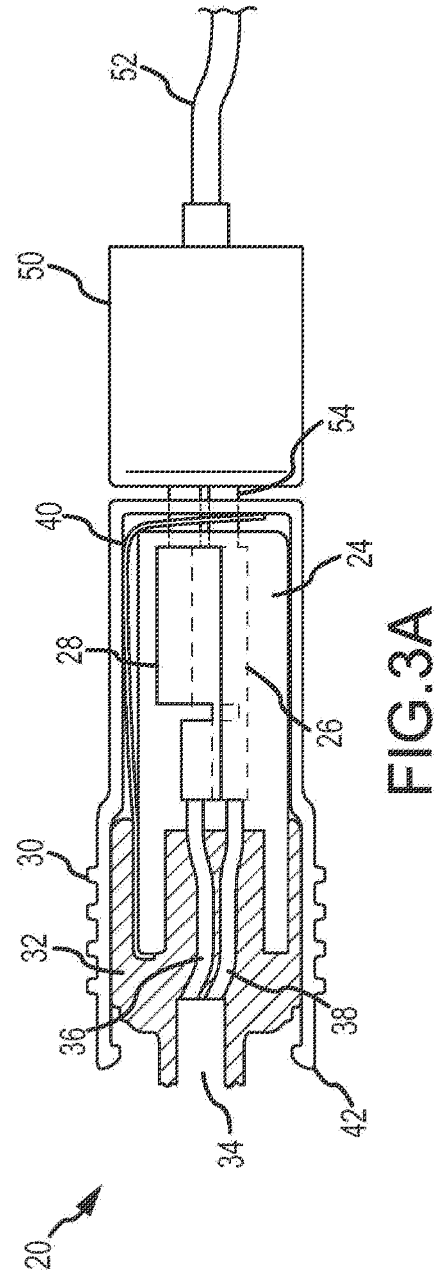
FIGS. 3A-3B illustrate an application for the locking electrical receptacle shown in FIGS. 2A-2B.

FIG. 3A illustrates the operation of the locking electrical receptacle 20 shown in FIGS. 2A-2B. When a prong 54 of a plug 50 first enters the receptacle 20 via an aperture in the lock release grip 22, it encounters the spring prong retainer 40, which is not in the perpendicular orientation at that time. Upon additional insertion, the spring prong retainer 40 is deflected into the perpendicular position by the force applied to it by the prong 54. The prong 54 then passes through the aperture in the spring prong retainer 40 and into the contact socket 26, making the electrical connection as required. Upon release of the insertion force, and when no axial strain is applied to the mated plug 50 and receptacle 20, the spring prong retainer 40 is only partially displaced from the perpendicular axis. It is noted that there is little separation between the forward-most surface of the plug 50 and the end of the receptacle of carrier module 24 adjacent the plug 50 in this connected configuration, i.e., the prong extends to substantially the conventional extent into the receptacle.

Figure 3B:
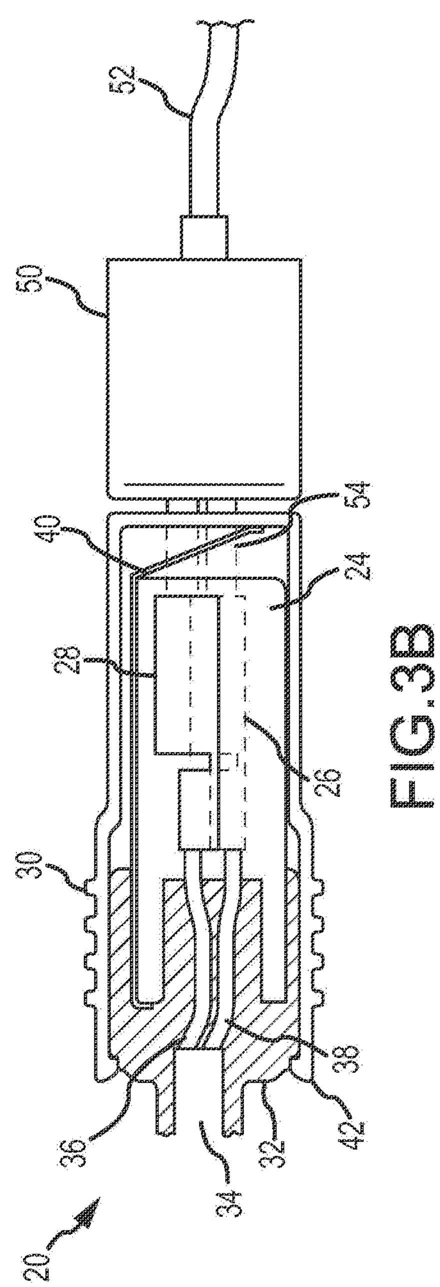

FIG. 3B illustrates in an exaggerated manner the condition of applying axial tension to the cord 34 of the receptacle 20. A slight retraction motion pulls on the spring prong retainer 40, thereby increasing the angle of grip and subsequent tightening of the offset angle of the spring prong retainer 40 and prong 54. The receptacle 20 and the plug 50 are then fully locked in this condition. Upon application of axial tension between the release grip handle 30 and the plug 50, the position of the spring prong retainer 40 is returned to the near-perpendicular position as illustrated in FIG. 3A, thereby releasing the spring prong retainer 40 from the prong 54. Upon release, the receptacle 20 is easily separated from the plug 50. Because the release grip handle 30 is mounted to slide in telescoping fashion with respect to the carrier module 24 and can be gripped for prong release from the top or sides, the locking mechanism can be easily released even in crowded or space limited environments such as in data centers.

Figure 13A:
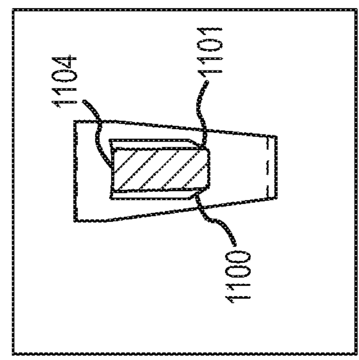
FIGS. 13A-15B show an alternative embodiment of a locking spring prong retainer electrical receptacles and spring prong retainers in accordance with the present invention.
Figure 13A:
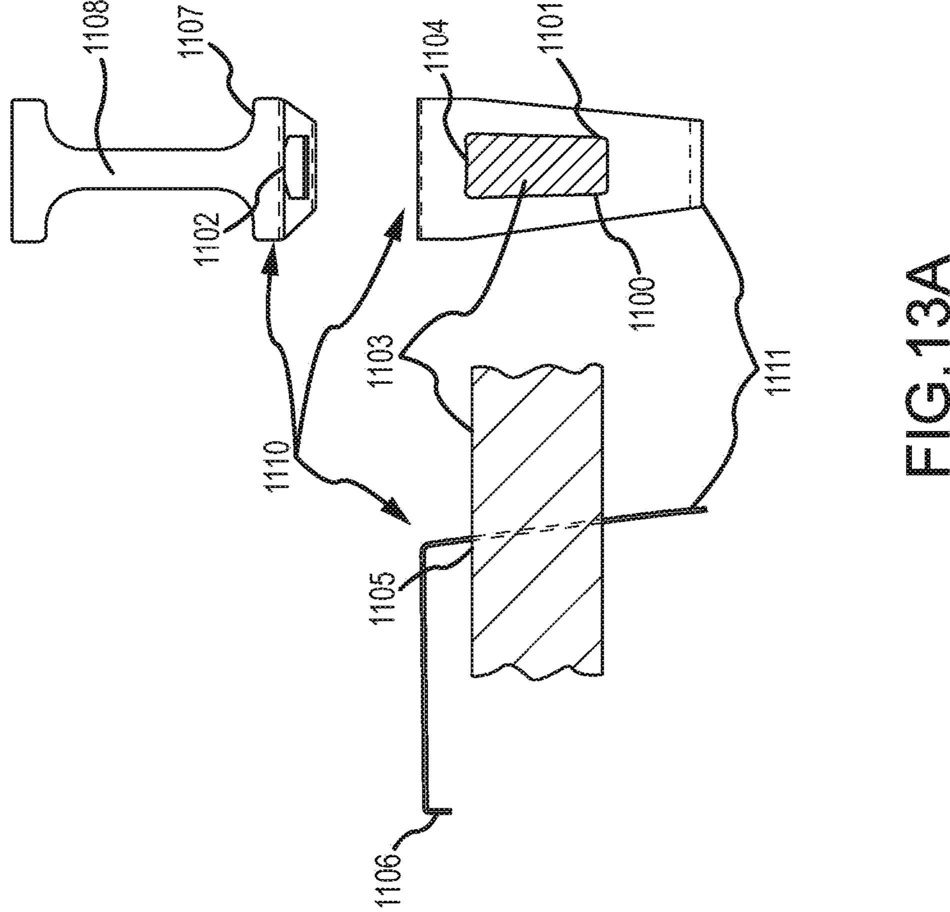
Figure 13B:
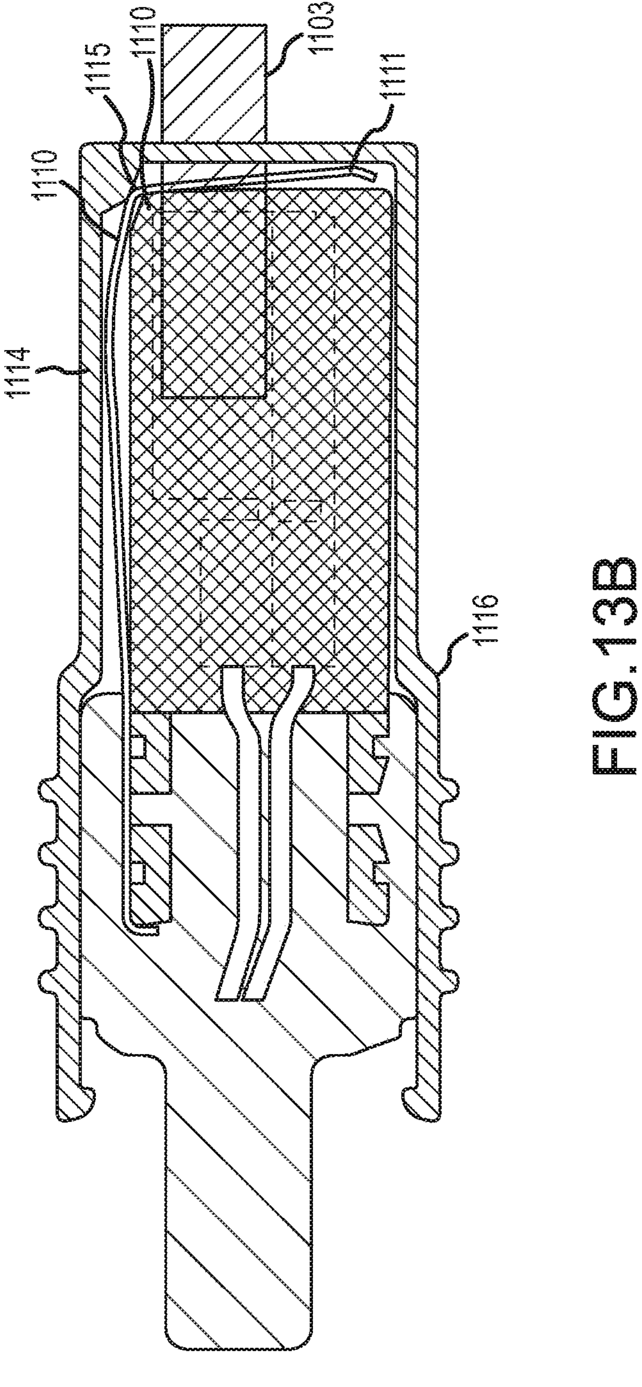
Figure 13C:
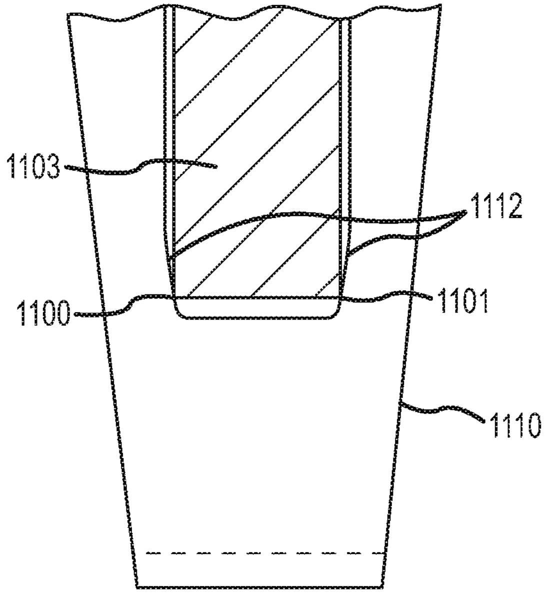

FIGS. 13A-13C illustrate an alternative spring prong retainer. In the embodiment described above and illustrated by FIGS. 1A through 3B, the retention gripping points are along the flat, or semi-flat surfaces of the narrow axis of the prong. The apertures are rectangular in shape and the top and bottom of the rectangle comprise the contact locations on the prong. Forces applied to those contact points are limited to the relationship of the precision of the prong dimensions to the hole dimensions. In the embodiment of FIG. 13A, the aperture has a rectangular top and a bottom half that narrows down or tapers. This design of aperture contacts the prong at three locations 1100, 1101, 1104 (see FIG. 13A—Exaggerated View), on the top of the prong and on each of the sides at the bottom.

A significant increase in the gripping force is possible due to the amplification of the pull torque via not only the angular displacement of the spring prong, but also the wedging effect at the two adjacent contact points 1100, 1101 at each corner of the narrow axis of the mating prong 1103. As pull force is exerted on the hook tab 1106 of the spring retainer 1110, an initial action occurs as described for the spring prong retainer in FIGS. 1A thru IC. After the initial contact is made at points 1100, 1101, 1104 during the attempt to withdraw the mating prong 1103, the forces applied to the mating prong 1103 are amplified by the inclined planes of the bottom of the slot 1100 1001. The tension force formed in the early stage of gripping by the axial displacement of the spring prong retainer 1110 about the fulcrum point 1105 is amplified greatly to apply a compressive force at the contact points of the mating prong 1103 and the spring prong retainer bottom contact points 1100 and 1101. This force is multiplied by about 10 to 1 due to the tension amplification of the spring prong retainer 1110 about the fulcrum 1105. A total force amplification of about 80 times can be achieved by this method. It should be appreciated that by adjusting the angles of the inclined planes 1100 and 1101, and the geometry of metal 1104 forming the fulcrum 1105, that various amplifications of force can be achieved. It should also be appreciated that by varying the amplification force, the spring prong retainer can be tuned to optimally engage with a variety of mating prong materials and finishes.

Due to this amplification, and the relatively small contact area between the spring prong retainer, inclined planes 1112 (FIG. 13C) 1110, 1101 and the mating prong 1103, forces at least as high as 30,000 pounds psi (30 Kpsi) are possible, thus ensuring positive gripping of the mating prong 1103. It should be appreciated that use of this alternate method of mating prong capture is also more tolerant of manufacturing variances in the prongs.

FIG. 13B illustrates the release methodology for this alternate spring prong retainer. It is similar to that of the spring prong retainer previously described. As release force is applied to the end of the spring prong retainer 1111 by the face of the outer shell 1116, the surface of the spring prong retainer 1110 becomes more perpendicular to the mating prong 1103. In turn, the point of contact at the fulcrum 1105 is disengaged and the mating prong would normally be free to be extracted, as described for spring prong retainer 40 of previous embodiments. However, at this point the lower contact points (illustrated in FIG. 13A) 1100, 1101 have the mating prong 1103 captured between them, and likely a small deflection of the metal of the mating prong 1103 has occurred at those points. The mating prong 1103 is therefore probably not yet released. As the outer shell 1116 compresses the face of the spring prong retainer 1110, the molded-in ramp in the outer shell 115 begins to push the spring prong retainer down and in turn pushes the lower contact points 1100 and 1101 (illustrated in FIG. 13A) down off of the mating prong 1103. Eventually the entire assembly is disengaged from the mating prong 1103.

It should be appreciated that the shape of the spring prong retainer (illustrated in FIG. 13A) contributes to the disengagement characteristics as well. The shoulders of the spring prong retainer 1107 are placed such that, upon force being applied to the spring prong retainer to release, the shoulders contact the interior surface of the outer shell 1116. Continued rotation of the face of the spring prong retainer closer to perpendicular to the mating prong 1103 results in the entire face of the spring prong retainer 1111 to be forced down. This action, in conjunction with the action of the ramp cast into the outer shell 1115 results in positive down force on the spring prong retainer disengaging the lower contact points 1100 and 1101 (illustrated in FIG. 13A) from the mating prong 1103.

FIGS. 14A-15B illustrate an alternate capture mechanism. FIG. 14C illustrates the principal mechanical components of the capture mechanism. A saddle and strain relief component 1401 is placed into the plastic connector carrier of the injection molded receptacle. A capture toggle 1402 is inserted into the two holes at the end of the saddle 1401. The opposite end of the saddle and strain relief component 1401 is the crimp ring that clamps around the cord end just beyond the start of the outer jacket or other suitable location depending on the design of the cord. It will be appreciated that if, e.g., for ease of manufacturing, it is designed to make the strain relief and clamping mechanism from different materials, such as metals of different properties, than the carrier or other cord attachment mechanism, this can easily be done, by separating the attachment method to the cord, such as a crimp ring from the strain relief piece and then connecting them mechanically. It should be appreciated that the strain relief mechanism described herein can be used with the two additional retention mechanisms described earlier.

Figure 14A:
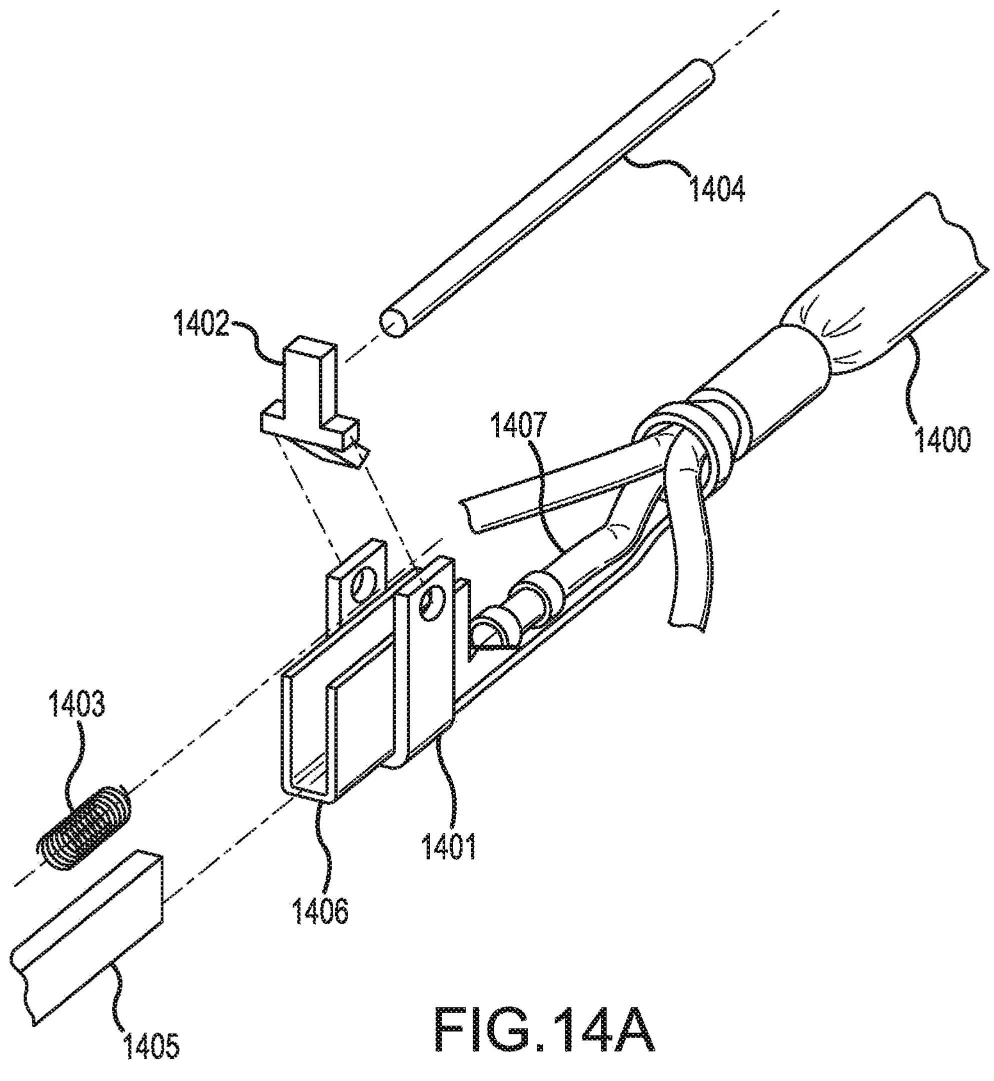

FIG. 14A illustrates the assembly of the saddle 1401 and the cord assembly 1400, 1407. The cord assembly includes the main cord 1400, an electrical interface terminal 1406, and the interior conductor 1407 of the aforementioned cord that connects to the terminal 1406. The terminal 1406 rests in the closed end of the saddle and the strain relief component 1401 and the two components are aligned along the long axis by relief ways in the outer contact carrier (not shown). If desired or needed, the terminal 1406 can be mechanically attached or bonded to the saddle and strain relief component 1401 for case of assembly, greater strength, or other purposes. The capture toggle 1402 is placed during manufacture in the saddle between the two holes in the saddle 1401. The pre-load spring 1403 will press upon the capture toggle 1402 while the release actuation rod 1404 rests against the opposite side of the toggle.

Figure 14B:
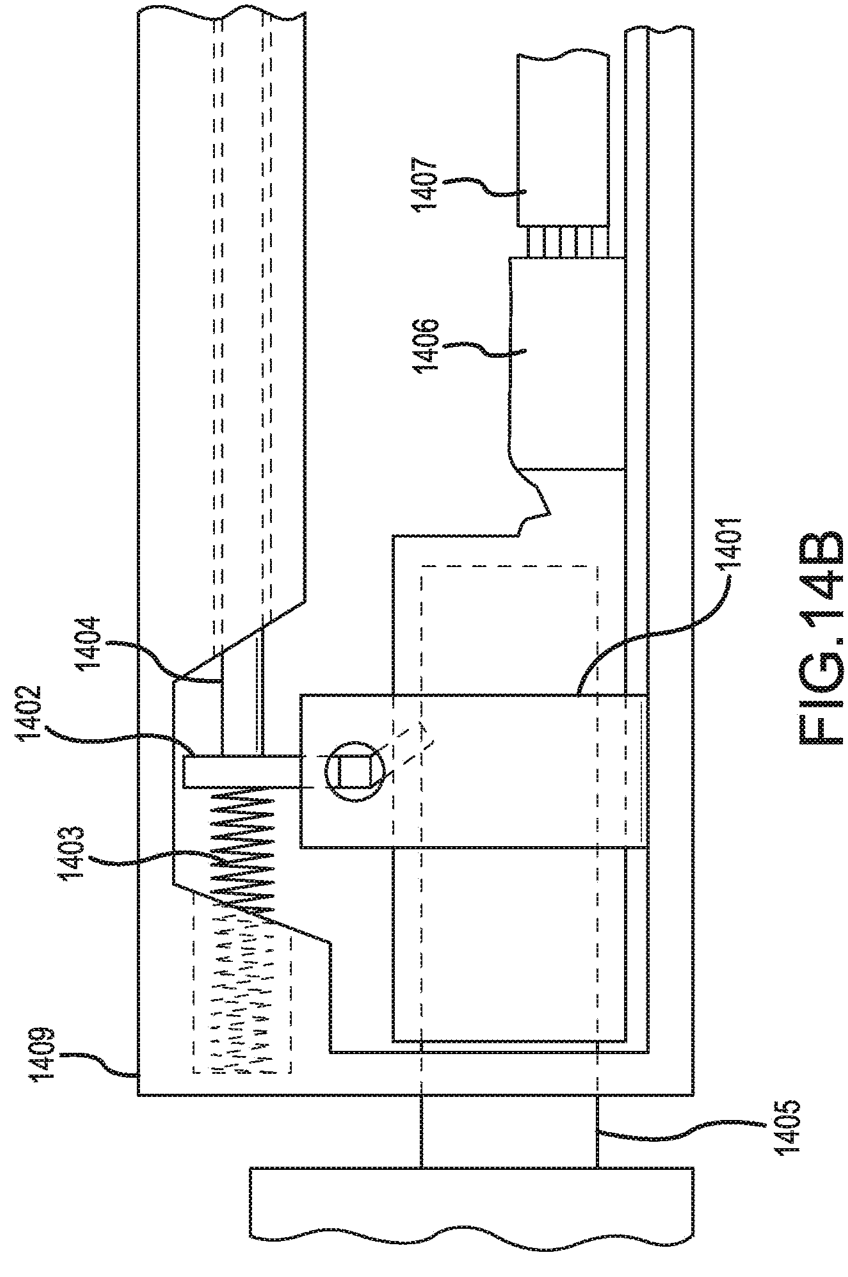
Figure 15A:
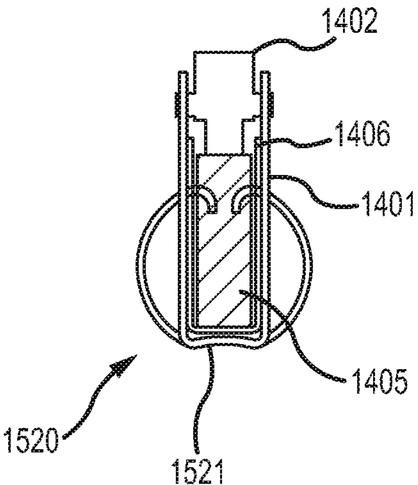

FIG. 14B shows a side view of this assembly. The outer contact component carrier 1409 houses and contains each of the components and prevents injection molding plastic from entering the interior of the carrier during the final outer over-mold injection process. FIG. 14B also helps understand the basic operation of the capture assembly. When the prong of the inserted plug 1405 is inserted into the receptacle, it enters into the plastic carrier 1409, then into the terminal 1406, and eventually passes under the toggle 1402 until it is fully inserted and is in the position shown. If tension is applied to the power cord in attempt to extract it from the mated plug, the force is transmitted from the cord to the prong 1405 and hence to the toggle 1402 (via the strain relief component and saddle 1401) which is pressed against the top of the prong 1405 by the pressure of the saddle 1401 on the bottom of the prong 1405, transmitted through the electrical terminal 1406. The toggle is pre-loaded against the top of the inserted prong of the plug connector 1405 by the spring 1403. As can be appreciated the shape of the toggle where it presses down on the prong can be shaped to control the application of the clamping force to the prong, for example, the toggle can have a groove to control the force on the prong so as not to twist it. This can also be done for the base of the saddle and mating terminal if desired or necessary. A suitably shaped insert between the saddle/strain relief 1401 and a terminal shaped to match the insert could accomplish this function. As the force applied to the cord 1407 causes minute movement along the major axis of the assembly, the mating prong also begins to attempt to retract and the toggle begins to rotate in such a manner as to force down the top of the inserted mating prong of the plug connector 1405, squeezing it tighter into the terminal 1406, and hence the terminal is squeezed into the saddle 1401. The friction between the terminal 1406, the mating prong of the plug connector 1405 and the saddle 1401 increases rapidly to a point where the movement is ceased. The pressing down of the mating prong 1405 onto the electrical terminal 1406 also improves the quality of the electrical connection. The prong of the plug connector 1405 is now functionally locked to the saddle and strain relief component 1401, and hence the cord 1407. FIG. 15A illustrates from an end-on view the relationship of all of the components involved in the locking of the components together. The prong of the inserted plug 1405 is located in the terminal 1406, which is sandwiched between the prong 1405 and the saddle 1401.

Figures 14C, 14D:
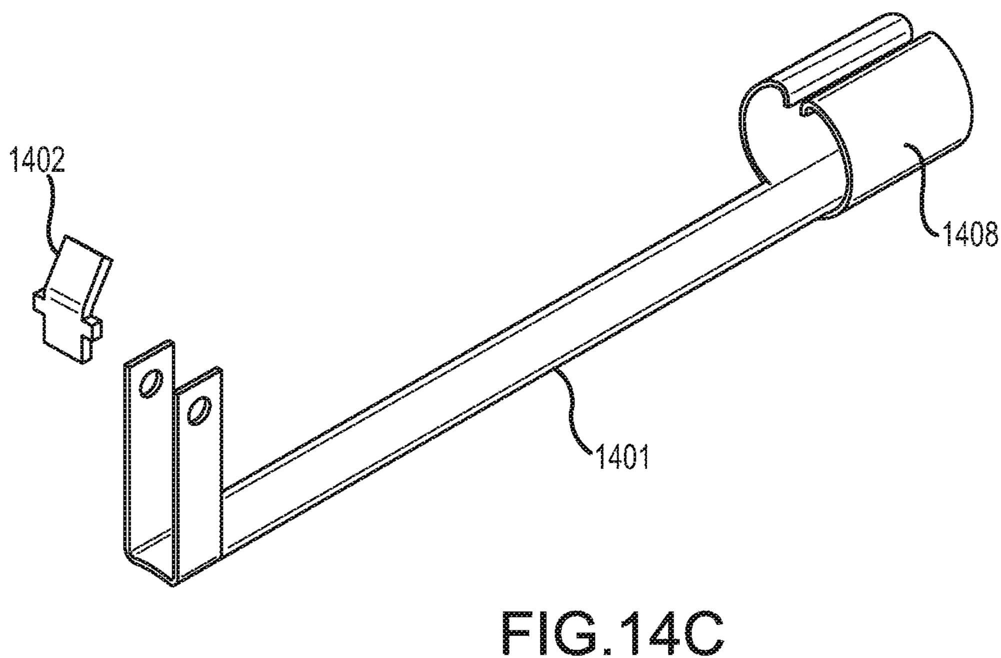

FIG. 14B illustrates the mechanism to release the connection of the toggle 1402 and the prong of the plug connector 1405. The opposite end of the release rod 1404 can extend through the entirety of the receptacle and protrude out the back of the connector or assembly where it is user accessible. The release rod 1404 can also be actuated by other means such as is shown in FIG. 14D. A telescopic section of the cord cap 1412 which includes a mechanical linkage 1408 can push the release rod 1404 against the toggle 1402 when the telescoping section 1412 is pulled back by the user to separate the plug assembly from the receptacle assembly (line 1413 indicates the fully inserted depth of the front face of the plug). In this regard, the range of motion of the telescoping section 1412 is controlled by elements 1410 and 1411. Pressure on the opposite end of the rod 1404 transmits to the back of the toggle 1402 and compresses the spring 1403 slightly. This action rotates the bottom of the toggle 1402 up and away from the prong of the inserted plug connector 1405 and reduces or eliminates the contacting force between the toggle 1402 and the mating prong 1405 allowing the mating prong to move in the retraction direction. The receptacle can then be separated from the plug. The system can be designed so that the spring 1403 functions to return the telescopic section 1412 to the locked configuration when the user releases the section 1412.

FIG. 15A illustrates the end-on view of the principal components of the inserted prong of the plug connector 1405 and the locking components of the receptacle in cross section. As mentioned previously, the toggle 1402 has been rotated into a position such that it is pressing on the prong of the inserted plug connector 1405. The prong 1405 is in turn pressing on the terminal 1406 and in turn the terminal 1406 is pressing on the bottom of the saddle 1401. It should be appreciated that as axial tension on the cord is increased the downward force exerted by the toggle 1402 will also increase. With suitable angles selected, and suitable dimensions of the components, the force amplification can be about 10 to 1. In other words, 10 pounds of strain force on the cord will result in about 100 lbs of force exerted on the prong.

It also should be appreciated that the bottom of the saddle and strain relief component 1401 can be manufactured with a crown shape as shown. This crown shape allows the bottom of the saddle and strain relief component 1401 to act like a leaf spring when pressed down by the prong. The spring in the bottom of the saddle allows a very controllable and predictable force to be applied to the prong 1405 by the combination of the toggle pressing down on the prong and the spring resisting that force as transmitted by the prong and terminal. The maximum clamping force of the toggle on the prong is controlled by the resistance and travel of the spring. This feature can be used as follows. When strain is put on the cord to pull apart the connection, the toggle increases its force on the prong and eventually a point will be reached where the spring in (or under as described in alternative embodiments discussed below) the bottom of the saddle and strain relief component 1401 starts to flatten out. This action allows the distance from the base of the saddle and strain relief component 1401 and the tip of the toggle 1402 to increase, allowing the toggle 1402 to rotate. As the tension on the cord continues to increase, a point will be reached where the distance between saddle and strain relief component 1401 and the toggle 1402 is great enough that the toggle 1402 will rotate and be perpendicular to the prong. At this point the tab on the toggle 1402 can no longer add any additional pressure to the prong 1405, and the prong 1405 will move under the tension applied to the cord 1407 which separates the plug and receptacle. It should also be appreciated that the tension at which the release occurs can be reliably predicted to occur and can be varied by the strength and travel of the spring. The design is somewhat tolerant of manufacturing variances of both the inserted connector prong and the mechanical components of the locking mechanism. It should also be appreciated that the tension at which the mated connection releases under strain can be reliably pre-set.

Figure 15B:
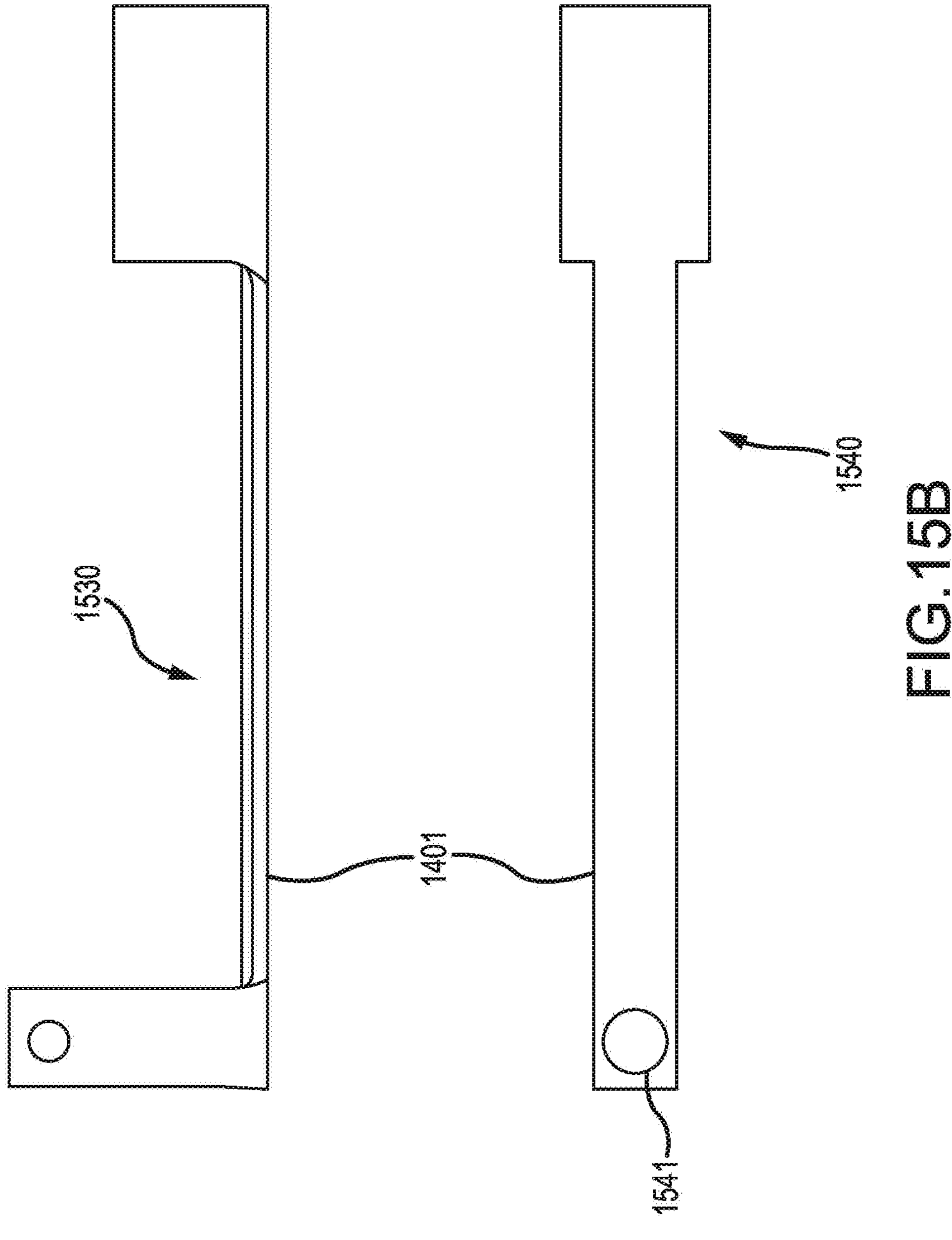

In this design, FIG. 15A illustrates the end-on view of the saddle and strain relief component 1401 with the cord crimp end away from the viewer. The crown spring depicted in the front 1521 view has the function of controlling the release point of the connected assembly under strain conditions. In FIG. 15B the crown spring is shown with a hole 1541 that is used to modify the strength and travel of the crown spring. However, other means such as the thickness or type or temper, etc., of the material used can be selected to control the spring function. Observing that the location of the hole 1541 is located directly under the saddle section of the saddle and strain relief component 1401, it should be appreciated that the strength of the crown spring action is modified. The absence of a hole will allow maximum resistance to compression of the spring crown, and a large hole will introduce significant reduction in spring strength. By reducing the spring strength, the release point of the mated connector components is subsequently reduced. Hence, the retention capacity of the locking receptacle can reliably set to specific release tensions. It will be appreciated that this design further promotes case and lower cost of manufacture. The die that stamps the strain relief can have an insert that can be changed to vary the size of the hole 1541 in the leaf spring for various values of release tension. Other means of setting the strength and travel of the spring can be used, for example the thickness and shape of the material or other means. Also, other means that use a uniform or variable strength spring of a suitable type (hairpin, leaf, elastomer, etc) to press on the bottom of the saddle 1401 directly below the toggle 1402 can be used. The saddle in this case would not need to incorporate a spring, the spring would be separate from the saddle. This would permit the addition of a factory and/or end user spring force adjustment mechanism, such as a screw. This mechanism would control the strength and travel of the spring pressing on the saddle and hence the release tension of the gripping mechanism as was described earlier. The range of adjustment could be controlled to meet any needed requirement. It can be appreciated that being able to reliably set the release tension is extremely useful—it allows a locking cord to be made that does not require a separate release mechanism. The release is done by the locking mechanism at the desired tension level.

FIG. 14C depicts an orthogonal view of the saddle and strain relief component 1401. The grip ring 1408 at the end of the saddle and strain relief component 1401 is shown as an integral part of the saddle and strain relief component 1401. This ring can also be a separate compression ring that is inserted over the end of the saddle and strain relief component 1401, where the end of the saddle and strain relief component 1402 can be shaped appropriately to be sandwiched between said compression ring and the end of the attached cord. The alternate method of attaching the saddle and strain relief component 1401 to the cord is mentioned due to the potential difficulties in compound heat treatment along the length of the saddle and strain relief component 1401. The saddle end of the saddle and strain relief component 1401 will generally be heat treated, while the crimp ring end must remain malleable. Although it is possible to manufacture the saddle and strain relief component 1401 with these characteristics, it may be more economical to manufacture an alternately shaped saddle and strain relief component 1401 and assemble it to the cord with a separate compression ring. It can be appreciated that the retention mechanism described will work well with other shapes of prongs than those illustrated, which are flat blade type prongs. For example, the retention mechanism will work well with round prongs such as used in NEMA 5-15 and other plugs. Only minor changes are needed such as shaping the end of the toggle where it contacts the round prong to have a suitable matching shape and thickness to optimize how the force is applied to the material of the prong. This is desirable, since many round prongs are formed of tubular, not solid material and therefore can be deformed or crushed by too much force applied to too small an area of the material they are made of. Similarly, the bottom of the saddle and/or the electrical contact could be shaped to spread the clamping force more evenly on to the round prong and/or an insert between the saddle and the terminal could be used for this purpose. Although the embodiment of FIGS. 14A-15B has been illustrated and described in relation to a conventional cord cap, it will be appreciated that similar structure can be incorporated into other types of receptacle devices including, for example, the structure described in PCT Application PCT/US2008/57140 entitled, "Automatic Transfer Switch Module," which is incorporated herein by reference.

By utilizing a clamping mechanism (e.g., the spring prong retainer 40) that captures the ground prong of the plug 50 only, the safety of the receptacle 20 may be greatly improved. In this regard, the effect of the application of various electrical potentials to clamping mechanism of the assembly is avoided, which may simplify the manufacturing of the receptacle, as well as improve its overall safety.

FIGS. 4A-4C illustrate a locking device 60 for providing a locking feature for a standard cord-cap receptacle. As shown in FIG. 4A, the locking device 60 includes a top holding member 62 and a bottom holding member 64 for positioning the locking device 60 onto a standard receptacle. The locking device 60 also includes a portion 66 that couples the holding member 62, 64 in relation to each other to provide a secure attachment to a receptacle. The locking device 60 also includes a clamping mechanism 68 that is coupled to a pivot 70. The operation of the clamping mechanism 68 is similar to that of the clamping mechanism 12 illustrated in FIGS. 1A-1C. It can be appreciated that the other clamping mechanisms described earlier could also be employed. As described earlier some of these eliminate the need to provide a separate release and could optionally provide a factory and/or user adjustable release tension feature. The locking device 60 may also include a release mechanism 72 that is operative to enable a user to disengage the clamping mechanism 68 when it is desired to remove a receptacle from a plug.

FIG. 4B illustrates the locking device 60 positioned onto a standard receptacle 80. To facilitate the installation of the locking device 60, the holding members 62 and 64 may be made of an elastic material such that a user may bend them outward and position the device 60 onto the receptacle 80. For example, the holding members 62, 64 may be made of plastic. Further, as shown, the holding members 62, 64 are shaped such that once installed onto the receptacle 80, the device 60 is not easily removed without a user deforming the holding members 62, 64. That is, the holding members 62, 64 may be shaped to closely fit onto standard receptacle, such that normal movements will not disengage the device 60 from the plug 80.

FIG. 4C illustrates the operation of the locking device 60 when the receptacle 80 is mated with a standard plug 84. The ground prong 86 of the plug 84 passes through an aperture in the clamping mechanism 68 and into the receptacle 80. If a withdrawing force tending to break the mated connection is applied to either the cord of the standard plug 84 or the cord of the receptacle 80, the clamping mechanism 68 will rotate, causing it to grip the ground to prong of the standard plug 84, thereby maintaining the electrical connection. If the user desires to break the connection, the user may engage to release element 72, which is operative to maintain the clamping mechanism 68 in a substantially perpendicular position relative to the ground prong 86, thereby permitting the prong 86 of the standard plug 84 to be withdrawn from the receptacle 80. It should be appreciated that although one particular embodiment of a locking device 60 has been illustrated, there may be a variety of ways to implement a locking device that may be retrofitted to a standard receptacle that uses the techniques of the present invention.

Figure 5:
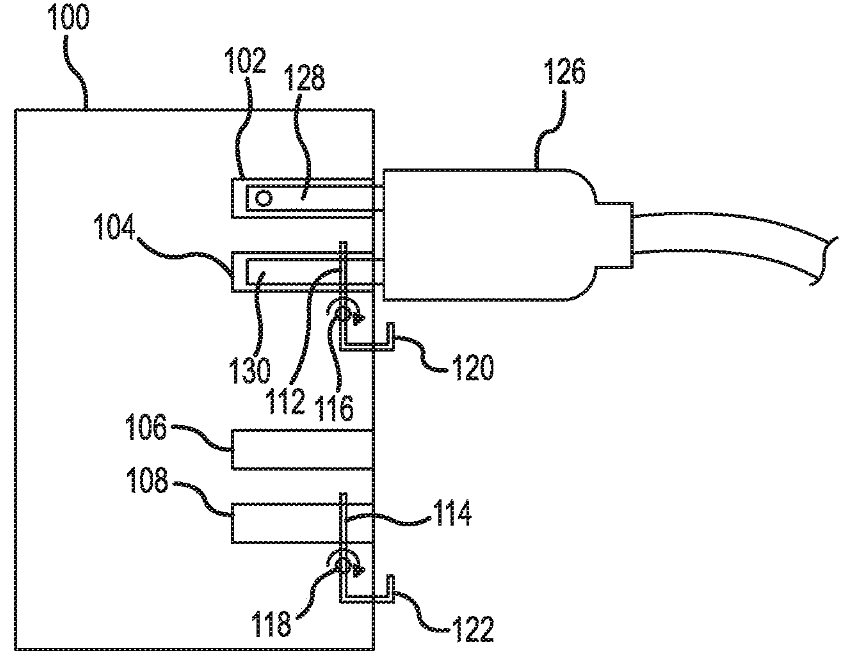
FIG. 5 illustrates an embodiment of a standard duplex locking receptacle in accordance with the present invention.

FIG. 5 illustrates an embodiment of a standard duplex locking receptacle 100. In this embodiment, clamping mechanisms 112 and 114 are integrated into the receptacle 100. The top portion of the receptacle 100 includes sockets 102, 104 for receiving the prongs 128, 130, respectively, of a standard plug 126. Similarly the bottom portion of the receptacle 100 includes sockets 106, 108 for receiving a second standard plug. The clamping mechanisms 112, 114 are each pivotable about the pivots 116, 118 respectively. Further the receptacle 100 also includes release elements 120, 122 that are operative to permit a user to break the connection when desired. The operation of the clamping mechanism 112, 114 is similar to that in previously described embodiments. That is, in response to a force tending to withdraw the plug 126 from the receptacle 100, the clamping mechanism 112 rotates in the direction of the plug 126, and engages the ground prong 130, preventing the mated connection from being broken. If a user desires to intentionally removed the plug 126 from the receptacle 100, the user may activate the release mechanism 120 and withdraw the plug 126. It can be appreciated that the other clamping mechanisms described earlier could be employed in a standard duplex locking receptacle. As discussed earlier, some of these eliminate the need to provide a separate release mechanism and could optionally provide a factory and/or user adjustable release tension feature.

Figure 6A:
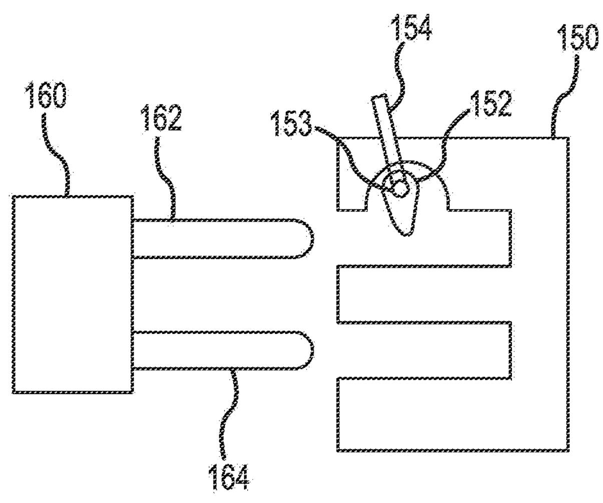
FIGS. 6A-6B illustrate an embodiment of a locking receptacle that includes a cam lock in accordance with the present invention.
Figure 6B:
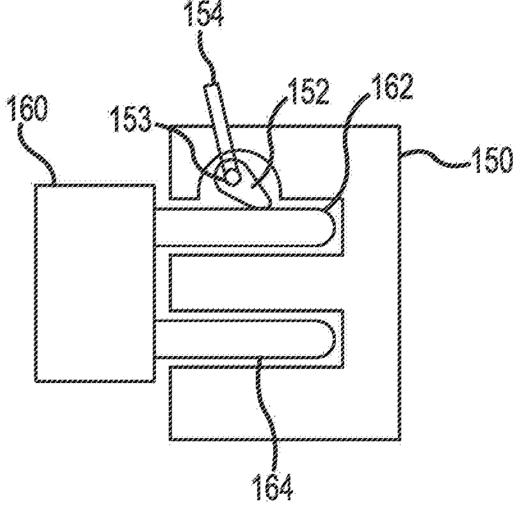

FIGS. 6A-6B illustrate side views of a receptacle 150 that includes a cam lock 152 for locking the prong 162 of a plug 160 to preserve a mated connection between the receptacle 150 and the plug 160. FIG. 6A illustrates the receptacle prior to the insertion of the plug 160, and the cam lock 152 may hang freely from a pivot 153. In this regard, an end of the cam lock 152 is positioned in the opening of the receptacle 150 that is adapted for receiving the prong 162 of the plug 160.

FIG. 6B illustrates the mated connection of the plug 160 and the receptacle 150. As shown, in the mated position the prong 162 has deflected the cam lock 152 about the pivot 153, causing the cam lock 152 to be angled away from the plug 160 and abutted with the prong 162. Thus, when an axial strain is applied to the plug 160 or the receptacle 150, the friction between the cam lock 152 and the prong 162 will tend to force the cam lock 152 downward toward the prong 162, which functions to retain the plug 160 in its mated position. If a user desires to intentionally remove the plug 160 from the receptacle 150, they may press the actuating mechanism 154, which may be operable to rotate the cam lock 152 out of the way of the prong 162, thereby enabling the user to freely withdraw the plug 160 from the receptacle 150. It should be appreciated that the cam lock 152 and the actuating mechanism may be constructed from any suitable materials. In one embodiment, the cam lock 152 is constructed out of metal, and the actuating mechanism 154 is constructed from an insulating material, such as plastic.

FIGS. 7A-7D illustrate a device 170 that may be used to secure a mated connection between a plug and a receptacle. As shown, the device 170 includes a top surface 173, a bottom surface 175, and a front surface 171. The three surfaces 171, 173, 175 are generally sized and oriented to fit around the exterior of a standard receptacle 178 at the end of a cord (i.e., a cord cap). The top and bottom surfaces 173 and 175 each include hooks 174 and 176, respectively, that are used for securing the device 170 to the receptacle 178 (shown in FIG. 7D). The operation of the hooks 174 and 176 is described herein in reference to FIG. 7D, which shows a side view of the device 170 when it is installed around the exterior of the receptacle 178. The hooks 174, 176 may be bent inward towards each other, and wrapped around an end 179 of the receptacle 178 to secure the device 170 to the receptacle 178. The other end of the receptacle 178 (i.e., the end with the openings 181 for receiving the prongs of a plug) may be abutted with the face surface 171 of the device 170.

Figure 7A:
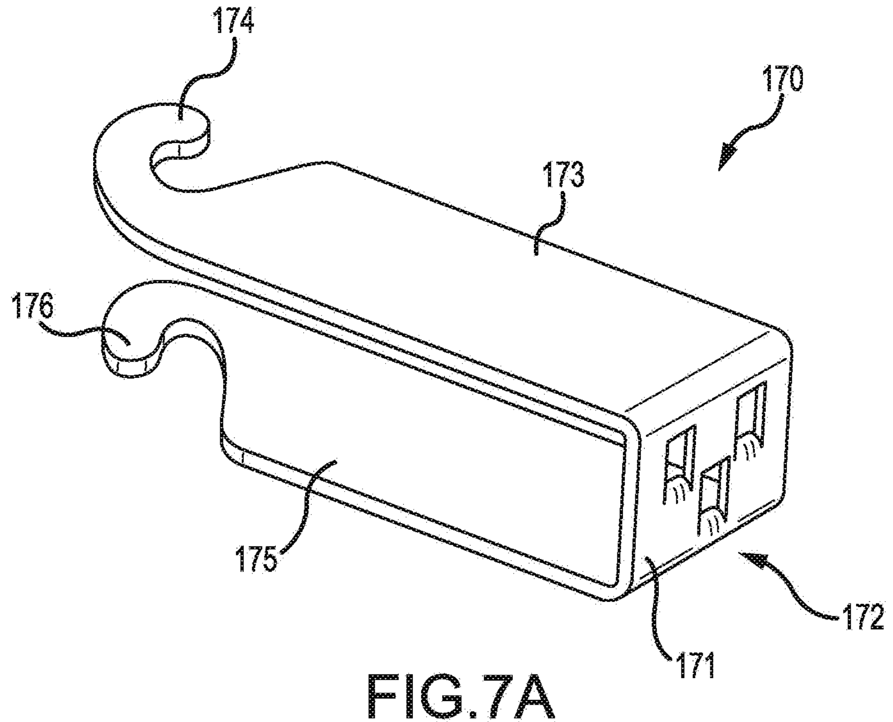
FIGS. 7A-7D illustrate an embodiment of a device for locking a mating assembly of a plug and receptacle in accordance with the present invention.
Figure 7B:
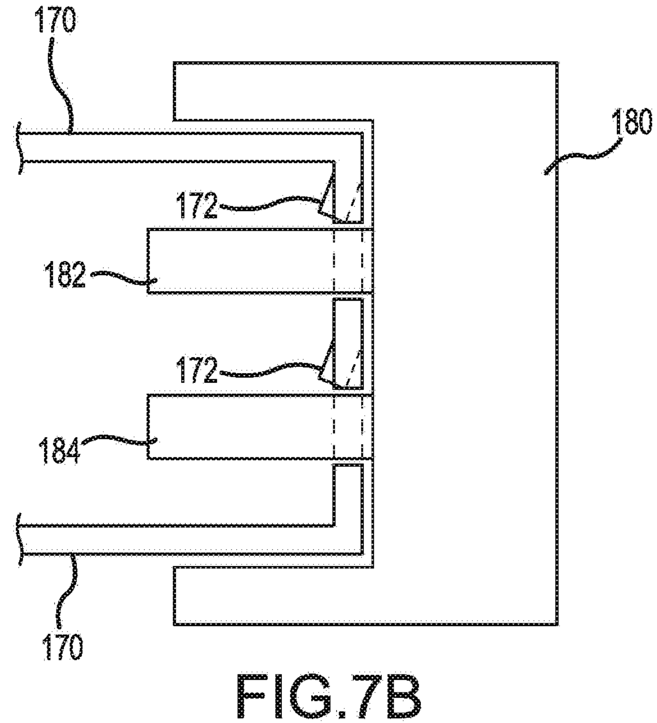
Figure 7C:
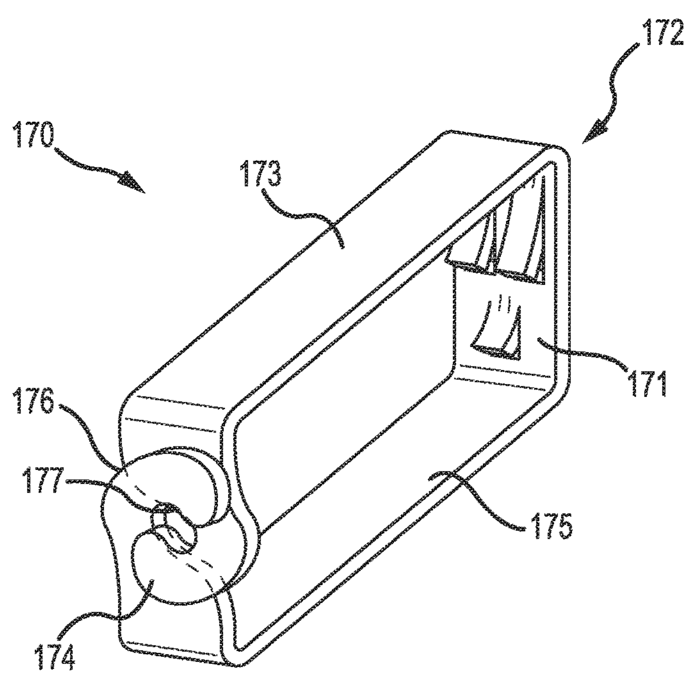
Figure 7D:
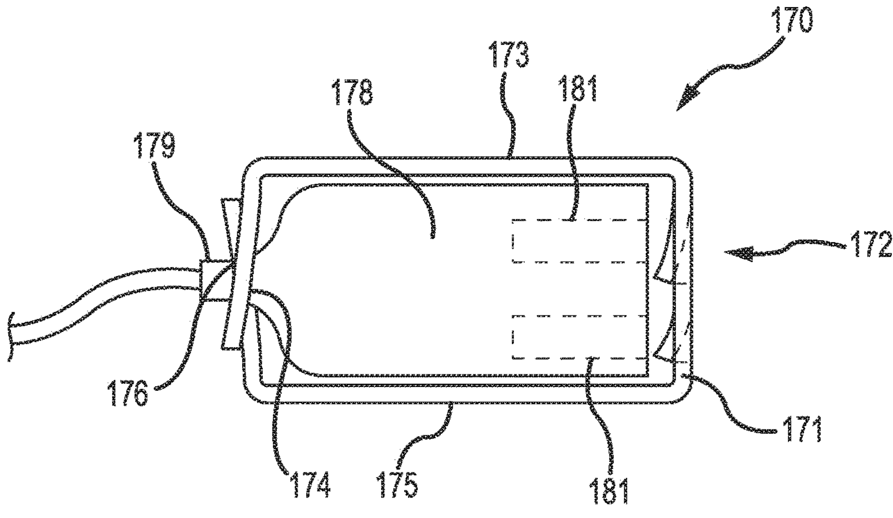

The device further includes tabs 172 that are used to securing the prongs of a plug in place. The operation of the tabs 172 is best shown in FIG. 7B, which illustrates the device 170 when installed over the prongs 182, 184 of a plug 180. The plug 180 may be any plug that includes prongs, including typical plugs that are disposed in the back of electrical data processing equipment. As shown, when the device 170 is installed by sliding it axially toward the plug 180, the tabs 172 deflect slightly toward the ends of the prongs 182, 184. In this regard, if an axial force that tends to withdraw the device 170 from the plug 180 is applied, the tabs 172 will apply a downward force against the prongs 182, 184. Since the openings in the device 170 are only slightly larger than the prongs 182, 184, this downward force retains the prongs 182, 184 in their position relative to the device 170. Further, because the device 170 may be secured to a standard receptacle as illustrated in FIG. 7C, the tabs 172 prevent the connection between the receptacle 178 and the plug 180 from being broken. The device 170 may be constructed of any suitable non-conductive material. In one embodiment, the device 170 is constructed from a semi-rigid plastic. In this regard, the device 170 may be a single use device wherein a user must forcefully withdraw the installed device 170 from the prongs 182, 184 of the plug 180, thereby deforming the plastic and/or breaking the tabs 172. It should be appreciated that if a user desired to unplug the receptacle 178, they may simply unwrap the hooks 174, 176 from the end 179 and separate the mated connection, leaving the device 170 installed on a plug.

Figures 8A, 8B:
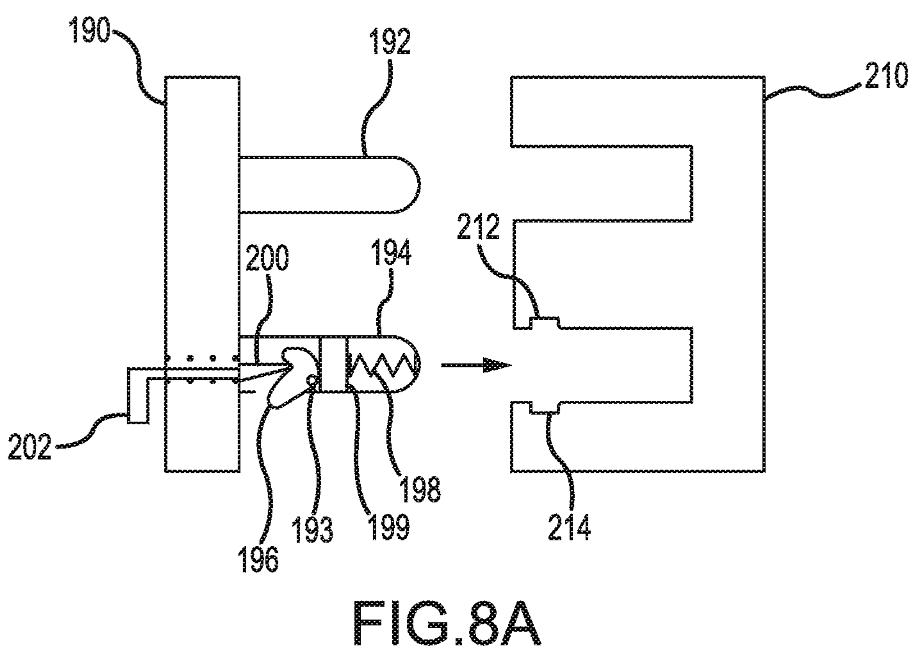
FIGS. 8A-8C illustrate an embodiment of plug that includes a toggle locking mechanism in accordance with the present invention.

FIG. 8A illustrates a plug 190 that includes a locking mechanism prior to insertion into a receptacle 210. As shown in a simplified manner, the receptacle 210 includes recesses 212 and 214. Most standard receptacles include a recess or shoulder inside the openings that are adapted to receive the prongs of a plug. This recess may be present due to manufacturing requirements, such as the molding process used to manufacture the receptacles. Further, the need to include various components (e.g., electrical connections, screws, etc.) in the receptacles may cause the need for the small recesses. If the recesses are not already present, they could be designed into the receptacle.

The plug 190 uses the recess 214 to assist in creating a locking mechanism. As shown, a hollow prong 194 (e.g., the ground prong) of the plug 190 includes a toggle 196 that is attached via a pivot to the 193 inner portion of the prong 194. A spring 198, piston 199, and an actuating mechanism 200 function together to enable the toggle 196 to be oriented in a lock configuration (shown in FIG. 8B), and a release configuration (shown in FIG. 8C). In one embodiment, the spring 198 acts to bias the tab 198 in the release position, which may be a substantially aligned with horizontal position inside the prong 194. Furthermore, the actuating mechanism 200 may be operable to rotate the toggle 196 into the unlock position (shown in FIGS. 8C) where the toggle 196 retracts into the prong 194 at an angle substantially parallel to the body of the prong 190. A user may control the actuating mechanism 200 through a control switch 202, which may be positioned on the front of the plug 190.

Figure 8C:
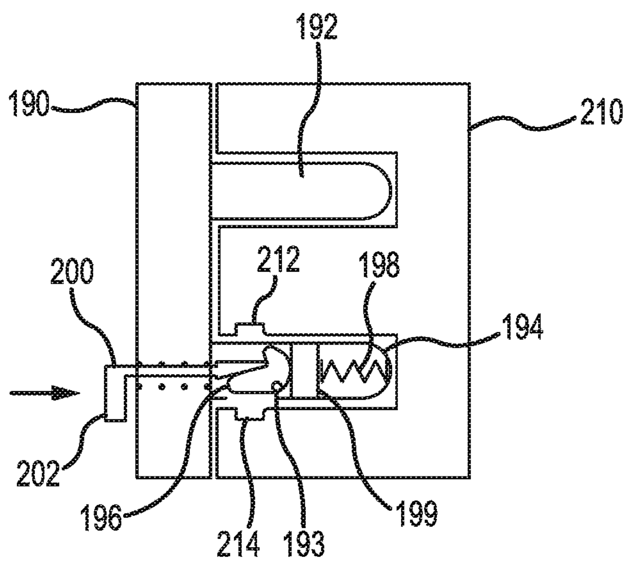

FIG. 8B illustrates the plug 190 when in a mated position with the receptacle 210. As shown, the tab 196 has been placed in the lock position by the pressure asserted by the spring 198 and piston 199. In this configuration, the tab 196 will resist any axial force that tends to withdraw the plug 190 from the receptacle 210. This is the case because the recess 214 acts as a stop for the tab 196. Therefore, the plug 190 may be securely fastened onto the receptacle 210. FIG. 8C illustrates when a user desires to remove the plug 190 from the receptacle 210, they may depress the control switch 202 on the front of the plug 190, which causes the actuating mechanism 200 and the spring 198 to rotate the tab 196 into the release position.

Figure 9A:
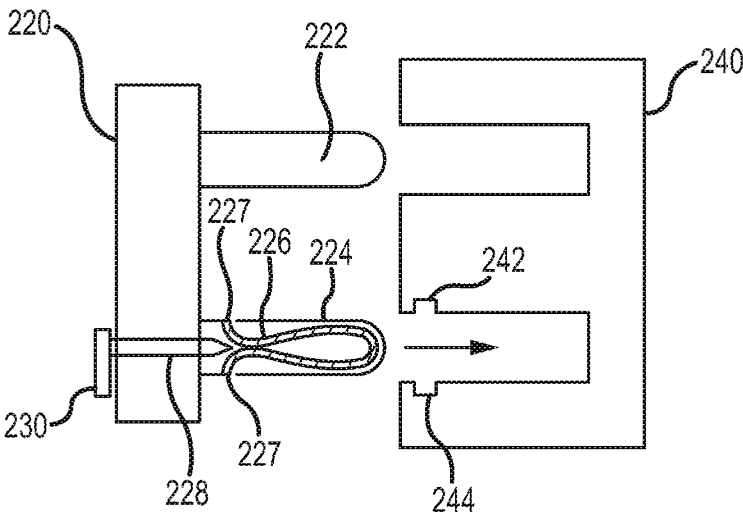
FIGS. 9A-9B illustrate another embodiment of a plug that includes a divergent spring tip locking mechanism in accordance with the present invention.
Figure 9B:
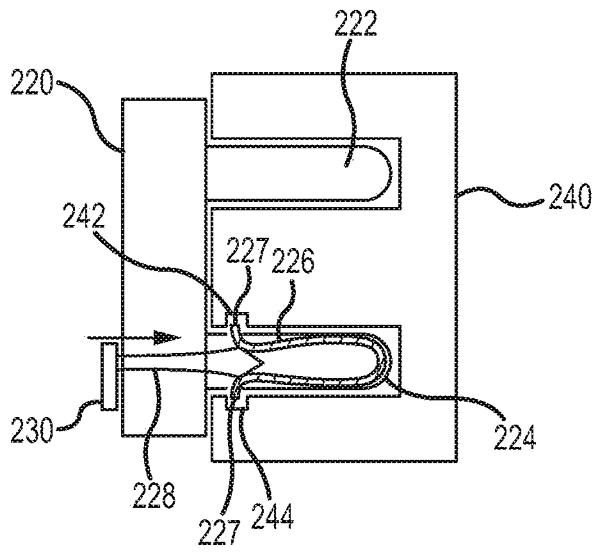

FIGS. 9A-9B illustrate another embodiment of a plug 220 that includes a divergent spring tip locking mechanism prior to insertion into a receptacle 240. Similar to the plug 190 shown in FIGS. 8A-8B, the plug 220 may be adapted to work with the standard receptacle 240 that includes recesses 242 and 244. The plug 220 may include a hairpin spring 226 that is disposed inside a hollow prong 224 (e.g., the ground prong). In a release position, the ends 227 of the spring 226 are disposed inside of the prong 224 and adjacent to openings in the prong 224. The plug 220 may further include an actuating mechanism 228, couple to a control switch 230 on the front of the plug 220, for biasing the spring 226 into a lock position, where the ends 227 of the spring 226 protrude outside of openings in the prong 224 (see FIG. 9B).

FIG. 9B illustrates the plug 220 when installed into the standard plug 240. As shown, the actuating mechanism 228 has been moved axially toward the spring 226 into the standard receptacle 240, causing the ends 227 to spread apart and out of the openings in the prong 224. The openings of the prong 224 are aligned with the recesses 242 and 244 such that the ends of the spring 226 are disposed in the recesses 242 and 244 when in the lock position. Thus, as can be appreciated, when an axial force that tends to withdraw the plug 220 from the receptacle 240 is applied, the ends 227 of the spring 226 are pressed against the recesses 242 and 244, which prohibits the prong 224 from being removed from the receptacle 240. When a user desires to remove the plug 220 from the receptacle 240, they may operate the control switch 230 which causes the actuating mechanism to axially withdraw from the spring 226. In turn, this causes the ends 227 of the spring 226 to recede back into the prong 224, such that the user may then easily remove the plug 220 from the receptacle 240.

Figures 10A, 10B:
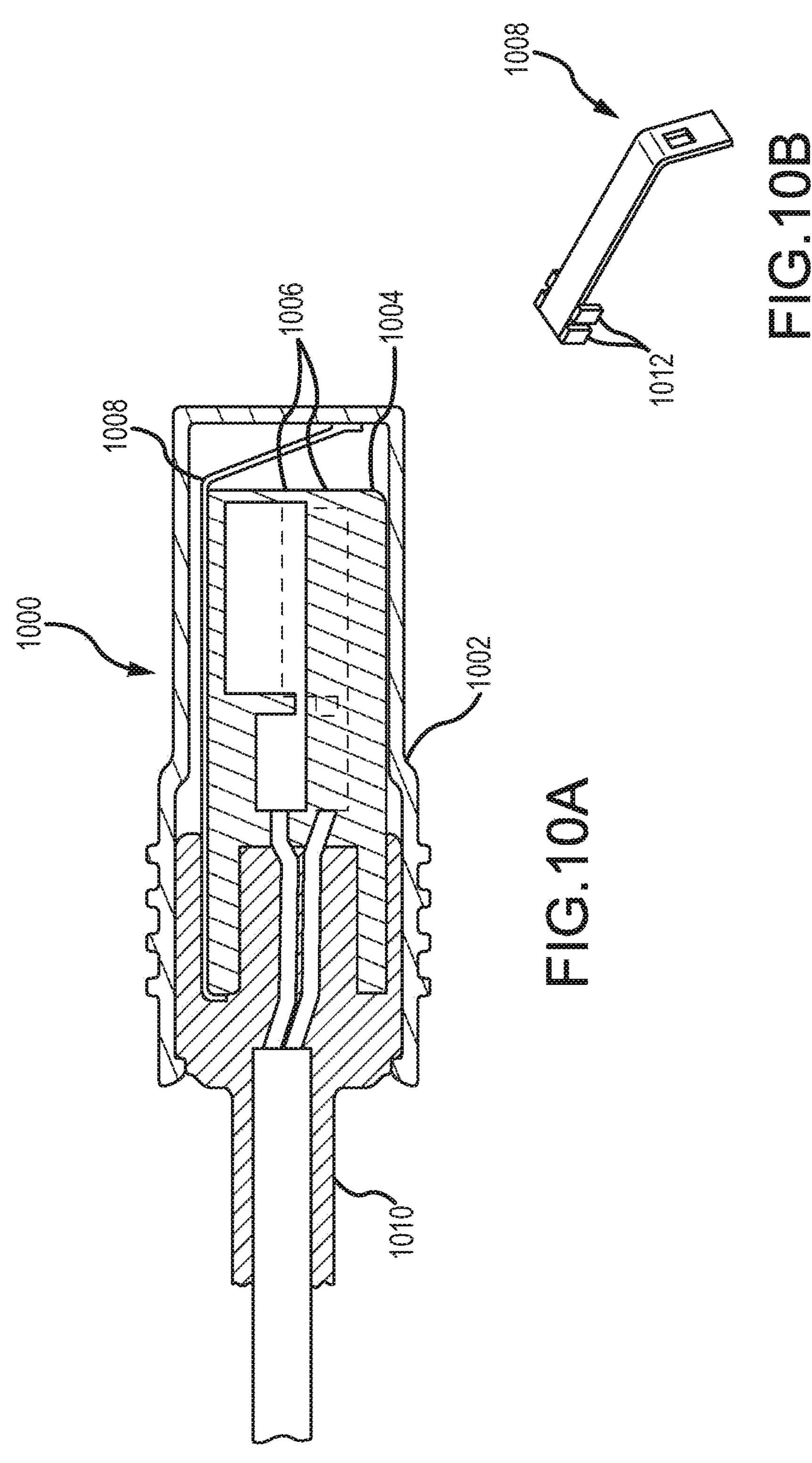
FIGS. 10A-10B illustrate a further embodiment of an end cap incorporating a locking mechanism in accordance with the present invention.

FIGS. 10A and 10B show a locking electrical receptacle 1000 according to a further embodiment of the present invention. The receptacle 1000 is generally similar in construction to the structure of FIGS. 2A-2B. In this regard, the illustrated receptacle 1000 includes an end cap formed from an outer lock release grip 1002 that is slideably mounted on an inner contact carrier module 1004. The inner contact carrier module carries a number of sockets or receptacles generally identified by reference numeral 1006. The illustrated receptacle 1000 further includes cord strain relief 1010 and spring prong retainer 1008.

FIG. 10B shows a perspective view of the spring prong retainer 1008. As shown, the retainer 1008 includes a number of gripping tabs 1012 for gripping the contact carrier module 1004. In this regard, the gripping tabs 1012 may be embedded within the molded contact carrier module 1004 so as to more firmly secure the retainer 1008 to the carrier module 1004. Alternatively, the tabs 1012 may be pressed into the carrier module 1004 or attached to the module 1004 by an adhesive or the like. In this manner, the tabs 1012 assist in securing the spring prong retainer 1008 to the contact carrier module 1004 and maintaining the relative positioning between the spring prong retainer 1008 and the contact carrier module 1004. It will be appreciated from this discussion below that this relative positioning is important in assuring proper functioning of the locking mechanism and controlling the release tension. The locking electrical receptacle of 1000 otherwise functions as described above in connection with FIGS. 2A-3B.

Figures 11A, 11B:
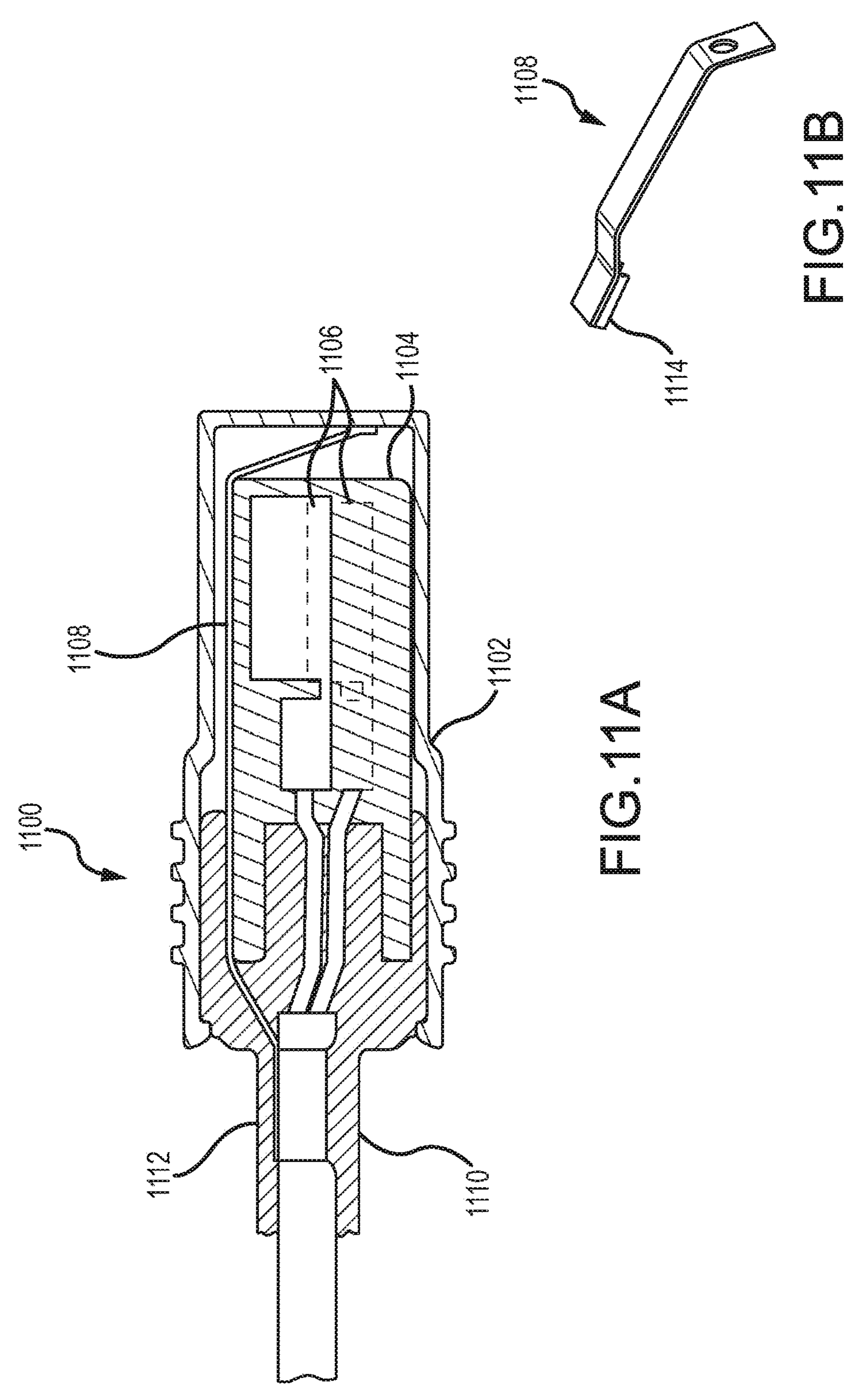

FIGS. 11A and 11B show a further embodiment of a locking electrical receptacle 1100. Again, the receptacle 1100 is generally similar to the structure described above in connection with FIGS. 2A and 2B and includes an outer lock release grip 1102, and inner contact carrier module 1104 including a number of receptacles 1106, and a cord strain relief structure 1110. The illustrated embodiment further includes a spring prong retainer 1108 incorporating strain relief structure. It will be appreciated that the locking mechanism of the present invention can result in significant strain forces being applied to the end cap in the case where large tension forces are applied to a plug against the locking mechanism. Such forces could result in damage to the end cap and potential hazards associated with exposed wires if such forces are not accounted for in the end cap design.

Accordingly, in the illustrated embodiment, the spring prong retainer 1108 includes strain relief structure for transmitting such strain forces directly to the power cord. Specifically, the illustrated spring prong retainer 1108 is lengthened and includes a cord grip structure 1114 at a rear end thereof. The cord attachment grip structure 1114 attaches to the power cord or is otherwise connected with a crimping band 1112 that can be secured to the power cord via crimping and/or welding, etc. or the like. In this manner, strain forces associated with operation of the spring prong retainer 1108 to grip prongs of a plug are transmitted directly to the power cord.

Various characteristics of the locking electrical receptacle of the present invention can be varied to control the release stress of the locking electrical receptacle. In this regard, the geometry, thickness, material qualities and detail shaping of the gripping component can be used to control the release tension of the locking mechanism. As an example, increasing the thickness and/or stiffness of the material of the gripping component increases the release tension of the locking mechanism.

Figure 12:
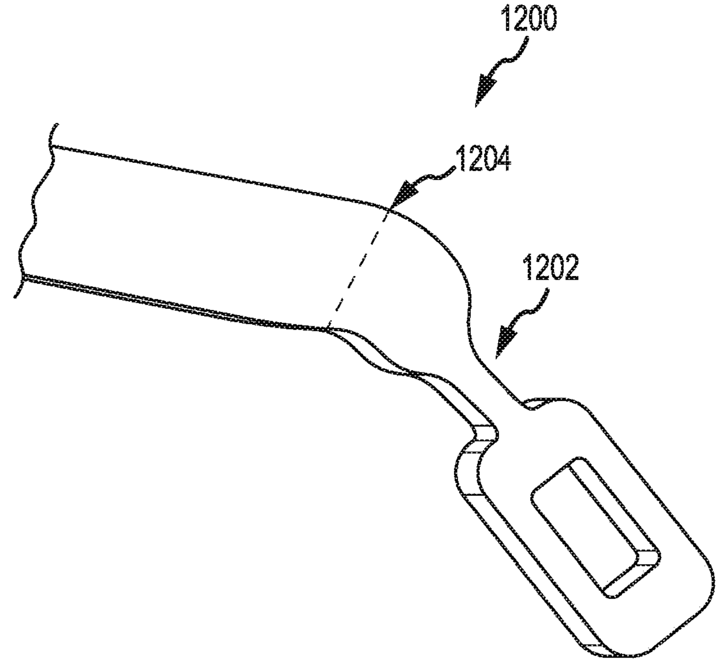
FIG. 12 is a perspective view of an alternative embodiment of a spring prong retainer in accordance with the present invention.

The geometry of these spring prong retainers may also be varied to provide improved safety and performance. FIG. 12 shows on example in this regard. The illustrated spring prong retainer 1200, which may be incorporated into, for example, the embodiments of FIG. 2A-2B, 10A-10B, or 11A-11B, includes a narrowed neck portion on 1202 between the flex point 1204 of the spring prong retainer and the prong engagement opening. This neck portion may provide a number of desirable functions. For example, the neck portion 1202 maybe positioned to provide greater clearance between the spring prong retainer 1200 and the other prongs of plug. In addition, the narrow portion 1202 may be designed to provide a defined breakpoint in the case of structural failure. That is, in the event breakage occurs due to stress or material fatigue, the neck portion 1202 provides a safe failure point that will not result in electrical hazards or failure of the electrical connection.

It can be appreciated that all of the retention mechanisms described herein that can have their release tension changed by varying their design parameters, can have a release tension that is coordinated with the receptacle design or a standard or specification so as to ensure that the cord cap or receptacle will not break resulting in a potentially hazardous exposure of wires. Thus, for example, it may be desired to provide a release stress of forty pounds based on an analysis of an end cap or receptacle structure, a regulatory requirement, or a design specification. The locking mechanism may be implemented by a way of a spring prong retainer as shown, for example, in FIGS. 2A-2B, 10A-10B and 11A-11B. Then, the material and thickness of the spring prong retainer as well as the specific geometry of the spring prong retainer may be selected so as to provide a release stress of 40 lbs. The locking mechanism with a release stress of 40 lbs can also be implemented in the toggle and saddle mechanism as shown, for example in FIGS. 14A-14D and 15A-15B. The values of these various design parameters may be determined theoretically or empirically to provide the desired release point.

Figure 16A:
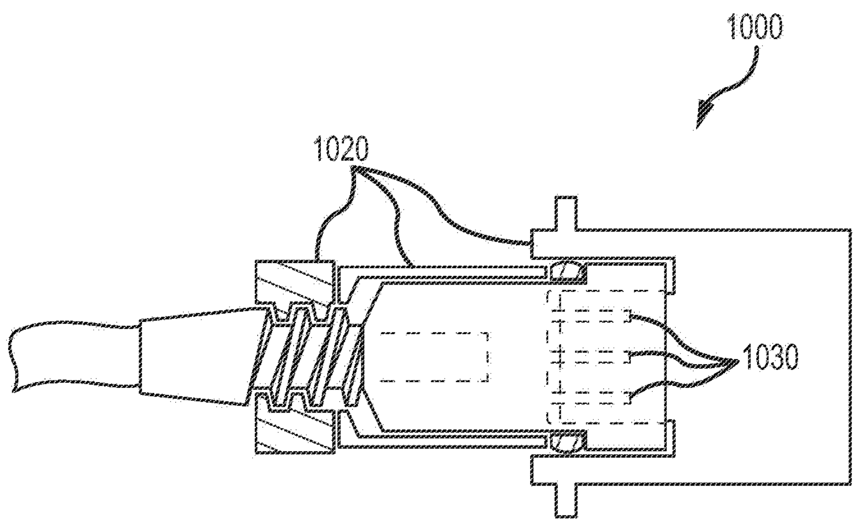
FIGS. 16A-18K illustrate the operation of several embodiments of retention mechanisms in accordance with the present invention.
Figure 16B:
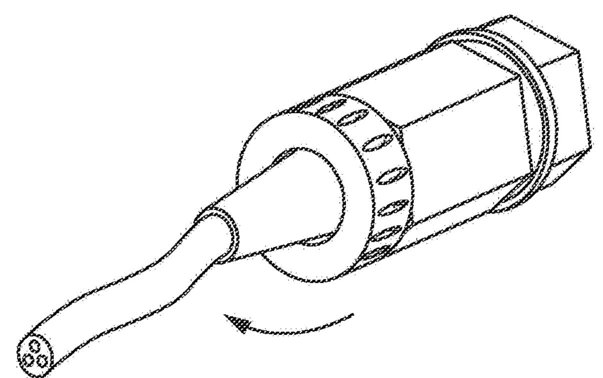
Figures 17A, 17B:
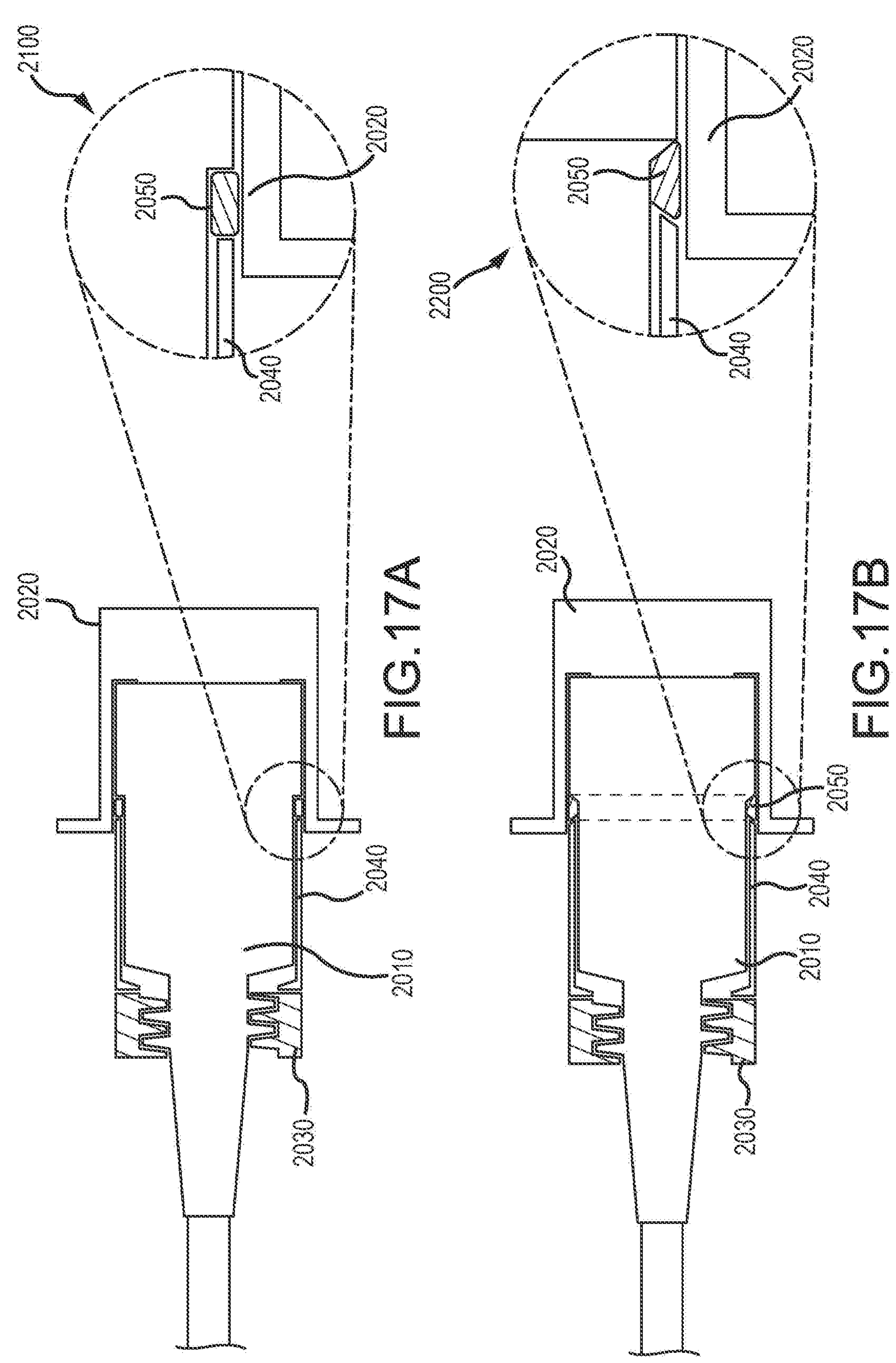

FIGS. 16A-16B illustrate an embodiment of a retention mechanism for securing a mated electrical connection that may be included in a secure connection of the present invention. In FIGS. 16A-16B, the top portion represents a top view of a mated plug and receptacle 100 and a retention mechanism 1020, while the bottom portion represents a perspective view. The electrical prongs 1030 may be two or more in number (e.g., an IEC 320 plug, a NEMA 5-15, or the like) and may be various sizes and shapes. Further, the plug and receptacle 1000 may be the plug and receptacle of a standard outlet (e.g., an IEC 320 cord cap, or the like). The plug also includes the retention mechanism 1020. The design of the secure retention mechanism 1020 is such that a simple slide in and then secure the connection technique is utilized. Referring next to FIG. 17A, the plug and receptacle are shown mated but prior to the connection being secured. This embodiment is one that the user must manually elect to secure, as described earlier.

FIGS. 17A-17B illustrates the plug 2010 when inserted into the receptacle 2020. As shown, the plug and receptacle are in a mated, but not yet secured position. The manual actuation nut 2030 is twisted by the user to secure and release the connection. The nut can have an optional ratcheting mechanism as described earlier, this is not shown. The outer shell 2040 is pressed into the elastomer 2050 by the action of the nut 2030, when the nut is tightened. The outer shell will compress the elastomer when tightened and will be pushed back by the expansion of the elastomer when the nut is loosened. Optionally, the shell can be positively attached to the nut using an appropriate mechanism (such as a mushroom ended pin going through a semi-circular slot in the nut) to insure that it is positively retracted when the nut is loosened. This is an optional construction that is not shown. The blow-up portions of the diagram, 2100 and 2200 show two different possible instantiations of this part of the mechanism. Detail 2030 shows the shape of the area of the mechanism where the elastomer is compressed as substantially rectangular. Detail 2040 shows the shape of the area of the mechanism where the elastomer is compressed in a shape that utilizes inclined ramps to compress the elastomer. As will be appreciated, the materials and detailed geometry of both 2100 and 2200 can be varied to optimize their function as described earlier.

Figures 18A, 18B:
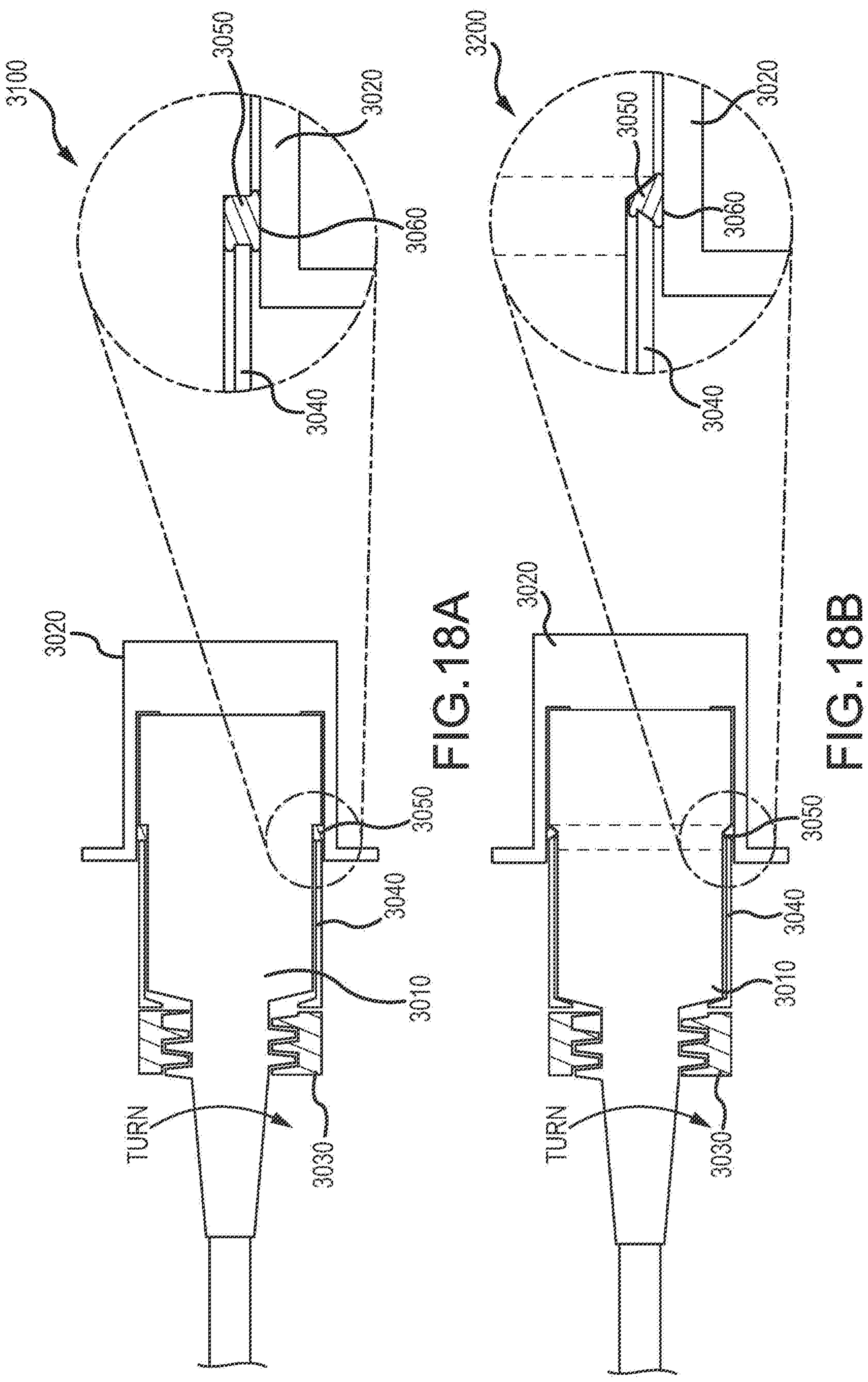
FIGS. 18AA-18TT show embodiments incorporating ergonomic structure to actuate and release the locking function in accordance with the present invention.

FIGS. 18A-18B illustrates the plug 3010 when inserted into the receptacle 3020. As shown, the plug and receptacle are in a mated and secured position. The manual actuation nut 3030 has been twisted by the user to secure the connection. The outer shell 304 is being pressed into the elastomer 3050 by the action of the nut 3030, which is tightened down. The outer shell is compressing the elastomer, which in turn is pressed tightly against the wall 3060 of the abutting receptacle 3020. This is shown in more detail in the blow-up portions of the diagram, 3100 and 3200. The outer shell 3040 will be pushed back by the expansion of the elastomer when the nut 3030 is loosened. Optionally, the outer shell 3040 can be positively attached to the nut using an appropriate mechanism (such as a mushroom ended pin going through a semi-circular slot in the nut) to insure that it is positively retracted when the nut is loosened. This is an optional construction that is not shown. Detail 3100 shows the shape of the area of the mechanism where the elastomer is compressed as substantially rectangular. Detail 3200 shows the shape of the area of the mechanism where the elastomer is compressed in a form that utilizes inclined ramps to compress the elastomer. As will be appreciated, the materials and detailed geometry of both 3100 and 3200 can be varied to optimize their function as described earlier.

Figure 18C:
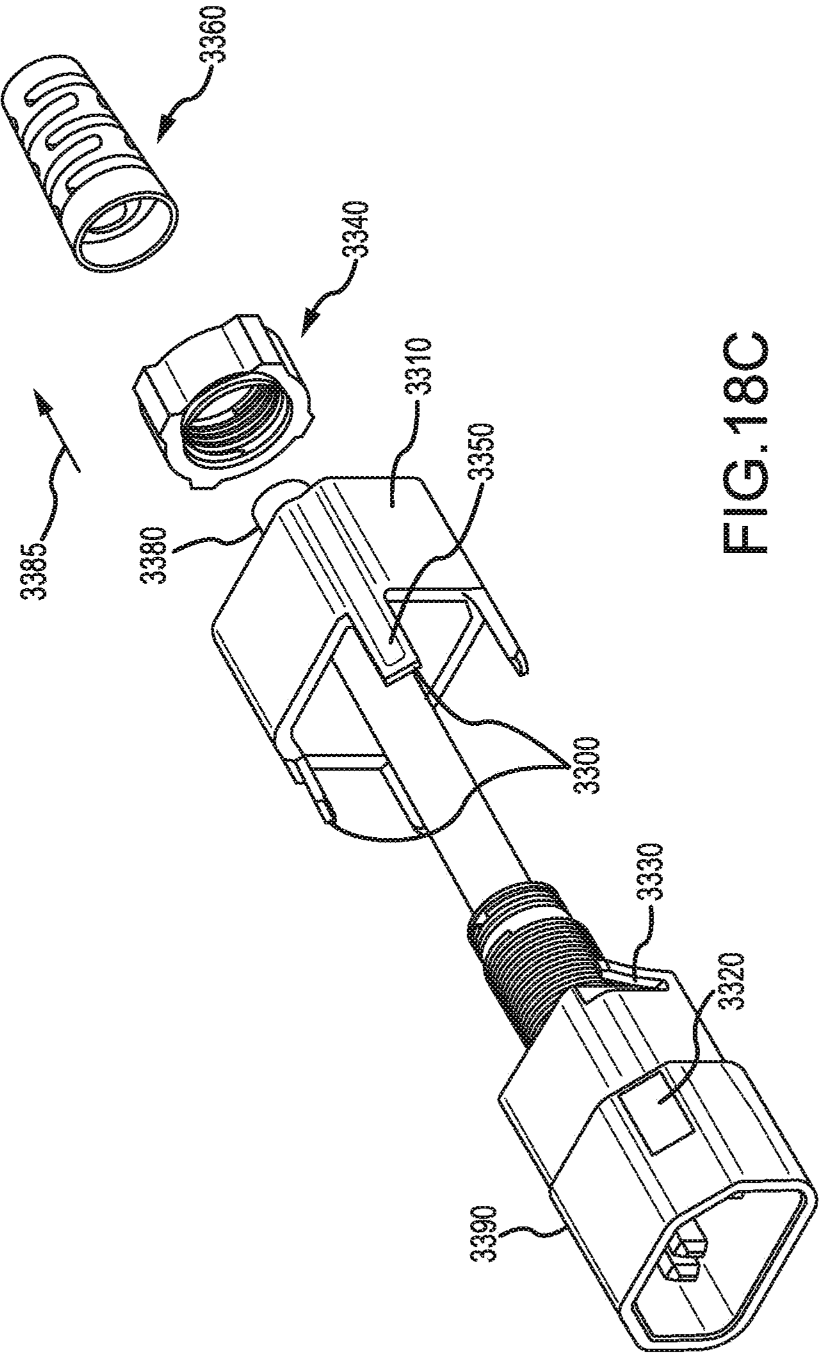
FIGS. 18L-Z illustrate further embodiments of cord caps incorporating retention mechanisms and associated construction techniques in accordance with the present invention.
Figure 18D:
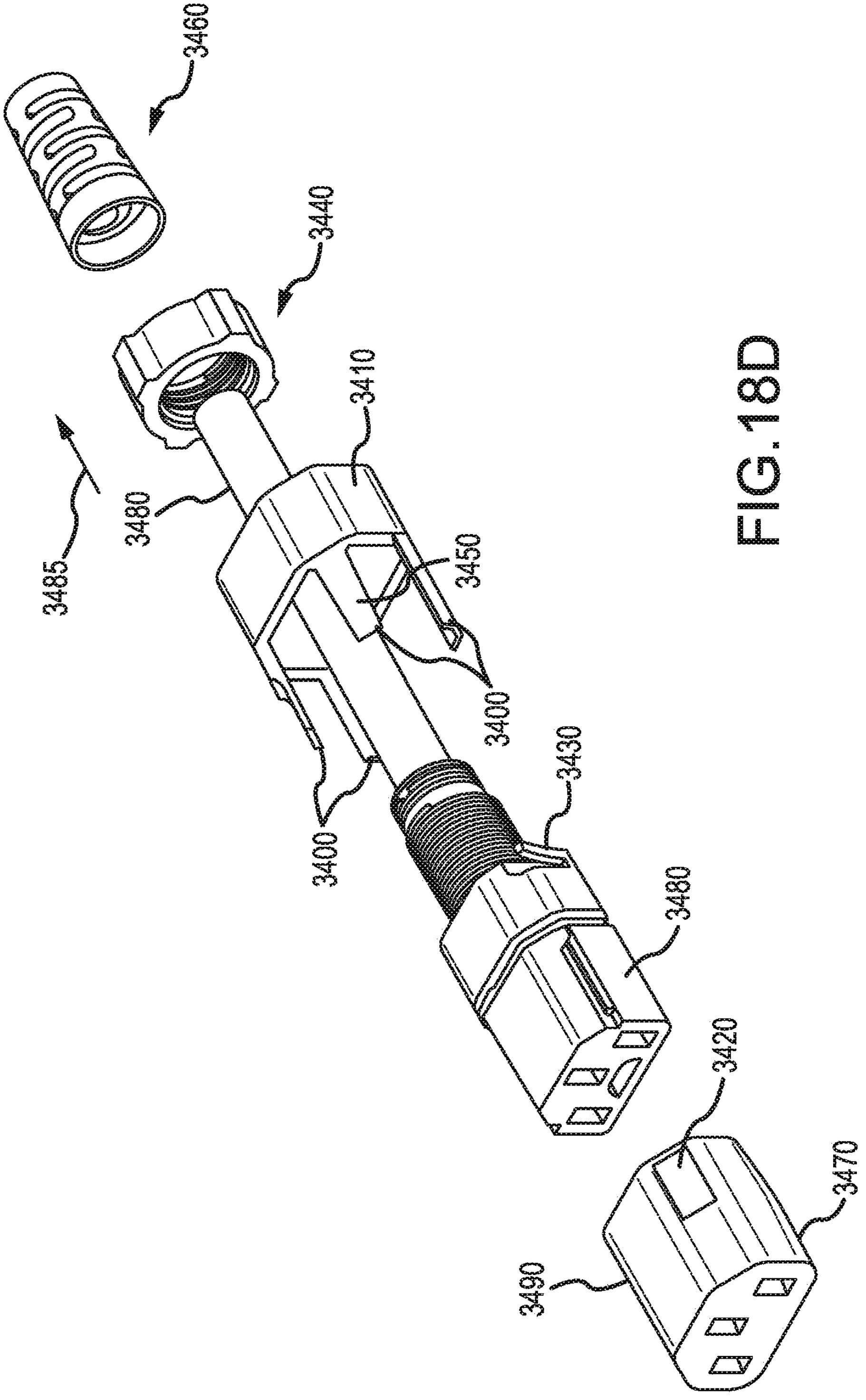

FIG. 18C illustrates a blowup of another possible instantiation of the invention. The tabs 3300 located on the outer shell 3310 are driven axially forward by the action of the nut 3340, when it is tightened down. The tabs 3300 push forward over ramps 3320 in the part of the assembly that is inserted into the matching receptacle. The example in FIG. 18C shown is a male C13, but the same concepts and mechanisms work with a female C13 as shown in FIG. 18D. The only substantial difference in construction between the male C13 shown in FIG. 18C and the female C13 shown in FIG. 18D is how the electrical contacts are located, in the female version a contact carrier 3480 (which is usually a safety agency approved part) is molded into the cord cap. The outer shell 3470 can be overmolded onto the contact carrier or made as a separate part that snaps over the contact carrier, which is the construction shown in FIG. 3D. Other construction methods are possible. The geometry, material, location, number and mechanical action of the tabs 3300, 3400 and ramps 3320, 3420 can be varied to insure that the area of maximum pressure exerted by the ramps contacting the mated receptacle is located as desired. This can be important to maximize the retention force and insure that the receptacle can withstand the force applied by the tabs 3300, 3400 without damage. The tabs 3300, 3400 can be one or more in number, and can be located to maximize the retention force of the mechanism. They may or may not be located to oppose each other, which can be used to insure that the force applied to the receptacle maximizes the retention force. As shown, the tabs 3300, 3400 would tend to apply force to the receptacle such that the walls of the receptacle are stressed in tension, which can be desirable, depending on the material of the receptacle. The surface of the tabs 3350, 3450 that contacts the wall of the mated receptacle can be made of one or more materials with suitable mechanical and frictional characteristics. An example of a possible instantiation would be to make the outer shell 3310, 3410 of a harder, mechanically strong material and then coat or the tab surfaces 3350, 3450 with a high friction coefficient elastomer. This could be economically done via a coinjection ("sandwich") molding process, for example. As can appreciated, in reaction to a withdrawal force 3385,3485 applied to the cord 3380, 3480, the retention mechanism as shown in FIG. 18C, 18D will transmit the force via the cord 3380, 3480 to the end of the cord cap 3390, 3490. This will compress elastomer injection molded materials that are commonly used to make electrical cords, resulting in the end of the cord cap being moved slightly closer to the outer shell 3310, 3410 which moves the tabs 3300, 3400 farther up the ramps 3340, 3440 which presses the contact area of the tabs 3350, 3450 into closer and closer contact with the walls of the receptacle, causing the frictional interlock between the plug and the receptacle to increase. Thus, the very force 3385, 3485 that tends to withdraw the plug from the receptacle acts to engage the retention mechanism to frictionally interlock with the walls of the receptacle, thereby preventing the withdrawal of the plug, and maintaining the electrical connection of the mated assembly. The geometry, material and mechanical action of the tabs 3300, 3400 and ramps 3320, 3420 can be also be varied to provide a programmable release mechanism by limiting the force applied to the walls of the mated receptacle and thus the frictional interlock between the contact surfaces of the tabs 3350, 3450 and the walls of the mated receptacle. Limiting the frictional interlock limits the maximum force the secured connection can resist. Once that level of force is applied, the plug and receptacle will separate. As discussed earlier, the level of the maximum force can therefore be specified to prevent damage to the plug and receptacle and/or meet an applicable standard and as also discussed earlier a range of retention force values that can be adjusted by the user via the action of the nut 3340, 3440.

FIGS. 18E-18K illustrate another possible instantiation of the invention and represents an alternate locking method for an IEC-13 receptacle utilizing a novel retention mechanism. It is comprised primarily of three main components associated with the gripping of this connector to a mating type connector, e.g. IEC-14. It should be noted that this mechanism is not limited to the IEC series connectors, but could be adapted to a variety of connector mating applications including those that utilize a shield barrier outer shell on the receptacle. In the case of such shield barrier receptacles, gripping can be accomplished by using the shield barrier as a frictional element against the wall of the mating receptacle and is independent of the electrical conduction methods utilized within the connectors themselves.

Figure 18E:
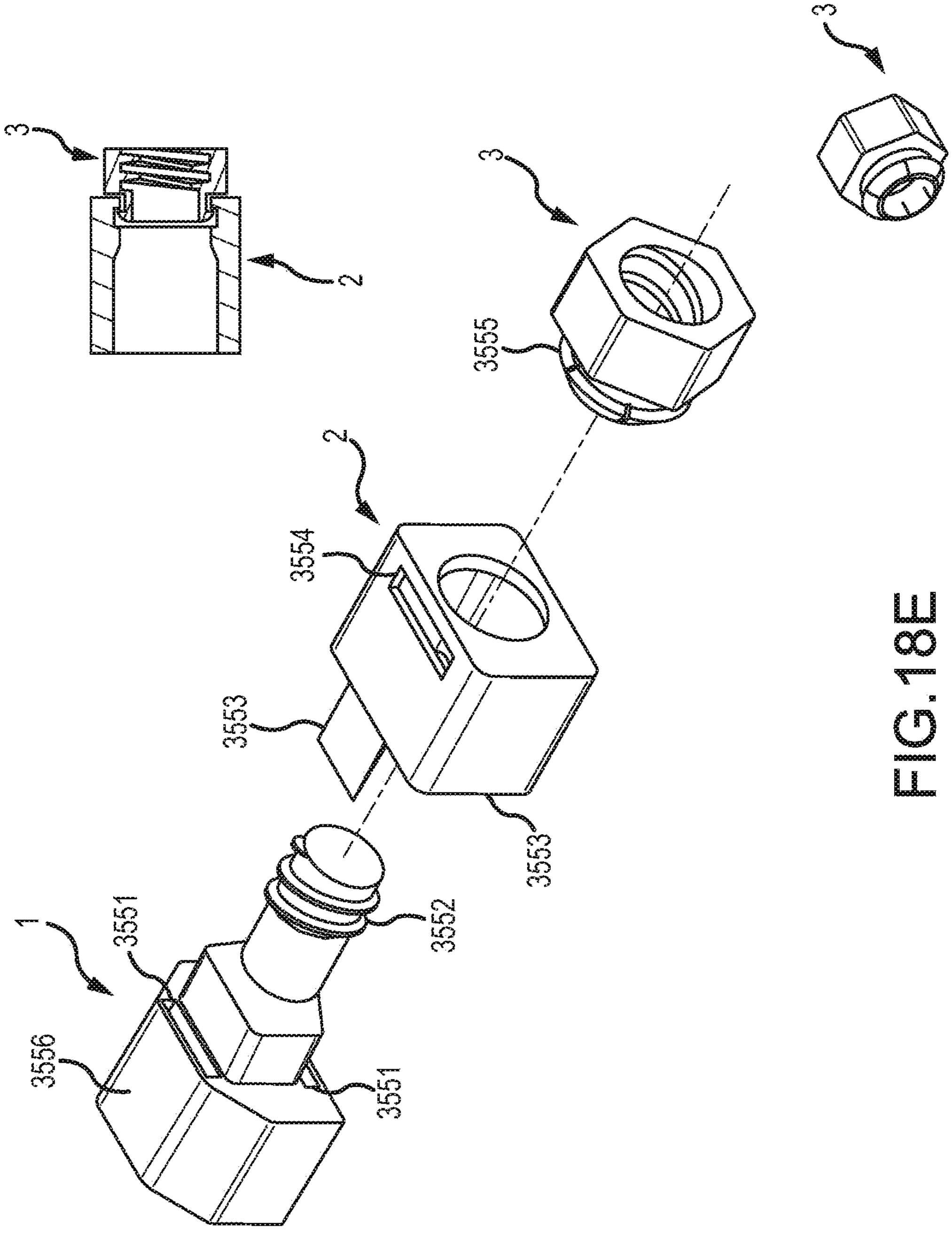

Observing FIG. 18E, the inner core of the connector 1 is comprised of a molded assembly that is very similar to traditional IEC-13 (or other standards) cord-cap receptacles (female end) with regards to dimensions and electrical interface components. It differs in that dielectric over-mold has two rectangular holes 3551 through the outer shell penetrating to the interior of the shell. In addition, a locking tab shuttle 2 made of a suitable material provides the locking tabs 3553 and structure for transferring force from a locking nut 3 into the interior of the shell area of the inner core 1 via holes 3551.

Figure 25:
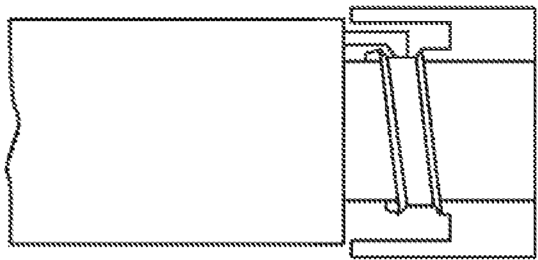
FIG. 25 illustrates an embodiment of a mechanism that insures positive retraction of the outer shell when the locking nut is turned to the release position in accordance with the present invention.

The locking to a mating connecter is achieved by the tabs 3553 being driven by the nut and thereby wedged between the top and bottom outer surface of the mating connector, and the top and bottom inside surfaces of the inner core shell 1. When it is desired to release the connection, the nut 3 is loosened which withdraws the tabs 3353 by positive retraction. This is accomplished by the engagement collar 3555 on the nut 3 which turns in the slot 3554 in the locking tab shuttle 2 pulling out the tabs 3553. Other means can be used to attach the nut 3 to the locking tab shuttle 2, an example is shown in FIG. 25. This method of locking provides good gripping with a programmable release force. Careful selection of the shapes, geometry and materials used allow the maximum retention force to be limited to a desirable range of values. Additionally the outer surfaces of the over-mold (for example the outer surfaces that are directly over the locking tabs 3553 can optionally be coated, textured or otherwise designed to increase the frictional force between the outer shell 3551 and the mating wall of the receptacle. The ability to control the release force to a chosen range of values is a desirable to prevent excessive pulling force from possibly damaging the plug and cord cap in the mating connection. It can also be useful to satisfy certain agency approvals. In addition, this method is simple to manufacture and has a minimum of moving parts.

Figure 18F:
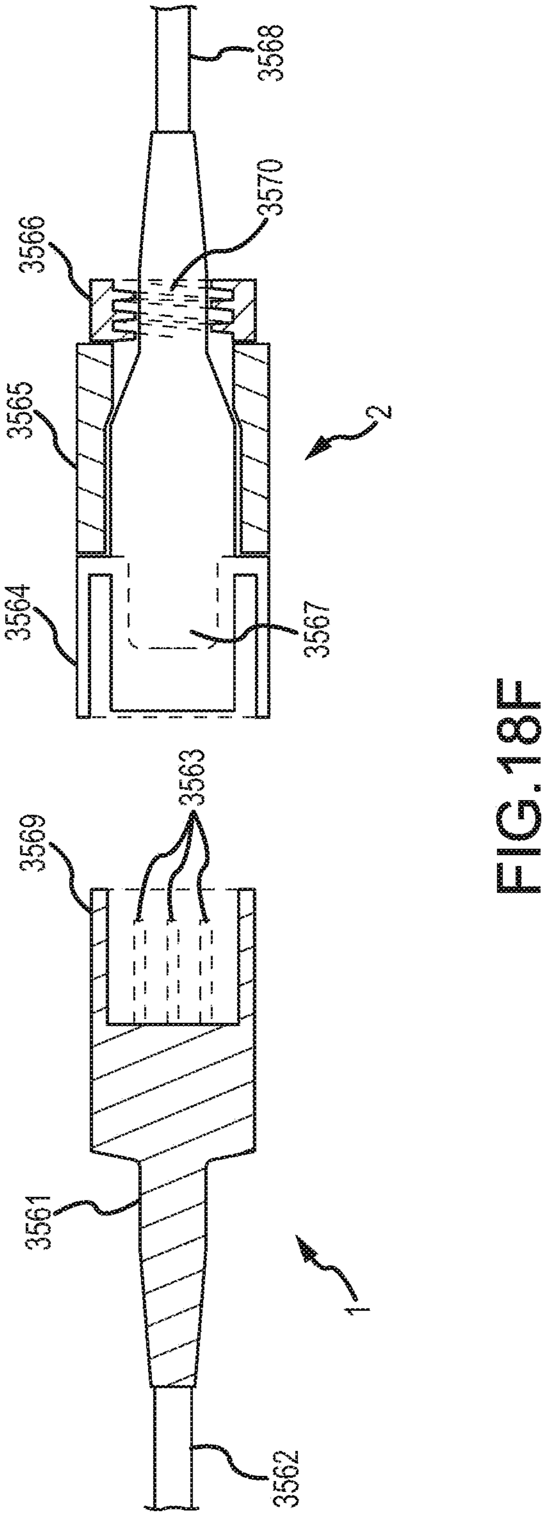

Referring to FIG. 18F, cross-sections of two primary parts are shown, a top view of the traditional cord-cap plug (male connector), 1 and a top view of the mating cord-cap connector (female receptacle) 2. The plug 1 is described as part of the description of the method of securing the electrical connection, but a key point is that the plug can be a standard un-modified plug. Only the mating receptacle 2 differs from traditional standards and is unique. This means that the invention is applicable to the very large installed population of standard plugs, such as are used in plugstrips in data centers. IEC C14 plugstrips are very popular for distribution of 200V+ electrical service worldwide. The traditional plug is comprised of three major components as shown in FIG. 18F, the over-mold dielectric 3561, a connecting cord containing the necessary electrical conductors 3562, and the electrical mating connector pins 3563. This example is of a traditional IEC-14 type plug, but could be other types utilizing an outer pin dielectric barrier 3569. This outer pin barrier 3569 is generally concentric around the pins 3563, and will be the object of the gripping by the mating receptacle when applied.

The focus of this application is the receptacle assembly 2 which includes a core with an outer shell 3564, a shuttle 3565 which includes, as a part of it, locking tab 3567 one of which is shown. This is the top view so the outline of the tab can be observed, but two tabs exist, one on the top of the connector and one on the bottom, where each is an integral part of the molded shuttle components in the illustrated. The tabs shown are a preferred instantiation, but the methods described can work with other tab numbers, shapes, and locations. The core 3564 has also molded onto it some type of threads 3570 which engage with a locking nut 3566. This threaded nut works against the threads of the core 3564, to apply force to the movable shuttle 3565 and transmit axial force to the tabs 3567.

Figure 18G:
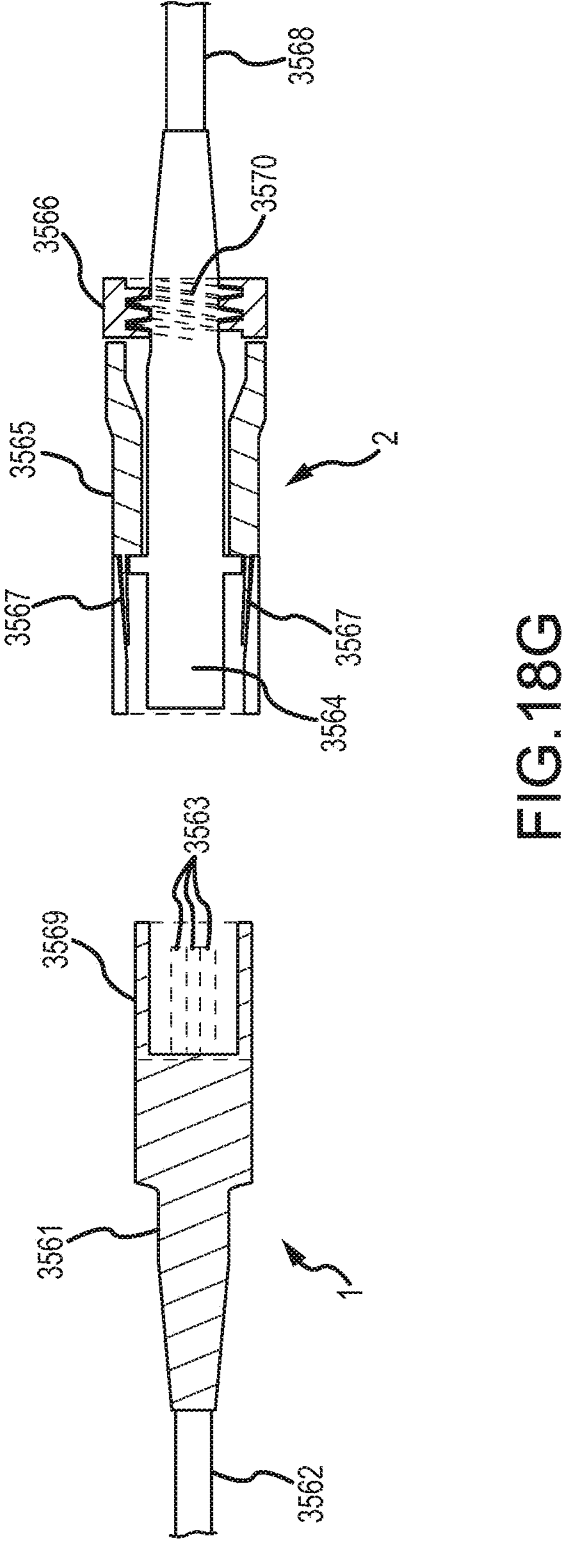
Figure 18H:
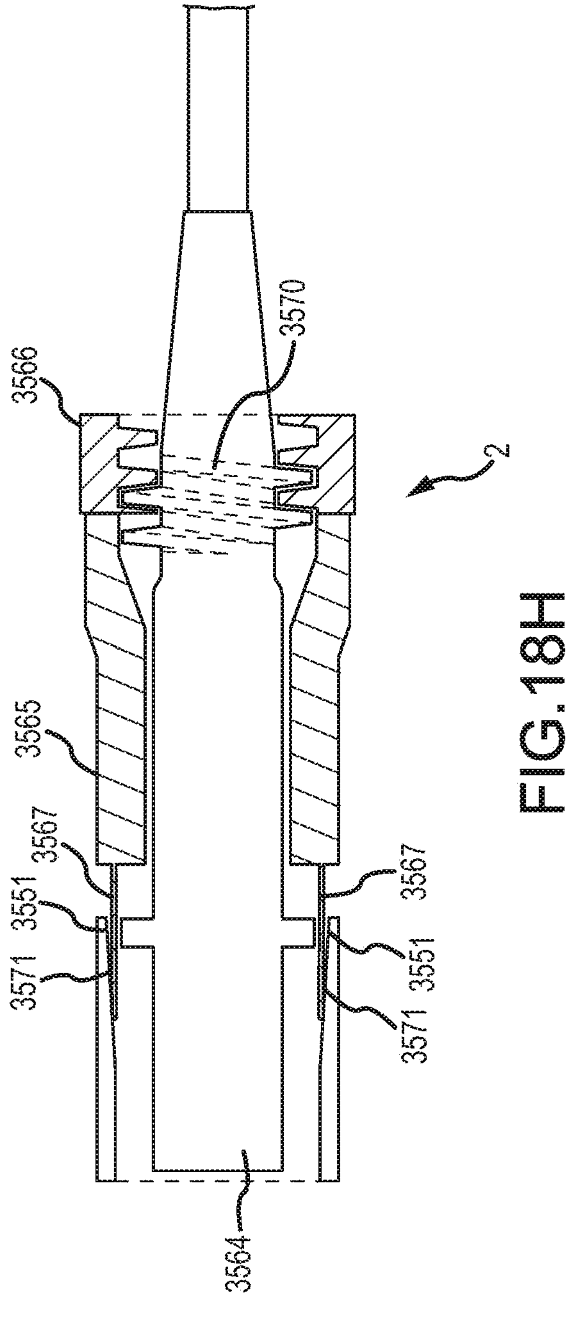

FIG. 18G represents a cross section side view of the aforementioned components in FIG. 18F. This view shows more clearly the relationship of the top and bottom locking tabs 3567, and that they are part of the shuttle 3565. In FIG. 18G, the receptacle assembly 2 is shown with the locking nut 3570 turned to the locked position, the shuttle 3565 pushed forward, and the locking tabs 3567 fully inserted into the shell and core 3564. FIG. 18H is an expanded cross section side view of the receptacle assembly 2. In this view it is more clearly shown the penetration of the tabs 3567 through the holes 3551 in the core and shell 3564.

The holes 3551 have a tapered entrance 3571 into the cavity of the core and shell 3564 that causes the tabs 3567 to be pushed towards the centerline when the shuttle 3565 moves from right to left in this example. This example has the shuttle 3565, and hence the tabs 3567 shown in the release position. The tabs 3567 are substantially retracted from the cavity thus leaving the area in that cavity available for insertion of the mating plug's shell. For the purpose of describing the focus of this application, the non-applicable components of both the plug and receptacles will not be referenced further. Those components include the electrical components such as the pins and sockets, and the cords.

Figure 18I:
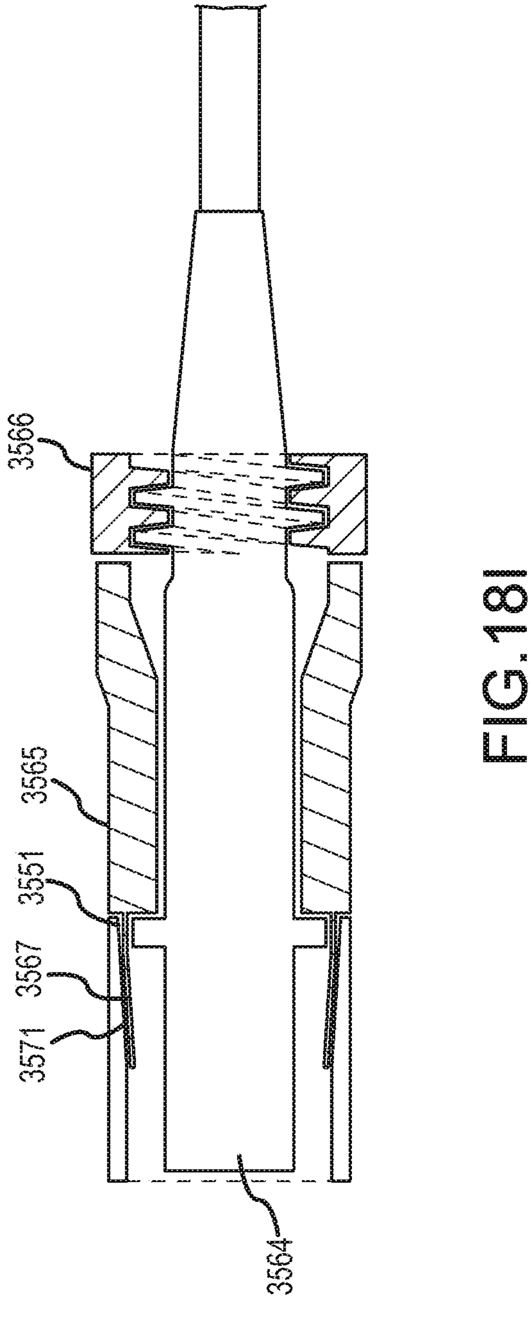
Figure 18J:
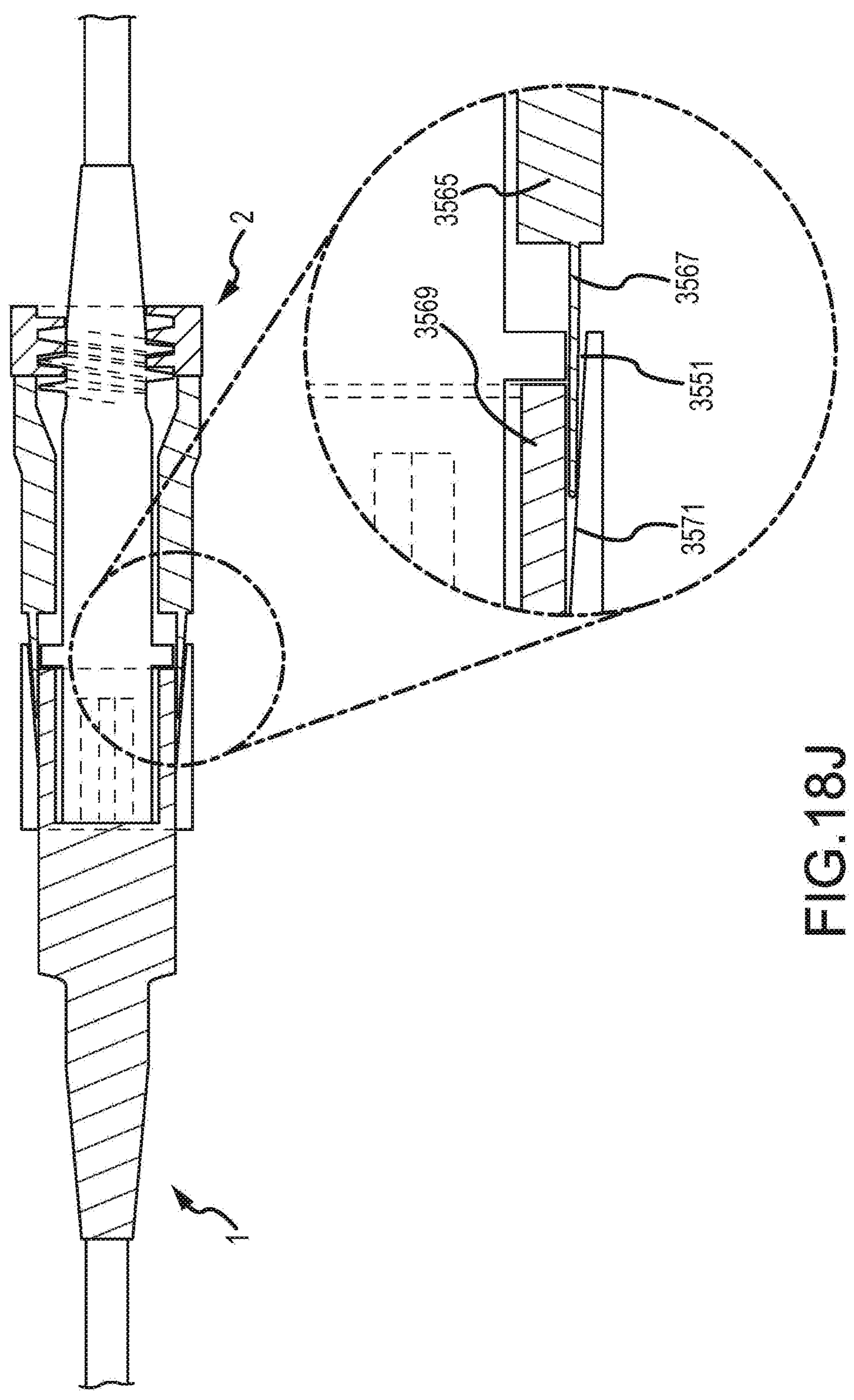

FIG. 18I shows the receptacle assembly of FIG. 18F with the locking nut 206 turned such that it applies axial force forward on the shuttle 3565, which in turn has pushed the tabs 3567 into the cavity of the core and shell 3564. It is important to note the relationship of the tabs 3567 and the tapered entrance 3571. The combination of the taper on the tabs 3567, and the tapered entrance 3571 have caused the tabs 3567 to bend inwards towards the centerline of the assembly. FIG. 18J represents the mating of an un-locked position receptacle 2 with a standard mating plug 1. A detailed blow up is shown in the lower right that more clearly shows the non-interference of the locking tabs 3551 with the mating plug barrier shell 3569. When the shuttle 3565 is retreated as shown, there is little or no contact between the tab 3551, the inner wall ramp of the core and shell 3571 and the outer surface of the mating plug's barrier shell 3569.

Figure 18K:
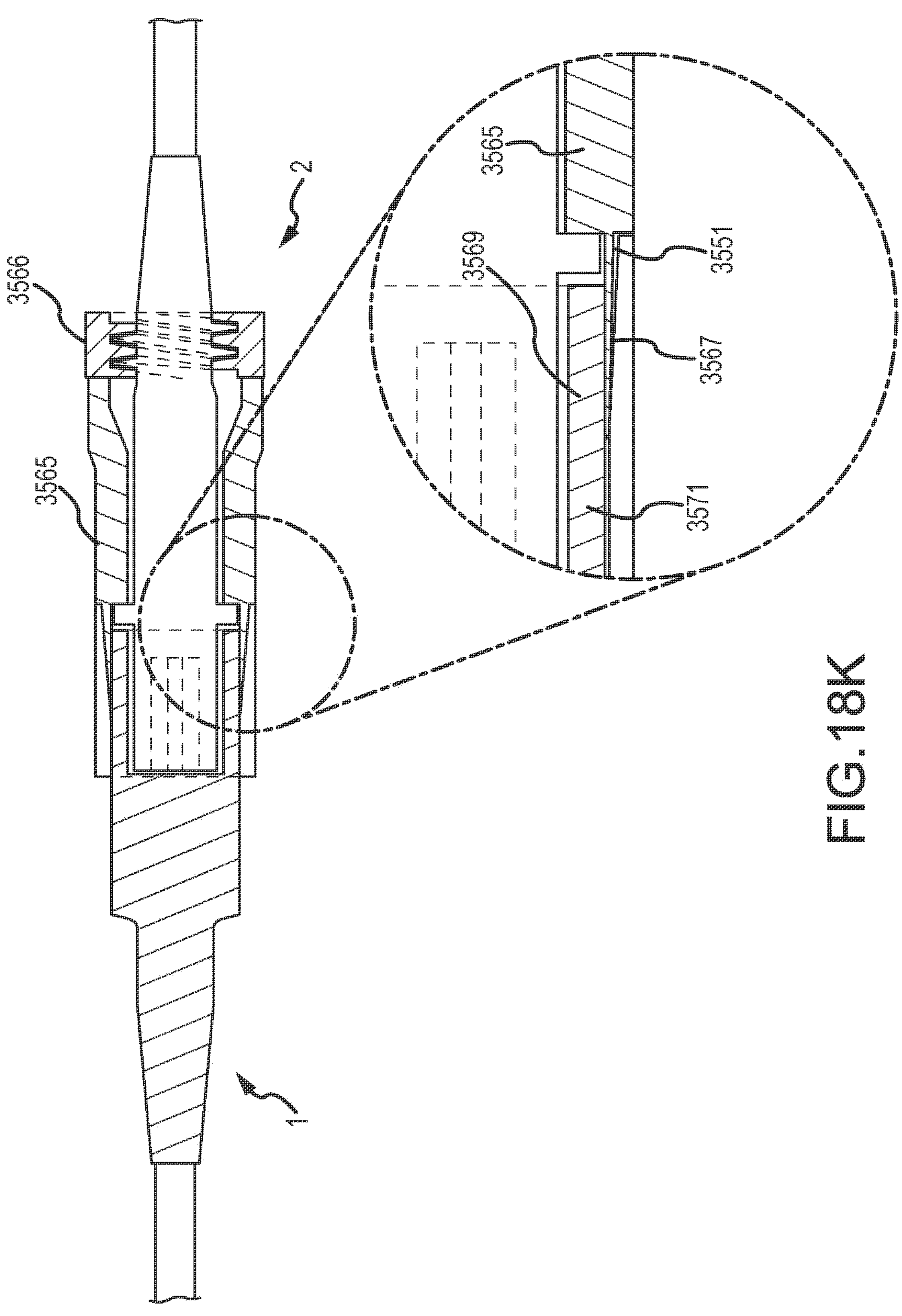

FIG. 18K shows the mated and locked condition of the plug 1 and receptacle 2 combination. The nut 3566 has been turned forcing the shuttle 3565 forward. The detailed blow up shown in the lower right more clearly shows the new relationship between the tabs 3567, and mating plug barrier shell 3569. When the shuttle 3565 is forced forward as shown, there is significant contact between the tab 3551, the inner wall ramp of the core and shell 3571 and the outer surface of the mating plug's barrier shell 3569. As the locking nut 3566 is further tightened, the radial forces between the tab 151, the inner wall ramp of the core and shell 3571 and the outer surface of the mating plug's barrier shell 3569 increase very rapidly due to the force amplification of the gradual taper of the tab 3567 and the inner wall ramp of the core and shell 3571. This same action is happening on the opposite side of the plug's barrier shell, and in the opposing direction on that side. These opposing forces help to maintain centering of the plug 1 in the receptacle 2.

Figure 18:
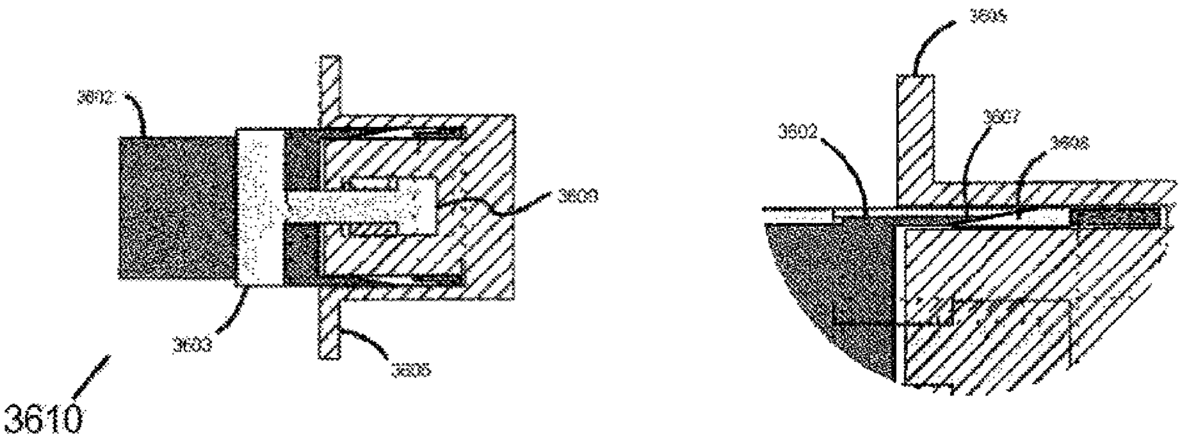
Figure 18:
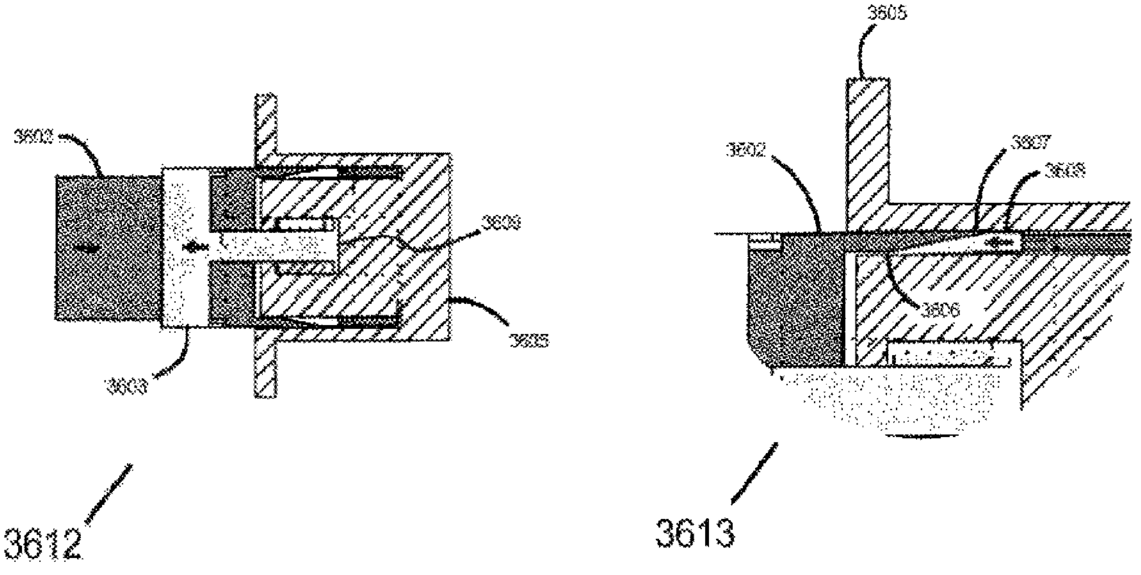
Figure 18:
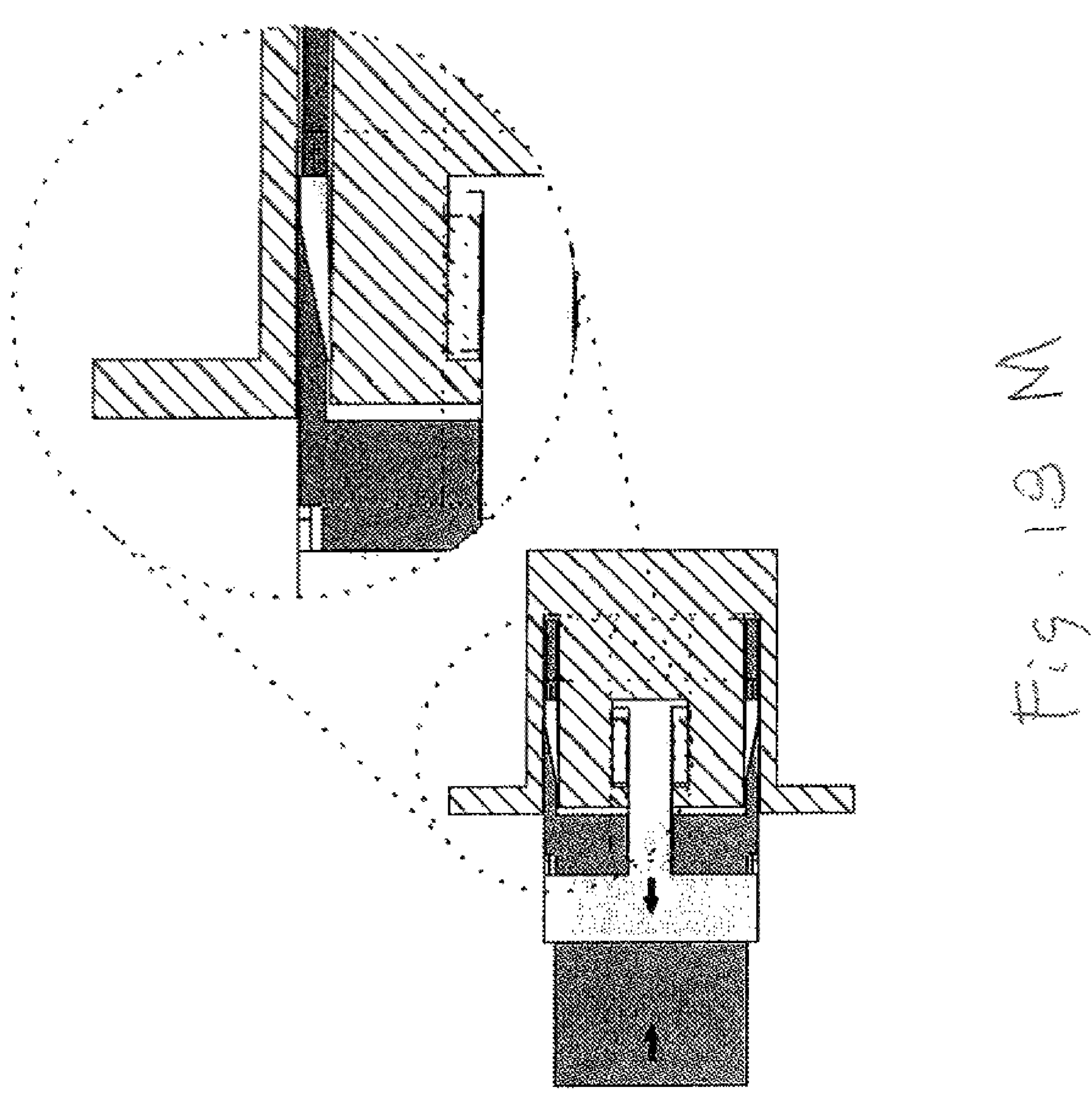
Figure 18:
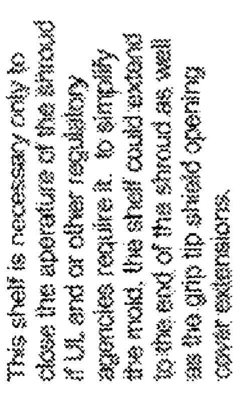
Figure 18:
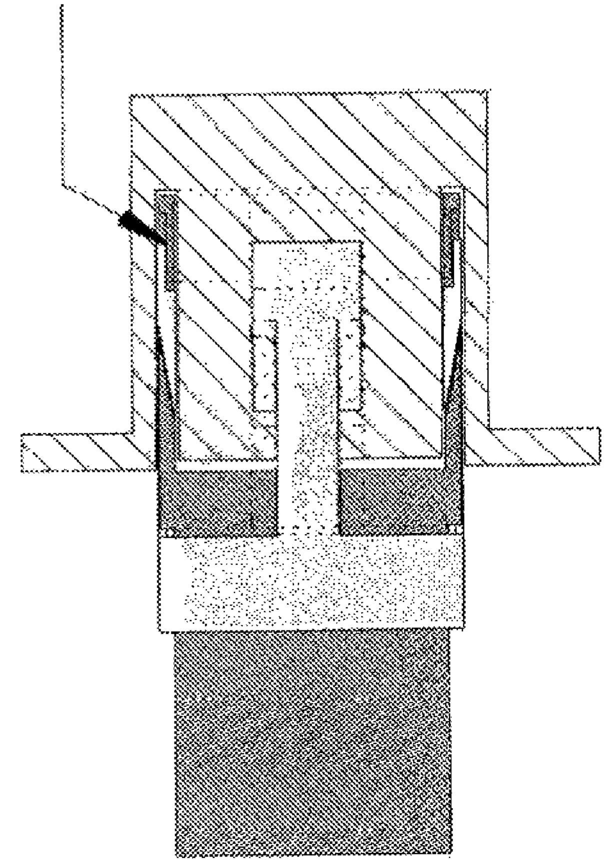
Figure 18:
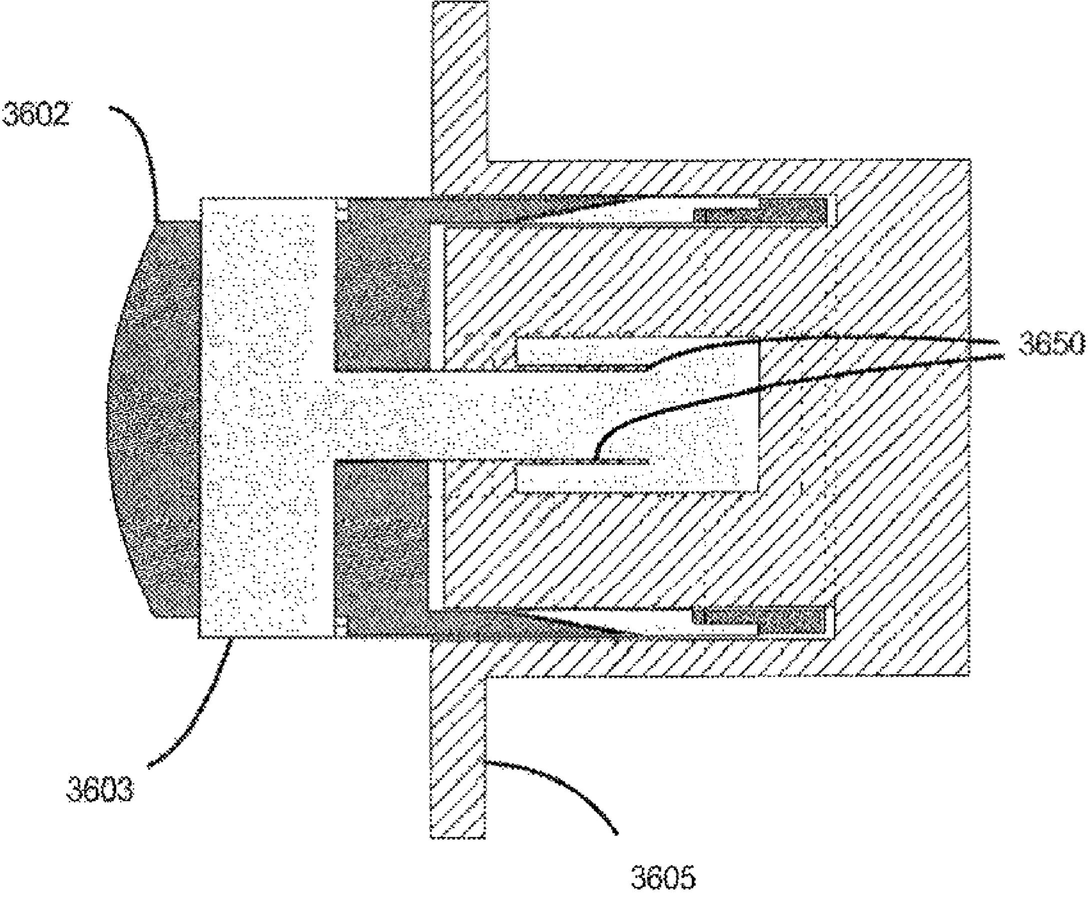
Figure 18:
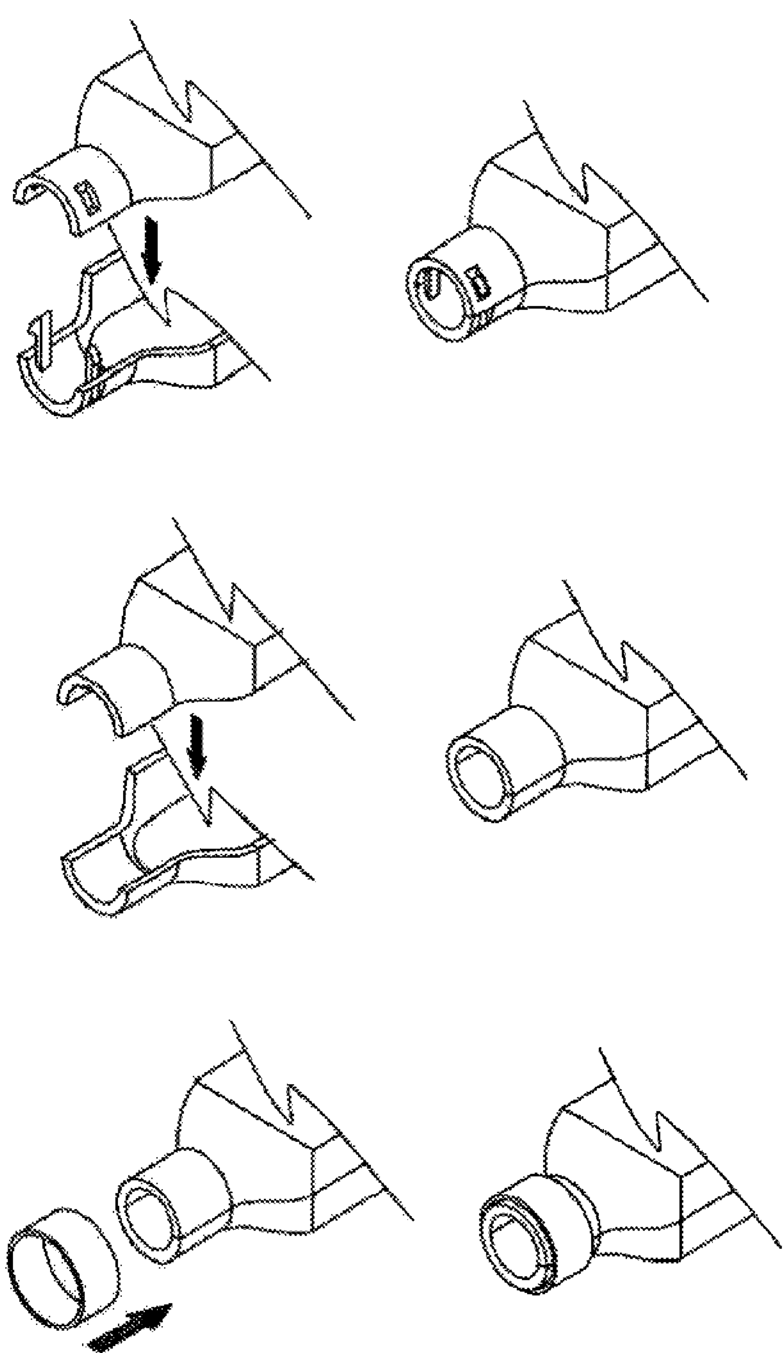
Figure 18:
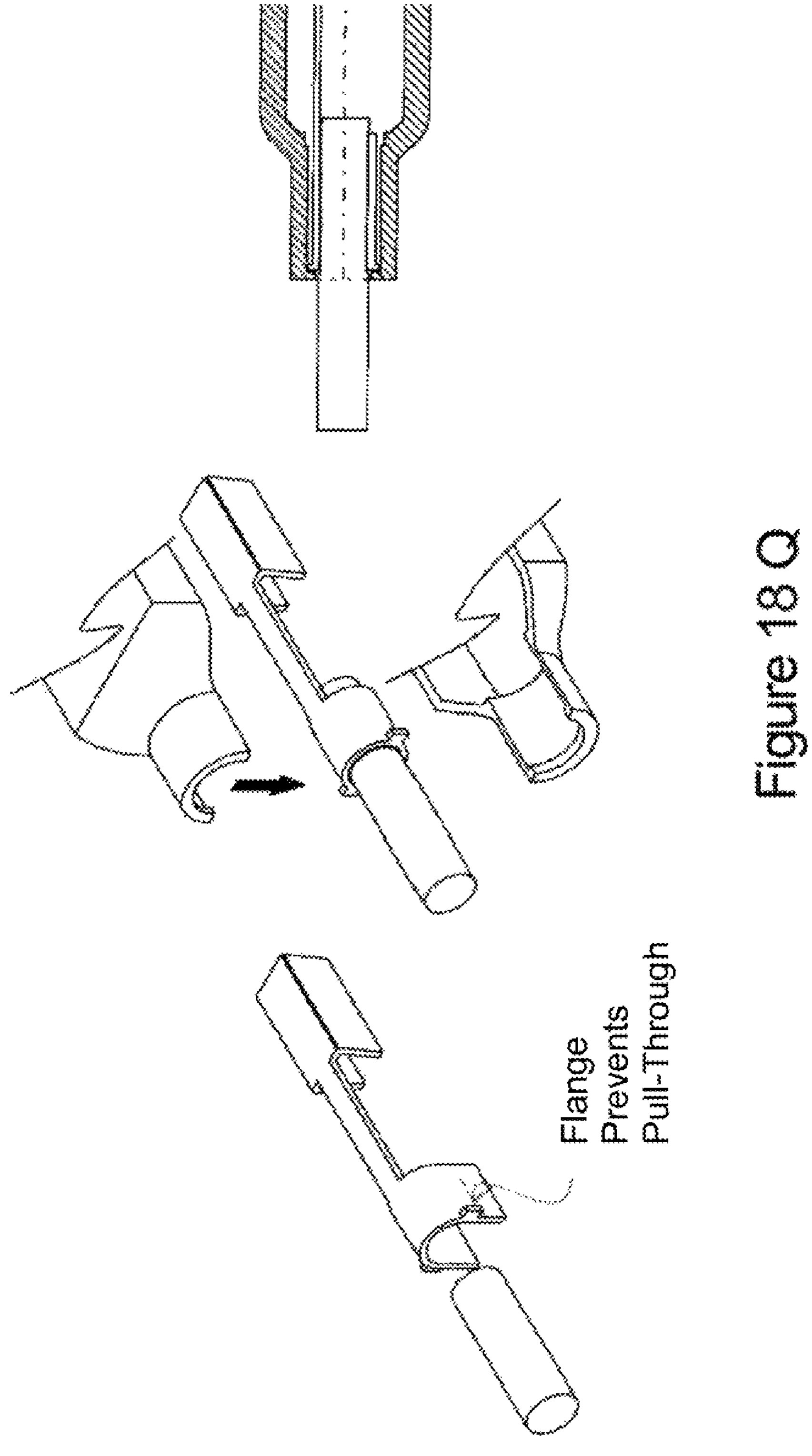
Figure 18:
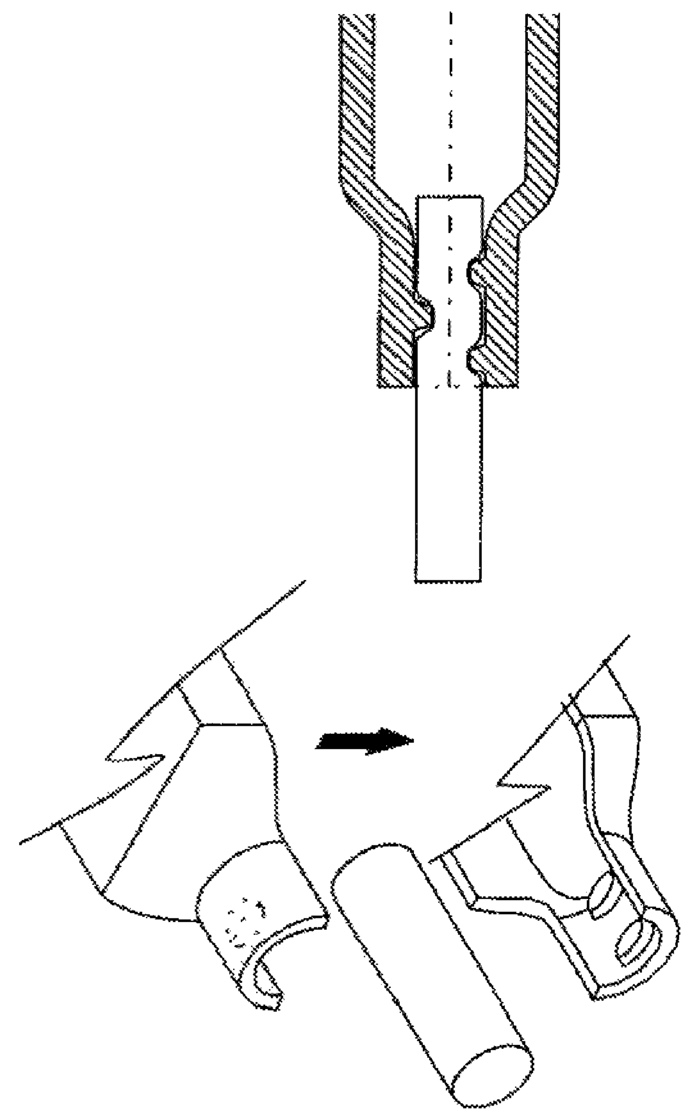
Figure 18:
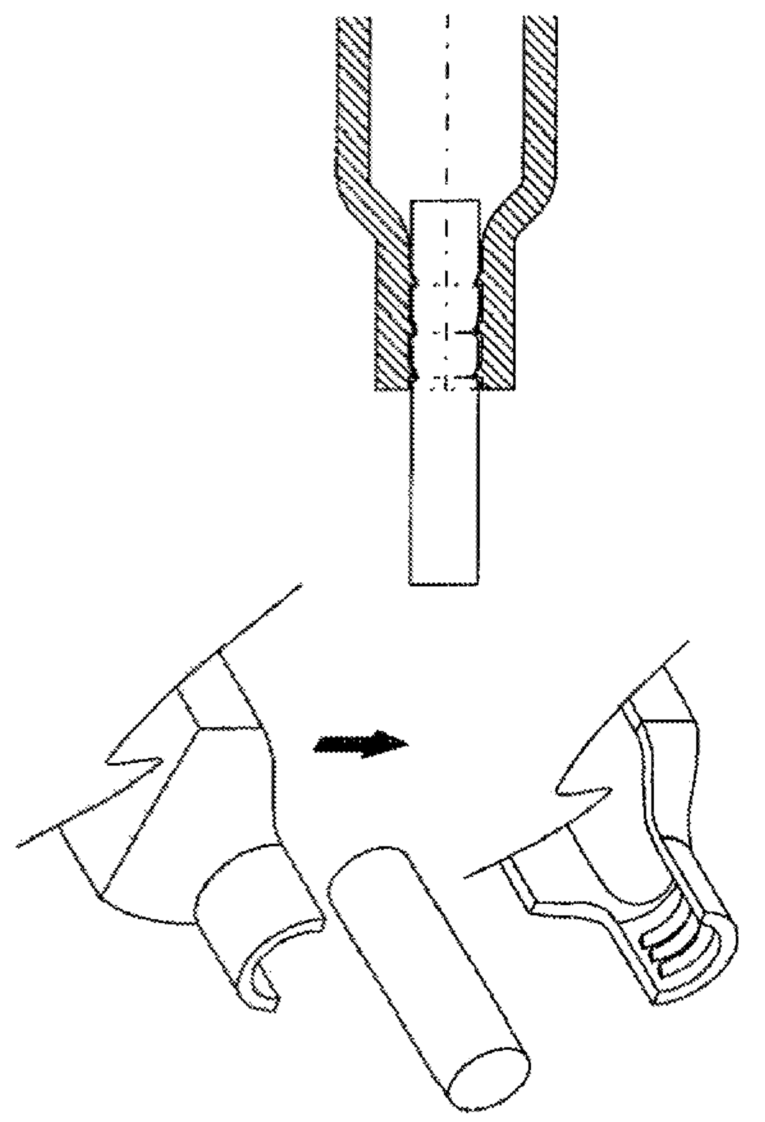
Figure 18:
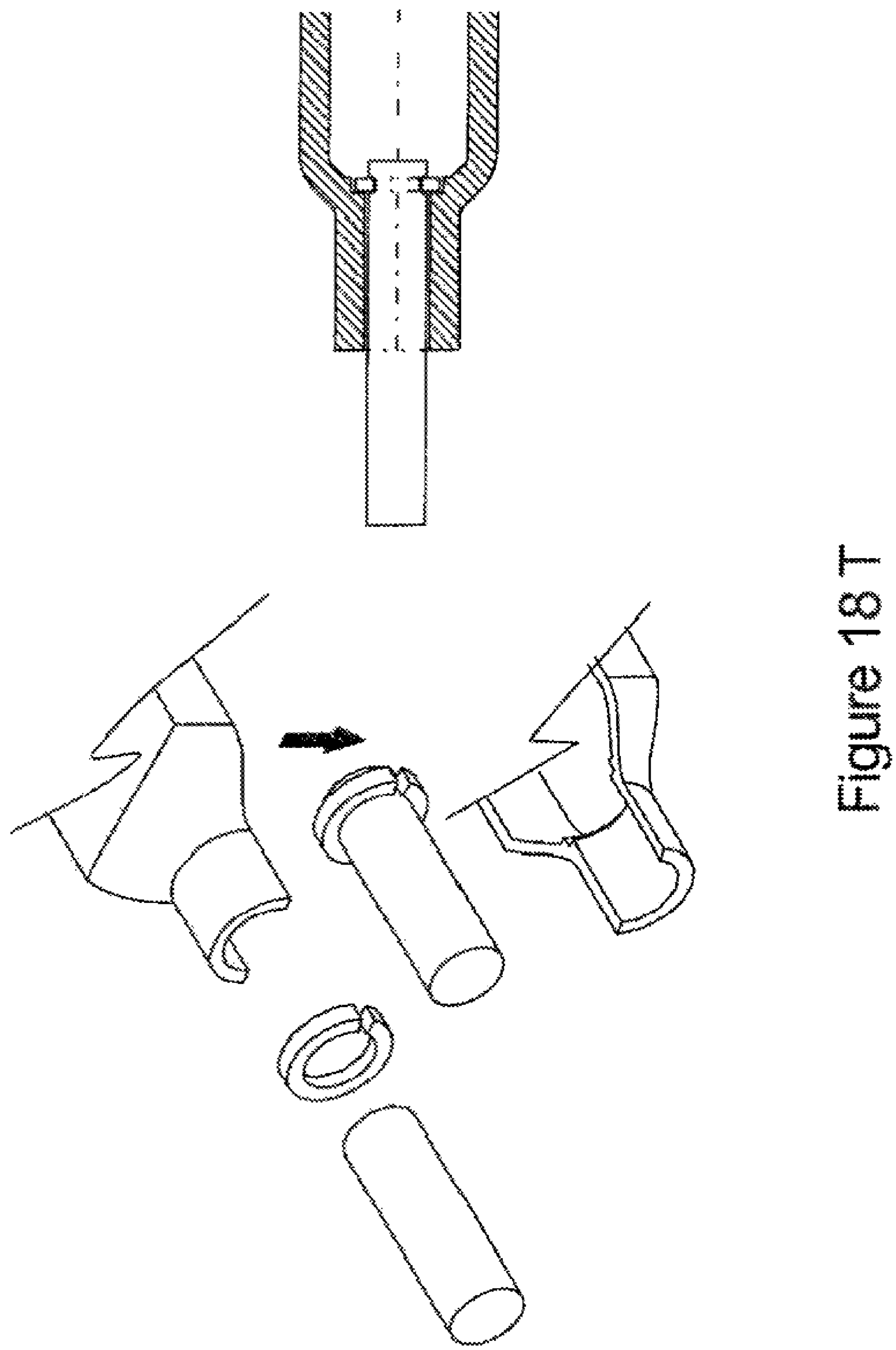
Figure 18:
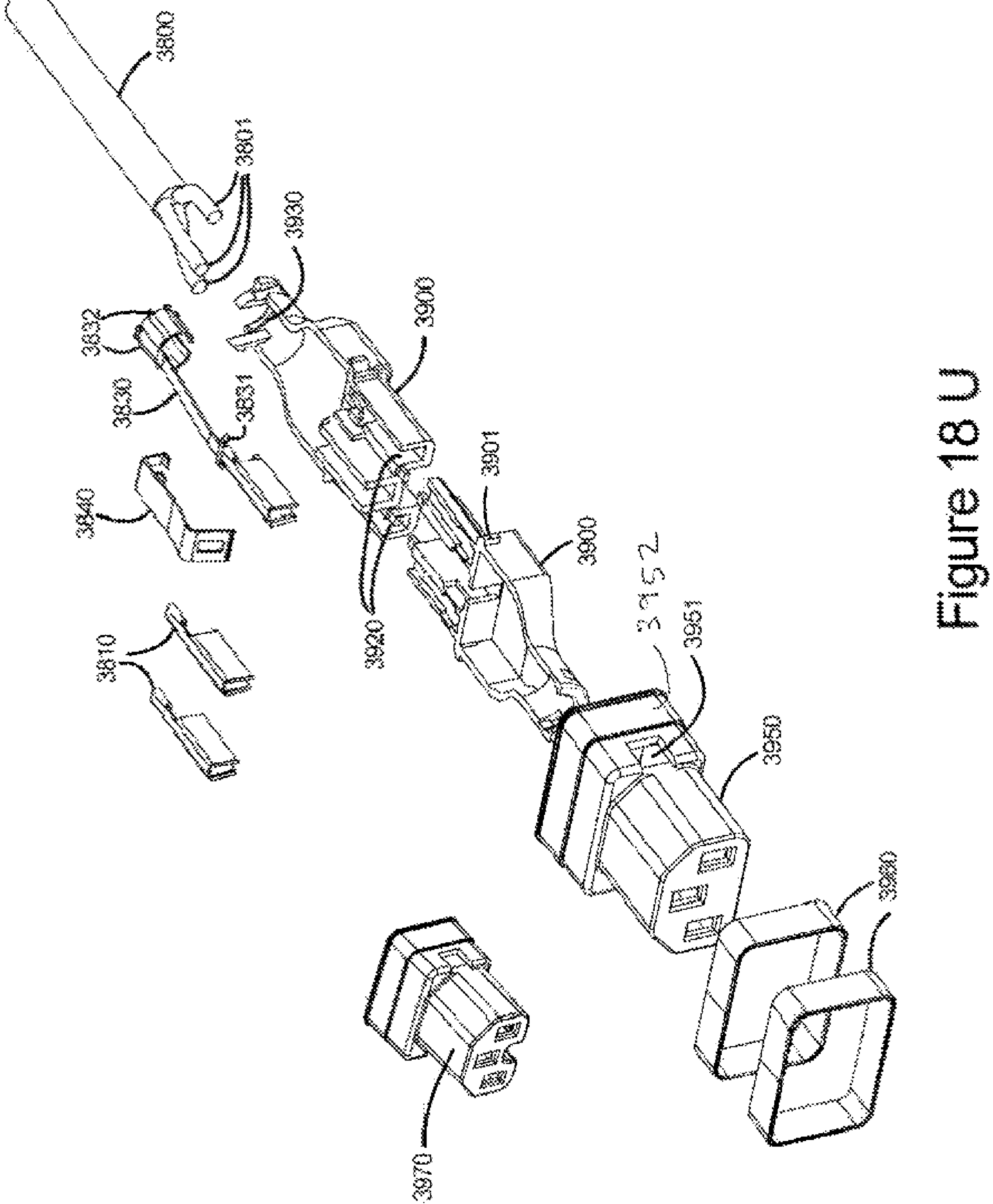
Figure 18:
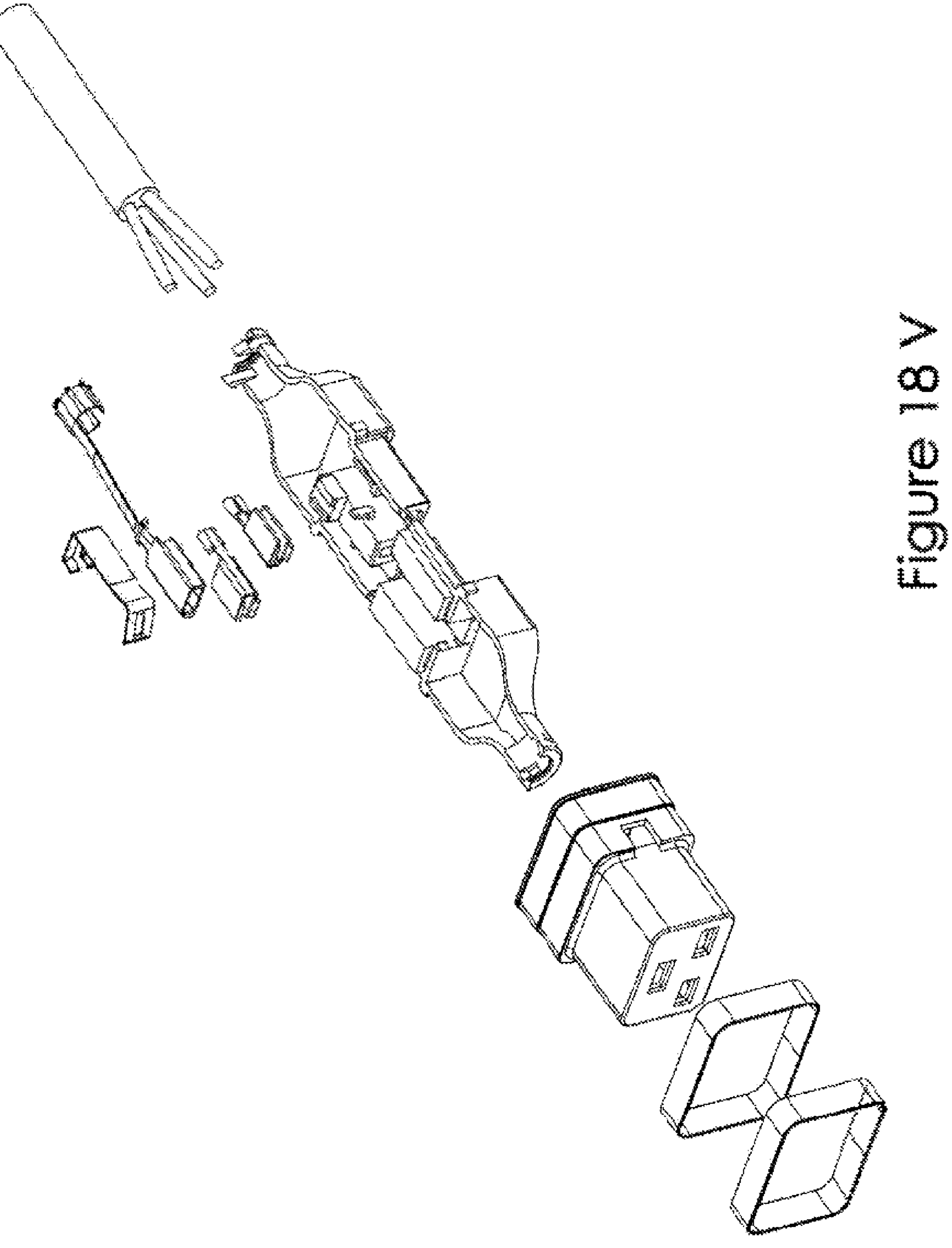
Figure 18:
Figure 18:
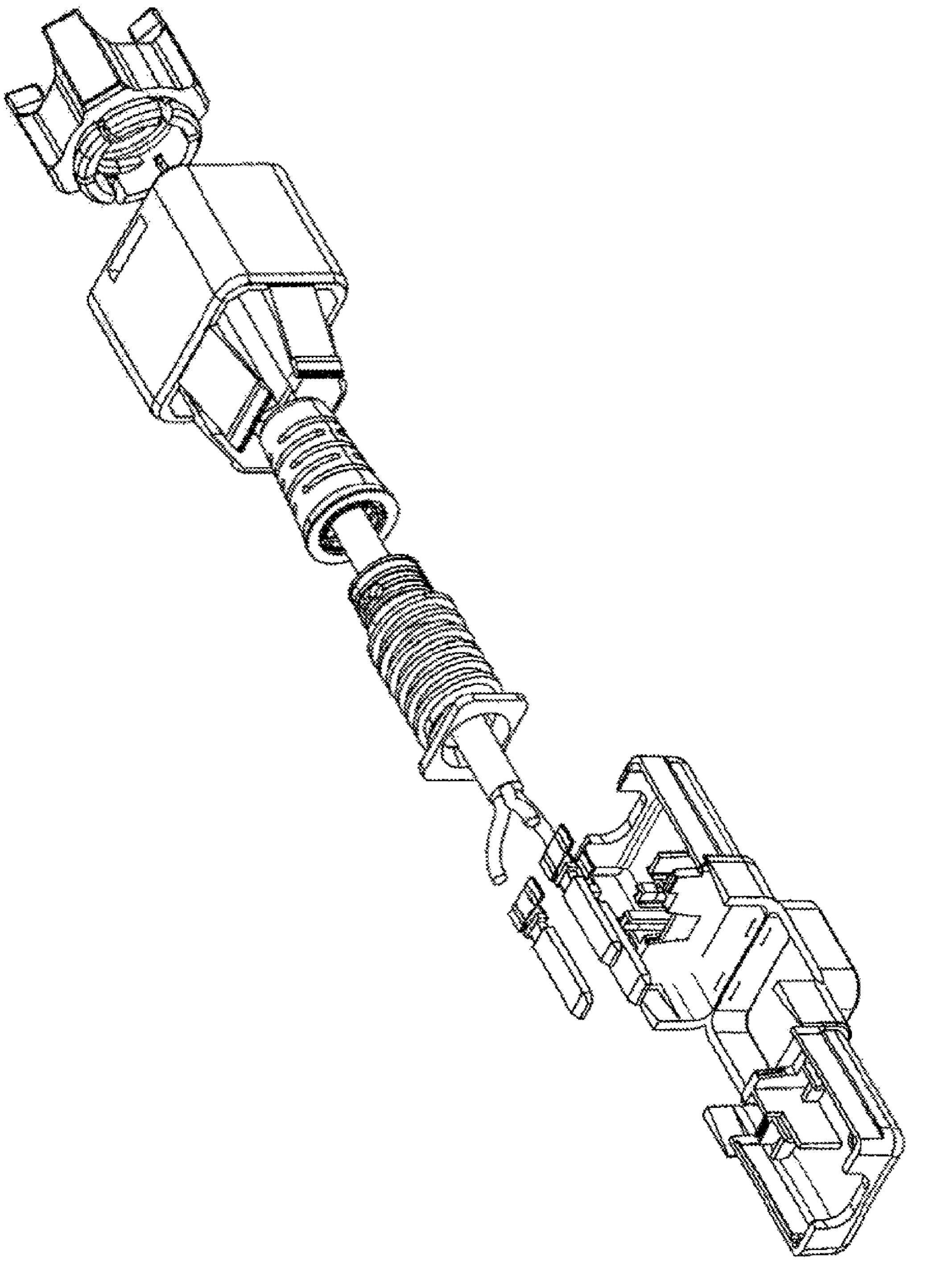

FIGS. 18-K2, 18-K2*b* & 18-K3 show several other instantiations of the invention, incorporating a different ergonomic method to actuate and release the locking function. These variations are well suited to plugs with dielectric insulating shells or barriers, such as the IEC C14, C20 and other models.

The first design, shown on FIG. 18K2 does not use a nut to move the shuttle 3580, instead the user pushes and pulls the shuttle to lock and release the plug to receptacle connection. The shuttle tab geometry can be modified to allow this to work as desired. The detail of the engagement method between the modified dielectric shell 3581 and the modified shuttle tab geometry is shown in section C-C. This section shows the plug and receptacle in the locked position in FIG. 18-K2 and in the unlocked position in FIG. 18-K2*b*. The user first pushes the plug via the shuttle, seating it in the receptacle and then continues to push the shuttle, and then will feel the shuttle retention feature 3582 seating into the matching feature on the dielectric shell. This is useful to indicate that the connection is now in the locked state. Conversely, when the connection is unlocked, the user will pull the shuttle and then feel the shuttle retention feature unseating from the matching feature on the dielectric shell as it is removed. The user can then remove the plug from the receptacle. The section E-E shows an additional detail 3583. This feature shows how a single piece dielectric shell could be attached to a rear section integrating a contact carrier that can then have an access mechanism for insertion of the contacts during construction. This method is useful to present the user with a cord that has few or no visible joining lines and therefore present the impression of solidity and reliability.

The locking tab(s) (FIG. 18K2) 3580 of the shuttle described above have been modified as shown in cross-section "C-C" of FIG. 18K2. The tabs 3584 of the shuttle 3580 now incorporate a profile 3582, which in combination with the paired feature of the modified outer barrier shell 3581, tends to increase the frictional force maintaining the connection between the plug and receptacle when more force is applied to separate them. This is because a force tending to separate the plug and receptacle will act to move the outer barrier shell rather than the shuttle tab prongs. This tends to make the locking connection more secure as more force is applied to pull it apart. The ergonomic push/pull release is a valuable feature in some applications. The ability of the locking mechanism to become more secure when a separating force is applied to the locked plug and receptacle can also be a desirable characteristic in some applications. It can optionally include provisions for programmable release as discussed earlier in this and other incorporated filings.

FIG. 18K3 show another instantiation of the invention, incorporating a different ergonomic method to actuate and release the locking function. This design, shown on FIG. 18K3 does not use a nut to move the shuttle 3590, instead the user pushs and pulls the dielectric shell 3591 via a rear extension to lock and release the plug to receptacle connection. The shuttle in this case is not the user interface. The shuttle tab geometry can be modified to allow this to work as desired. The detail of the engagement method between the modified dieclectric shell 3590 and the modified shuttle tab geometry 3592 is shown. The matching engagement features are on the shuttle 3592 and the dilectric shell 3594. The user first pushes the rear extension of the dielectric shell, inserting it and will feel the retention feature seating into the matching feature on the shuttle. This is useful to indicate that the connection is now in the locked state. Conversely, when the connection is unlocked, the user will pull the rear extension of the dielectric shell and then feel the retention feature unseating from the matching feature on the shuttle as it is removed. The user can then remove the plug from the receptacle. In other respects this instantiation functions in a manner similar to that described in FIG. 18-K2.

FIGS. 18L-X show another instantiation of the invention, incorporating an alternate tab geometry that incorporates a locking function with different characteristics. This example is of a traditional IEC-14 or IEC-20 type plug, but could be other types utilizing an outer pin dielectric barrier (FIG. 18K) 3569. In FIG. 18L the outer pin barrier is generally concentric around the pins, and will be the object of the gripping by the mating receptacle when applied.

The locking tab(s) (FIG. 18K) 3567 of the shuttle described above have been modified as shown in FIGS. 18L-O. The tabs 3609 of the shuttle 3603 now incorporate a ramped profile 3608, which in combination with the mirror ramps feature 3607 of the modified outer barrier shell 3602, tends to increase the frictional force maintaining the connection between the plug and receptacle when more force is applied to separate them. This tends to make the locking connection more secure as more force is applied to pull it apart. This can be a desirable characteristic for some applications. It can optionally include provisions for programmable release as discussed earlier in this and other incorporated filings.

To make this new tip design function properly, the locking nut (FIG. 18K) 3566 is modified so that the insertion and locking sequence of operations goes as follows. 1) The user turns the nut so that the tips are near or at maximum insertion depth. 2) The user inserts the cordcap into the matching receptacle. 3) The user turns the nut, which withdraws the prong tips, which then progressively frictionally lock via the action of the mirror ramps, securing the connection. Some notes about the implementation are as follows. 1) To make the user interface easy to use, the threads on the nut 3566 can be reversed so that the user turns the nut clockwise to secure the connection, and counter-clockwise to release it, although the tabs are withdrawn by turning the nut clockwise and inserted by turning it counter-clockwise. 2) The threading on the nut can optionally be made of a much coarser pitch requiring fewer turns in either direction to lock or unlock the plug to receptacle connection. This is desirable because it is quicker and simpler for the user to operate. In one preferred instantiation the nut would not need to turn more than one ¾ turn to secure and release the connection.

FIG. 18M shows the basic functionality of the alternate instantiation described above in more detail, as first described in FIG. 18L. The plug and receptacle are fully mated in this figure. The plug assembly components involved in the frictional locking consist of the plug barrier outer shell 3602 and the shuttle 3603. For simplicity, only the cross section of the barrier and shell are shown. The mating receptacle 3605 is also shown as a simplified cross section. The simplified cross section shows the essential components of this locking alternative instantiation.

Figure 18Y:
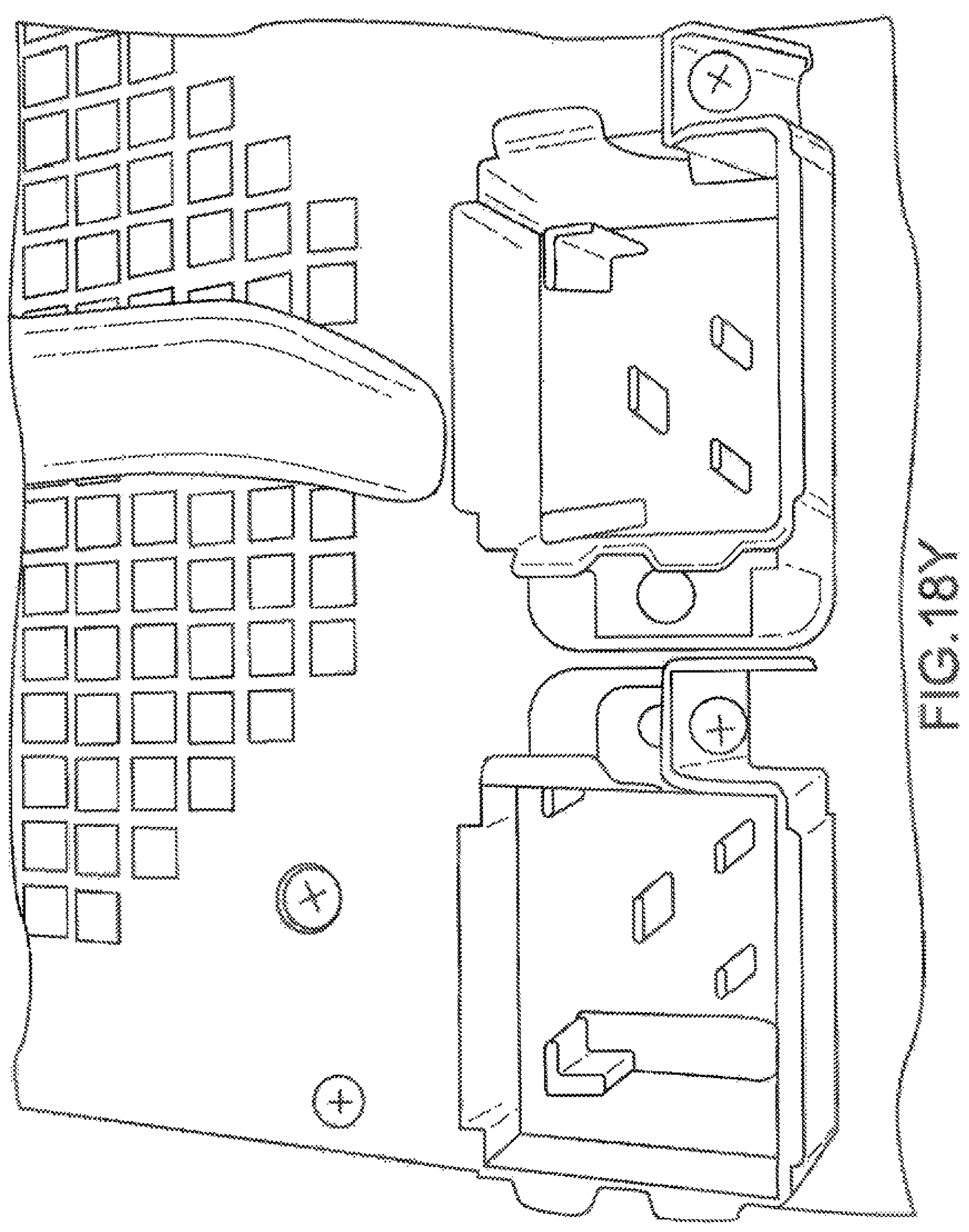
Figure 18A:
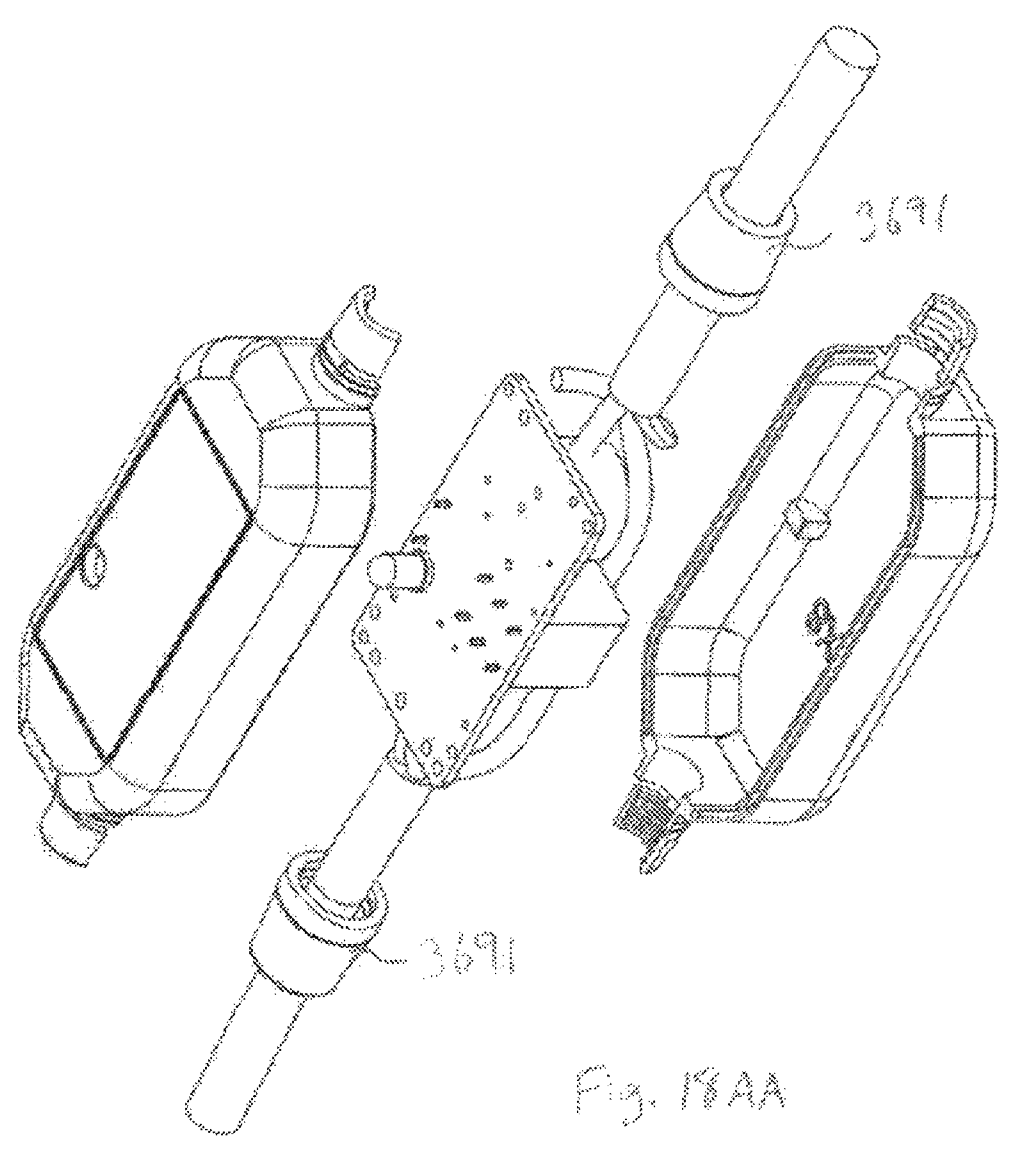
Figure 18:
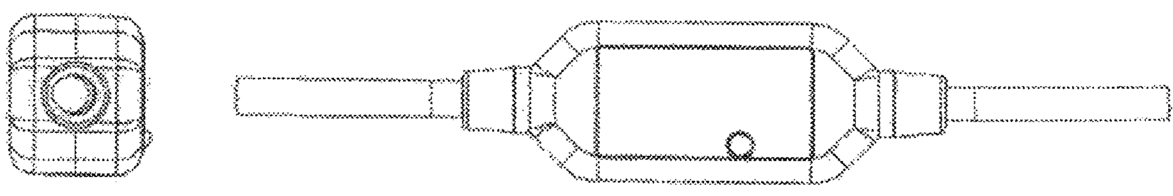
Figure 18:
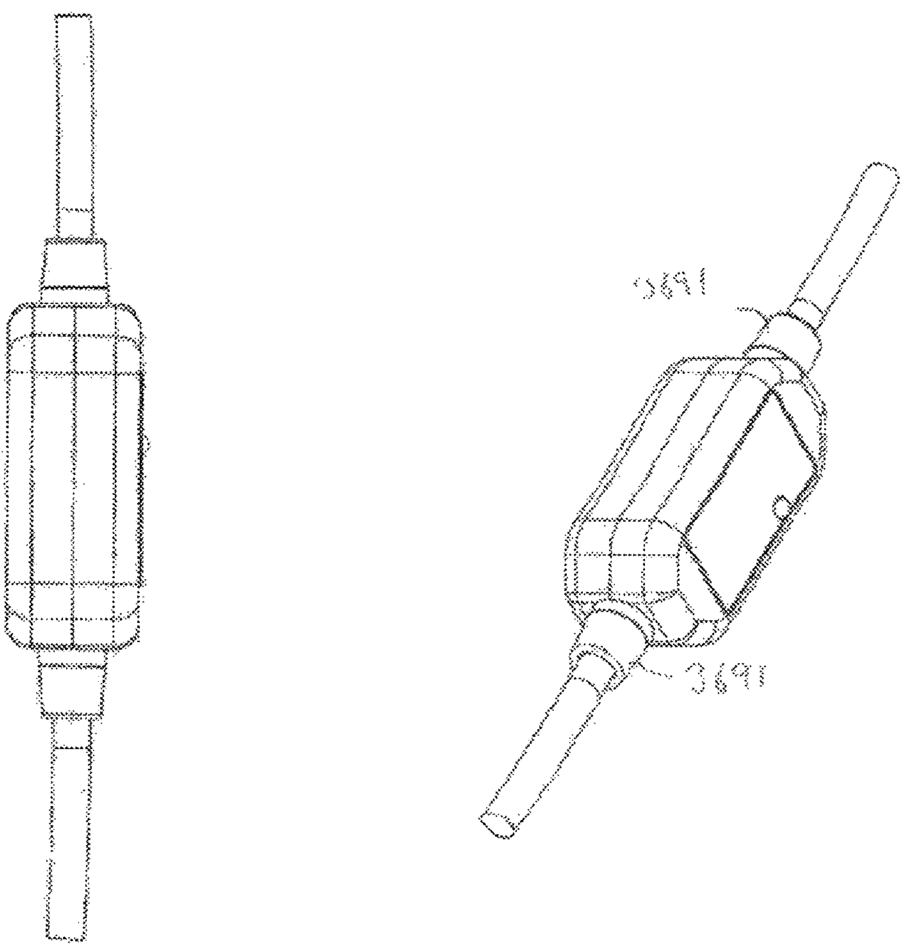
Figure 18C:
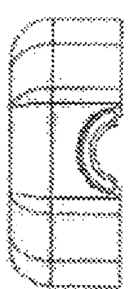
Figure 18C:
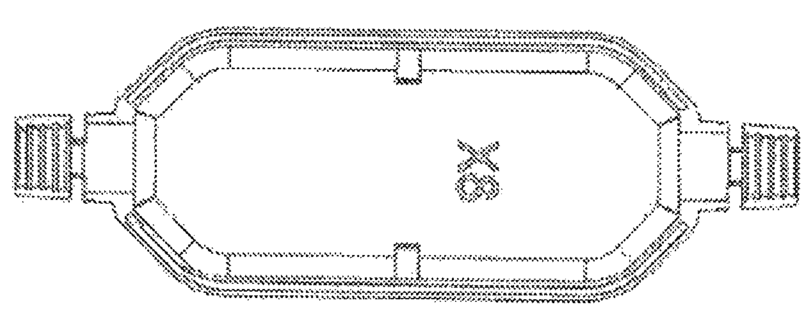
Figure 18C:
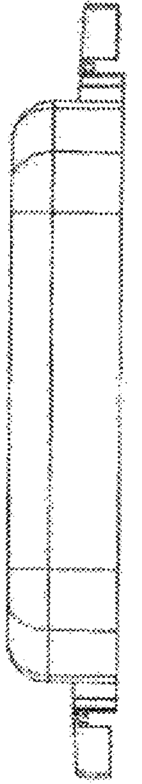
Figure 18C:
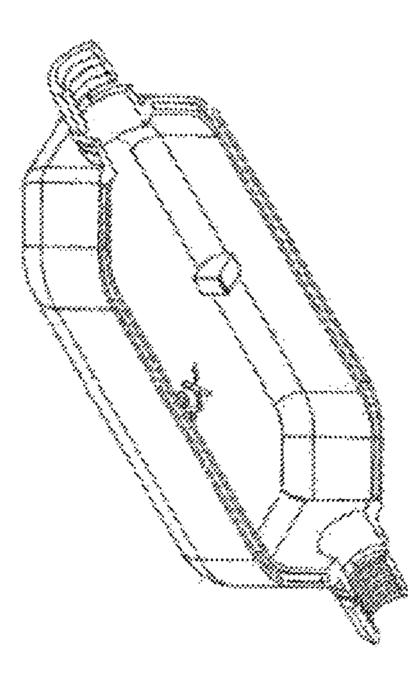
Figure 18D:
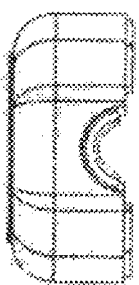
Figure 18D:
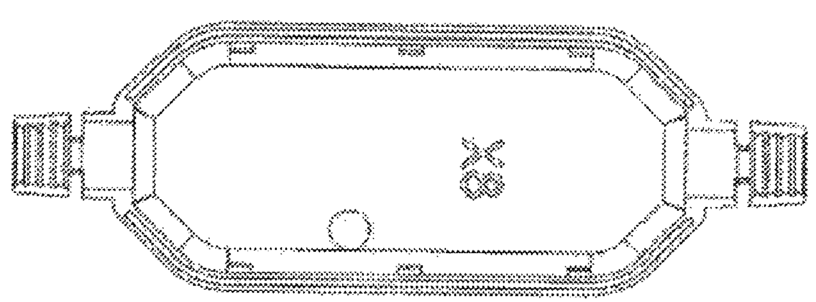
Figure 18D:
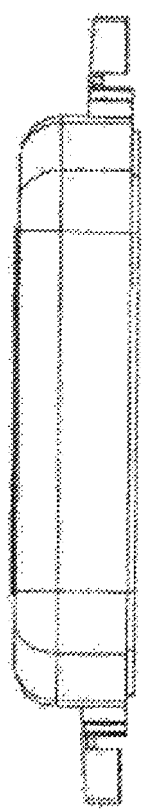
Figure 18D:
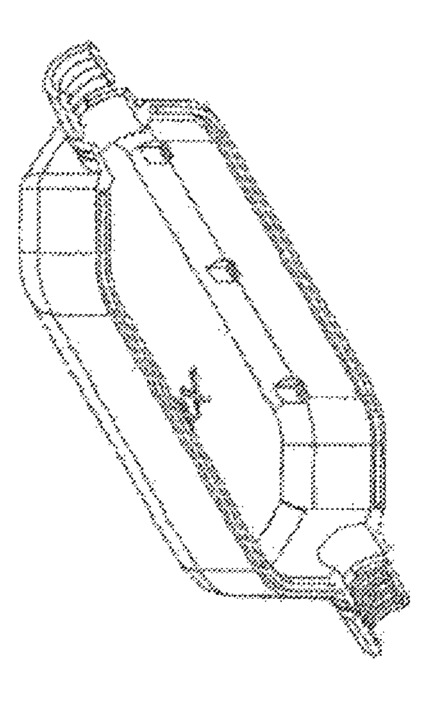
Figure 18E:
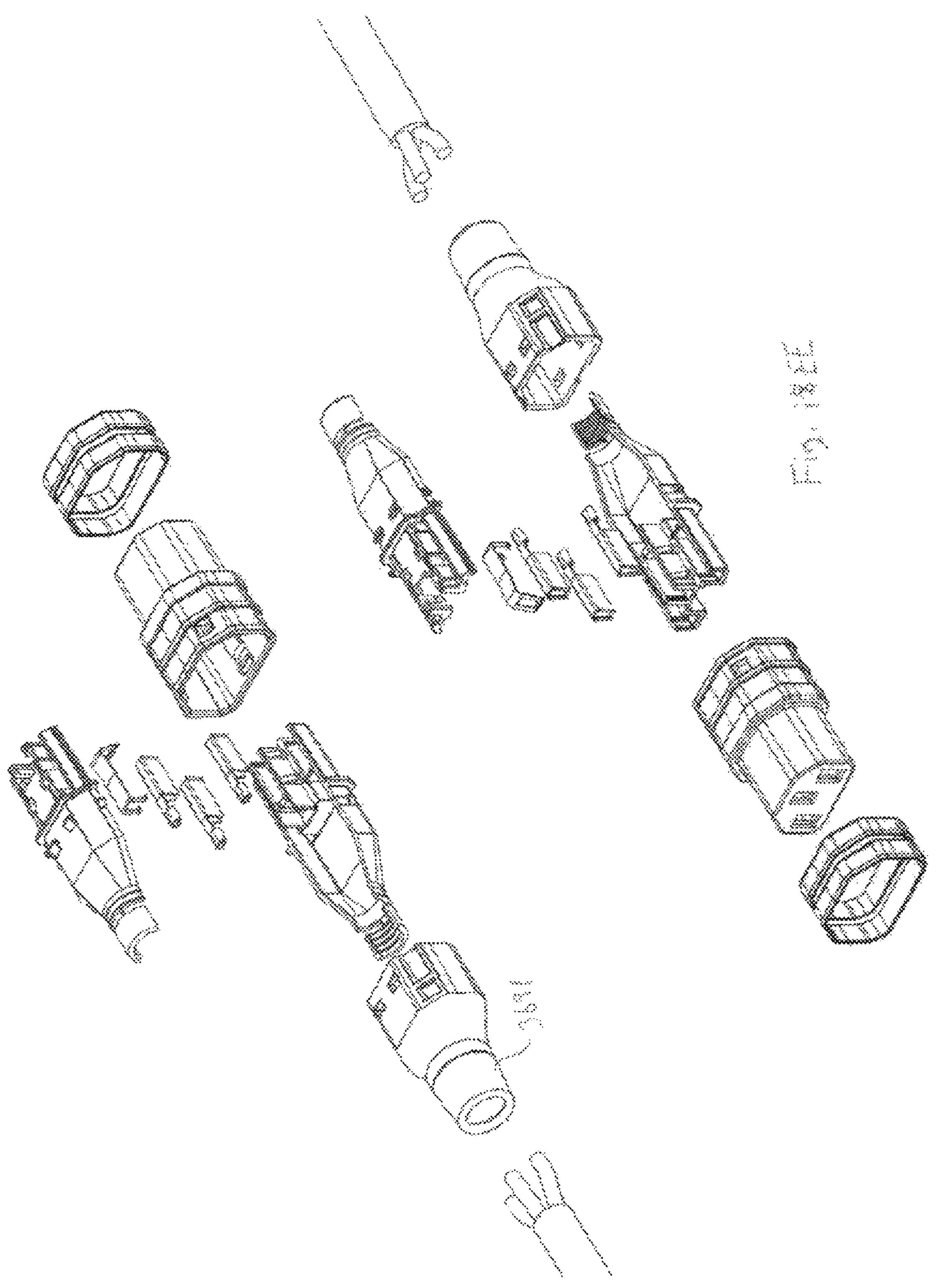
Figure 18F:
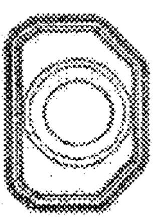
Figure 18F:
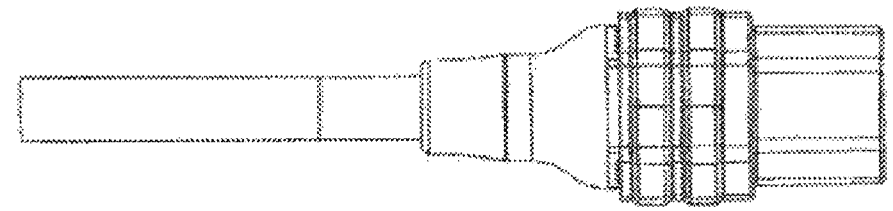
Figure 18F:
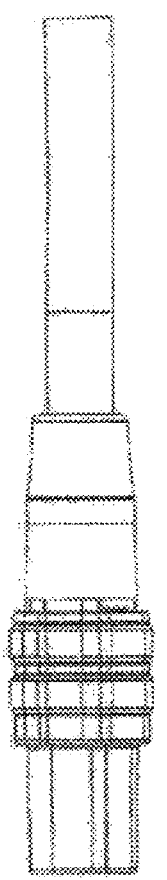
Figure 18F:
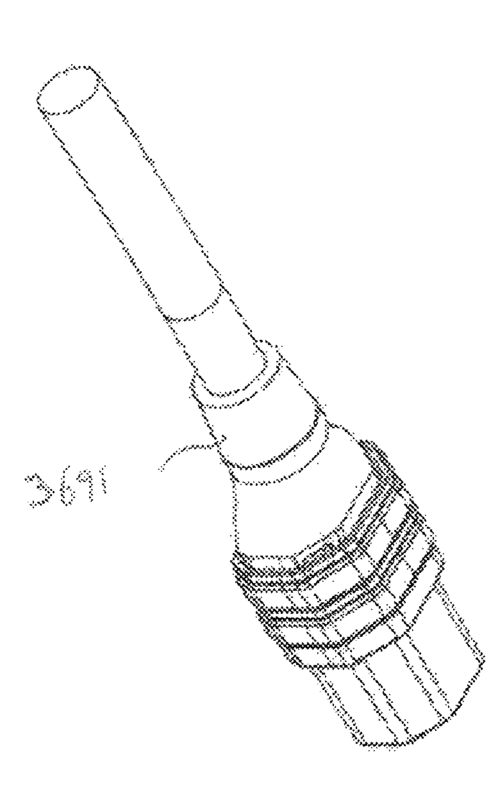
Figure 18:
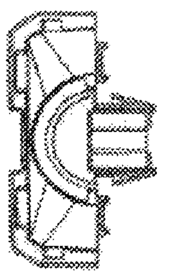
Figure 18:
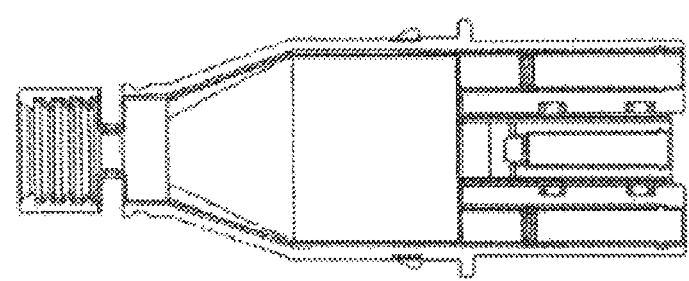
Figure 18:
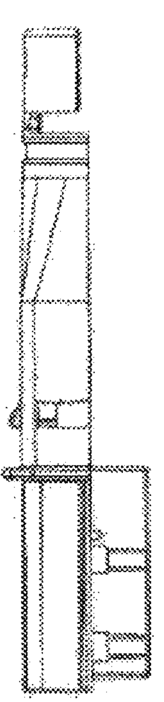
Figure 18:
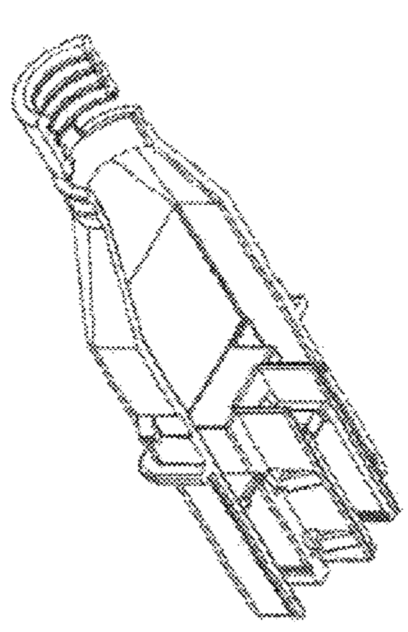
Figure 18H:
Figure 18H:
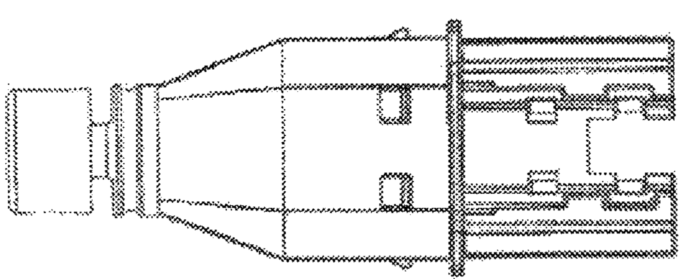
Figure 18H:
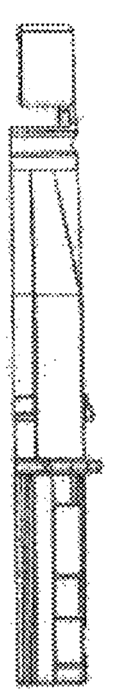
Figure 18H:
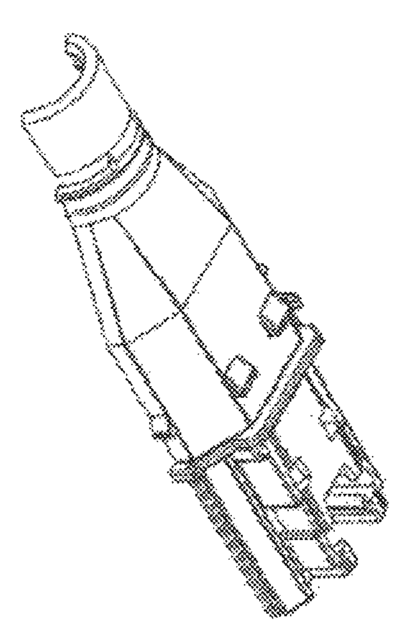
Figure 18J:
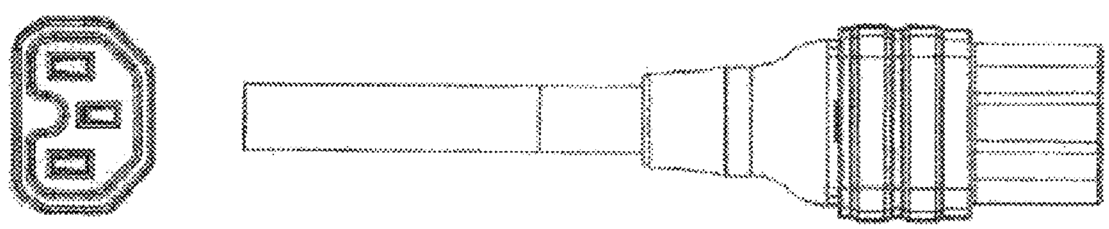
Figure 18J:
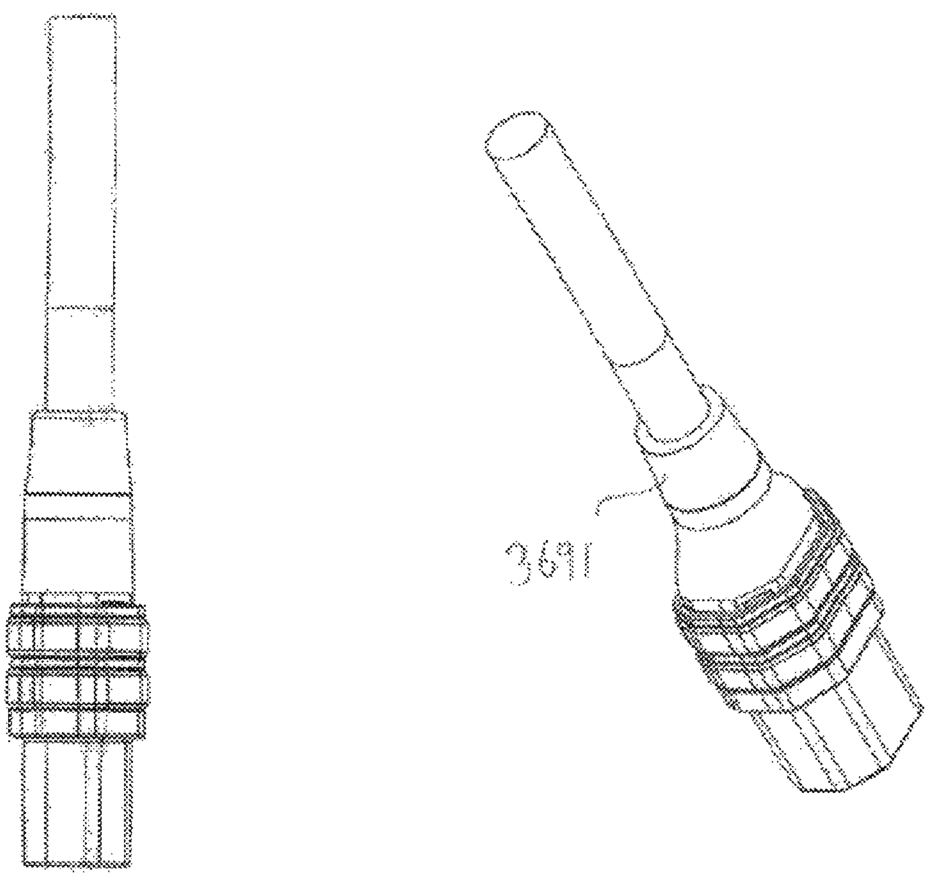
Figure 18K:
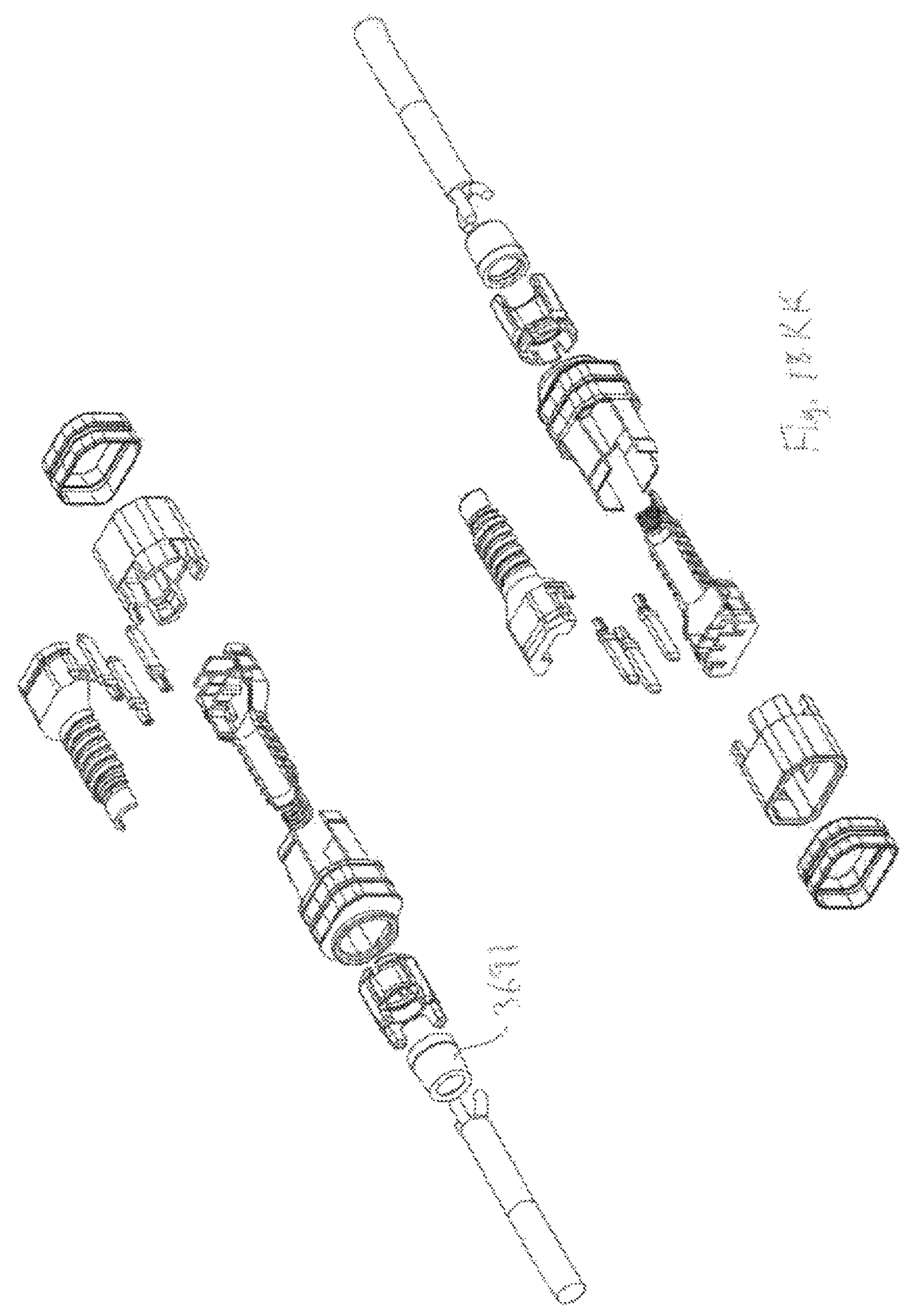
Figure 18L:
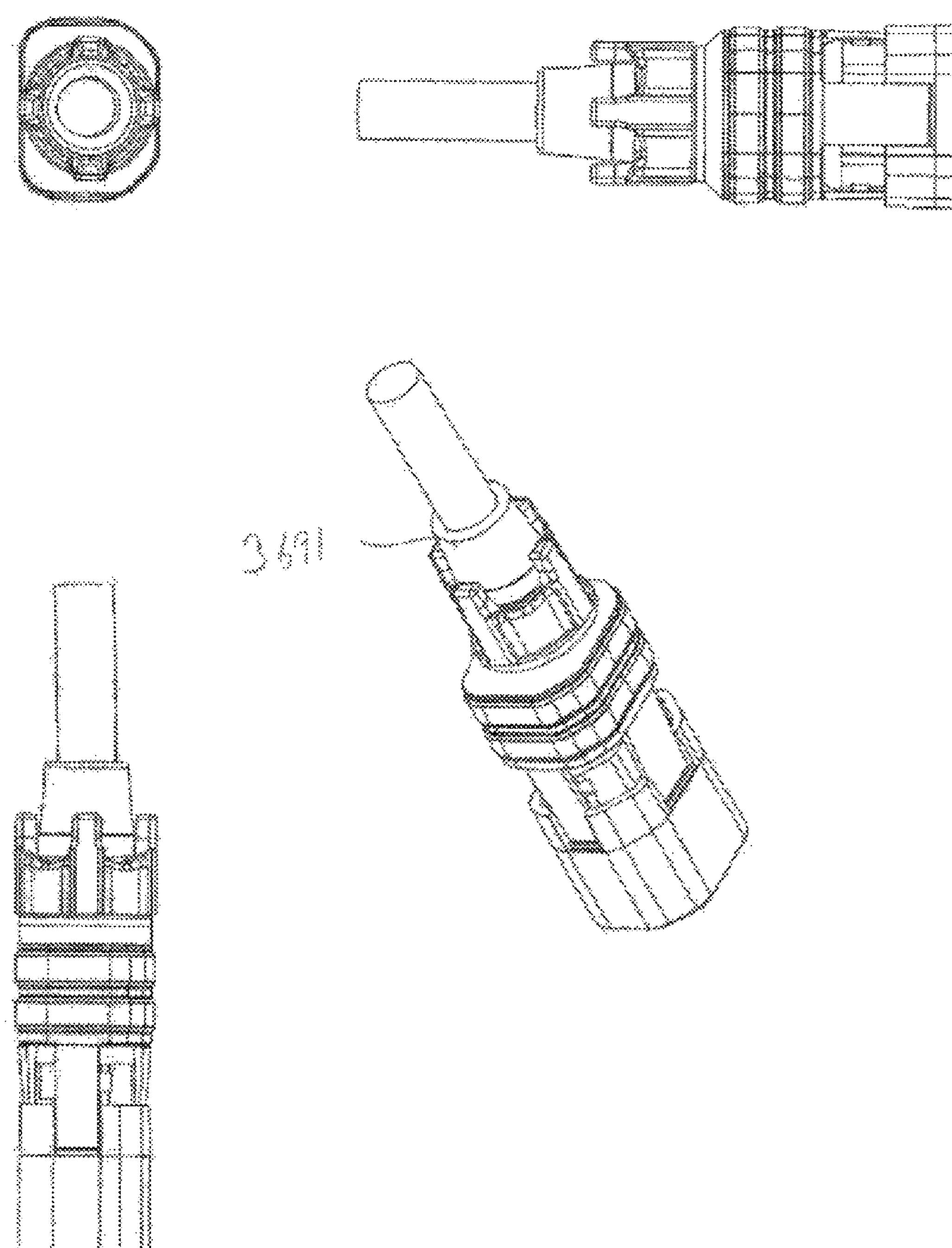
Figure 18N:
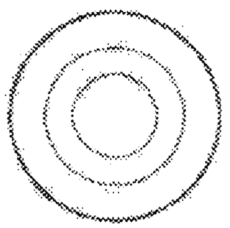
Figure 18N:
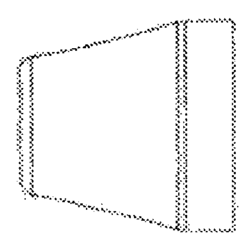
Figure 18N:
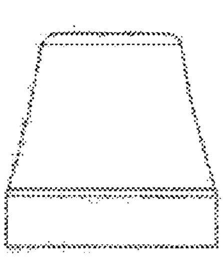
Figure 18N:
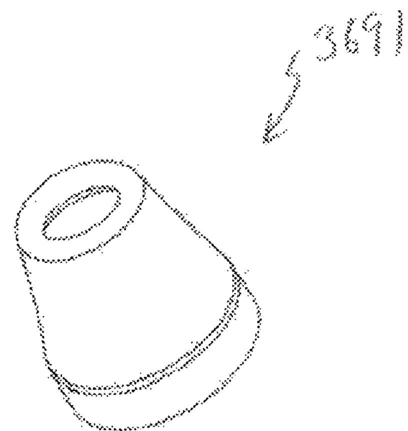
Figure 18:
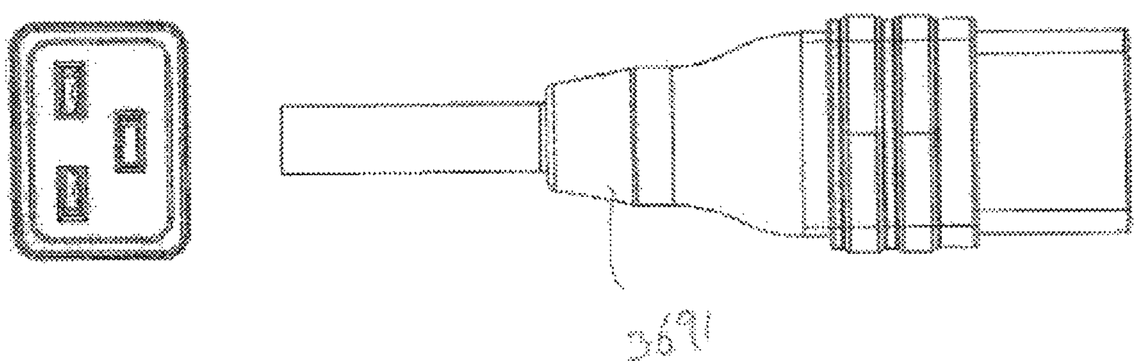
Figure 18:
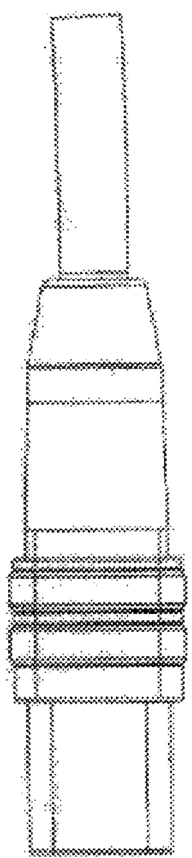
Figure 18:
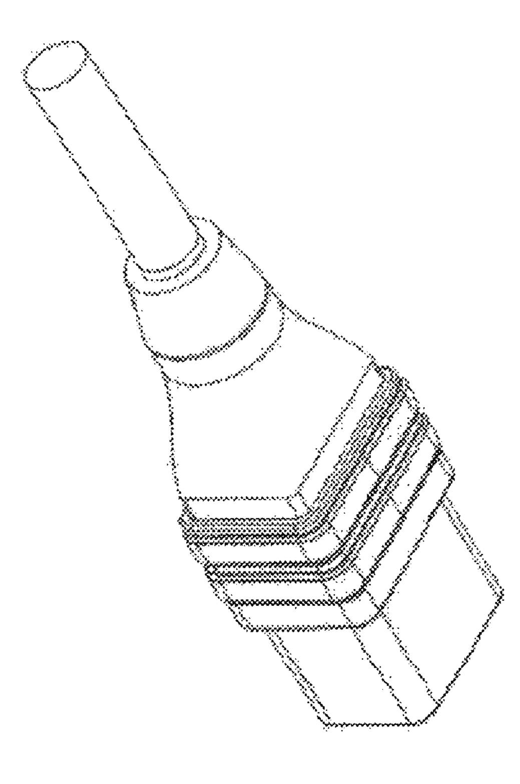

FIG. 18N shows the basic functionality of the alternate instantiation described above in more detail, as first described in FIG. 18L. In the un-locked position the mated pair 3610 has four insertion tabs, the same as many other preferred instantiations, of which three are shown in the drawing 3610, as the fourth tab is essentially hidden by the middle tab 3609 shown. The blown up section 3611, shown in the unlocked position, demonstrates the interaction of components of the assembly. The shuttle 3603 lock tip 3608 is shown with the example plastic tip having an inclined plane which is mated with a similar mirror image incline plane 3607 of the outer shell 3602. The outer shell 3602 is shown pushed towards the mating receptacle 3605, and the shuttle 3603 is also shown moved into the unlocked position, which is essentially pushed as far as possible towards the mating receptacle. Thus the ramp faces are in the minimal engagement position.

The locked position overview of the mated pair 3612 shows that the shuttle 3603 has been moved in relationship to the barrier outer shell 3602 in a manner which moves the shuttle 3603 away (to the left) from the mating receptacle 3605. At the same time the outer shell 3602 has not moved away from the mating receptacle 3605. The movement of the shuttle 3603 relative to the barrier shell 3602 is accomplished by any one of the actuation means described earlier. A threaded assembly with a manually turned nut is described above. The movement of the shuttle can also be accomplished by the use of a cam lever action, or other means suitable to draw together the shuttle 3602 and the outer shell 3503 in the indicated way as shown by the arrows in diagram section 3612.

Since the forces applied to the barrier shell and the shuttle are symmetrical but opposing, and only interactive with one-another, no forces are directly applied to the mating receptacle 3605 other than perpendicular to the axis of insertion/extraction. Thus there is little or no tendency to extract the plug from its optimally electrical connected position within the receptacle when the locking mechanism is engaged.

The blow-up section for the locked position 3613 shows detail about the relationship of the inclined planes of the tip of the shuttle 3603 and the mating inclined plane of the outer shell 3602. In the locked position the relationship of the shuttle inclined plane 3608 has moved away from the mating receptacle 3605, and the reverse tip 3606 of the shuttle 3603 has slid along the inclined plane forcing the tip 3606 to press into the inner surface of the mating receptacle 3605 core. The point of interference shown at 3606 is the result of the shuttle motion as it moves away from the mating receptacle 3605. This is important because the action to "lock" the plug into the receptacle is also tending to draw the plug and receptacle together. This helps ensure the fully engaged relationship of the plug and receptacle thus guaranteeing a good electrical and mechanical connection.

Simultaneously, as the heel of the shuttle tip inclined plane 3608 is moving away (to the left) from the mating receptacle 3605, it is sliding along the tip of the inclined plane 3607 of the outer shell 3602 and forcing interference between the tip of the outer shell inclined plane 3607 and the inner surface of the outer plastic shell of the mating receptacle 3605. Essentially the tip halves have wedged themselves in the slot in the mating receptacle. There is a tip halve (8 in total, four from the outer shell, four from the shuttle prongs) on each of the four flat surfaces of the barrier shell that engages with the four flat surfaces of the slot in the mating receptacle that receives the outer shell when engaged.

To summarize, what is shown is are alternate methods of securing (locking) two mating connectors utilizing friction only. The description of the mechanical characteristics of the receptacle demonstrate a mechanism for securing (locking) the receptacle to a standard and un-modified mating plug of the same standard.

This method of securing an electrical connection can be easily adapted to deliver various release tension ranges as necessitated by application or by regulating agencies. Minor modifications to the shape, placement and geometry of the tabs, tapered openings and thread pitch all can have various effects on the securing force and the types of force necessary to dis-connect a "locked" mating of the plug and receptacle. The simple nature of this design is robust and yet easy to manufacture. The reduced parts count, and use of all injection-moldable materials reduces manufacturing cost.

The great majority of conventional power cords now made use a construction technique known as Poly-Vinyl-Chloride (PVC) overmolding as their construction method of choice. This is a well developed construction technique where no or a few precision molded and metallic components and assemblies, such as contact carriers, wire, etc. are overmolded with PVC plastic material in an injection molding machine, to give them their final form and dimensions and insure that they are mechanically connected into one assembly and robust. The PVC overmolding is commonly used to form such elements as the outer covering and strain relief in many cordcaps. The overmolding may or may not cover some or all of the precision molded parts which are typically made of other plastics such as nylon that are suitable for the intended application. The precision molded parts may further be designed to be joined by gluing, hypersonic welding or other techniques that are commonly used to join parts of such materials. This joining may be done typically before, but sometimes after the PVC overmolding operation is performed.

The PVC overmolding construction became dominant in the late 1960's to early 1970's in power cord construction techniques. It is more labor intensive and requires larger investment in and expertise using injection molding machines. Appropriate tooling of injection molding molds is a requirement for this construction technique, which is both an expense and a long-lead time item bringing new designs to market. The economics of this technology were such that by the early 2000's almost all manufacturing of this type of cord had moved to Asian manufacturers in Taiwan and China. It is also true that this manufacturing method is best suited to large manufacturing runs per SKU, because the setup time needed for each run of a different SKU can add cost. This resulted in longer lead times for product deliveries because ocean shipment is the rational cost choice for such products as power cords that weigh more and can be bulky. This creates a longer than optimal supply chain for value-added unique power cord designs such as the Zonit zLock™, which are wanted for data center and other mission critical applications by clients that think, "It is just a power cord", and do not realize the complexity and constraints of the supply chain for these unique products. Also, these specialty designs such as zLock are typically made in much lower numbers per manufacturing run, which adds both time and cost. Further, the long-term competition for global resources and the resulting trade wars have made the choice of where to manufacture more and more important. Reducing lead-times for zLock and minimizing the time and cost needed to change SKU models on the production line both result in more sales and better margins.

Changing the construction technique of a zLock power cord to consist of all or mostly high-precision metal and plastic components that can be snapped or pressed together to form the final assembly has significant advantages.

1) The manufacture of the components can be fully separated from the final assembly process. Furthermore, the manufacturing of the components can easily be moved from one plastic injection manufacturer to another, just move the molds, which are typically owned by the end customer. This insures that no single point of failure exists in this step of the manufacturing process.
2) The resources required to do final assembly are quite simple, just manpower and very simple assembly machinery, such as jigs and mechanical presses (if needed) that can be hand or power operated. These are widely available.
3) The setup costs for doing different models of power cords are minimal, since the main setup cost will be to switch a roll of wire and maybe a reel of contacts on an automatic striper/crimper machine, which is quickly done. Also, that machine is not a large investment and many wire harness shops have them. The final assembly task of assembling the components and connnecting them together to form a power cord is almost a constant cost per cord and can be automated for further economic benefit.
4) The location of final assembly can be placed where it is needed for best transport logistics, low labor cost and tax/regulation/tarriff benefits. This method also insures that no single point of failure exists in this step of the manufacturing process. If one contract manufacturer can not meet required deadlines, cost points or quality requirements, moving the final manufacturing program to another that can is very simple. This incents more competitive bidding by contract manufacturers to win the contract and more attention to detail when running the program to keep it.

The zLock instantiations using these new construction techniques we will discuss below, can use a variety of design techniques. We will discuss a few of the more obvious; many of these are discussed in other zLock patent filings incorporated herein with different construction methods.

1. Part joining methods that are or can be used in these designs.

Note that one or methods can be combined as needed.

a. Barbed post and matching aperture
b. Mushroom plastic post riveting
c. Gluing with alignment posts and holes
d. Gluing of part edges with or without alignment grooves
e. Ultra-sonic welding
f. Other suitable methods 2. Parts that could use these methods in this set of designs a. Inner shell contact carrier joining of halves
b. Optional separate contact carrier
c. Concentric ring or sleeve over back of inner shell
d. Other parts or assemblies in this filing.

3. Strain relief options, inner shell and any other required components are modified to match the method chosen.

See FIGS. 18Q-T.

a. Labyrinth path w/ or without additional bushing for power cord
b. Contact/prong crimp with flange or other to prevent pull-through
c. Grip ring on power cord preventing pull-through
d. Gluing power cord to strain relief
e. Concentric ring or sleeve to securely clamp inner shell halves together. This goes over the inner shell halves.
f. Concentric barbs.
g. Optional strain relief cord radius control sleeve, an additional element that can be placed on the cord and clamped by the back half of the inner shell where the cord exits. It could be made of a different, possibly more flexible material than the inner shell halves if desired. This can be done in a variety of ways, one simple way would be to have a flange on the cord radius control sleeve that is captured by a matching groove in the interior of the inner shell halves. Another method would be to have a rib on the interior of the cord radius sleeve that is captured by a matching groove on the outside of the rear of the inner shell halves.

4. Inner shell construction—One inner shell shown is designed as one piece that folds over and is therefore self aligning when joined. It joins together using barbed posts and matching apertures. It can also be designed as one folding piece or two separate pieces that are joined by any of the joining methods listed above. The choice of one or more of these methods to use is driven by cost and manufacturer capability and machinery. The design shown integrates the contact carrier, but that could be done as a separate part that is held by the inner shell if needed for construction and/or safety compliance reasons. The inner shell can incorporate the strain relief function entirely or do it in combination with an outer concentric ring or sleeve which has certain advantages described below. It can also incorporate an optional strain relief radius control sleeve as described above.

5. Shuttle and Nut construction—The shuttle and nut are each designed to be a single piece if possible, ideally formed in a single action mold. That is a preferred instantiation, others are possible.

6. Outer Shell construction—The outer shell is designed to be a single piece if possible, ideally formed in a single action mold. That is a preferred instantiation, others are possible, such as two pieces, etc.

Figure 18Q:
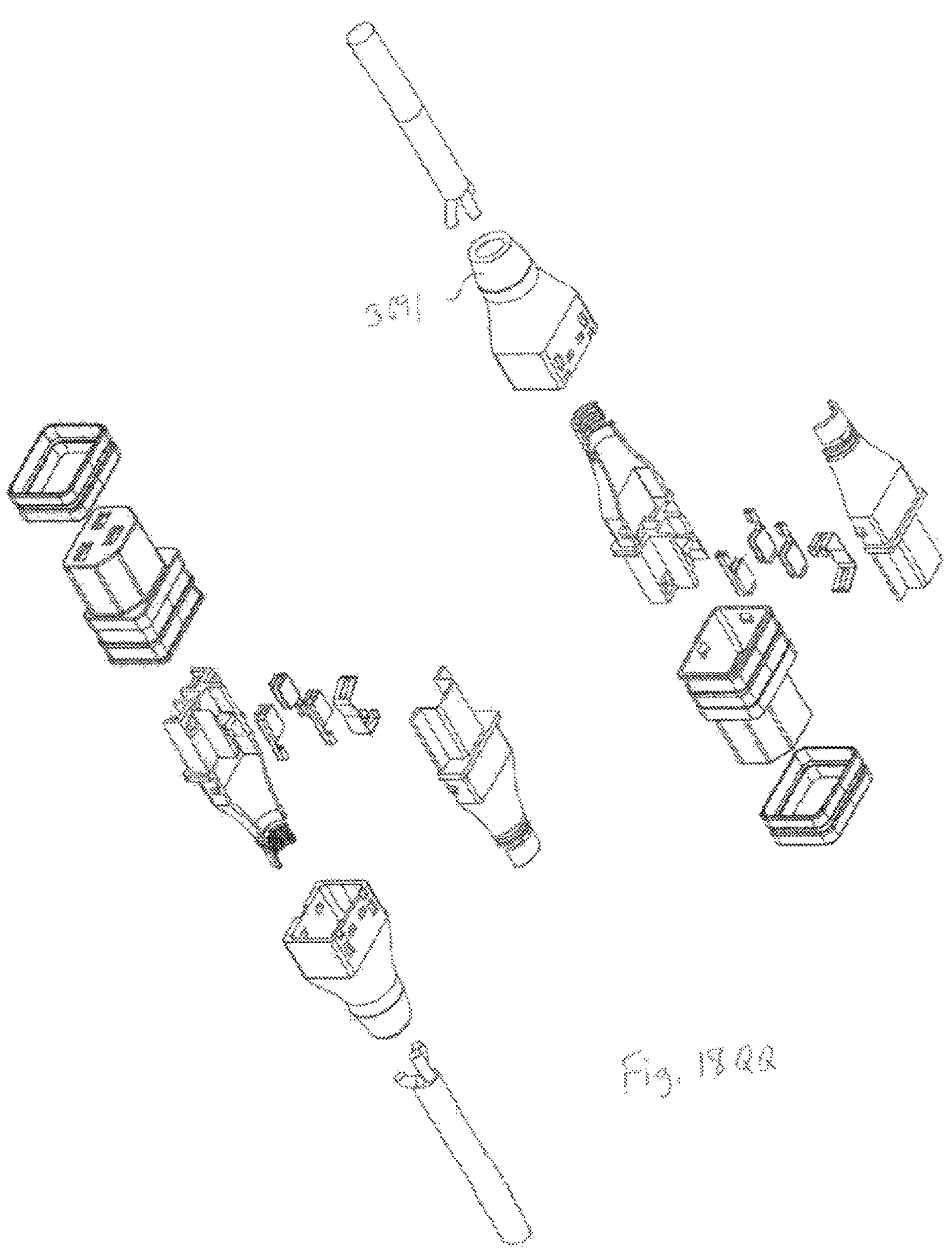

7. Strain relief construction—There are several methods that can be used to create a suitable strain relief. It can be done entirely by the inner shell or by a combination of the inner shell and a concentric outer ring or sleeve. The method chosen in one of the zLock instantiations discussed below, FIGS. 18P-T show a variety of possible methods. FIG. 18Q shows how to use the ground contact extension to transfer the force tending to pull the plug and matching receptacle apart to the power cord. That force transfers from the spring retainer (See FIG. 18U) to the flange on the ground contact carrier and hence to the power cord via a crimp of the extended ground contact to the power cord. The crimp has a flange that prevents it from pulling through the inner shell assembly when it is joined and closed as is shown in FIG. 18Q and FIG. 18Q. The advantage of this method is that the strong and potentially brittle material of the retainer spring is not required to be crimped onto the power cord (which is a possible design variant, using suitable materials) the crimp is done using the more malleable metal of the contact.

Figure 18R:
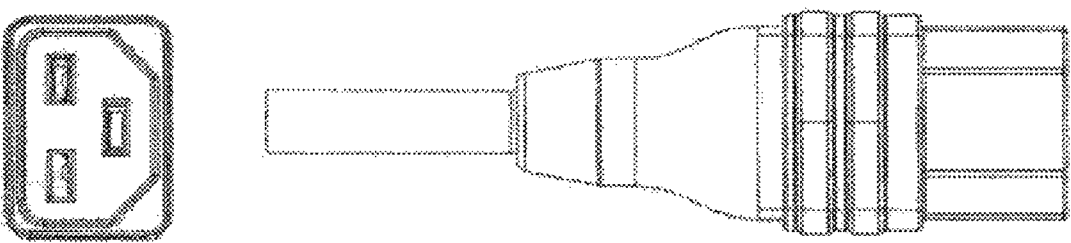
Figure 18R:
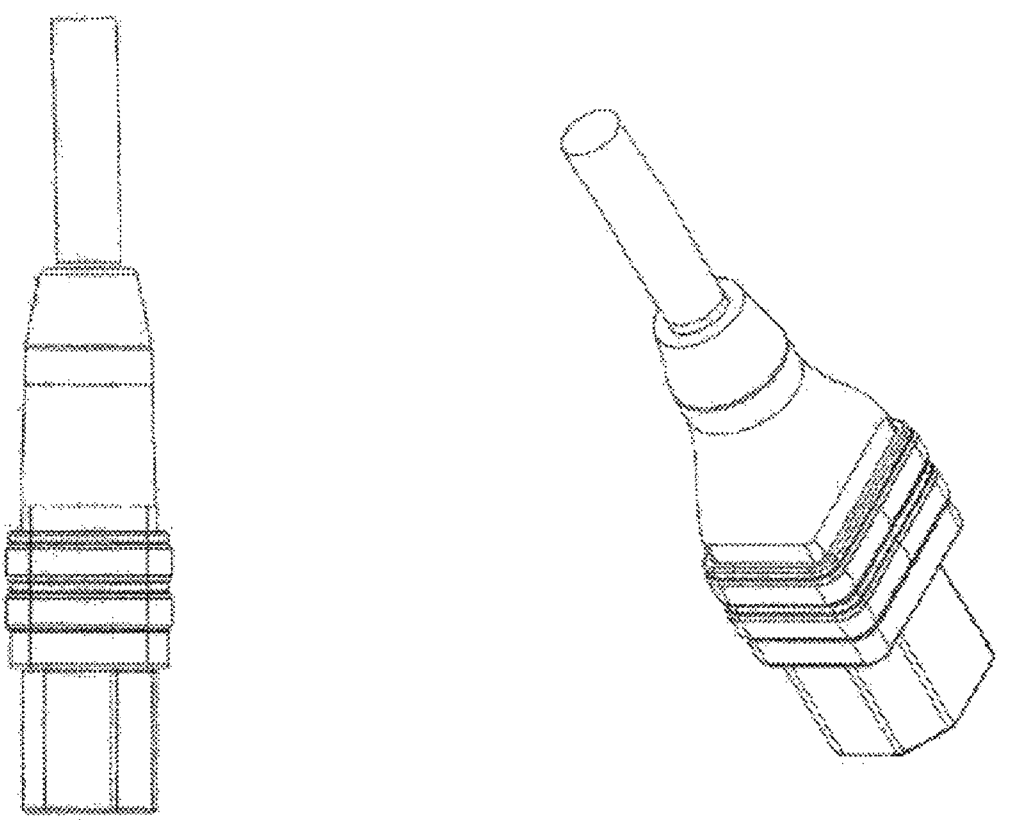
Figure 18:
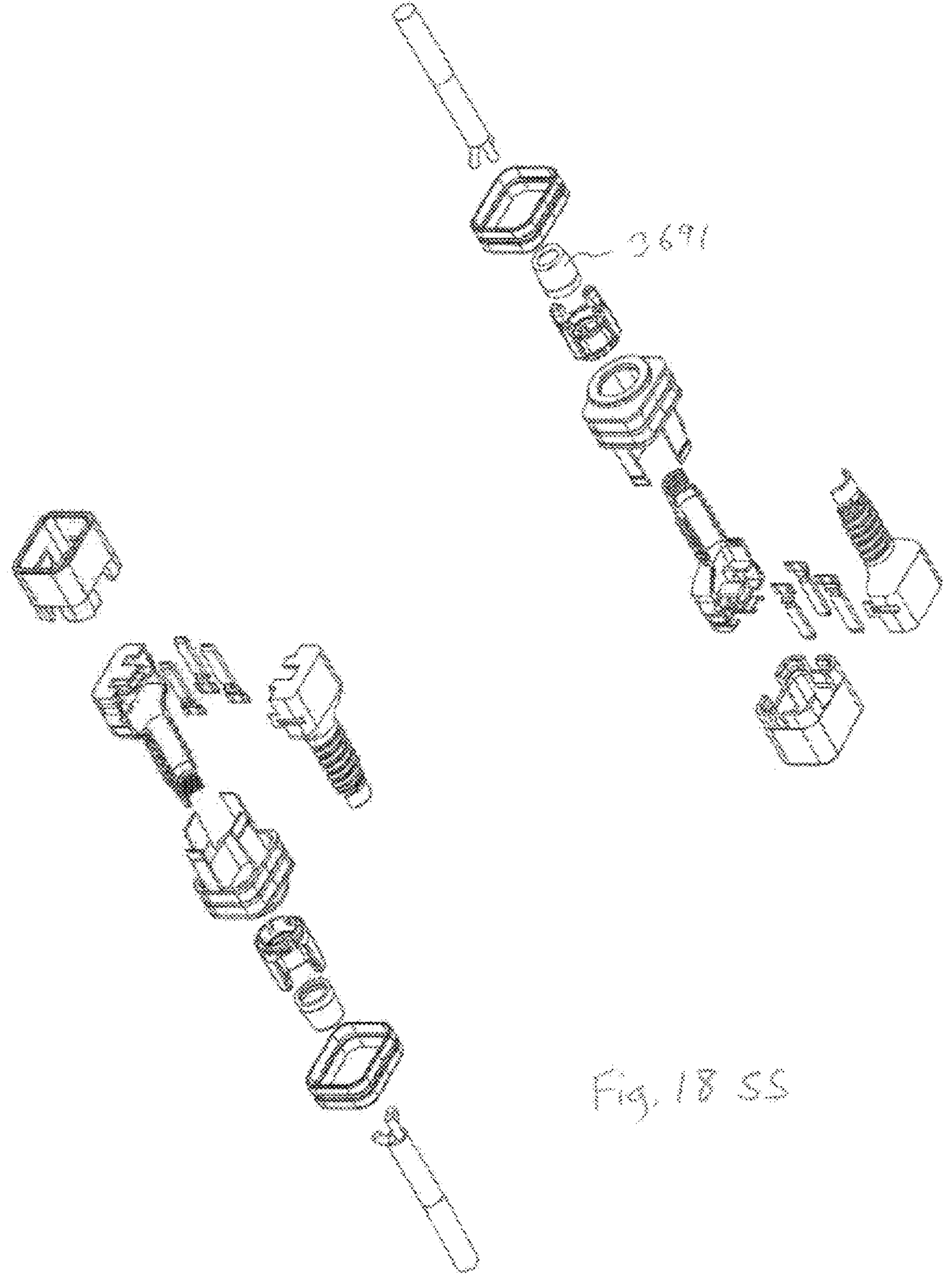
Figure 18T:
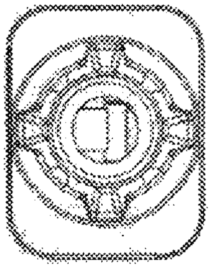
Figure 18T:
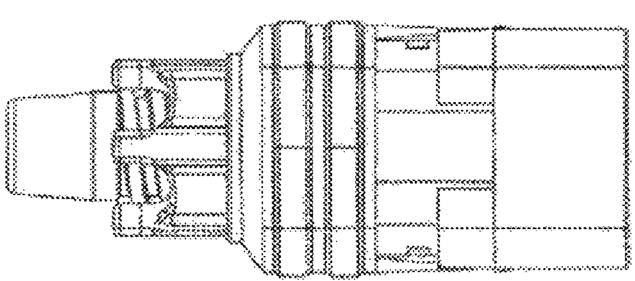
Figure 18T:
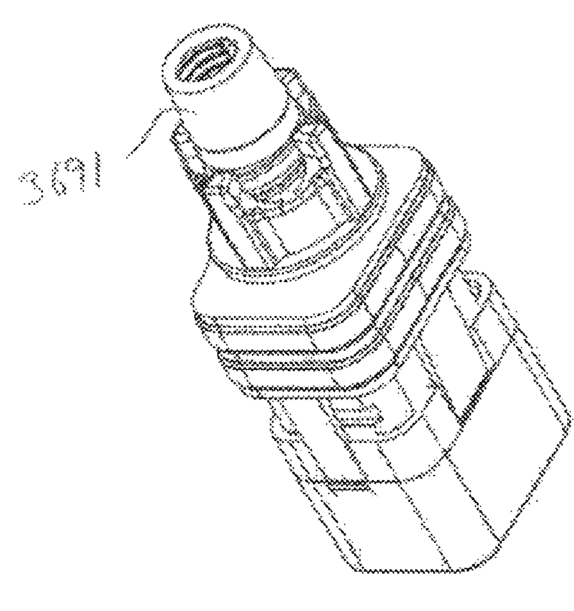
Figure 18T:
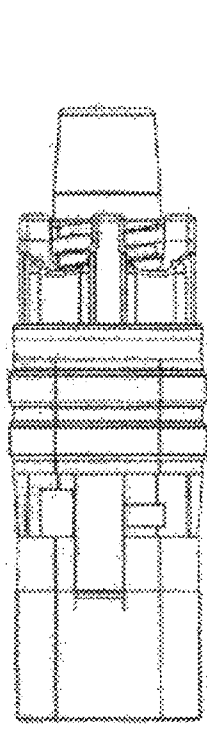

Another strain relief method that can be used is to insert a labyrinthine or serpentine path feature in the back side of the inner shell assembly that grips the cord when closed. This is shown in FIG. 18R.

Another strain relief method that can be used is to insert a concentric barbs feature in the back side of the inner shell assembly that grips the cord when closed. This is shown in FIG. 18S.

The functioning of the labyrinth path strain relief can be improved by making the back side of the inner shell assembly a suitable shape, such as a cylinder or a slightly tapered cone and using a concentric ring of metal or a plastic sleeve with concentric retention rings or grooves that are matched by matching concentric grooves or rings on the outer face of the inner shell assembly. The outer ring or sleeve is pressed over the assembled halves of the inner shell and insures that excellent compression of the power cord is achieved by the labyrinthine path in the interior of the inner shell halves.

The concentric compression component can also be modified to be a short sleeve (often shaped like a suitably-shaped truncated cone) that is the outer surface of the assembly viewed from the rear of the cordcap where the power cord enters. It can be provided with a hole that closely matches the size of the power cord diameter and is what the end user views when looking at the exit of the power cord from the cordcap. In this case, one possible variant is to make the concentric ring in the form of a longer sleeve, and then press it onto the tapered walls of the inner shell assembly where the matching retaining rings and grooves on both parts will insure that they stay firmly joined. The tapered sleeve can also be attached via barbed posts and a matching aperture, gluing or ultrasonic welding or any of the joining methods described earlier. Some of these described variants are shown in FIG. 18P. A strain relief radius control sleeve can be integrated into the concentric sleeve, it could be inserted through the large end of the sleeve, and then held in place by a retaining flange and a matching groove on the inner surface of the sleeve. Alternatively, it could be held by the inner shell halves as described above. This technique can also be used to provide threads for a nut to be used in a type of locking male plug, examples of which are shown in FIGS. 18W and 18X. In that case, the material used could be selected to be optimal for use as threads. The advantage of this design variant is that it shows few if any joining lines at all, because the joint between the concentric ring sleeve and the inner shell assembly is covered by the outer shell overhang in the female variants (for example IEC C13/15/19 and covered by the nut in some male locking models (for example IEC C14/20). This is desirable to form an impression of solidity and reliability in the mind of the end user.

In yet another aspect of the invention, a novel strain relief that can be used in many applications is shown in FIGS. 18AA-NN. In this instantiation of the invention, the concentric compression component 3691 can be made in a range of sizes to accommodate a range of power cord diameters and still function effectively as a strain relief mechanism. The advantage of this design is that the concentric compression component 3691 is a simple and cheap part to make and no other changes are required to the other elements of the assembly. Example instantiations of cord caps, according to various international standards (e.g., C13, C14, C15, etc.), employing strain relief extensions captured by a compression component 3691 are shown in FIGS. 18EE-18NN. An example of an in-line surge suppression circuit employing strain relief extensions captured by a compression component 3691 is shown in FIGS. 18AA-18DD. Various embodiments and details of the surge suppression circuit are described in the surge suppression case which is incorporated herein by reference.

FIGS. 18U-X illustrate several possible instantiations of the invention. These instantiations can function like any of the other described instantiations of the invention, and use any of their described features, but their method of construction is different, which allows the previously described advantages to be realized.

FIGS. 18U-X show examples of several embodiments of examples of zLock designs that can use these construction techniques. The designs shown are for locking IEC C13/15/19 and C14/20 cordcaps, but the methods described can be used for other cordcap designs and standards both locking and non-locking.

We will describe the details of an IEC 13/15 assembly (the C13 and C15 assemblies are the same except for the indent in the outer C15 shell, as shown in FIG. 18U) using the new construction method for illustrative purposes, see FIG. 18U. The C19 assembly, FIG. 18V shares the new construction method and functions in essentially the same manner, with the contacts and retention spring turned 90 degrees. The assembly consists of the following elements: the power cord 3800, which inserts into the inner housing 3900. The electrical contacts 3810, 3830, which are crimped onto the appropriately stripped inner wires 3801 of the power cord. The contact carrier slots 3920 are integrated into the inner housing 3900. The inner housing also incorporates a strain relief function, in this example it is done via a stop 3930 that prevents the ground contact crimp 3830 on the power cord pulling through the aperture formed when the two halves of the inner shell 3900 are closed. A flange or other feature (see FIG. 18Q) may be included as part of the ground contact crimp, to help prevent pulling through the aperture of the closed inner shell halves. An optional external strain relief cord radius control sleeve (not shown) that slips over the power cord and is captured via a lip or other suitable method when the two halves of the inner housing are joined could also be used if needed for UL or other regulatory body compliance. A spring retainer 3840 that grasps an electrical contact, in this case the ground prong of the matching cordcap, and transfers a force that would tend to pull the plug and receptacle apart, to the ground contact 3830 via a flange 3831 on the ground contact and hence to the crimp 3832 of the ground contact on the power cord 3800. An outer shell 3950 is pressed onto the closed halves of the inner shell assembly and is retained by one or more formed pegs 3901 on the side(s) of the inner shell assembly that match to the one or more formed apertures 3951 in the outer shell. One or more elastomeric rings 3960 which fit into the one or more grooves 3952 on the back half of the outer shell and provide both an aid to gripping the outer shell and a color identification method which can be useful for data center operators to use in marking certain properties of a power cord connection such as what power source, or phase or priority or other characteristic that is important to the data center operator. This design releases from the locked position by pulling back on the outer shell as has been described in previous filings that are incorporated into this filing. We will now describe the details of one possible instantiation of an IEC C14 assembly using the new construction method for illustrative purposes, see FIG. 18W. The C20 assembly, FIG. 18 X shares the new construction method and functions in essentially the same manner, with the contacts turned 90 degrees. The assembly consists of the following elements: the power cord 4100, which inserts into the inner shell 4200 which incorporates the dielectric shield that goes around the electrical prongs. The inner shell encloses, locates and supports the electrical prongs 4102. The electrical prongs 4102, are crimped onto the appropriately stripped inner wires 4101 of the power cord. The electrical prong carrier 4203 is integrated into the inner shell housing. The shuttle 4210 has one or more prongs 4211 with shaped tips 4212 that insert through slots 4250 in the inner shell housing 4200. The shuttle is moved back and forth via the nut 4215, which has one or more flanges 4216 that is captured by a one or more slots 4217 in the shuttle, which keep the shuttle and nut attached and make them move together when the nut is turned.

In this example strain relief is done via a stop that prevents the ground prong crimp on the power cord pulling through the support feature formed when the two halves of the inner shell are closed. The other strain relief methods described earlier could also be used.

The inner shell can incorporate a combination nut thread and strain relief function or it can be a separate piece 4110, as shown. In that design option it can be formed by a threaded sleeve that is connected to the inner shell 4200. It could be connected by being pushed over a rear extension of the inner shell housing and retained by concentric retention rings or grooves that are matched by matching concentric grooves or rings on the outer face of the inner shell assembly. It can also be retained by having a retention groove in the inner shell that captures a flange on the concentric sleeve or by any other of the other joining methods detailed earlier. It can incorporate a retaining pin or other feature to insure that it does not rotate once pressed on. The sleeve also can be manufactured with no joining line, so it can provide a smooth nut turn function.

The prongs 4211 on the shuttle 4210 are moved and wedge between the walls of the mating receptacle and the dielectric shell securing the connection between the plug and receptacle. This can be done in several ways as described earlier. The assembly of the inner shell, outer shell and shuttle with nut acts to transfer a force that would tend to pull the plug and receptacle apart, to the power cord 4100 via the crimped ground prong or any other strain relief feature used to secure the power cord in the inner shell assembly. The shuttle 4210 shown in is fitted onto the inner shell assembly and is retained by the nut behind it as described earlier. One or more elastomeric rings can be provided which go into the one or more grooves 4218 on the back half of the shuttle to provide both an aid to gripping the shuttle and a color identification method which can be useful for data center operators to use in marking certain properties of a power cord connection such as what power source, or phase or priority or other characteristic that is important to the data center operator. This design releases from the locked position by turning the nut to release the locked connection, as has been described herein and in previous filings that are incorporated into this filing.

A new feature that we have created for a specific equipment issue is now described. Several models of power cord receptacle have appeared on the market with shrouds that prevent the end user from easily removing a locking power cord.

See FIG. 18Y for a photograph of an example.

A simple solution is to provide a way to extend the outer housing via a tool that allows the user to draw back the outer shell, releasing the locking plug. The tool can be designed to be used in the following ways.

1. Inserted, used and then removed. In this case a simple sheet metal tool as shown in FIG. 18Z will work. It is pushed into the receptacle shroud, where it will catch the dividing rib on the outer shell where the two elastomeric rings sit, allowing the user to pull back the outer shell and remove the plug.

2. Inserted, used and left attached. In this case the inner and outer shells of the plug are slightly modified. One or more channels are molded into the outer surface of the inner shell. An indent is molded into one or more surfaces of the outer shell with the wall nearest the rear perpendicular and the front wall angled at 45 degrees. The recess is aligned to the channels of the inner shell. The tool has one or more prongs with hooks on their tips that are inserted into the channels of the inner shell and pushed in until the hook tips expand out and catch on the perpendicular wall of the outer shell. The user can then pull back the tool and release the locking plug. The tool can be left attached if desired. To remove it the user pushes it in just a bit which disengages and forces the hook tips closer together and then squeezes it slightly, which keeps it disengaged, and then can pull the prongs back out of the channels in the inner shell, removing the tool.

FIGS. 27A-E illustrate the operation of the locking connector 2700 in accordance with another embodiment of the invention. For example, the connector 2700 may be implemented as a male cord cap corresponding to, for example, the standards IEC 14 (see, FIGS. F-I) or IEC 20 (see, FIGS. 27J-O). Among others. FIGS. 27A-E show assembled and simplified illustrations of the connector 2700 to facilitate understanding of the locking mechanism whereas FIGS. 27F-O show exploded and detailed drawings of specific examples of commercial implementations.

Figure 27A:
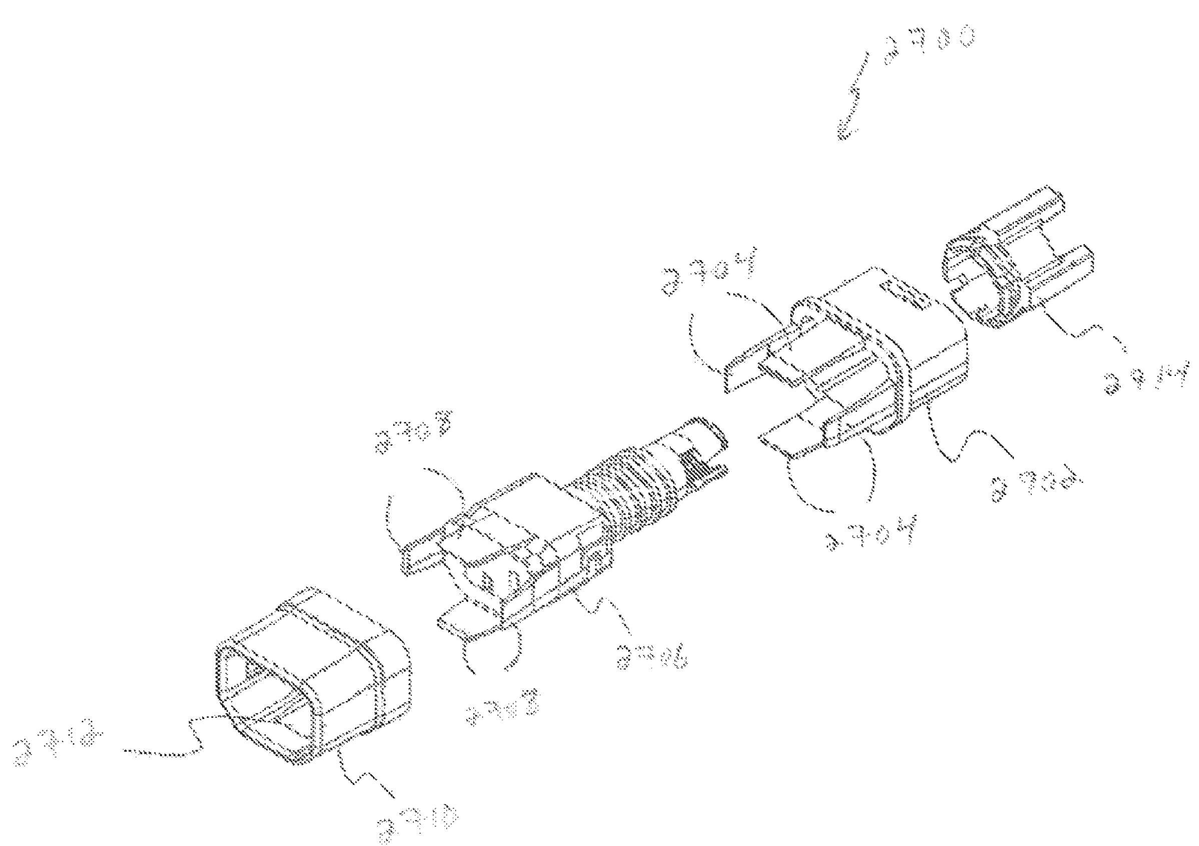
FIGS. 27A-O show various embodiments of locking connectors corresponding to various IEC connector standards in accordance with the present invention.
Figure 27B:
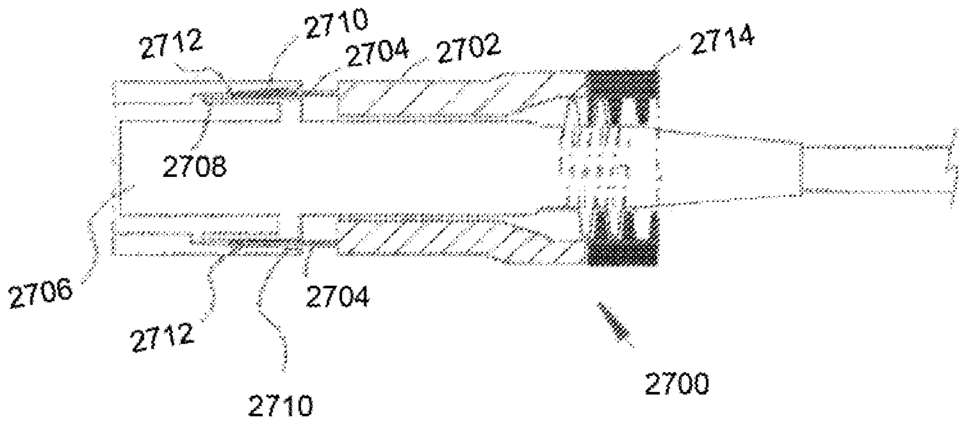
Figure 27C:
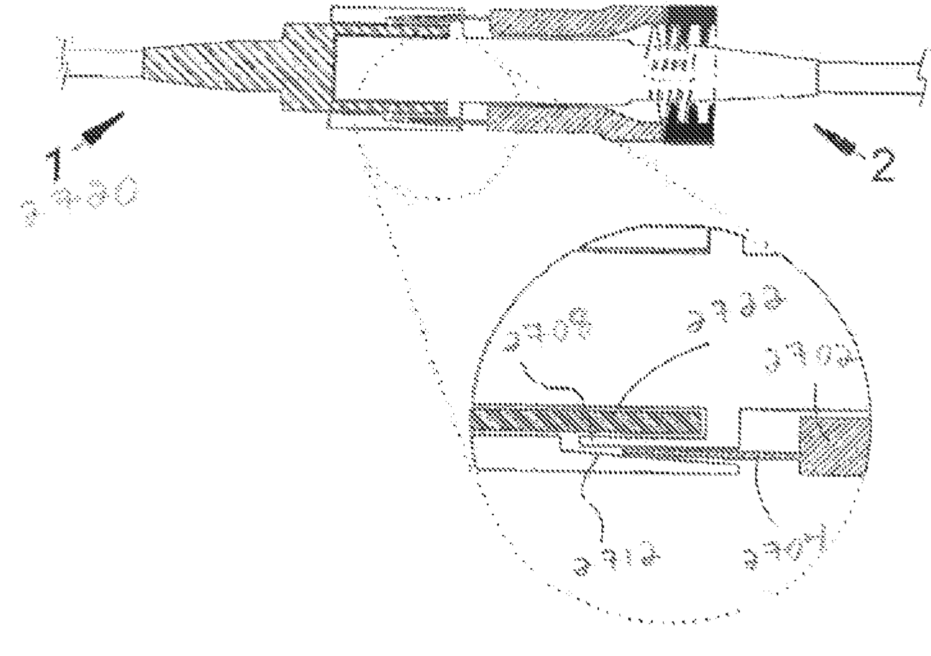
Figure 27D:
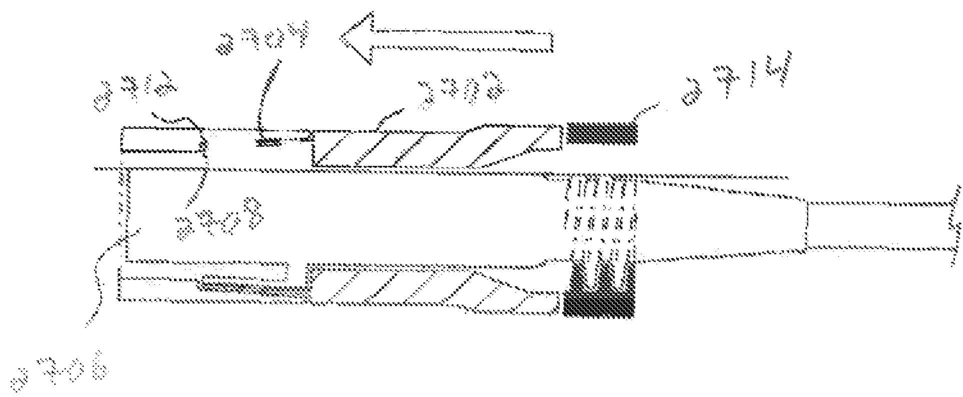
Figure 27E:
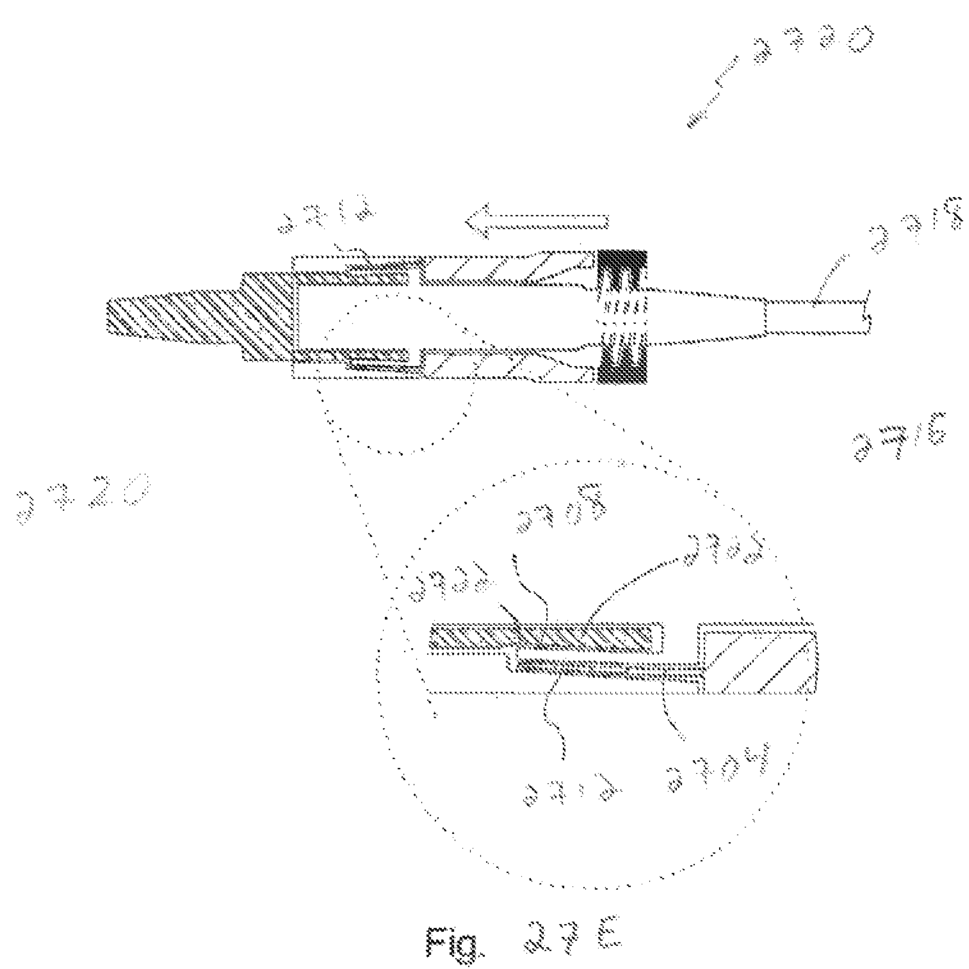
Figure 27F:
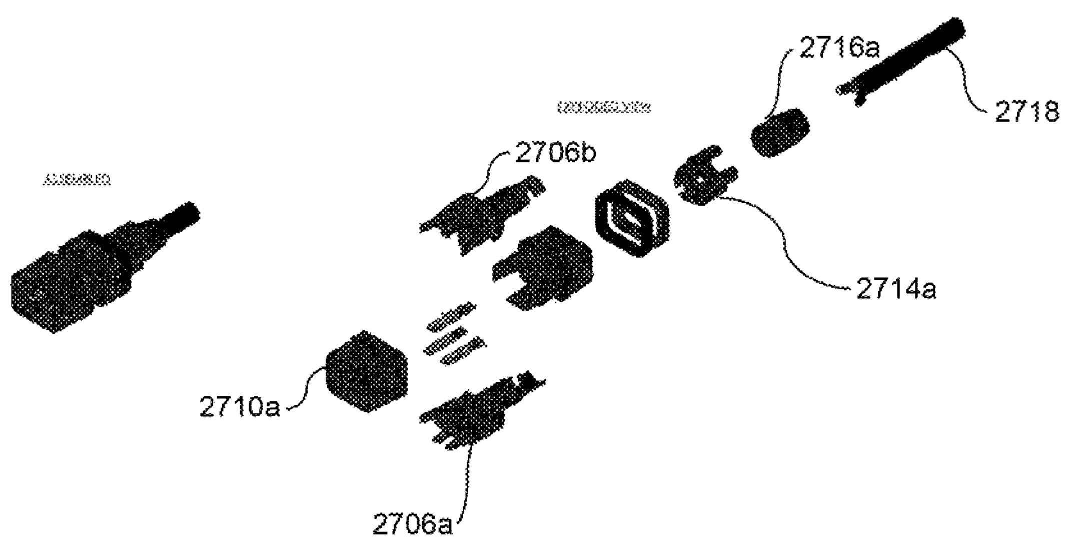
Figure 27G:
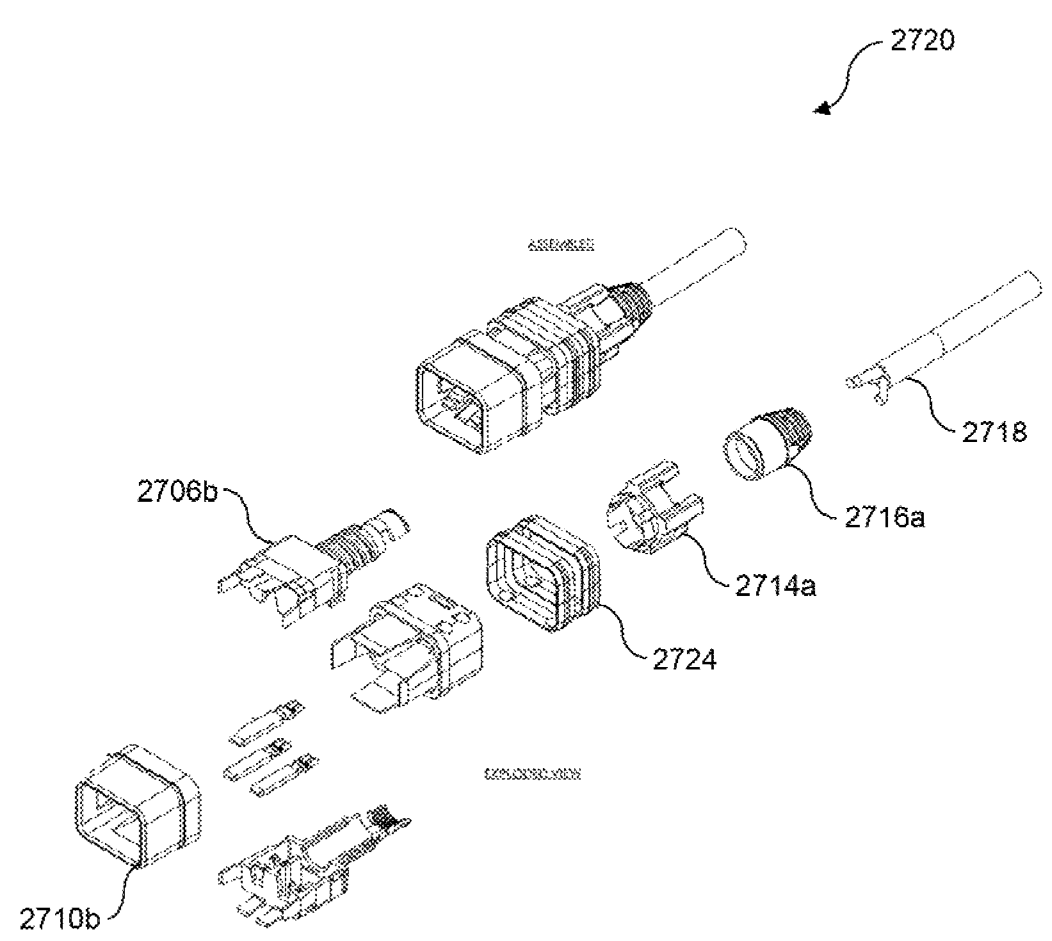
Figure 27H:
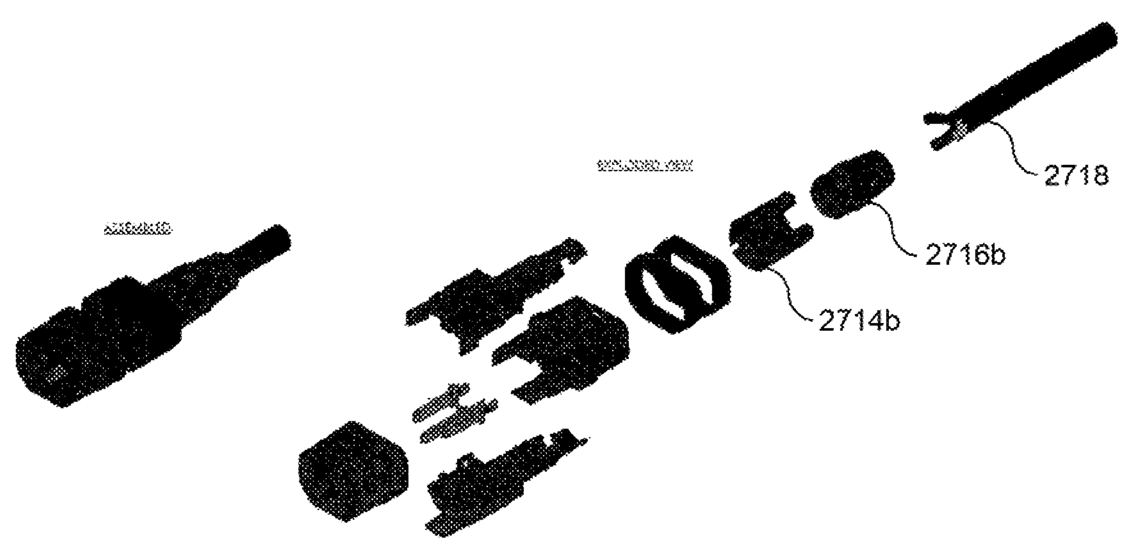
Figure 27I:
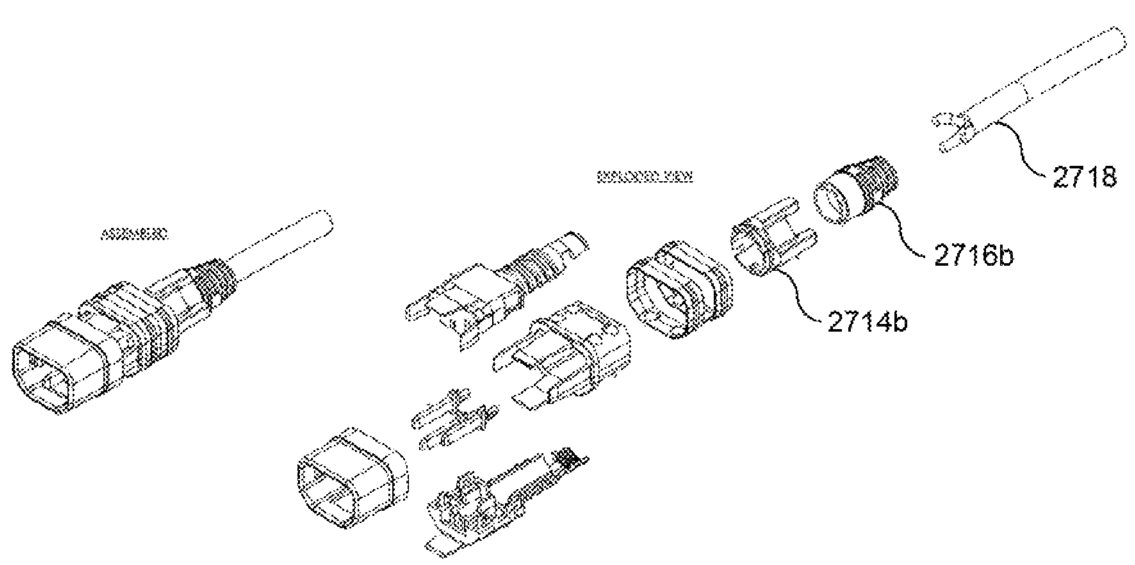
Figure 27J:
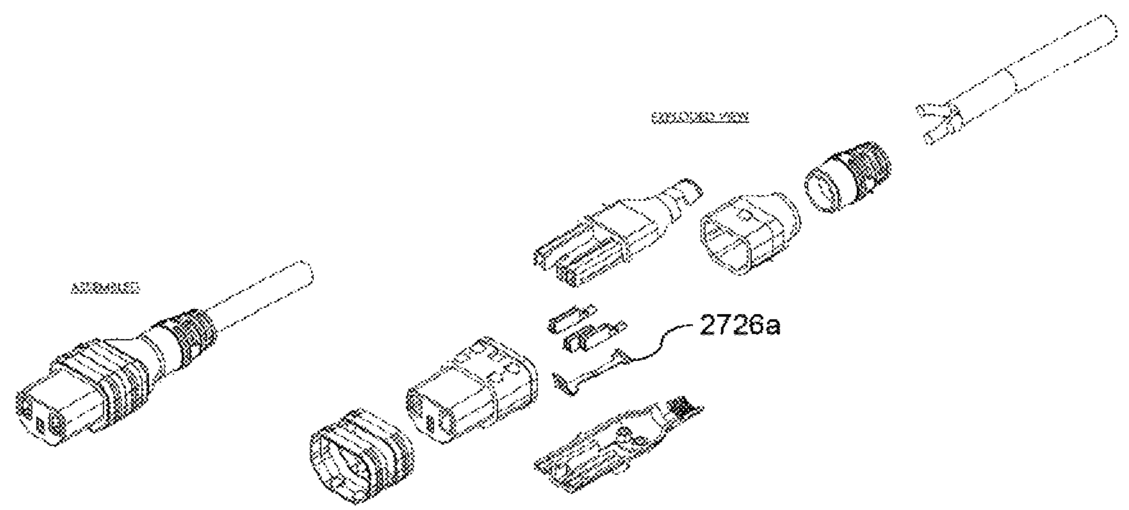
Figure 27K:
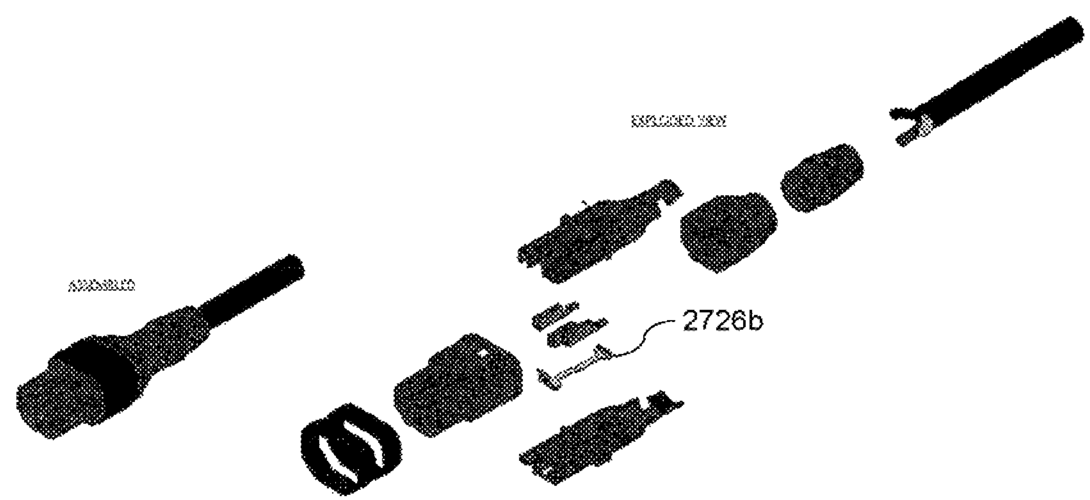
Figure 27L:
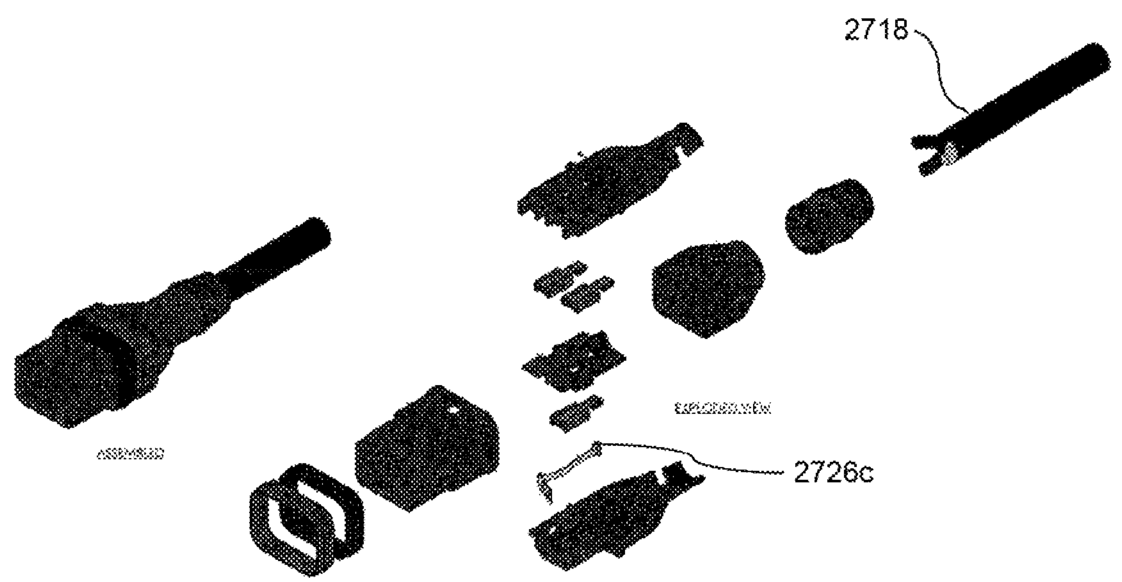
Figure 27M:
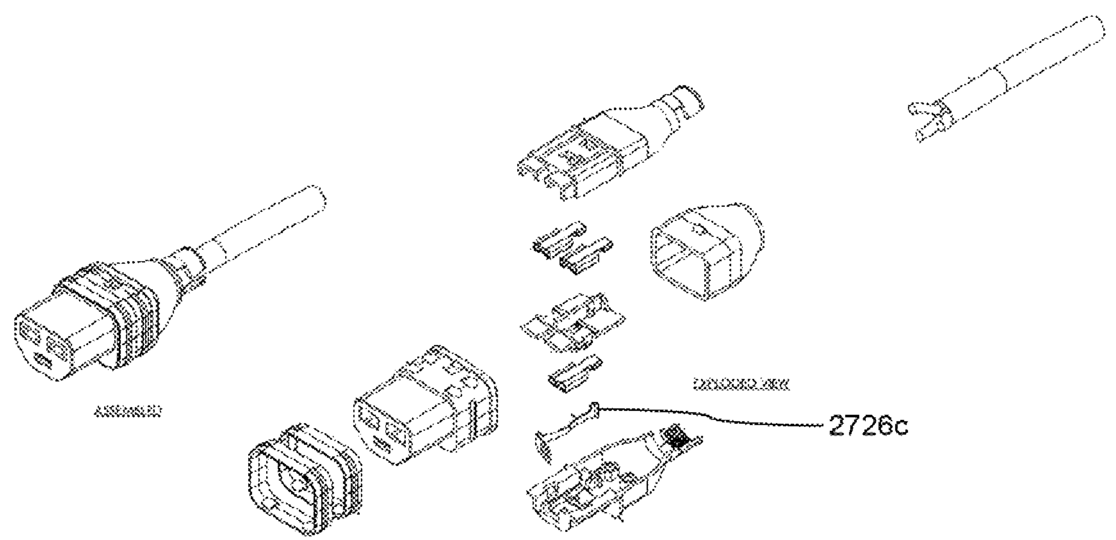
Figure 27N:
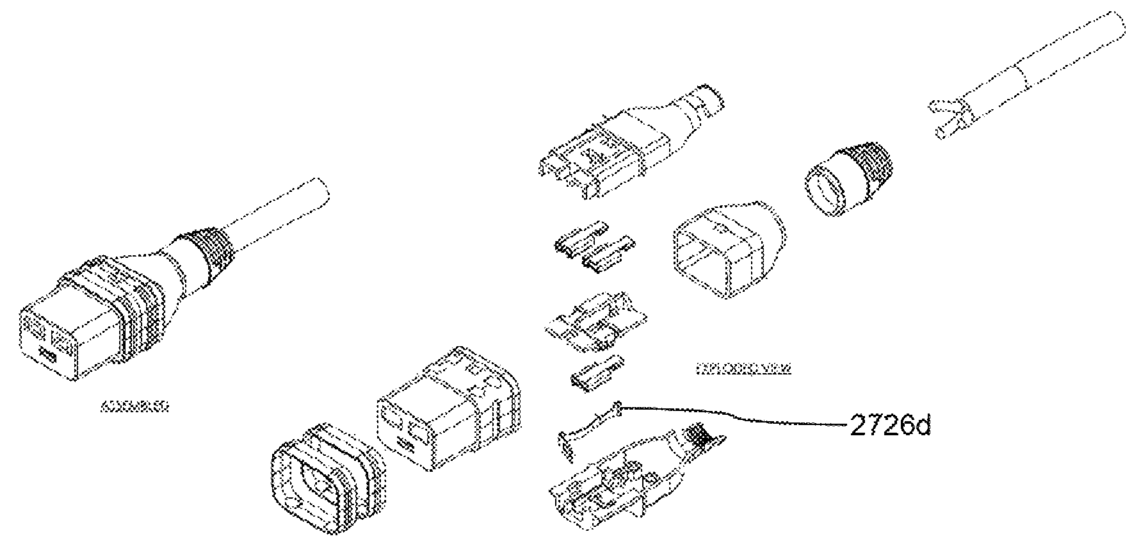
Figure 27O:
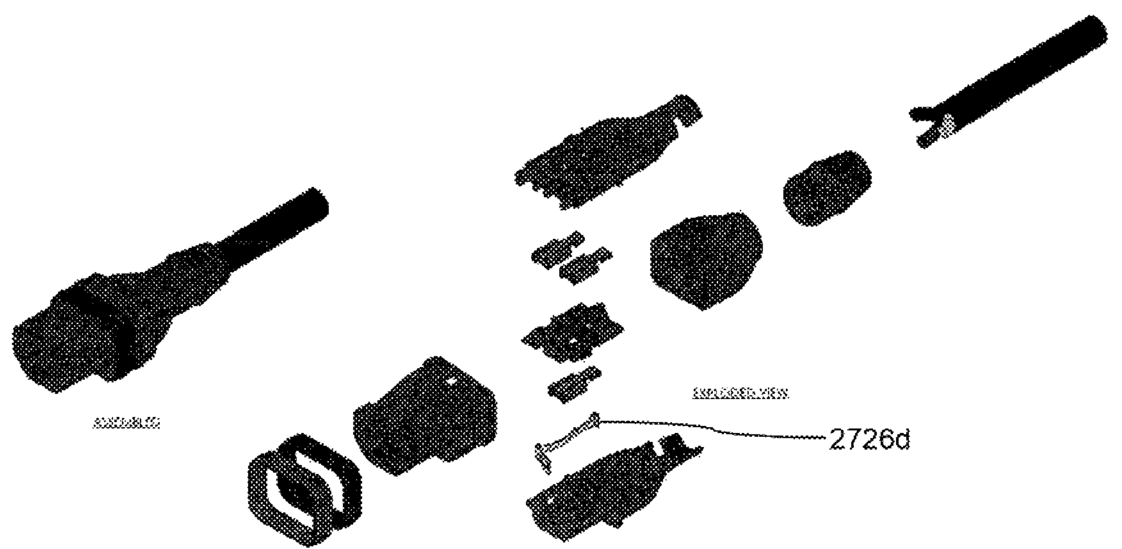

As shown in FIGS. 27A-E, the connector 2700 generally includes: a slide lock 2702 including wedges 2704 extending forwardly from the body of the slide lock 2702; a connector housing 2706 including flaps 2708 extending forwardly from the body of the housing 2706; a shell 2710 including internal ramps 2712; a locking nut 2714 that engages threads formed on a rearward portion of the housing 2706; and a cord clamp flex 2716 that connects the housing 2706 to the cord 2718 as well as connecting the housing halves (see, e.g., FIG. 27F, elements 2706*a,b*). The connector 2700 engages a mating connector 2720 such as a female cord cap or a receptacle of a power strip or other ganged receptacle device. It will be appreciated that the functional elements illustrated in FIGS. 27A-E may each be implemented in multiple pieces that are assembled to form the various functional elements.

In operation, the connector 2700 can be locked to and released from the mating connector 2720 by operation of the locking nut 2714. In particular, to lock the connectors 2700 and 2720, the nut 2714 can be turned to forwardly advance the nut 2714 and the slide lock 2702 in relation to the housing 2706. FIGS. 27B and C show the connector 2700 in the unlocked or released configuration and FIGS. 27D and E show the connector 2700 in the locked configuration. As the slide lock 2702 advances to the locked configuration, the wedges 2704 slide around (on the outside) of the flaps 2708 and ride inwardly on the ramps 2712. This causes the wedges 2704 to force the flaps 2708 inwardly against the outside of a wall 2722 of the mating connector 2720. The connectors 2700 and 2720 are thereby frictionally locked together. To release the connectors 2700 and 2720, this process is reversed by turning the locking nut 2714 to withdraw the nut 2714 and slide lock 2702. This causes the wedges 2704 to ride outwardly on the ramp 2712 so that the frictional engagement between the flaps 2708 and wall 2722 is reduced or at least substantially eliminated. The connectors 2700 and 2720 can then be easily separated.

FIGS. 27F-I show certain optimized implementations. The lock nuts 2714*a,b* can be implemented so that the periphery of the nuts 2714*a,b* does not extend or does not extend substantially beyond the peripheral surfaces of the connector housing and shell, at least in certain orientations of the nut 2714*a,b*. The nuts 2714*a,b* can be configured so that adjacent nuts 2714 mesh like gears in certain orientations to facilitate tight packing. In this manner, the nuts 2714*a,b* do not interfere or do not substantially interfere with the goal of densely packing the receptacles of plug strips or other ganged receptacle devices. In addition, the cord cap flexes 2716*a,b* can be formed with openings that allow the elements 2716*a,b* to flex to relieve or spread stress on the cord 2718. The flexes 2716*a,b* also help to capture and secure together the rearward ends of the housings when provided in halves to facilitate construction and assembly, including geographically distributed construction and assembly. The shells 2710*a,b* further help to secure the housing halves. The illustrated embodiments also accommodate ID rings 2724 as described above.

FIGS. 27J-O show various embodiments of the mating connector as implemented, for example, in relation to ICE 13, 15, 19, and 21 configurations. While the basic locking functionality can be provided as described above, FIGS. 27 J-O show implementations that accommodate the ICE configurations including lock springs 2726*a-d* that can be positioned and oriented to capture the ground prongs in these configurations, as well as appropriate housing, shell, and carrier clamp configurations. The illustrated mating connectors also include ID rings and cord cap flexes as described above.

The ID rings 2724 may be formed from nylon, rubber, or other resilient material. The rings 2724 may be colored so that a cord, or a relationship of the cord to other equipment, can be readily identified, e.g., based on a ring color, a combination of ring colors, or the like. In lieu of, or in addition to, color-coding, the rings 2724 may include a company name or logo, other text, Braille or other information, an embedded ID chip, or any other identification or other information. The rings 2724 may be seated in depressions, grooves, or the like (recesses) formed on the exterior of the shell. These recesses provide a convenient structure for attaching or mounting a variety of other accessories as may be desired. For example, in some environments, such as crowded plug strips, or where the cord cap is shrouded by other equipment, it may be desirable to attach finger-pulls or other extensions to facilitate release of the locking mechanism. Such extensions can include a mount that is seated in the recesses and extending structure that extends beyond the shroud or other obstruction. The extending structure may extend on one side, on one or more selected sides, or in various configurations in relation to the shell. The extensions could be integrated with the ID ring or attached thereto, or otherwise implement multiple functions. It will be appreciated that the recesses can similarly be used for various other accessories.

Figure 19:
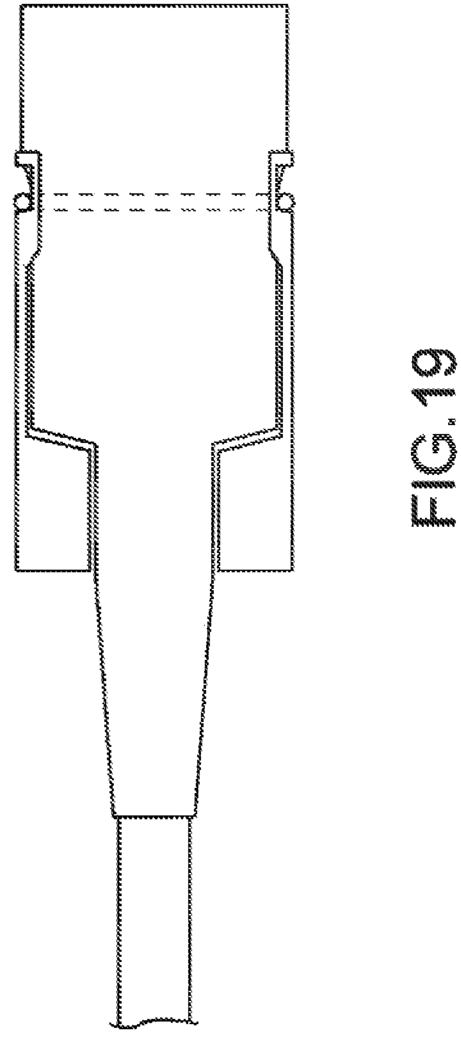
FIGS. 19-22 illustrate the operation of another embodiment of a retention mechanism in accordance with the present invention.
Figure 20:
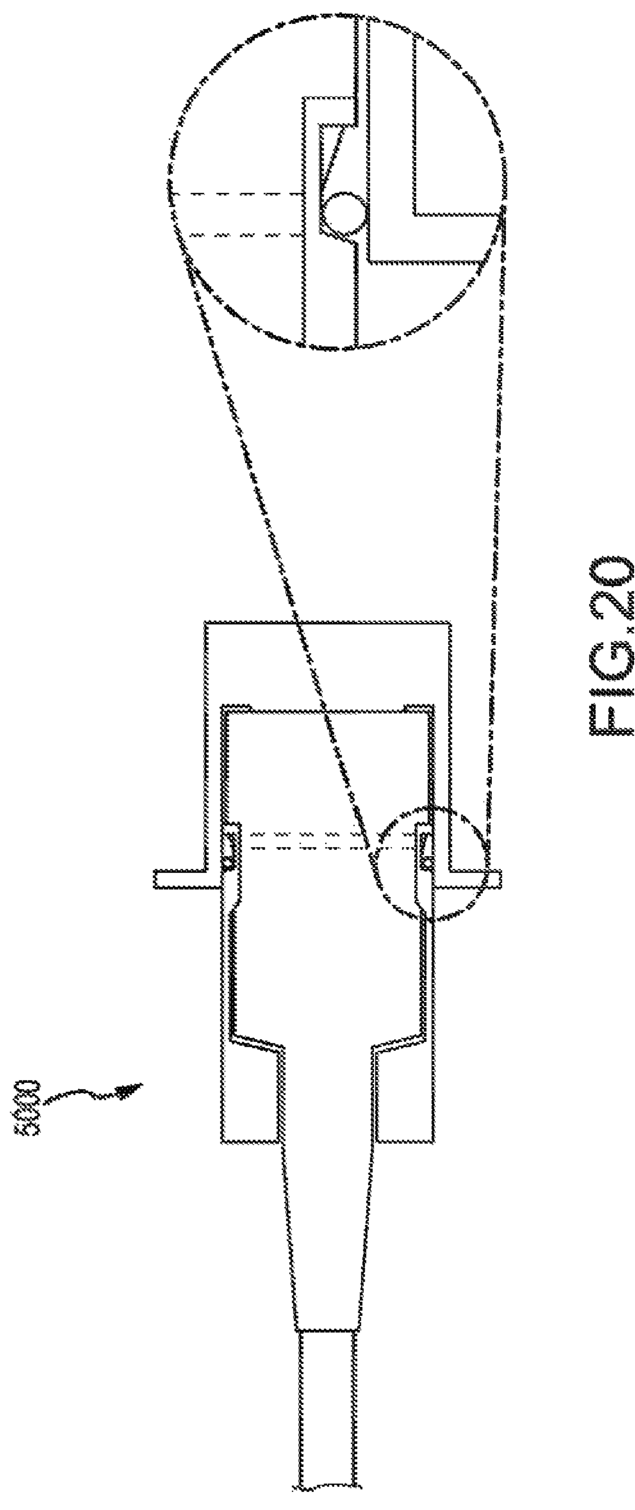
Figure 21:
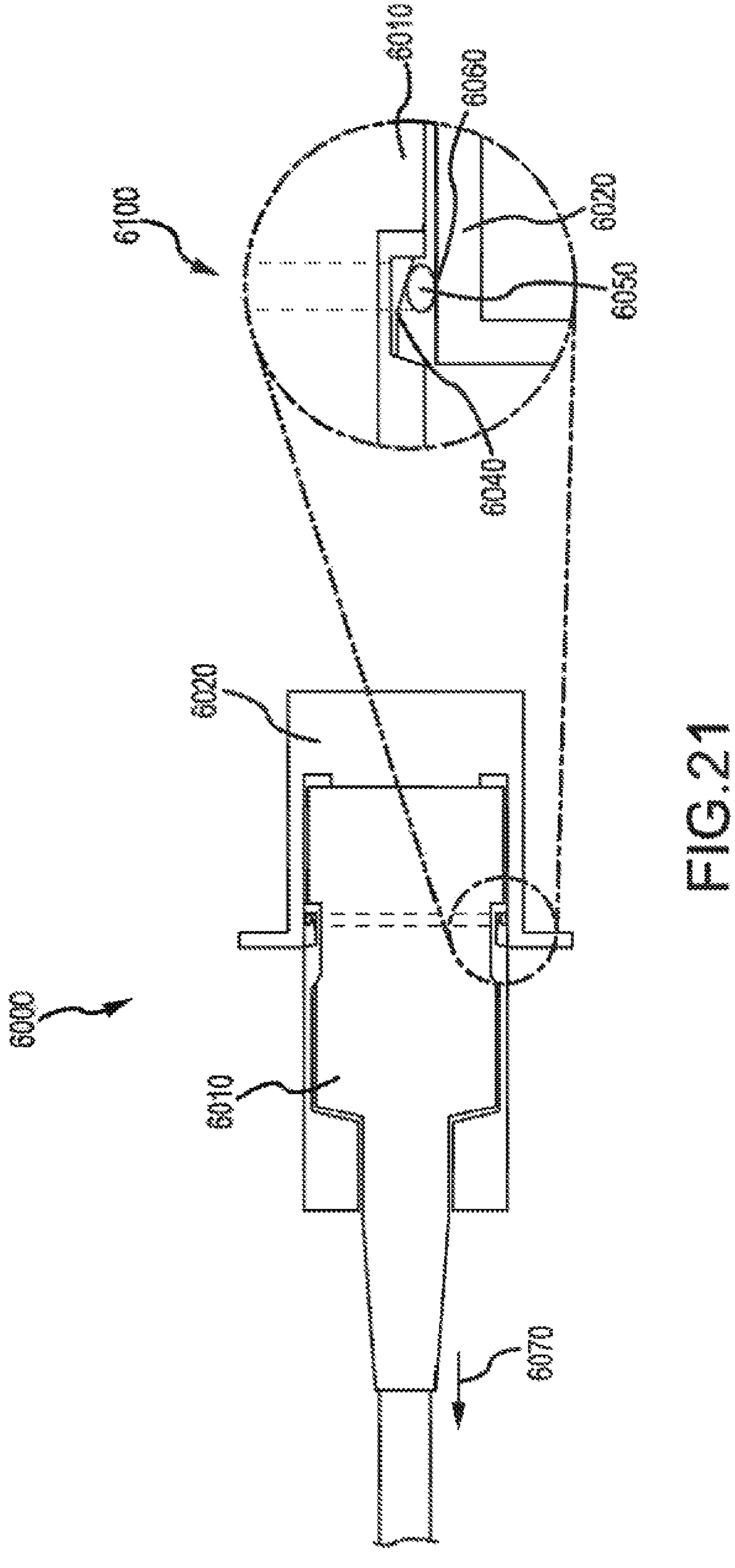
Figure 22:
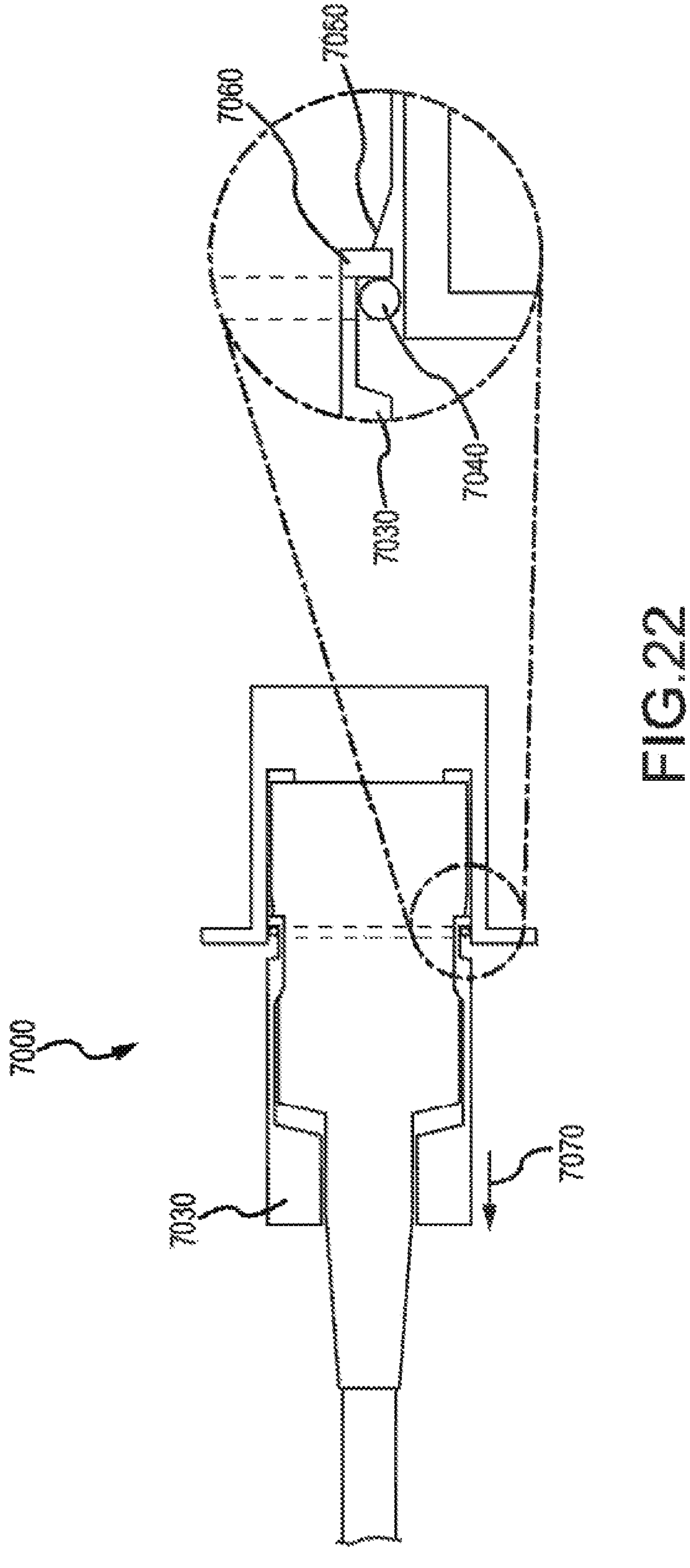

FIGS. 19-22 illustrate the operation of another embodiment of a mechanism for securing a mated electrical connection that may be included in a secure connection of the present invention. This embodiment is one that automatically secures itself in response to a force 6070 that would tend to pull the connection apart. FIGS. 20-22 represents top views of the retention mechanism in the states of: 1) fully inserted 5000, 2) fully inserted under tension 6000, 3) being released 7000. FIG. 19 illustrates the plug and receptacle and the elements of retention mechanism. FIG. 20 illustrates the connection after the plug has been inserted into the receptacle but no force has been applied that would tend to pull the connection apart. FIG. 21 illustrates the operation of the retention mechanism 6000 in reaction to a force on the plug 601 that tends to withdrawal the plug 6010 from the receptacle 6020. In reaction to a withdrawal of the plug 6010, the retention mechanism as shown in detail blowup 6100 via the action of the inclined ramp 6040 forces the elastomer 6050 into closer and closer contact with the walls of the receptacle 6060, causing the frictional interlock between the plug 6010 and the receptacle 6020 to increase.

Thus, the very force 6070 that tends to withdraw the plug 6010 from the receptacle 6020 acts to engage the retention mechanism 6000 to frictionally interlock with the walls of the receptacle 6060, thereby preventing the withdrawal of the plug 6010, and maintaining the electrical connection of the mated assembly. The retention mechanism 6000 may be constructed of any suitable material as described earlier. FIG. 22 illustrates the operation of the retention mechanism during release of the secure connection. When the user desires to release the connection, they can grasp and pull the outer shell 7030 which will retract, pulling 7070 the elastomer 7040 back down the ramp 7050, via the extension of the outer shell 7060, uncompressing the elastomer 7040 thus releasing the connection.

Figure 23:
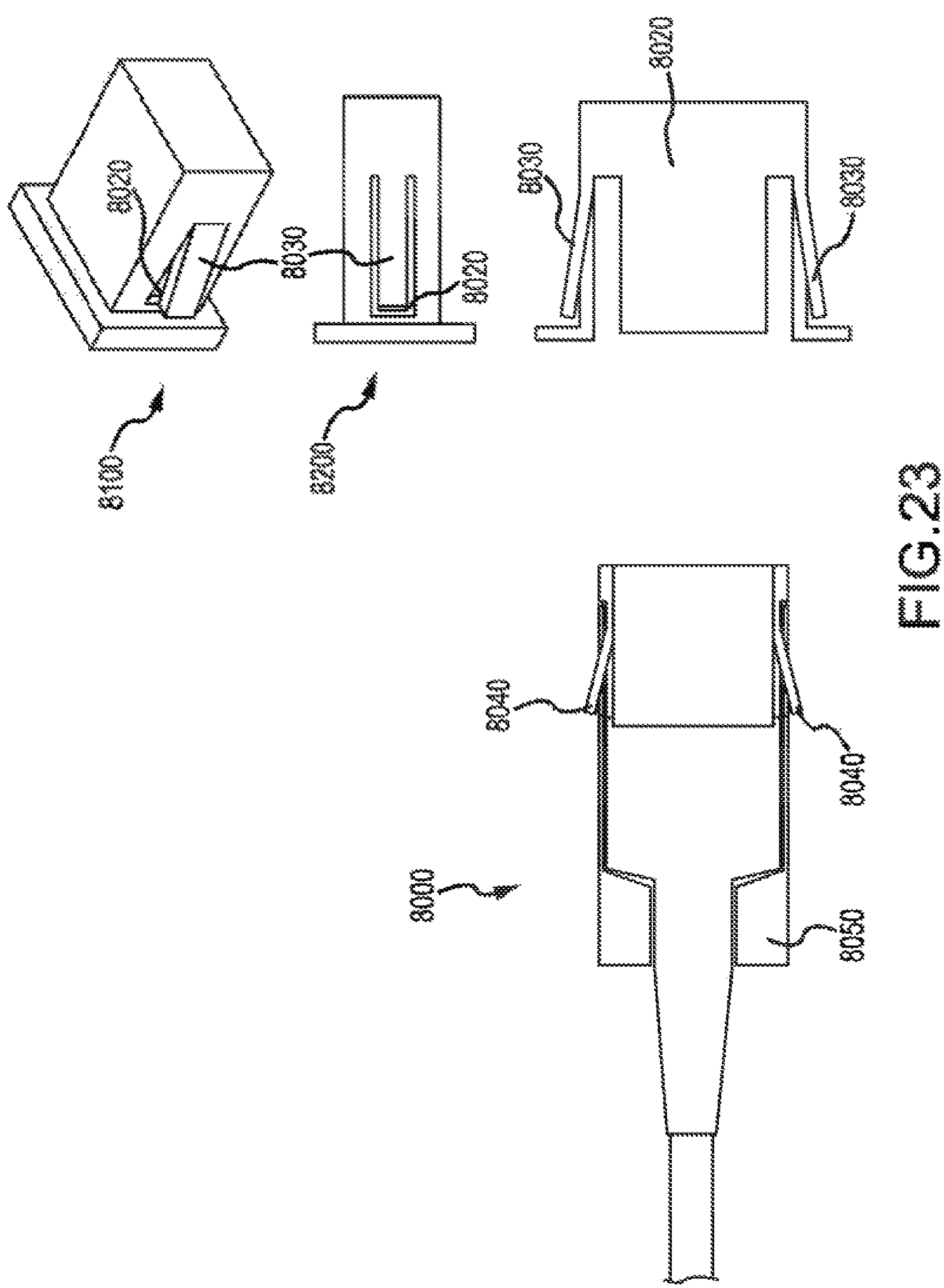
FIGS. 23-24E illustrate an embodiment of plug that includes a tab or hook retention mechanism in accordance with the present invention.

FIGS. 23-24 illustrate the operation of another embodiment of a mechanism for securing a mated electrical connection that may be included in a secure connection of the present invention. This embodiment is one that automatically secures itself in response to a force that would tend to pull the connection apart. FIG. 23 illustrates a side top of the plug 8000 that incorporates the secure mechanism, and side view 8010 and perspective views 8020 of a typical standard receptacle. The receptacle has fingers 8030 that are used to secure the receptacle 8020 when it is snapped into a panel. These fingers 8030 are typically provided in individually molded snap-in receptacles 8020 and typically provided in molded models of receptacles that provide 2, 3 or more receptacles in one molded unit for snap-in insertion into a plugstrip. The fingers 8030 splay when the receptacle 8020 is inserted, leaving an opening in the body of the receptacle 8020. Where the fingers are not provided, the manufacturer could alter the molding to insure they or a similarly shaped and located slot or hole are provided in every model of individual or multiple receptacle, at low cost with little or no impact on regulatory body approvals, making it easy and inexpensive to offer. The plug 8000 has tabs 8040 (that optionally can be shaped as hooks) that will expand and insert themselves into the openings in the body of the receptacle 8020 when the plug 8000 is inserted into the receptacle 8020. The ends of the tabs 8040 can be located and shaped so that they can insert themselves into and transfer forces that would tend to pull the connection apart to the walls of the receptacle, but not pass through the opening in the wall of the receptacle 8020. This insures that the tabs 8020 cannot become wedged by the walls of the receptacle in response to a force that would tend to pull the connection apart and therefore separate the plug 8000 and receptacle 8020. This shaping of the tabs 8020 insures that the secure connection will function properly and always release when desired. To release the connection the user grasps the outer shell 805, and pulls it back to pull the plug 8000 out of the receptacle 8020.

Figure 24A:
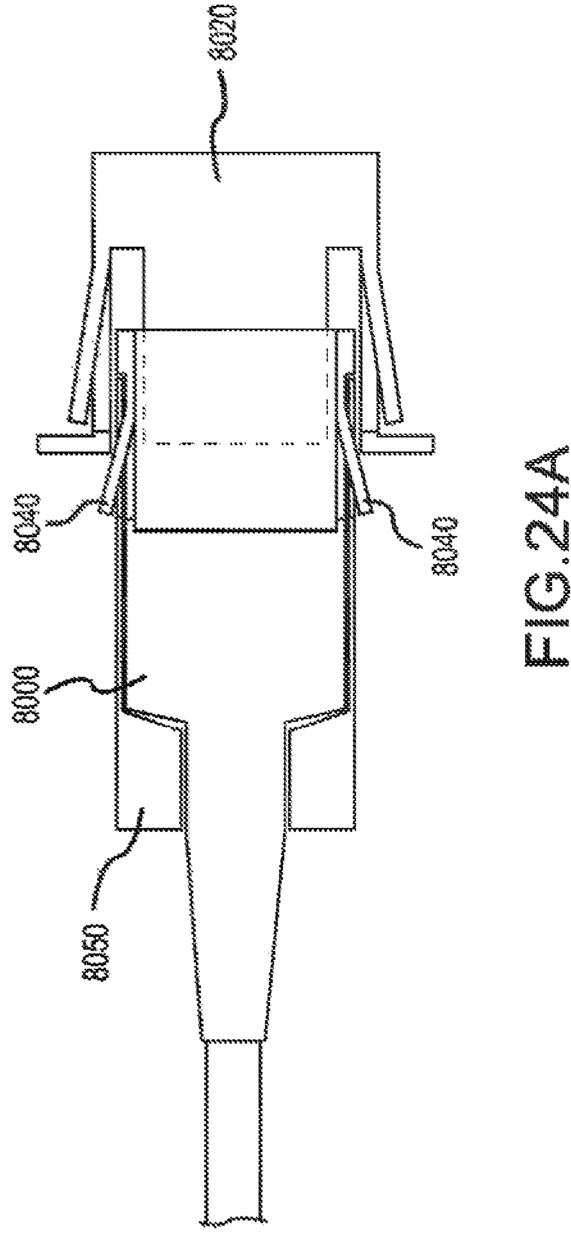
Figure 24B:
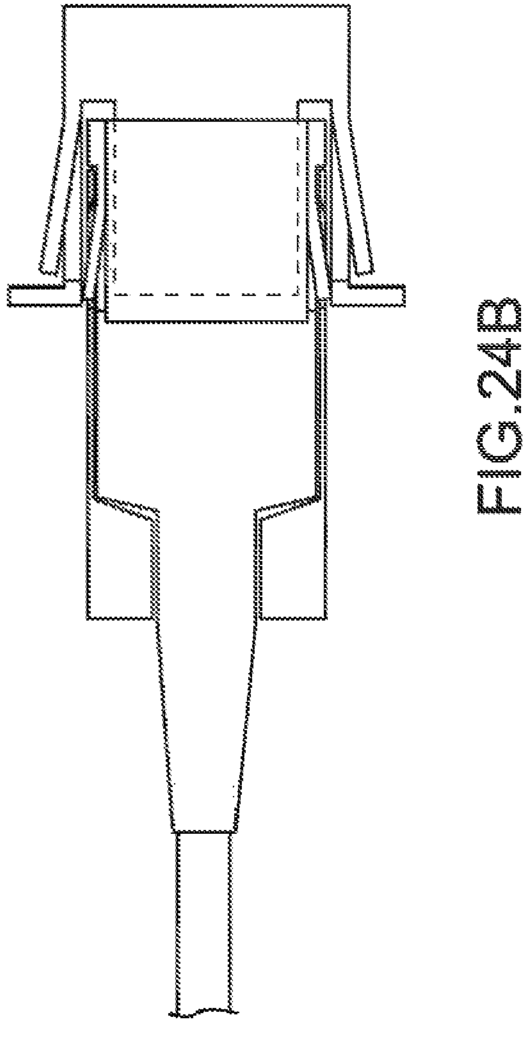
Figure 24C:
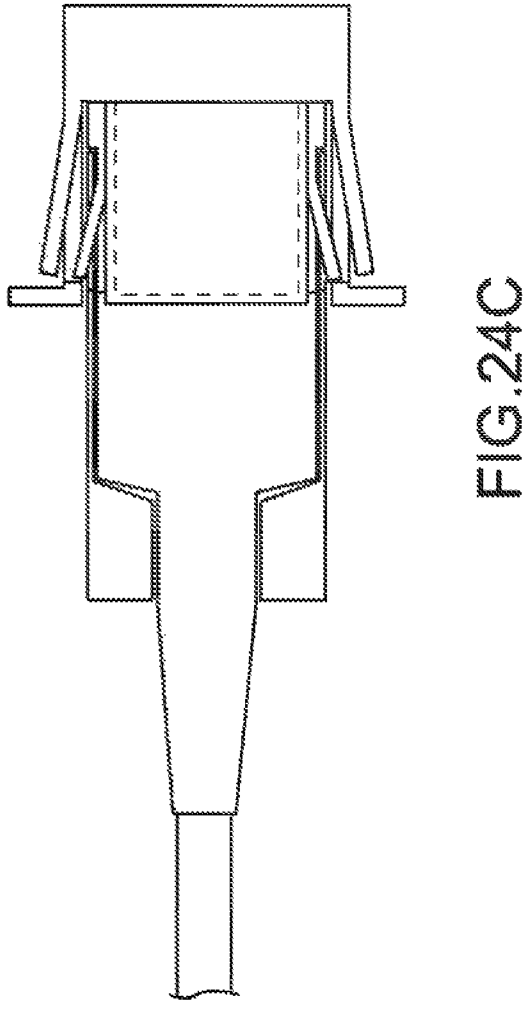
Figure 24D:
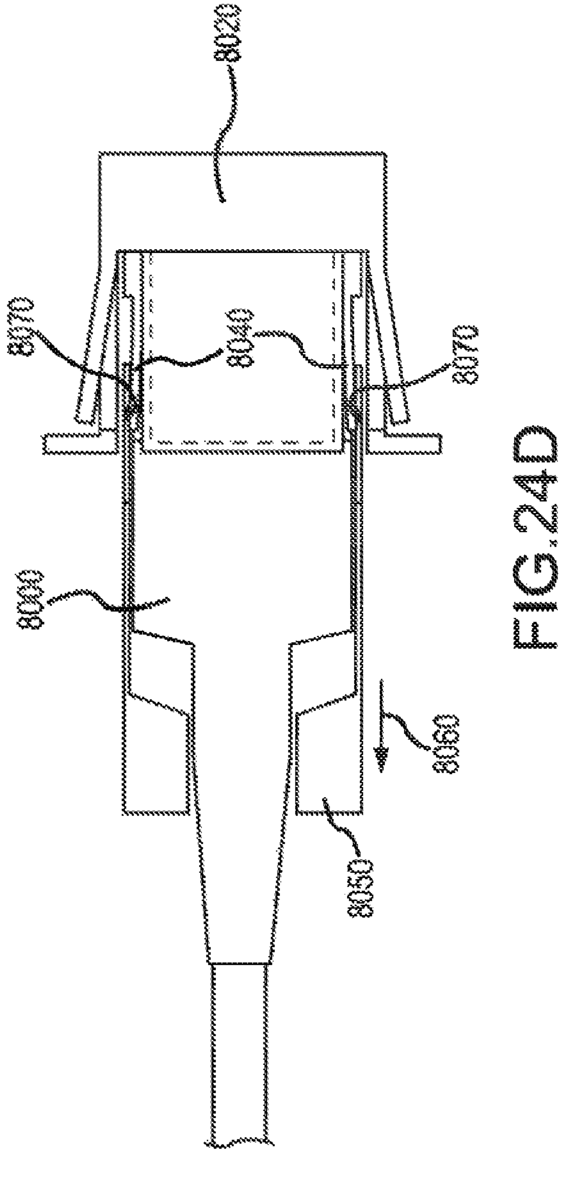
Figure 24E:
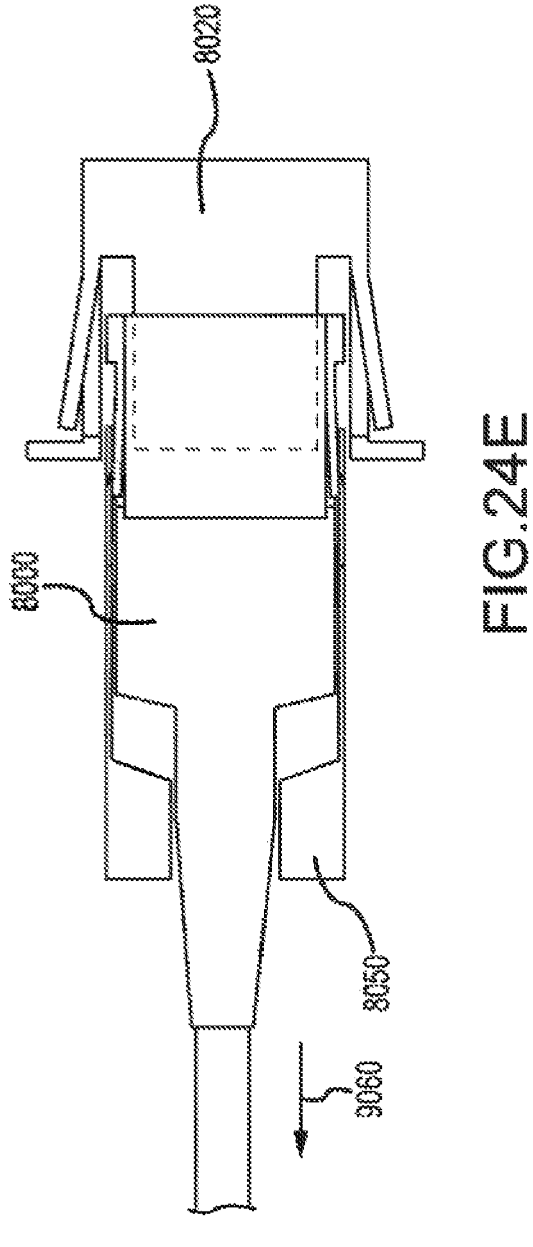

FIGS. 24A-24E represents top views of the retention mechanism with an electrical contact prong in the states of: 1) partially inserted FIG. 24*a,* 2) being inserted but not yet secured FIG. 24*b,* 3) fully inserted and secured 9020 FIG. 24*c,* 4) fully inserted while being released 9030 FIG. 24*d,* 5) being removed, thus breaking the connection 9040 FIG. 24*c*. As described above, and demonstrated in FIGS. 24*a*-24*c* the plug 8000 has tabs 8040 (that optionally can be shaped as hooks) that will expand and insert themselves into the openings in the body of the receptacle 8020 when the plug is inserted into the receptacle 8020. To release the connection the user grasps the outer shell 8050, and pulls 8060 it back to pull the plug 8000 out of the receptacle 8020 as demonstrated in FIG. 24*d* and FIG. 24*c*. The outer shell 8050 is equipped with suitably shaped substantially rectangular openings for the tabs 8040 to extend through and when the outer shell 8050 is pulled 8060 back by the user, the edge 8070 of the rectangular opening that is closest to the front of the male plug will depress the tabs 8040, frecing the plug 8000 to disconnect from the receptacle 8020. The retention mechanism may be constructed of any suitable material as described earlier. It should be noted that this embodiment of the mechanism could easily be combined with the earlier versions described that use a user activated manual retention mechanism. This instantiation would use the actuation nut described earlier to control the position and movement of the outer shell. The release position of the actuation nut would position the outer shell to depress the tabs, preventing their engagement with the receptacle, but not preventing the plug from being inserted into or removed from the receptacle. The secure position of the actuation nut would allow the tabs to engage with the receptacle, securing the connection. This version might be useful in some circumstances.

Figure 26A:
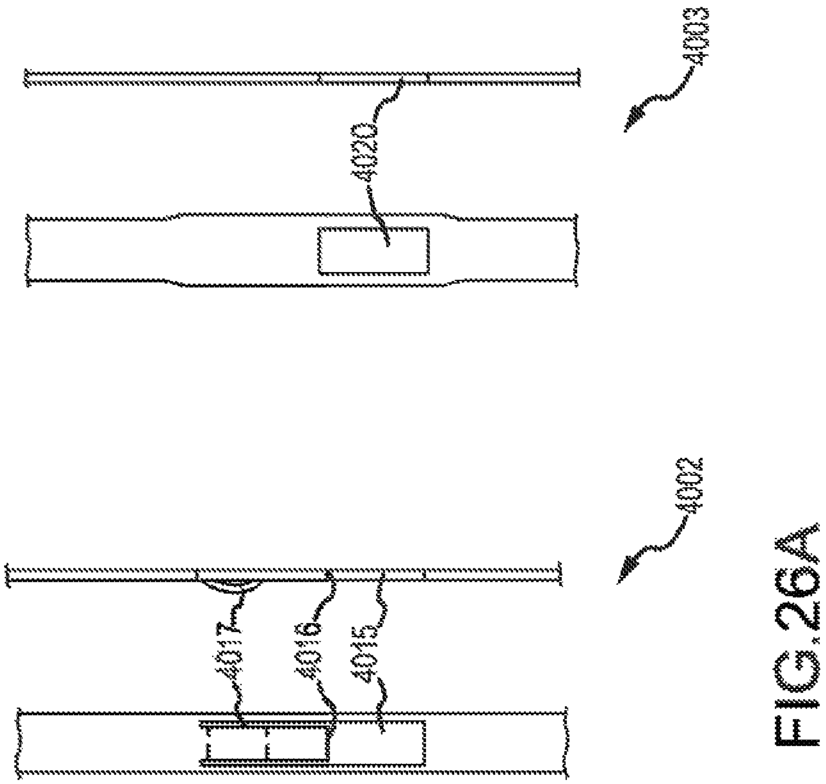
FIGS. 26A-26I show embodiments of a locking plugstrip in accordance with the present invention.
Figure 26A:
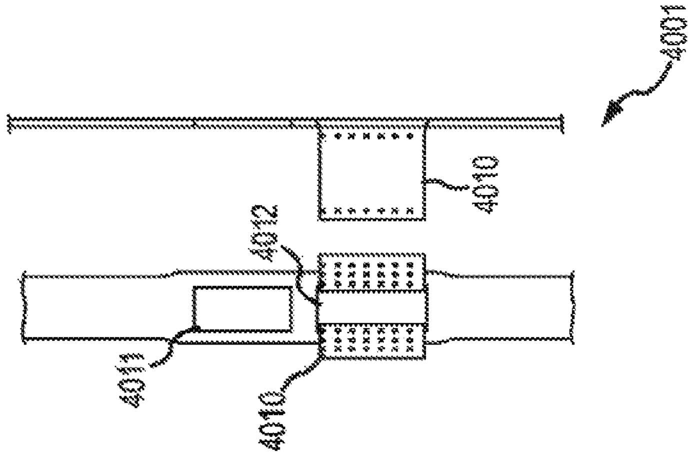
Figure 26B:
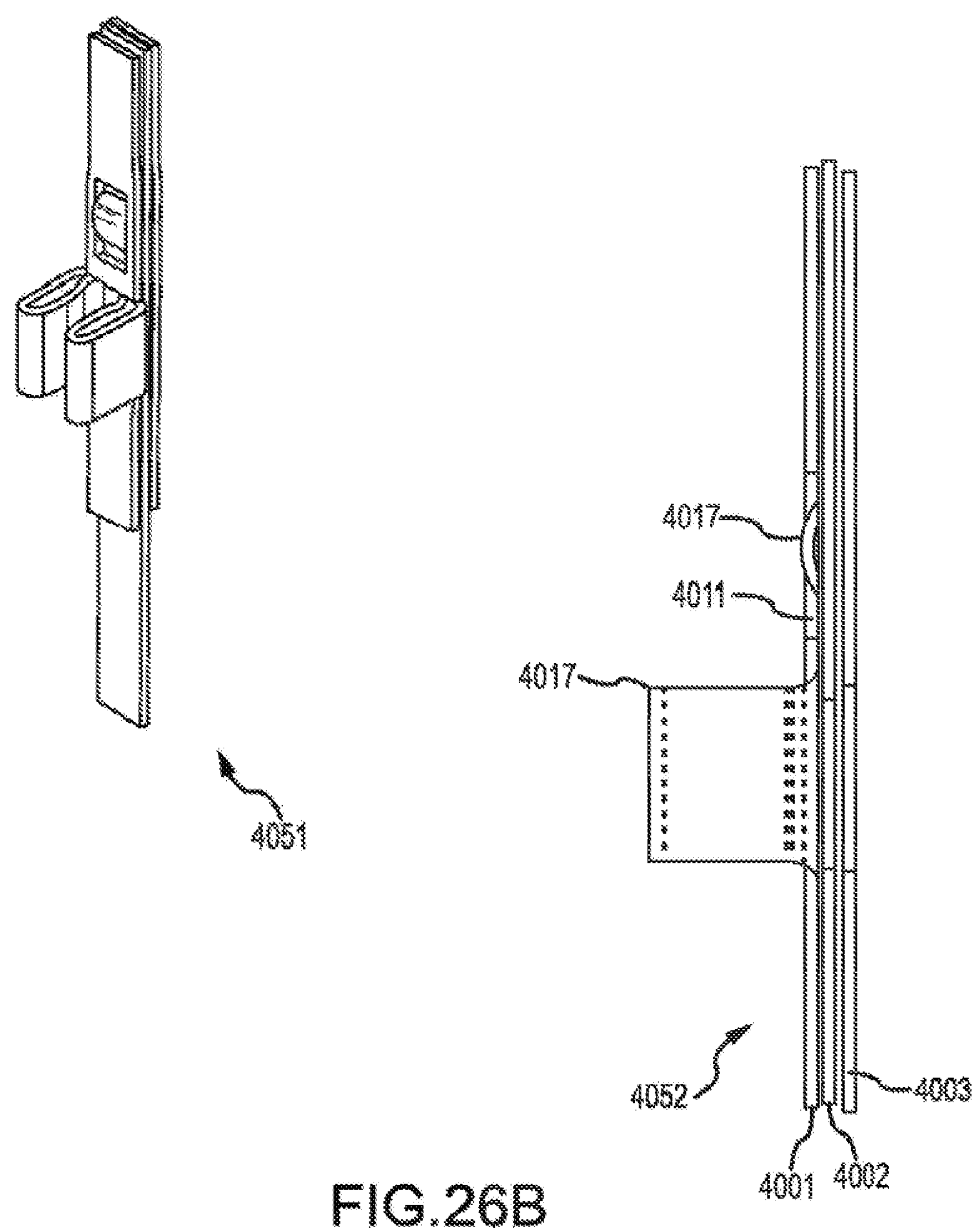
Figure 26C:
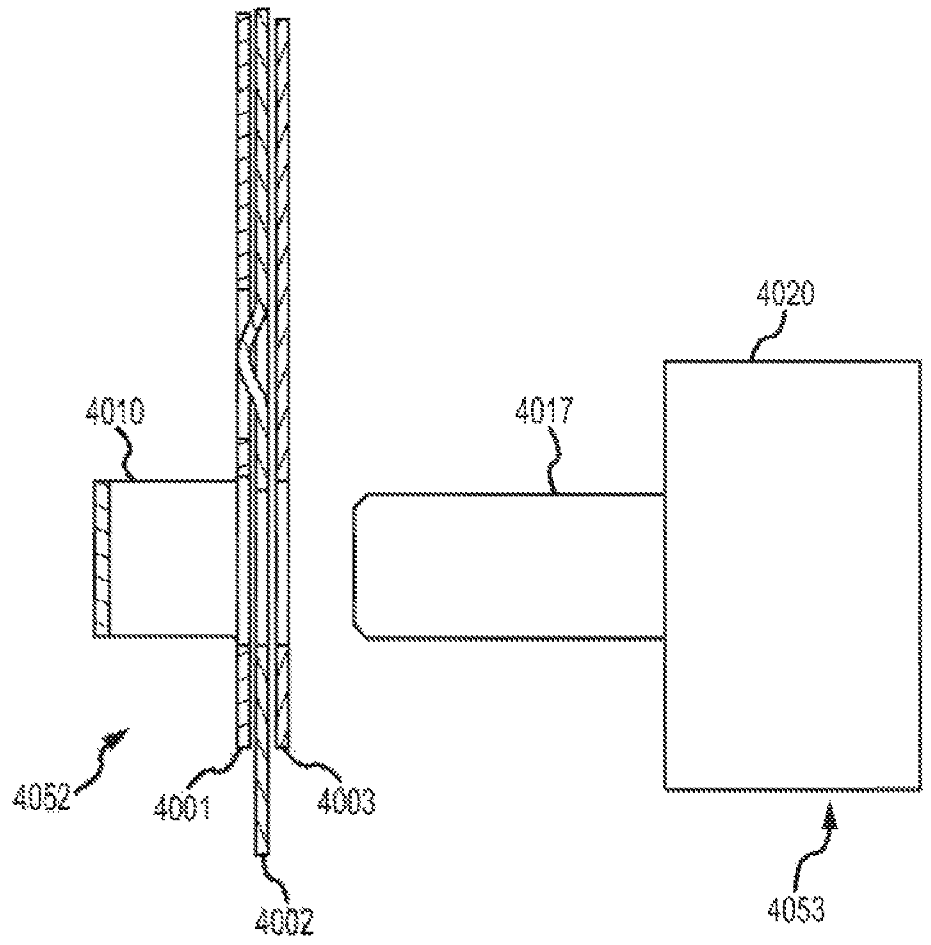
Figure 26D:
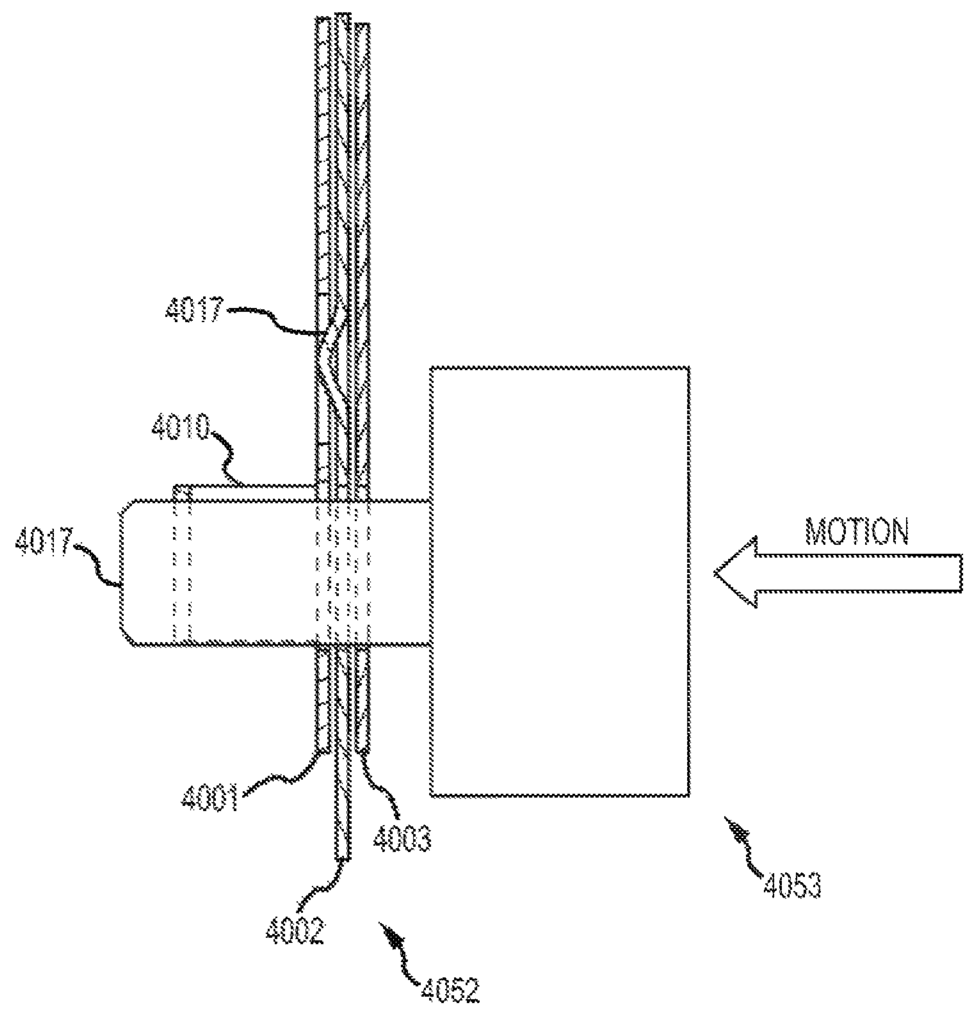
Figure 26E:
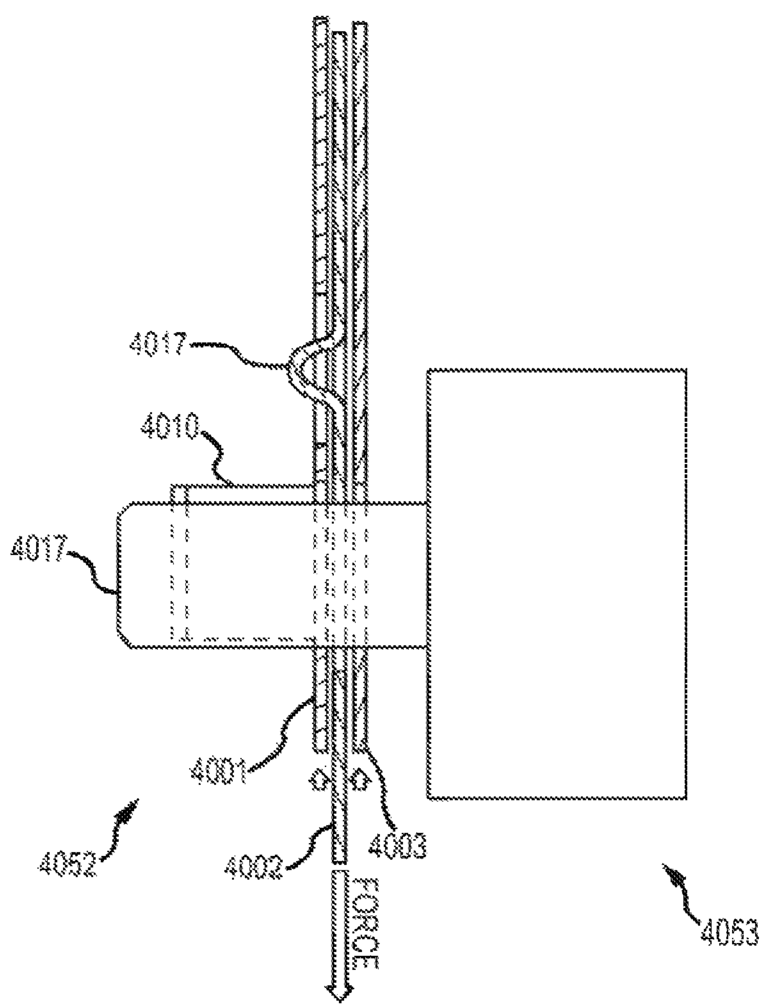
Figure 26F:
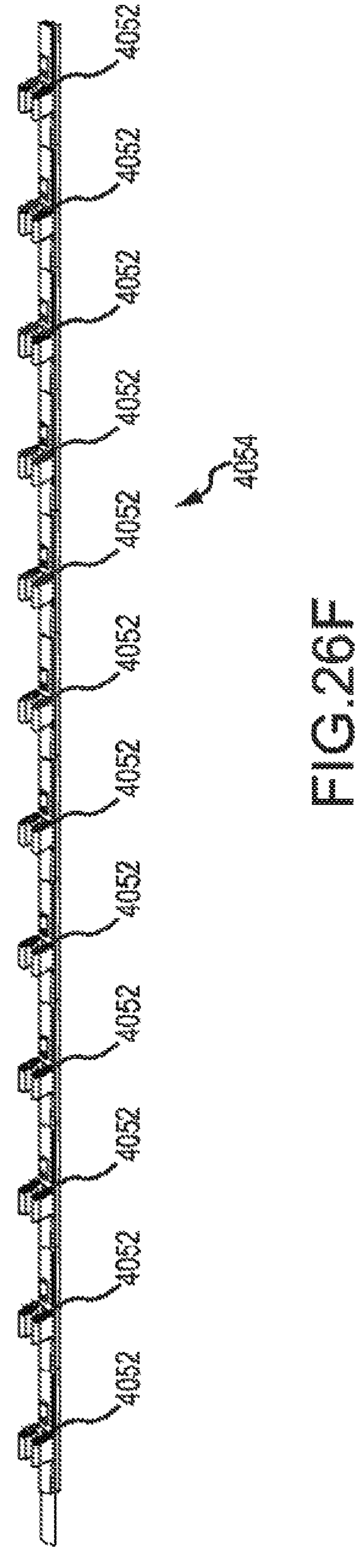
Figure 26G:
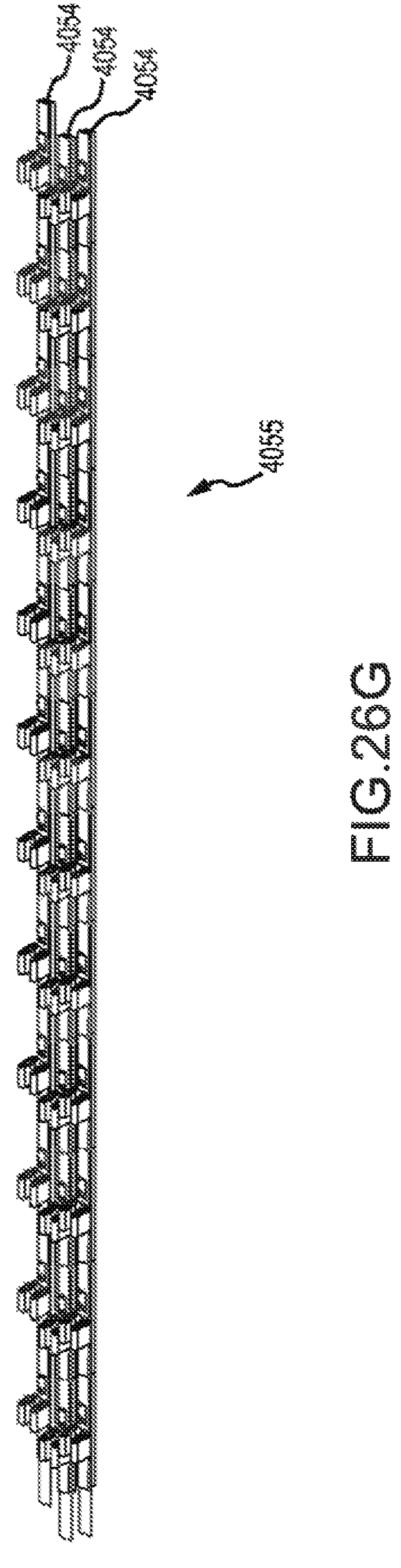
Figure 26H:
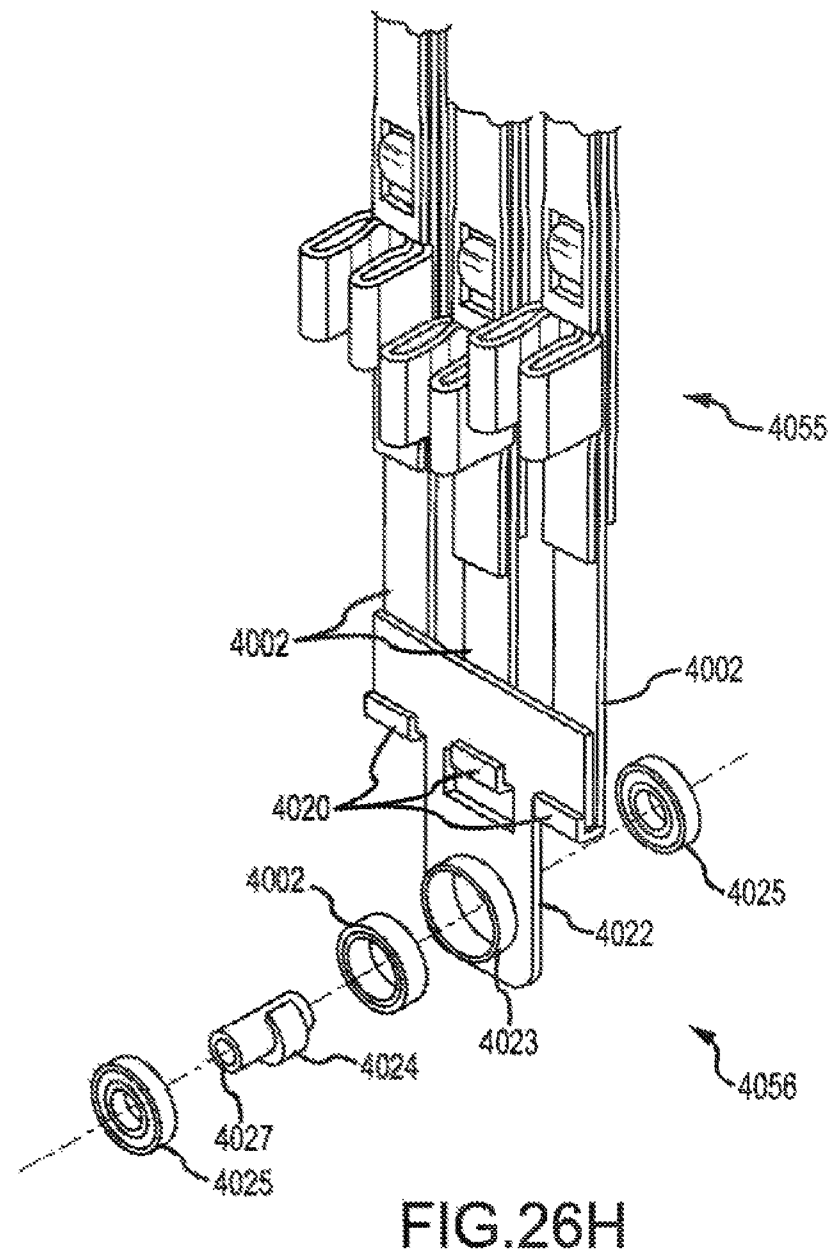
Figure 26I:
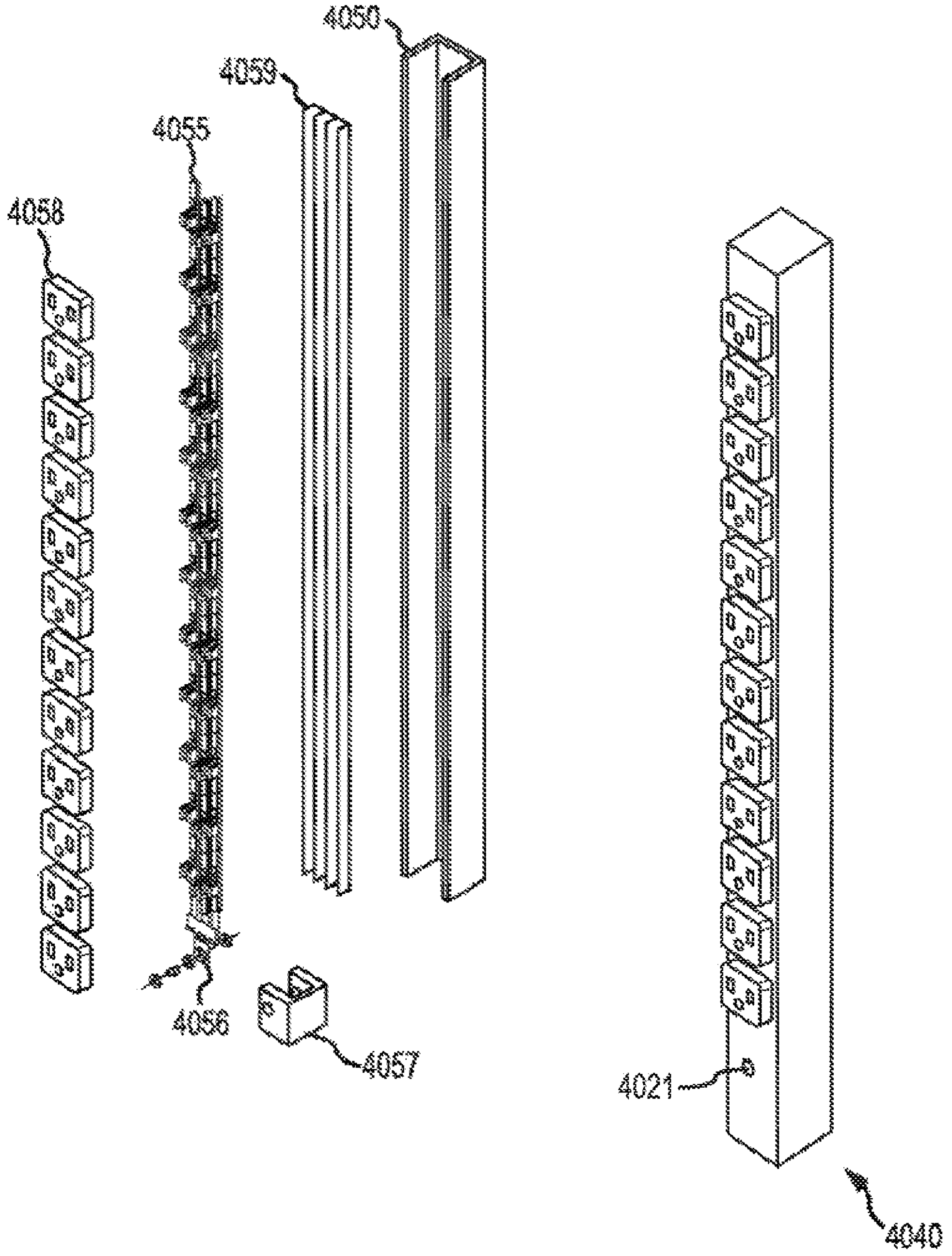

FIGS. 26A-I depict another possible method to secure cords to plugstrips. The locking mechanism has been incorporated into the plugstrip, so that every cord is locked at once and all can be released at one time. FIG. 26I shows an multiple electrical outlet assembly 4040 comprised of 12 e.g., National Electrical Manufacturers Association (NEMA) type 5-15 receptacles (other receptacle types could be used, the 5-15 type is used as an example) oriented in a line and assembled into a narrow profile long “strip”. This configuration is commonly utilized in electronic equipment racks, and is often referred to as a plugstrip, and will be referred to hereinafter as such. Any number of receptacles, from one to any practical limit, can be manufactured using this method. The plugstrip that is the object of this invention is unique in that it incorporates a locking feature for the purpose of securing the plugs of electrical cords that are to be attached to the plugstrip. The locking or un-locking of the receptacles to the attached electrical plugs is accomplished by an operation of rotating a hex socket screw 4021 on the front of the panel with a small tool. This does not necessarily need to be a hex socket, it could be a knob or handle integrated into (or separate from) the assembly, or some other means of actuating the internal mechanism. It could be a proprietary connector with matching tool, knob, or lever, etc. to restrict the ability to unlock and relock the plugstrip to authorized personnel. It could be a motor or solenoid driven locking mechanism controlled either locally (by a button or switch or secure key-actuated switch or secure digital authentication data fob or secure code keypad such as have been used for car doors, for example or digital passkeys, ID cards, or other suitable physical access control mechanisms) or a remotely controlled motor drive. The remote control could be accomplished via any suitable communications mechanism with or without security features as needed, for example over the Internet, an internal data network, via wireless network, (any of which could be implemented as a secure connection, using encryption, authentication, tokens, etc.) or any other suitable means.

A unique concept of the invention is the ability to lock or unlock all of the receptacles from attached plugs by a single, simple operation. In addition, the design allows for a predictable pull out force (programmable release) to extract any attached plug, when the assembly is in the locked position. This may be necessary to meet Agency requirements, such as Underwriters Laboratories (UL). The design allows for a wide variation in manufactured tolerances of the attached plugs. In addition, the design of this assembly allows for lowered cost of manufacturing and higher reliability due to the simplicity of the design. This design can be adapted to a variety of plug types and is not limited to the example of NEMA type 5-15 plugs.

A key design feature of the locking assembly is a unique prong capture mechanism that can be assembled in any length with any number of capture points that will correspond to the number of receptacles the plugstrip is supplying. FIG. 26A outlines three basic components of each prong capture assembly. These assemblies will be located at each receptacle, in combination of at least one assembly per receptacle, but can, and will likely, be applied to every prong capture location of any one receptacle, as well as all of the receptacles. The assemblies must be kept separate for each of the electrical conductors for electrical isolation reason. The components shown in FIG. 26A are all metallic in nature and most likely be fabricated of a good conducting metal such as brass, beryllium copper, or other reasonably tensile strong material, but is not limited to those materials. The primary electrical prong receiver 4001 is shown at the left of the figure. It is comprised of a machine stamped and die-formed piece. The prong wipes 4010 are formed from the base stamped metal and are rolled inward in a manner commonly practiced in the industry to provide an aperture for the mating prong to enter and exit reasonably easily, but with very secure electrical connection to the mating prong. A hole in the stamping 4012 is located behind the electrical wipes 4010 to allow the prong of the mating connector to fully penetrate the assembly. An additional hole is punched in the metal 4011 just above the first hole. This hole 4011 will allow operational room for a spring of an additional component of the finished assembly. The second component of the grip assembly is the prong bearing stamping 4002 that performs the function of actually holding the inserted prong when actuated to do so. It is again an electrically conductive metal and must have some degree of brittleness. This is necessary since there is an integral spring 4017 formed into the stamping. Observing the side view of the component, it can be observed that the metal of the spring 4017 is deflected to the left in an arc. The purpose of this spring will be discussed later when the assembled components are described. In addition, a hole is stamped into this component 4015 that allows the prong of the mating plug to penetrate this stamping, without interference. A third component, the back prong support 4003 is shown, and it is a simple stamping with a hole in it 4020 at the same relative location as on the prong receiver 4001 at the lower aperture 4012.

FIG. 26B shows an orthogonal view 4051 and a side view 4052 of the three aforementioned components 4001, 4002, 4003 into an assembly. It is now apparent why the hole 4011 was necessary in the prong receiver component 4001. The spring 4017 protrusion now has a place to be without interference. In this view, it can also be observed that the three lower apertures align to allow penetration by an engaging prong of a plug to be attached.

In FIG. 26C, an additional component is shown, the prong and a partial view of a representative plug with a single prong 4013 and is not part of the completed assembly of this invention but is used to clarify the function of the components in the process of locking the two pieces 4052, 4053 together. The representative plug and prong 4053 assembly is comprised of a prong 4017 and an insulating carrier 4020. It would be generally part of a three-prong plug assembly, but could be a member of any combination of prongs. This system will work for any shape prong, simply by matching the shape of the apertures of the various sub-components to the desired prong to be captured. The prong receiver assembly 4052 is shown inside view and is comprised of the primary electrical prong receiver 4001, the prong bearing stamping 4002, and the back prong support 4003. The electrical prong wipe 4010 is not yet engaged by the mating prong 4017 at this time.

FIG. 26D shows the electrical plug 4053 fully entered into the prong receiver assembly 4052. The aligned apertures of the three components 4001, 4002, 4003 allow the insertion of the prong 4017 through them and into the electrical wipes 4010. At this point, the three apertures are essentially aligned and allow the prong 4017 to pass freely through them. The spring 4017 is shown in the relaxed state.

In FIG. 26E, the prong bearing stamping 4002 is shown with force being applied in the down direction. The top of the aperture in this stamping is now bearing down on the top of the prong 4017. Concurrently, the bottoms of the apertures in primary electrical prong receiver 4001 and the prong bearing stamping 4002 are applying a counterforce in the opposite direction to the prong 4017 resulting in a shearing action. Since the relative strength of the prong is great, the shearing force only acts to capture the prong, and not damage it. The spring 4017 is represented as being compressed at this time. This allows a measurable range of motion for the prong bearing stamping 4002 after initial contact with the prong 4017. This is necessary as prong dimensions change from manufacturer to manufacturer, and the placement of multiple prong receivers in a line necessitate a means to compensate for minor manufacturing variances. This spring 4017 also serves to allow a predetermined level of force to be applied to the prong 4017 for a given range of vertical deflection of the prong bearing stamping 4002. At this point, the prong is captured and “locked”.

FIG. 26F describes a plurality of the aforementioned prong receiver assemblies 4052 contiguously arranged in a linear configuration. All three components of the component 4052 are replicated in a row on a single set of three stampings. The final multiple prong capture assembly 4054 is comprised of three metallic components assembled together.

FIG. 26G illustrates three of the multiple prong capture assembly 4054 arranged beside each other in a manner that produces the aperture locations of each in compliance with the arrangement of prongs of a mating plug. This arrangement is not limited to three conductors, and variations including only one capture plate and two electrical wipe plates are only one example of the variations possible. At least one capture plate assembly is necessary to capture a plug. The assembly is the electrical conduction and capture subassembly 4055.

FIG. 26H represents one possible method of providing the force to the prong bearing stampings 4002. Note the hooked ends 4020 of the prong bearing stampings hooked around the edge of the cam plate 4022. When force is applied to the bearing hole 4023 of the cam plate 4022, the force will be transmitted to the three prong bearing stamping hooks 4020. The cam plate 4022 is shaped to allow some side to side motion of the plate with respect to the prong bearing stamping hooks 4020 to allow for the lateral action associated with the cam motion. The cam 4024 is held in position in bearings 4025 and is actuated by a receiving hex socket 4027 in this example instantiation. The cam 4024 and bearings 4025 are carried in a c-frame later described. When the cam 4024 is rotated via a tool inserted into the hex socket 4027, it rotates eccentrically about an axis of the bearings 4025. The eccentric motion is transmitted to the cam bearing 4002 and into the cam bearing receiver 4023, and hence to motion in the cam plate 4022. Since only a small deflection is necessary, the force amplification of the force applied to the tool (or knob or other means of turning the cam as previously discussed) is amplified many-fold, the force necessary to lock all the plugs is maintained at an easy to achieve level.

FIG. 26I shows the sub-assembly components, dielectric receptacle faces 4058, the electrical conduction and capture subassembly 4055, Cam actuator 4056, cam support c-frame 4057, dielectric separator 4059, and back housing 4050 of an assembled plugstrip 4040 (FIG. 26I). The end caps, cord assembly and electrical attachments are not shown, but are implied in a final assembly, and are attached by traditional means.

The invention has several novel features, among them: Locking and un-locking of all receptacles simultaneously, the spring can be manufactured with characteristics resulting in predictable pull-out tensions for captured plugs, any practical length and number of receptacles is possible from one actuation point, the profile area behind the receptacle face is absolute minimum, simple stampings allow lower cost assembly and manufacturing, and a simple twist operation, either by a tool or other means previously discussed, is all that is necessary to lock and un-lock the assembly.

This section describes a method to construct a number of circuits in a number of devices such as power cords, ATS devices or other devices. Many of the examples relate to compact ATS units. While this is believed to be an important use case, it will be appreciated that the invention is applicable in a variety of other contexts. Accordingly, the following description should be understood as exemplary and not by way of limitation.

In one instantiation, in connection with a power cord associated with an ATS, the power surge circuit of the present invention can be implemented in a very small form factor in-line. This has a number of advantages that are detailed below. A point to note is that depending on the design of a given ATS unit, the in-line power surge circuit can be put on the output or one or both power inputs of the ATS unit. This is because an ATS that is designed and/or has been set to use the "A" side as the preferred and primary power source would only need the "B side" input (secondary power source) to have a power surge protected power cord. Most ATS devices have a preferred power source, which is the "A" primary source. One ATS developed by Zonit Structural Solutions, of Boulder, Colorado, (Zonit) allows the user to select which source to use, as the primary source and change the primary source as desired. The ATS will use the "A" source if it is available and optionally for some designs that measure power quality, of sufficient quality. An "A side" to "B side" ATS transfer is done as soon as the "A" power drops far enough and long enough. The normal definition is a power quality disturbance can last up to 4 milliseconds, after which it becomes a power outage. Therefore most ATS units monitor the "A" side power and then switch to the "B" side power as fast as possible after 4 milliseconds has passed.

This means that if the "A" side and "B" side power are of different phases (this is very common in modern data centers that use two hot phases for 208V power distribution, or three phase power distribution which has become the most common method due to increasing power levels at the rack) the difference in voltage levels between the power sources can cause the high transient current and/or voltage surges in the circumstances described above. It should be noted that such differences in voltage levels can therefore result from a difference in voltage between, or between a voltage due to a capacitor charged by one of the signals and the voltage of the other signal, the signals, not a surge in one of the signals. Accordingly, the problem is not addressed by surge protection circuits in one or both of the power lines. This is not a problem when transferring from the "B side" to the "A side". This is true because when a "B" side to "A" side transfer is performed, both sides have power up and running and potentially of sufficient quality. In this case the ATS can time the transfer to occur at the zero crossing of the "A" side power being transferred to, so no high transient currents and/or voltage events normally occur.

Figure 28:
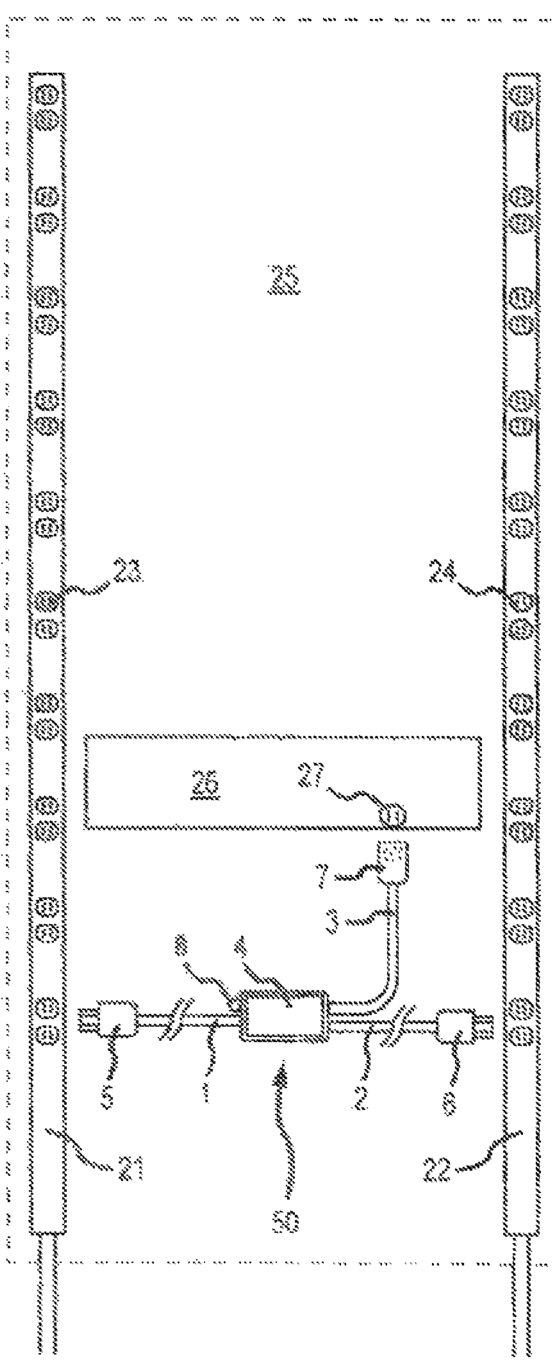
FIG. 28 shows an example of an operating environment of an ATS which may include a surge suppression circuit in accordance with the present invention.

FIG. 28 below shows the operating environment of an ATS (in this case, one form factor of a micro ATS developed by Zonit). Thereafter, an example of the surge suppression or surge control circuit and various formfactors and alternate implementations will be described.

An exemplary diagram of an application of an automatic transfer switch 2850 is shown in FIG. 28. Equipment 2826 may be mounted in a rack 2825 having a primary power strip 2821 and a secondary power strip 2822 mounted on opposite sides of the rack 2825. It will be appreciated that outlets associated with primary and secondary power sources may alternatively be provided in a single plug strip, from a rack mounted power supply unit, or via other means. The illustrated power strips 2821 and 2822 include multiple outlets 2823 and 2824, respectively. The primary and secondary input plugs 2805, 2806 of the module 2804 may be plugged into the outlets 2823, 2824, respectively, and the output receptacle 2807 of the module 2804 may be coupled to a plug 2827 on the equipment 2826. In normal use, this application may be duplicated for as many pieces of equipment as are mounted in the rack 2825. In operation, the equipment 2826 may receive power from the primary power strip 2821, through the primary input cord 2801 and the output cord 2803. When an interruption of the voltage on the primary power strip 2821 occurs, the automatic transfer switch 2850 may then couple the equipment 2826 to the secondary power strip 2822, through the secondary input cord 2802 and the output cord 2803. In this manner, power redundancy is provided to the equipment 2826.

The automatic transfer switch 2850 may be particularly well-suited for high-density applications where the rack 2825 may contain forty or more pieces of equipment. For example, in such a case, forty automatic transfer switches 2850 with eighty input plugs 2805, 2806 and forty output receptacles 2807 may be needed. Typically, this density requires careful attention to cord management in order to prevent blocking of air flow that may inhibit cooling of the equipment mounted in rack 2825. Accordingly, in such applications, the automatic transfer switch 2850 reduces this problem by including cords that have lengths that are suited for the specific application.

Various form factors (sizes and shapes) of the ATS unit are described below. The shape of the illustrated module 4 is substantially rectangular, in both end and side views, with the output cord 2803 and one of the input cords 2802 attached to one end of the module 2804 and the other input cord 2801 attached to the opposite end. Also, the cross-sectional area of the module 2804 may be less than about 3 square inches (with each axis no more than about 1.75 inches) and, more preferably, less than about 2 square inches, and the length of the module 2804 may be less than 5 inches, with a total volume contained within the module 2804 of less than 10 and, more preferably, less than about 7 cubic inches.

One distinguishing feature of this embodiment of the automatic transfer switch 2850 is that the relay 2812 does not require any additional control circuits to operate. The absence of relay control circuits permits the automatic transfer switch function to be contained in a much smaller space than that required by switches with complex circuitry (e.g., high-speed controllers, optical isolators, current sensors, synchronizing circuits, or the like). The use of a DPDT relay (or matched multiple relays) to ensure break-before-make connections prevents connecting the two power sources in parallel, which may cause damage to equipment. The automatic transfer switch 50 takes advantage of the inherent energy storage capability of most common EDP equipment to operate the equipment during the short time interval (e.g., a few milliseconds) between the breaking of a connection from one source and the making of a connection to the other source. In this manner, the automatic transfer switch 2850 provides the automatic transfer function in less space and at lower cost than traditional automatic transfer switches.

The automatic transfer switch 2850 also provides for switching power sources right at the input to the equipment, thereby minimizing the probability of a failure between the switch and the equipment. Additionally, the automatic transfer switch 50 occupies a relatively small space, and it provides for better cable management in rack-mounted equipment. The length of the cords may allow placement of the module 2804 adjacent to the back panel of each piece of equipment, and may allow connection to power strips without excess cord length. This configuration eliminates the tangle of power cords usually associated with rack-mounted equipment. Although the automatic transfer switch is shown as being positioned between a piece of equipment and a power strip or other power source receptacles, it will be appreciated that the automatic transfer switch may alternatively or additionally be located elsewhere in the power distribution topology. For example, the switch may be located in a standard duplex receptacle, in a dual power source plug strip, upstream from a pair of single power source plug strips, in a uniform power distribution (UPD) module, upstream from a pair of UPD modules or otherwise in connection with a leaf, branch or root of the topology of a power distribution system. In addition, the switch may be used in connection with interleaved UPD modules as described in PCT Application PCT/US2009/038427 entitled "Power Distribution Systems and Methodology" which claims priority from U.S. Provisional Application 61/039,716, both of which are incorporated by reference herein, to provide further options to avoid disruption of power delivery. Some of the advantages of the power cord in-line surge control method are listed below. See FIGS. 30-33 for some example instantiations that show details of where the circuit can be used in the context of a micro ATS implemented between equipment and a plug strip.

Figure 29:
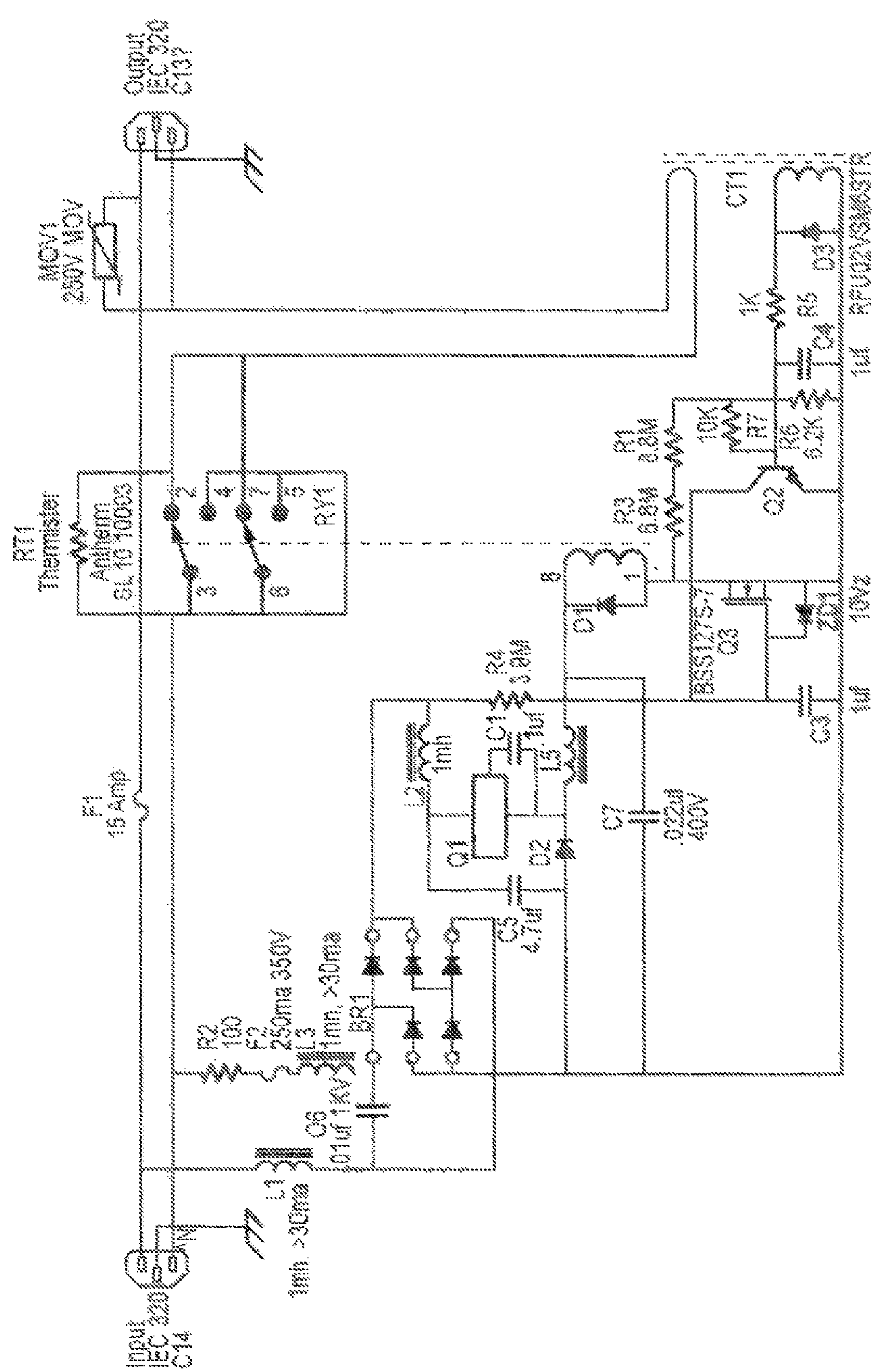
FIG. 29 shows one possible instantiation of a compact power surge suppression circuit in accordance with the present invention

1. The power surge circuit—a sample circuit design, nicknamed "ZCrush", is shown in FIG. 29—can be placed in the power topology anywhere it is required using a variety of forms.
   a. As an additional power cord or power module (the power surge circuit is placed in metal or plastic molded enclosure that is shaped as needed for the application and is as small as is practical; it may be connected in-line via connectors, hardwire connection(s), or plugs and receptacles or any combination of the these that is needed for the application) placed in the power path at the required location. This is a convenient implementation to retrofit to an existing ATS deployment.
   b. As one or both input power cords to an ATS unit. For units with input receptacles, this is a convenient implementation to retrofit to an existing ATS deployment.
   c. As the output power cord of an ATS unit.
   d. As the connecting power cord between an ATS unit that has output receptacles and the device being powered. The Zonit locking power cord technologies incorporated above by reference make many of these options easy to implement in a secure fashion.
2. It can be integrated into a strain relief device, such as the Zonit Micro ATS "Y" cord model strain relief.
3. It can be integrated into the case of small form factor ATS units, such as the Zonit Micro ATS or the Zonit Mini-ATS in any of the Mini-ATS instantiations.
4. It can be used anywhere in a power path where a high transient current and/or voltage event needs to be controlled. Its small form factor makes it easier to use as an integrated solution (in a device enclosure) or external solution (outside the enclosure) than larger, bulkier traditional solutions. This is a key advantage, traditional methods just do not fit in the space required.
5. It can be integrated into the circuitry of an ATS by adding the transient surge circuit to the design of the ATS. This can be done by adding it to an existing PCB layout or may be done by implementing it a separate daughterboard that is connected and mounted as needed by the specific application. The latter approach may be desirable because it has minimal regulatory agency impacts such as on Underwriters Laboratory certification.

In yet another instantiation, an ATS can be designed to not be vulnerable to transient current and/or voltage surges. Example designs are shown in the incorporated documents noted above. This design uses a combination of relay and silicon switching methods to eliminate the issue as described in the incorporated documents.

The surge suppression circuit of FIG. 29 limits the currents experienced at the contact surface, even in surge scenarios as noted above. This can be done by limiting the voltage experienced at the contact surface (e.g., by controlling the voltage or relative voltage on one or both power lines) or by ensuring that there is sufficient impedance during the critical time period. The circuit of FIG. 29 ensures that there is resistance to limit peak current during the critical time.

Figure 30:
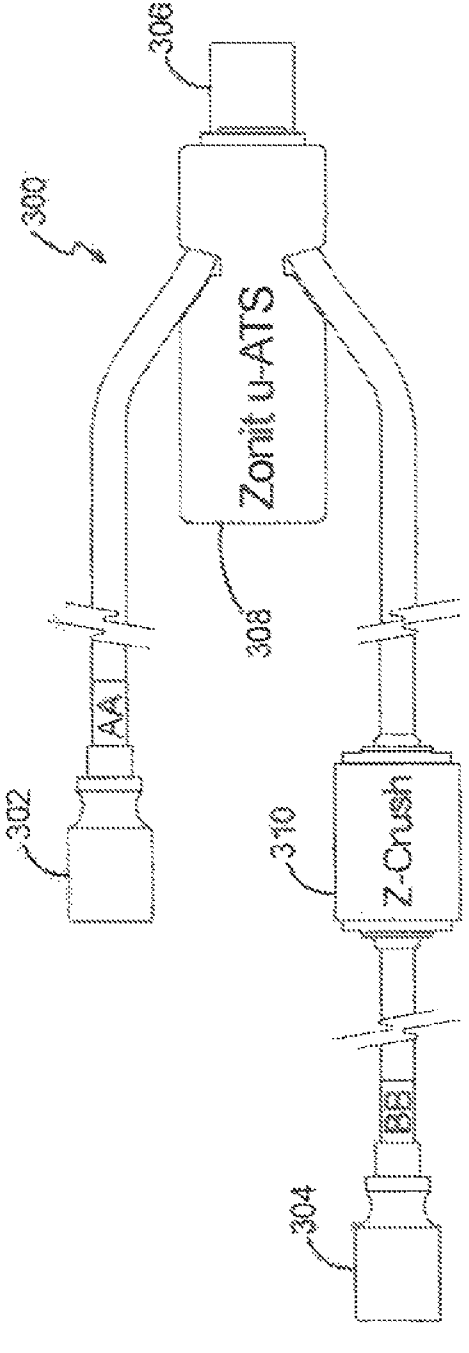
FIGS. 30-33 show examples of several possible form factors to implement one aspect of the invention in an external device or as part of an ATS design. The Zonit Micro Automatic Transfer Switch is used as a representative example of a very compact ATS.

FIGS. 30-33 show various form factors of a surge suppression circuit that can be used in connection with an ATS or other vulnerable devices in accordance with the present invention. FIG. 30 shows an ATS system 3000 with an integrated in-line surge suppression circuit. Specifically, the system 3000 includes a primary power cord terminating in cord cap 3302 for receiving power from a primary power source and a secondary power cord terminating in cord cap 3304 for receiving power from a secondary power source. The system 3000 further includes an output 3306 for connecting to an output load such as a piece of equipment. In the illustrated example, the output 3306 is a female outlet such that the system 3000 can be directly connected to a male power port of a piece of equipment. The system 3000 further includes a micro-ATS module 3308 operative to sense a power outage or degradation of signal quality for the power signal of at least the primary power source and, in response, to switch the power supply from the primary source to the secondary power source. A surge suppression circuit 3310 is interposed in the secondary power cord between the module 3308 and the cord cap 3304.

Figure 31:
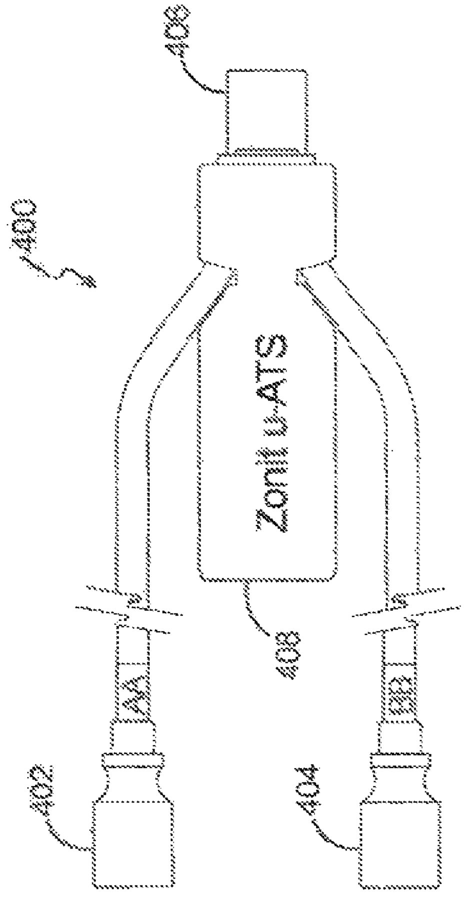

FIG. 31 shows an ATS system 3100 that is similar to the system of FIG. 30 in that it includes a primary power cord terminating in a cord cap 3102, a secondary power cord terminating in a cord cap 3104, and an output 3106 that can be directly connected to a piece of equipment. However, in the embodiment of FIG. 31, the micro-ATS module and the surge suppression circuit are both provided within housing 3108. The surge suppression circuit may be operative to suppress surges on the primary power line, the secondary power line, or both. Alternatively, the surge suppression circuit may suppress surges on the output circuit.

Figure 32:
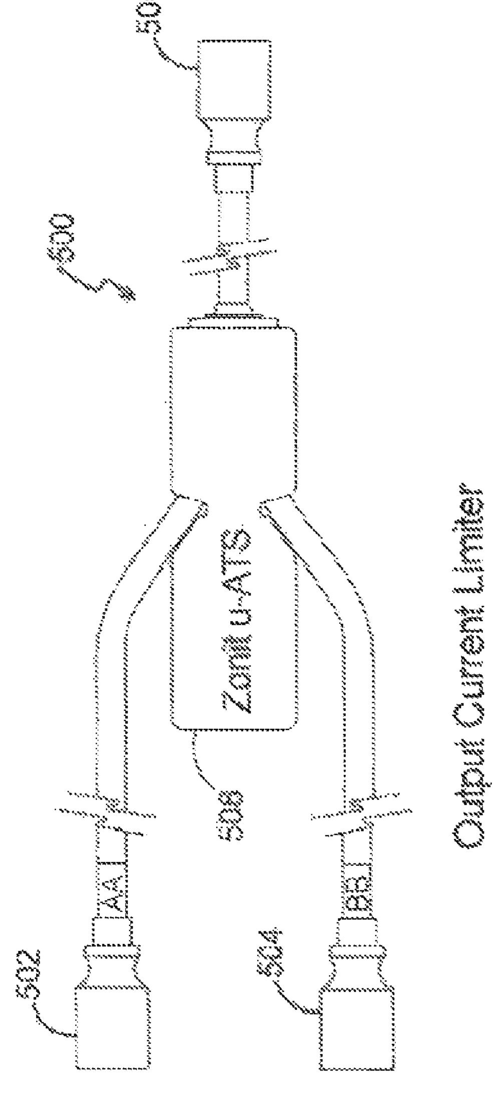

The ATS system 3200 of FIG. 32 is similar to the system of FIG. 31 in that it includes a primary power cord terminating in a cord cap 3202, a secondary power cord terminating in a cord cap 3204, an output 3206, and a housing 3208 incorporating a micro-ATS module and a surge suppression circuit as described above. However, the output 3206 is connected to the housing 3208 by a power cord such that the housing 3208 is not directly connected to a power port of a piece of equipment.

Figure 33:
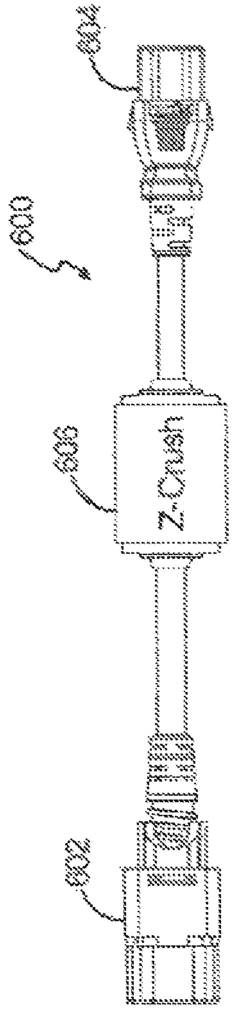

FIG. 33 shows a standalone surge suppression power cord system 3300 in accordance with the present invention. The system 3300 includes a power cord having a first cord cap 3302 at a first end thereof and a second cord cap 3304 at a second end thereof. For example, the first cord cap 3302 may include a female outlet for connecting to an input of an ATS or another piece of equipment, and the second cord cap 3304 may include a male plug for connecting to a plug strip or other power source. A surge suppression circuit 3306 is interposed in line on the power cord between the first cord cap 3302 and the second cord cap 3304. The system 3300 can thus be used in a variety of contexts including as an aftermarket product to protect an ATS (e.g., by connecting to either or both inputs of the ATS or to the output of the ATS) or another vulnerable device.

Figure 40:
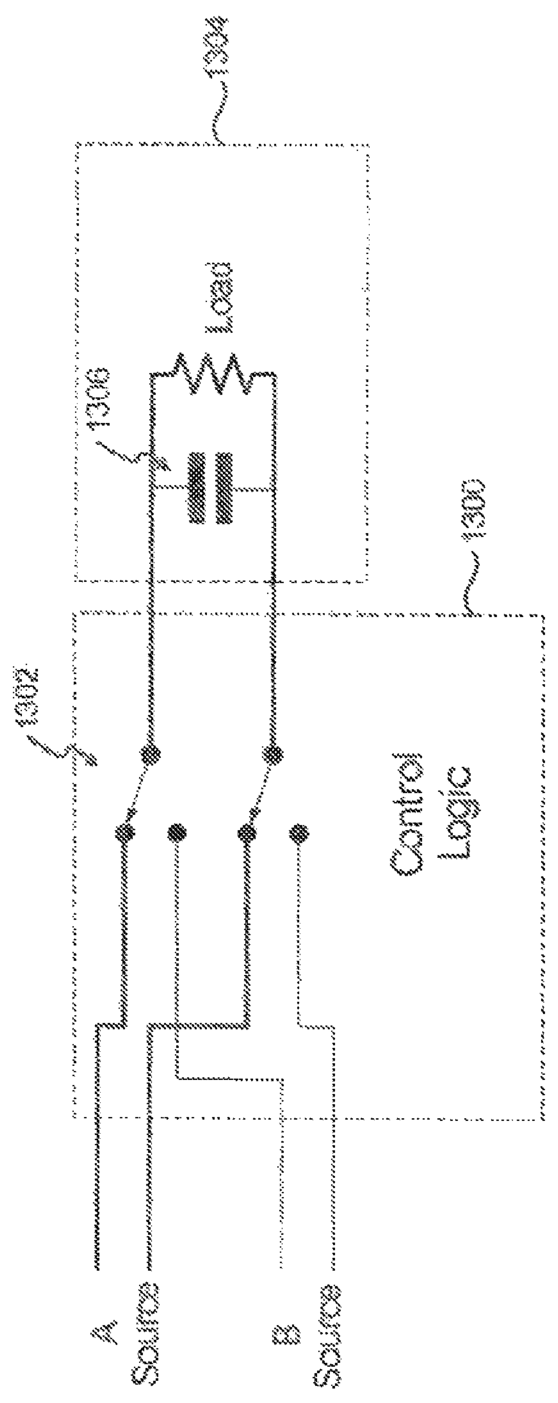
FIG. 40 is a schematic diagram of an ATS that may be used with a surge suppression circuit in accordance with the present invention.

FIG. 40 shows a very basic diagram of a transfer switch 4000 in connection with which a surge suppression may be employed as described below. The reference numbers of FIG. 40 are carried over to corresponding elements in FIGS. 41-46. The internal relay 4302 is shown in the connected to A position. The output is connected to a load 4304 that has a capacitor 4306 across the hot leads of the output of the ATS 4300. A normal transfer would possibly result in the energy stored in the capacitor 4306 being discharged at the moment when the contacts make connection to the B side relay contacts. Those contacts will have voltages present that may be opposing the voltage stored in the capacitor 4306 when the disconnection from the A side occurs.

Figure 38:
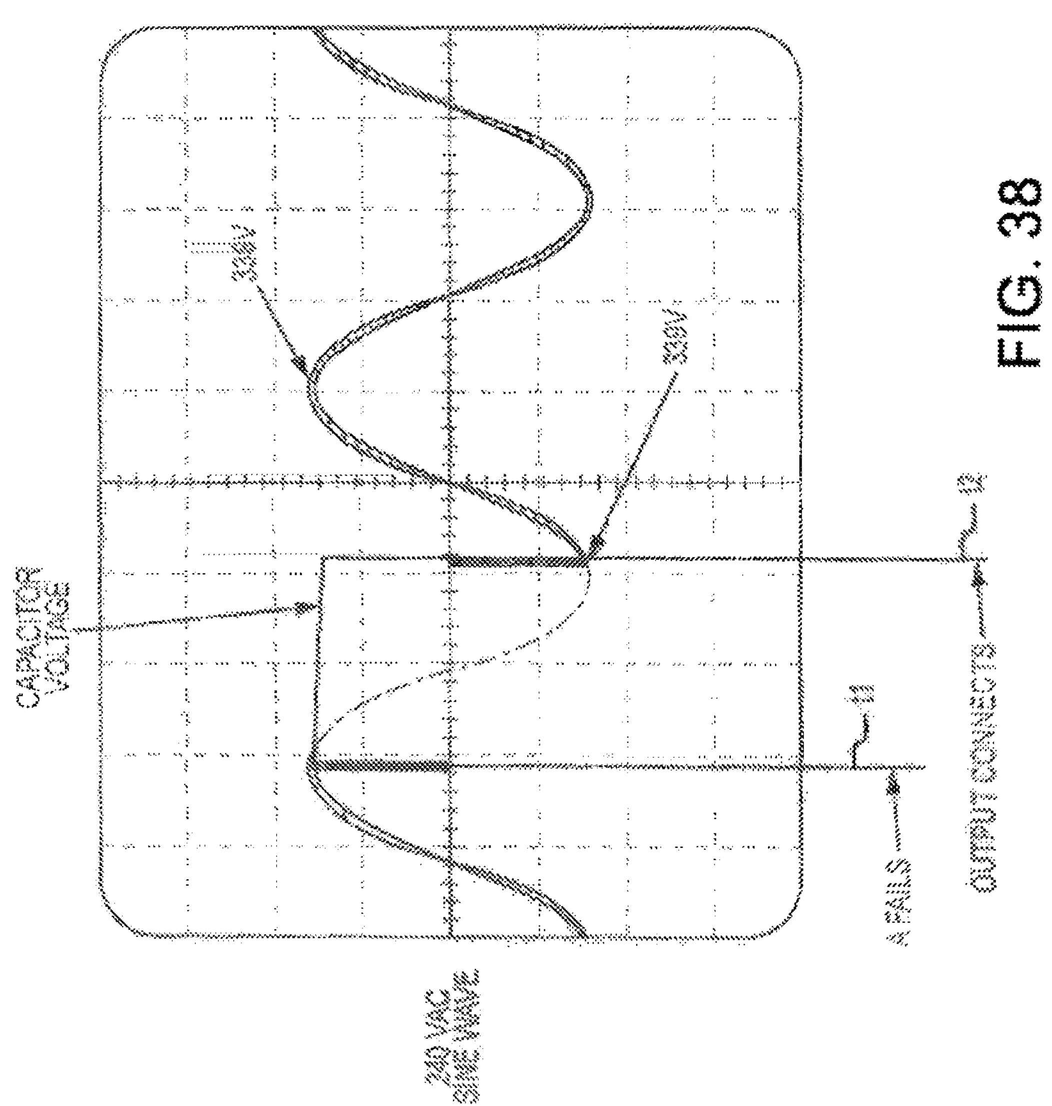
FIG. 38 is a voltage versus time diagram illustrating the surge conditions that are addressed in accordance with the present invention.
Figure 39:
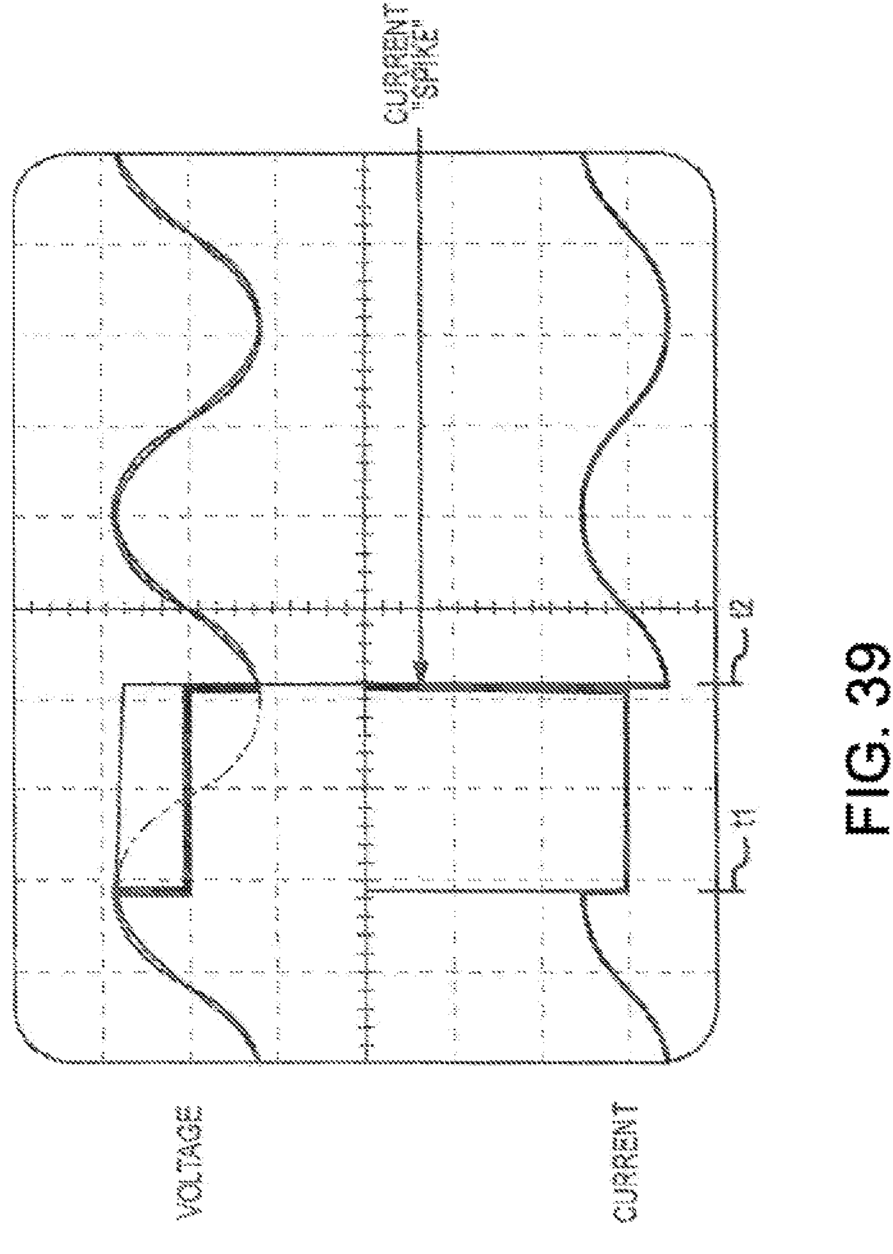
FIG. 39 shows voltage and current diagrams corresponding to FIG. 11.

FIGS. 38-39 show the relationship of these voltages and possible effect on the output current the relay must conduct. The current "spike" shown, at time t2, is the result of the positive capacitor charge remaining from the time, t1, when the AC voltage became disconnected from the input. It is shown in this example that the capacitor has not discharged significantly due to a very minimal load resistance. This can be true for a variety of reasons. In particular, the internal capacitance of the load power supply may have large energy storage capacitors that are only charged at the very peak of the AC cycles. The remainder of the AC cycle is always at a voltage lower than the voltage stored in the internal storage capacitors of the power supply. This leaves no path for the energy stored in the external line connected capacitor to discharge to, so the voltage, and hence stored energy, remains until the ATS connection to the power line occurs.

Figure 41:
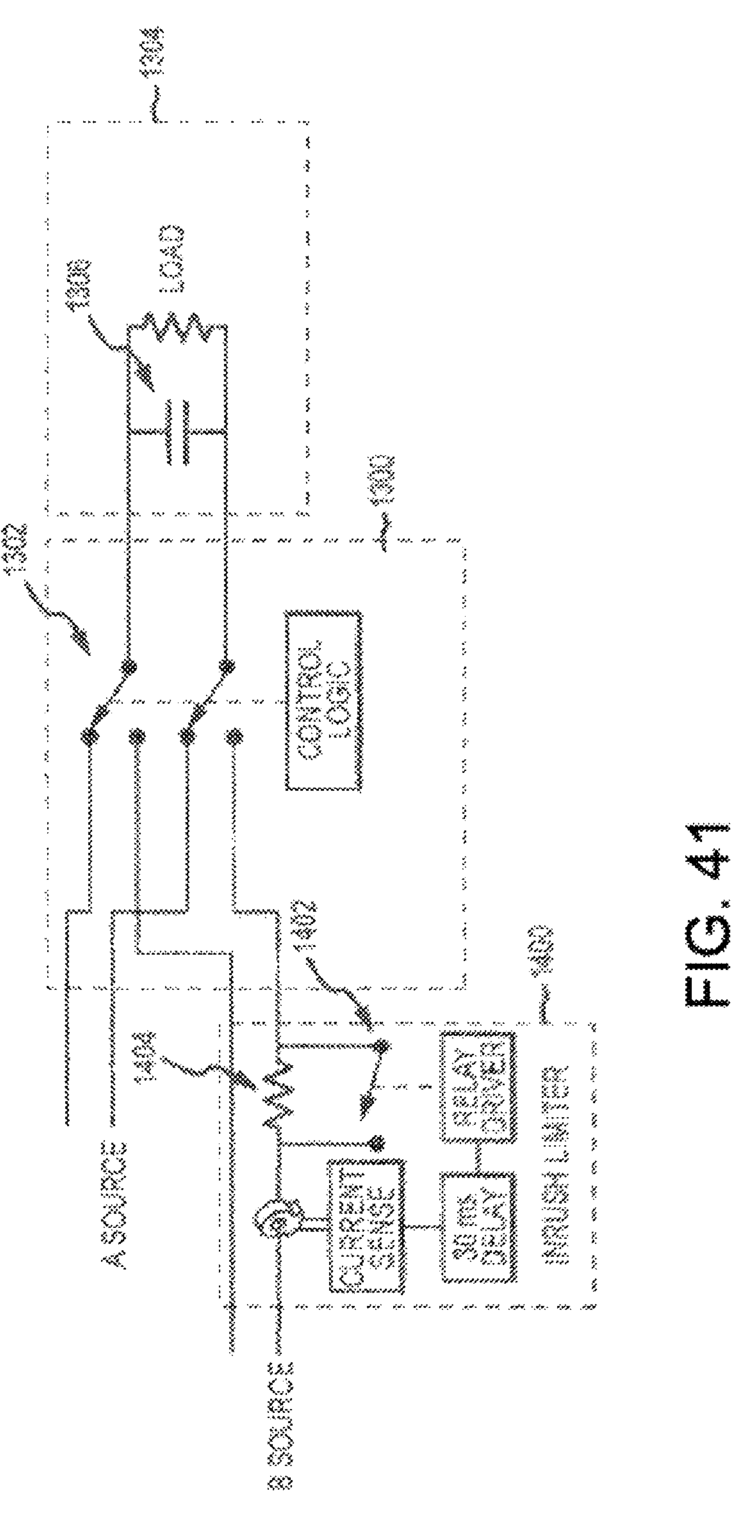
FIGS. 41-43 are schematic diagrams illustrating the operation of an external surge suppression circuit in accordance with the present invention.
Figure 42:
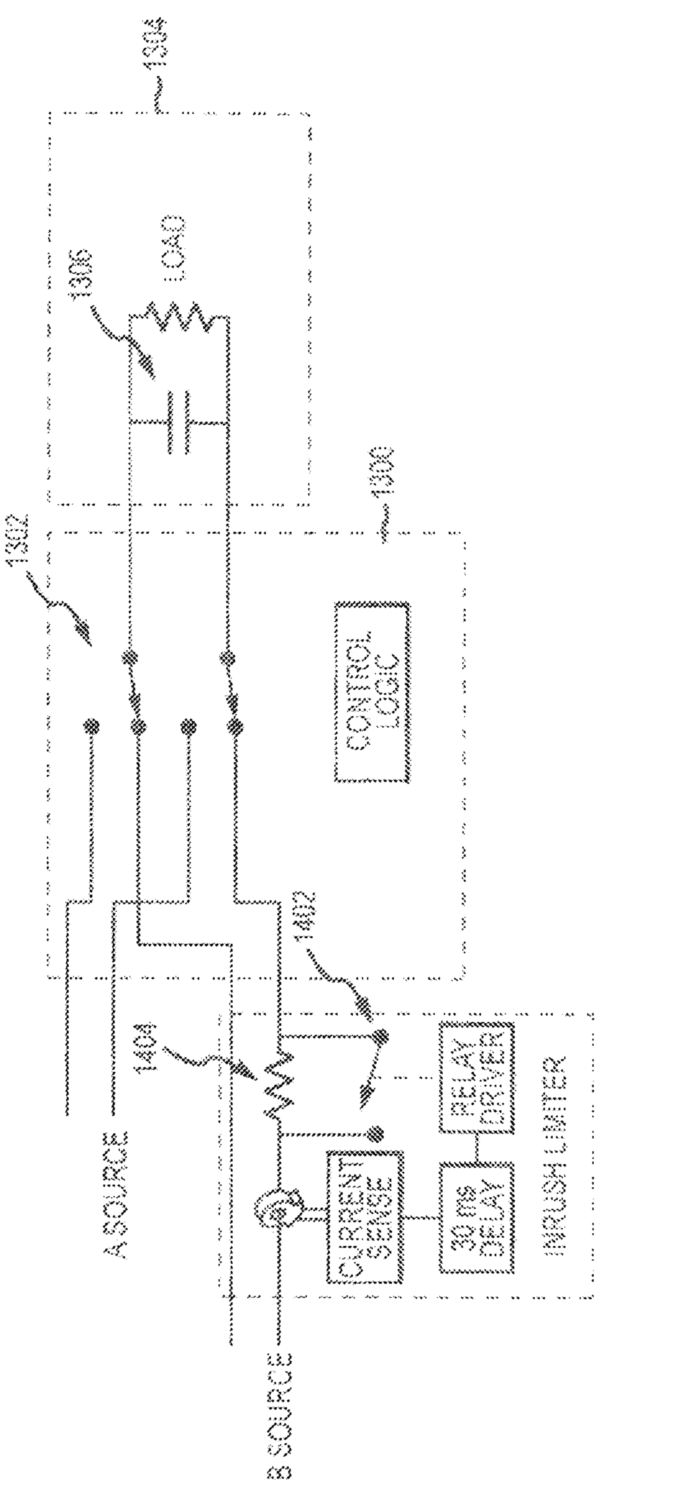
Figure 43:
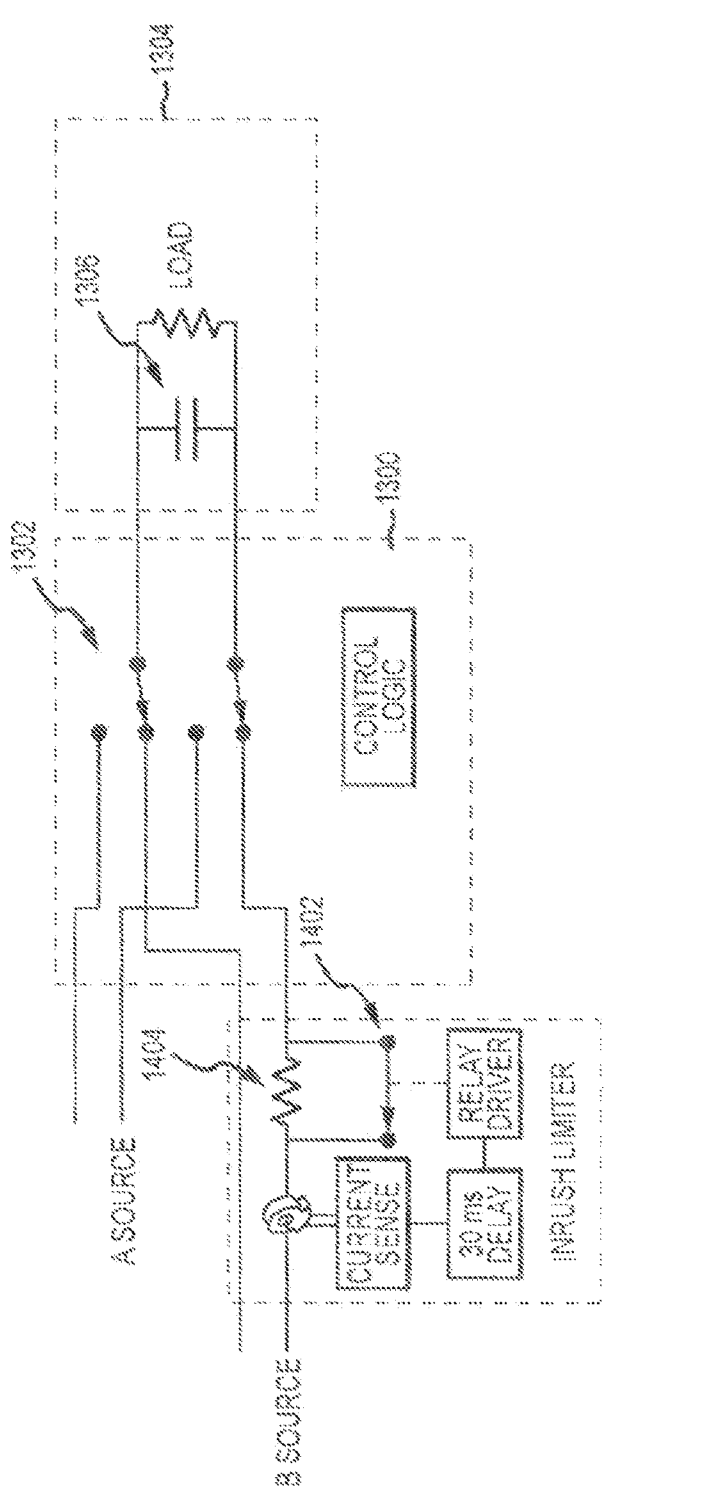

Referring to FIGS. 41-43, to prevent the currents from becoming excessively high, or to a level that could cause the contacts of a relay based ATS to become welded together, a simple surge suppression circuit 4100, or inrush limiter, is utilized for applications where the inrush limiter is connected internally to the ATS 4300. FIG. 41 shows the ATS 4300 with the circuit 4400 in normal operation. Current flows through the ATS relay 4302 to the load 4304 and back as shown.

When the A side power fails, the ATS begins by disconnecting the power from the A side source, and moving the relays to the opposite input, the B side power source as shown in FIG. 42. At that time, the relay 4402 shown in the Inrush limiter circuit 4400 is presently open. It is a relay that is normally open, or a so-called form A relay.

FIG. 42 shows the current path through the ATS 4302 to the load 4304 shortly after the completion of the transfer. Note that the resistor 4404 in series with that power path located inside of the Inrush Limiter circuit 4400. This resistance is generally very small, about 4 to 10 ohms. But it is sufficient to limit the peak current from the discharging capacity 4306 located in the load 4304 as shown. For example, on a 120 VAC circuit, the peak voltage possible is about 170 Volts. If the AC sine wave is exactly opposite when the transfer completes, the peak voltage at that time could be −170 volts, and when summed with the residual voltage stored in the capacitor (as much as +170 volts), the difference is 340 volts. Thus, if a 10 ohm resistor is in series with this, the peak current is limited to 34 Amps. Various resistances could be used for specific applications, but in the case of the Zonit uATS products we use a 10 ohm resistor for products in the 15 amp and under group. FIG. 43 shows that the Inrush limiter driver circuit 4400 has completed about a 30 millisecond power delay to the Inrush limiter relay 4402 and has released that relay 4402. The current now returns to flowing through the contacts of the Inrush limiter relay 4402 and not through the resistor 4404. This saves energy and delivers the full voltage to the load 4304.

The Zonit uATS products return power from the B side to the A side always at the zero voltage crossing point of the AC cycle. See description of Zonit uATS in the incorporated cases for clarification. Since the transfers from B side to A side occur at the zero crossing, there will be no energy stored in the capacitor to dissipate when the contacts connect the A side power source to the load, and thus no excessive currents will occur.

Figures 44, 45:
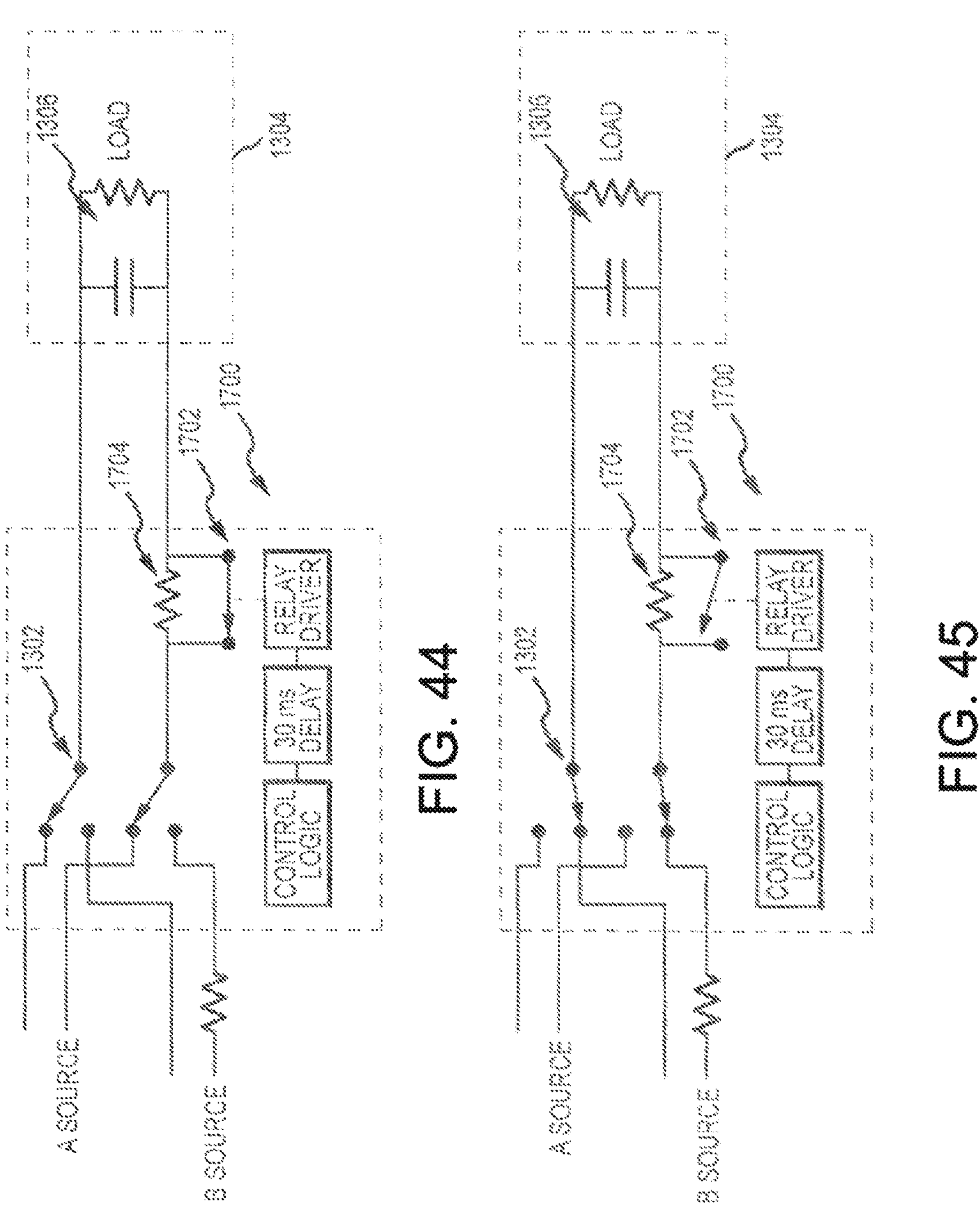
FIGS. 44-46 are schematic diagrams illustrating the operation of an internal surge suppression circuit in accordance with the present invention.
Figure 46:
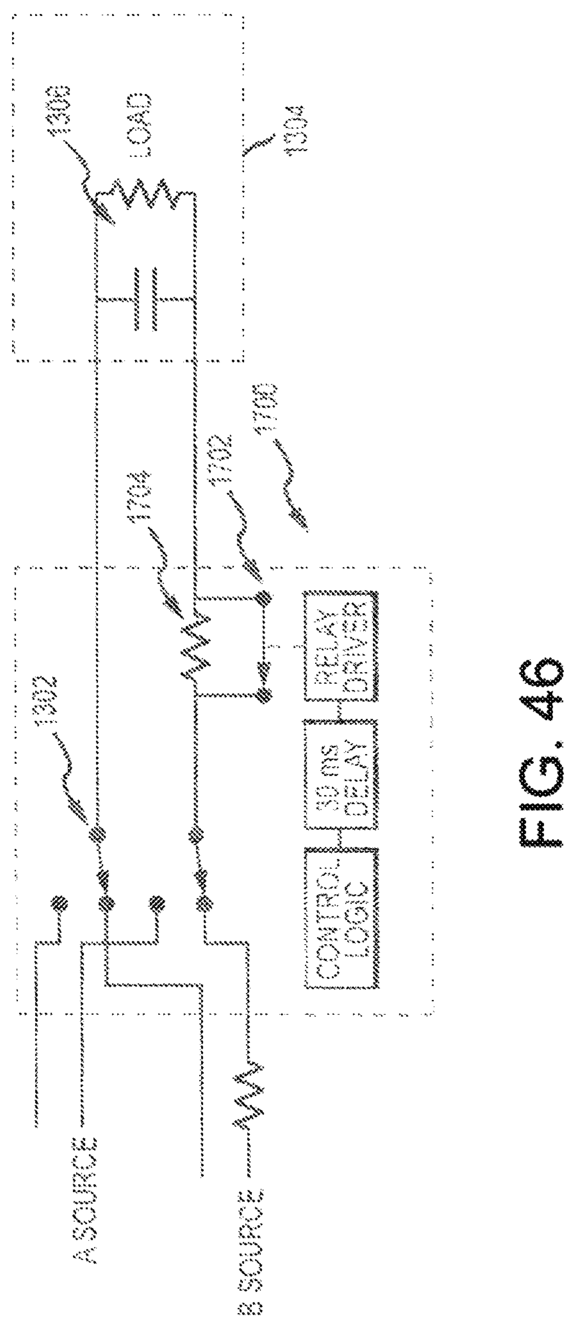

FIGS. 44-46 show a simple circuit for applications where the inrush limiter is connected internally to the ATS housing (see FIGS. 31-32). FIG. 44 shows the ATS with the internal circuit 4700 in normal operation. Current flows through the ATS relay 4302 to the load 4304 and back as shown. It is returning through an additional relay 4702 that is normally closed (NC). A resistor 4704 is shown across the contacts of that relay contact, but it does nothing since all the current is bypassed around the resistor 4304 through the contacts.

When the A side power fails, the ATS begins by disconnecting the power from the A side source, and moving the relays 1302 to the opposite input, the B side power source. At that time, the relay 4702 shown in the Inrush limiter section on the output of the transferring relays is presently closed. It is a relay that is normally closed, or a so-called form B relay. At the very instant that power is sent to the ATS relays to commence transferring to the B side, power is also sent to the inrush limiter relay on the output of the transfer relays causing it also to start to open.

FIG. 45 shows the current path through the ATS to the load shortly after the completion of the transfer. Note that the resistor 4704 in series with that power path is now conducting the power. The relay contacts across the resistor 4704 have opened simultaneous with the transfer, and thus, by the time power is restored to the load through the ATS contacts, that power must go through the resistor 4704. This resistance is generally very small, about 4 to 10 ohms. But it is sufficient to limit the peak current from the discharging capacitor located in the load 4304 as shown. For example, on a 120 VAC circuit, the peak voltage possible is about 170 Volts. If the AC sine wave is exactly opposite when the transfer completes, the peak voltage at that time could be −170 volts, and when summed with the residual voltage stored in the capacitor (as much as +170 volts), the difference is 340 volts. Thus, if a 10 ohm resistor is in series with this, the peak current is limited to 34 Amps. Various resistances could be used for specific applications, but in the case of the Zonit uATS products we use a 10 ohm resistor for products in the 15 amp and under group.

FIG. 46 shows that the Inrush limiter detector circuit 4600 has completed about a 30 millisecond power delivery to the Inrush Limiter relay 4702 and has released that relay 4702. The current now returns to flowing through the contacts of the Inrush limiter relay 4702 and not through the resistor 4704. This saves energy and delivers the full voltage to the load.

The Zonit uATS products return power from the B side to the A side always at the zero voltage crossing point of the AC cycle. See description of Zonit uATS for clarification. Some products, such as the Zonit uATS Industrial will not necessarily return the power to the A side of the zero Crossing. Thus, the Inrush limiting function may be necessary on that half of the cycle. Since the Inrush limiter relay is driven by any transition of the main ATS relay, The 30 millisecond routing of power through the resistor will also occur when the Main ATS relay releases to restore power to the A side.

Figure 34A:
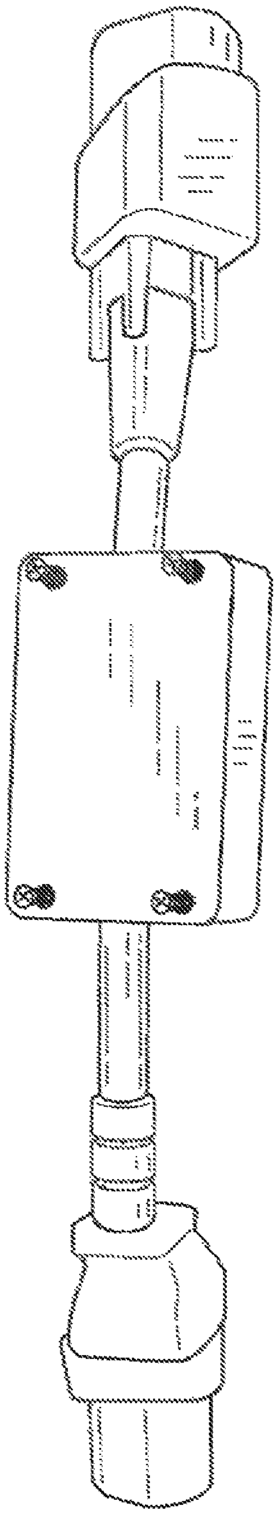
FIGS. 34A-34C are photographs showing one possible instantiation of a surge suppression circuit in a power cord in accordance with the present invention.
Figure 34B:
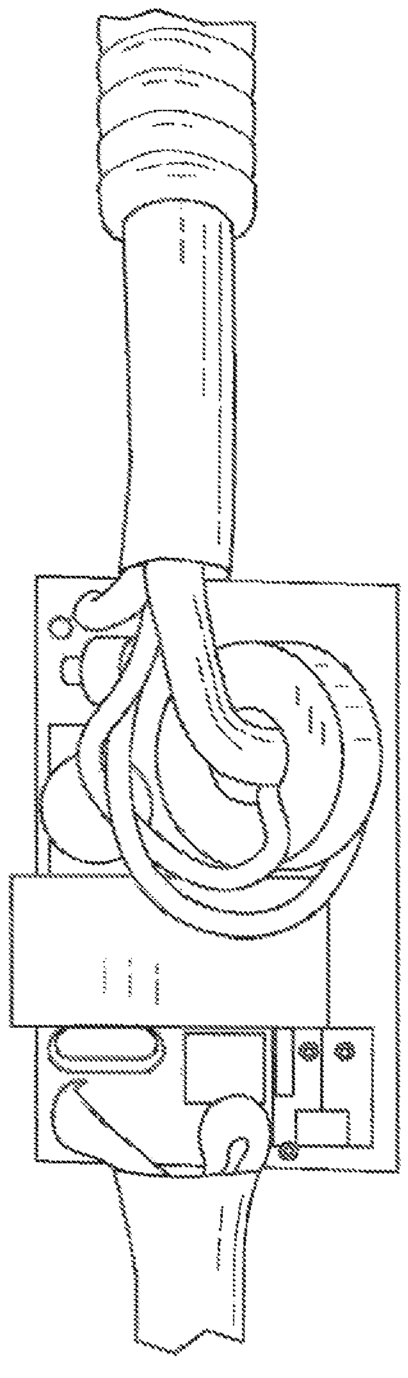
Figure 34C:
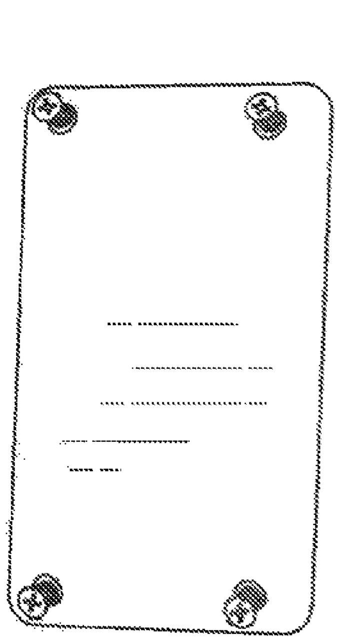
Figure 34C:
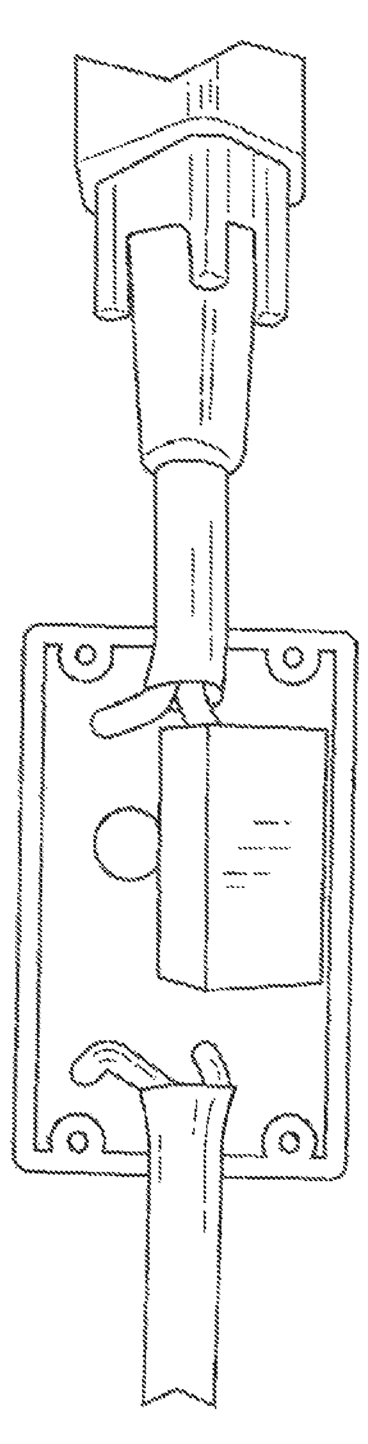

FIGS. 34A-34C are photographs showing a power cord with an in-line surge suppression circuit similar to that illustrated in FIG. 33. In particular, FIG. 34A shows a perspective view of the power cord with the in-line surge suppression circuit housing mounted thereon. FIG. 34B shows a close-up of the in-line surge suppression circuit with a portion of the housing removed. A ruler is also shown in the photograph to provide an indication of the size of the housing. In this case, the housing has a maximum dimension of about 55 mm. FIG. 34C shows a close-up of the in-line surge suppression circuit with a portion of the housing removed (opposite that of FIG. 34B).

In accordance with another aspect of the invention, the relays used in a relay-based ATS can be designed and/or conditioned to lower their vulnerability to transient current and/or voltage surges and the resultant micro-welding possibility. Relay conditioning can be done to relays before they are installed during ATS manufacturing or it can be done to the relays of already manufactured ATS units which is convenient for application of the process in the field or as a re-manufacturing process. The conditioning process can result in significant increases in the resistance of the relay to point micro-welding, allowing it to reliably tolerate 2× or more high transient current and/or voltage events. An example is that for general purpose 2GRL relays used, for example, in a data center environment, the point micro welding resistance can be increased from approximately 1 microfarad of capacitance discharge to 2 microfarads of capacitance discharge.

Figure 36:
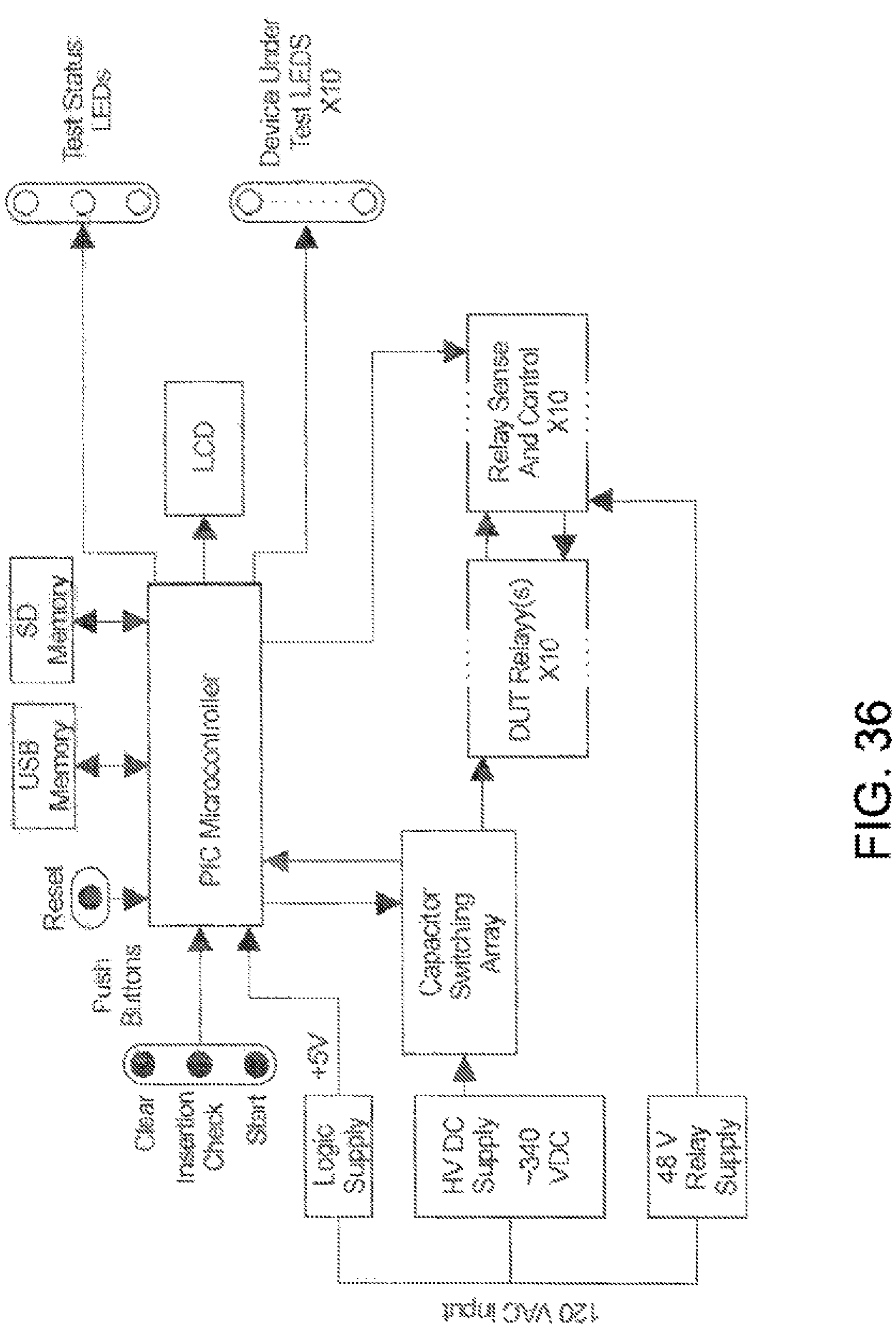
FIG. 36 shows one possible instantiation of a relay conditioner in accordance with the present invention that tests, times and groups tested relays as described herein.

To condition relays, an apparatus is provided. An example relay conditioning apparatus is shown in FIG. 36. This apparatus applies specific surge signals, which can be programmed as needed to condition the relays. These surge currents arc across the relay contacts and cause the topology and condition of the relay contacts to change. These changes increase the resistance of the relay to point micro-welding when exposed to high transient current and/or voltage events. The changes to the relay contacts can be described as follows. General purpose relays are built with contact materials and shapes that are optimized to both give high actuation count service lifetime and low electrical resistance across the contacts when they are closed and touching. Sufficient resistance to arcing and contact welding is also part of the design process, but is usually only considered in relation to what is deemed a reasonable current and/or voltage limit that is appropriate for the intended application. Typically, the contacts are in the shape of a section of a large radius sphere. Think of two very large beach balls touching. This means that the contacts touch each other at a single point. After enough usage this point will flatten out somewhat to a small flat area due to mechanical deformation from the contacts striking each other as they close. If arcing has occurred that flat area may be pitted and somewhat irregular depending on the usage history.

Figure 35A:
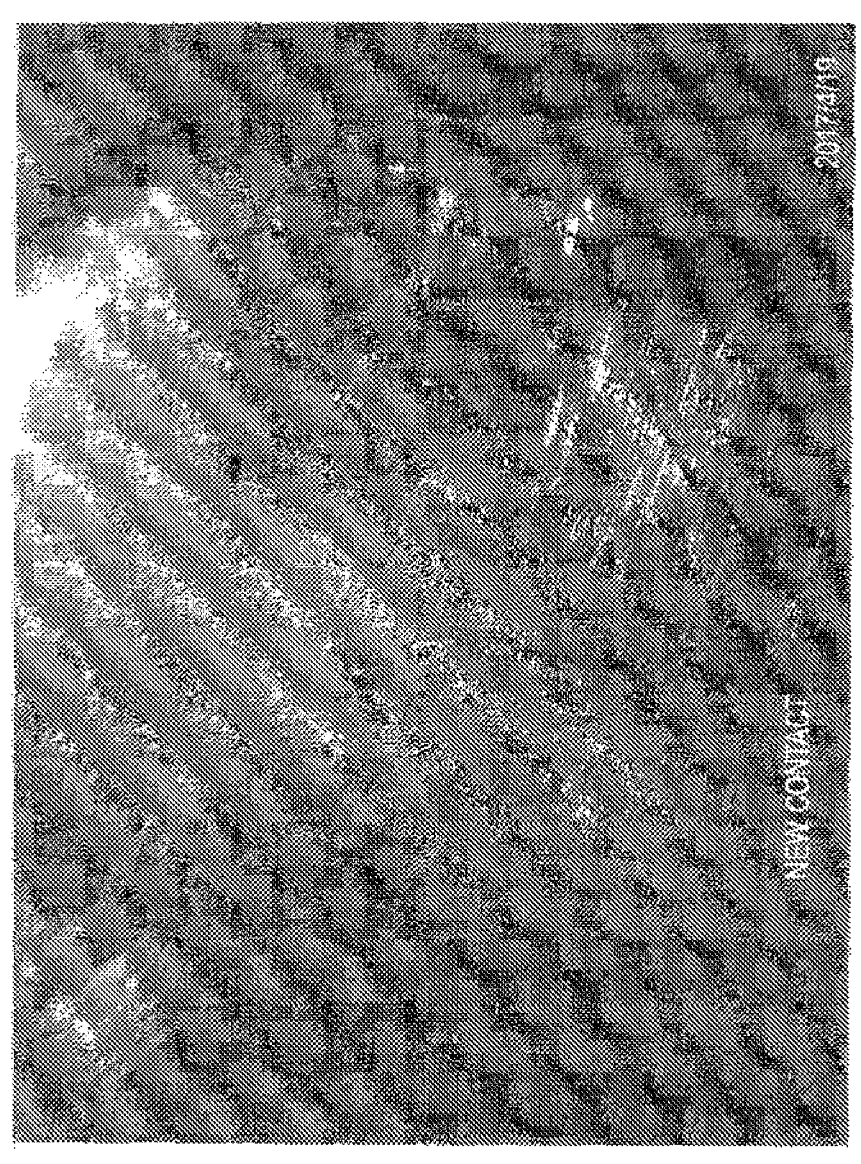
FIGS. 35A-35C are photographs sharing a contact surface without conditioning and with different numbers of conditioning cycles in accordance with the present invention.
Figure 35B:
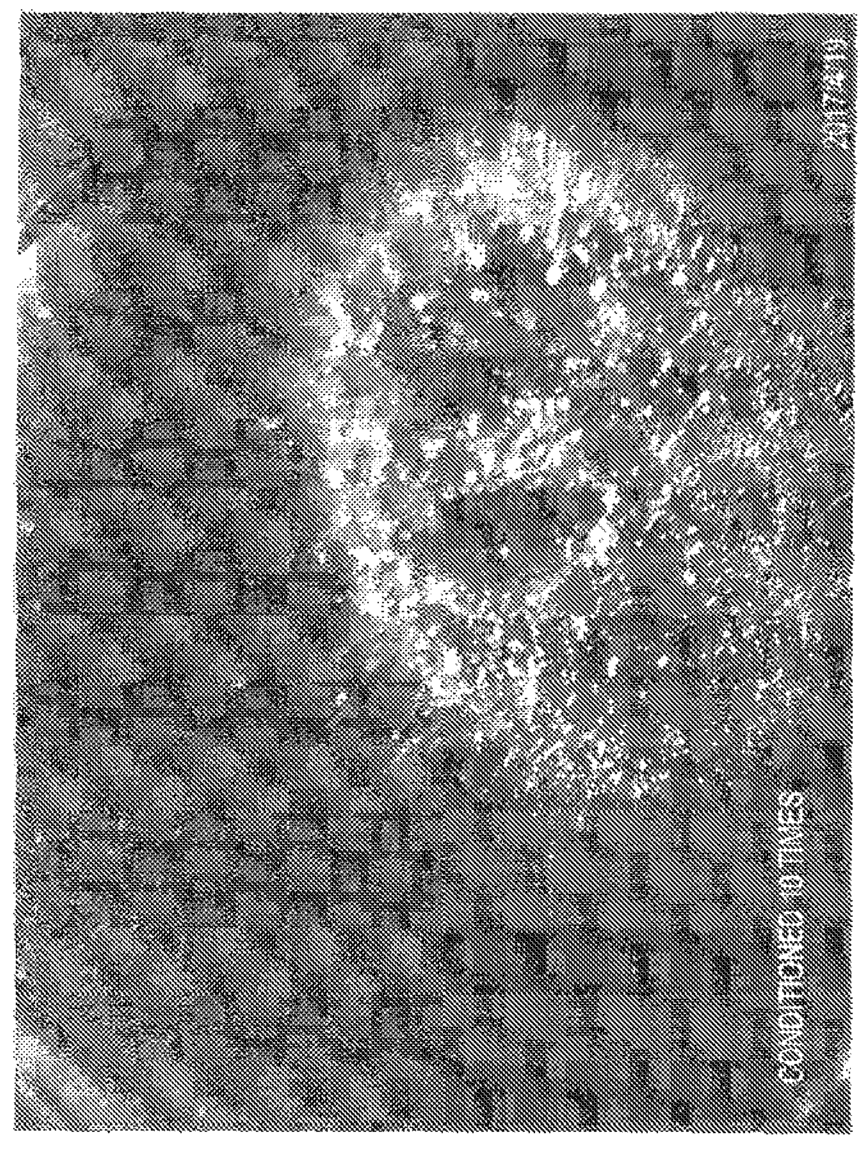
Figure 35C:
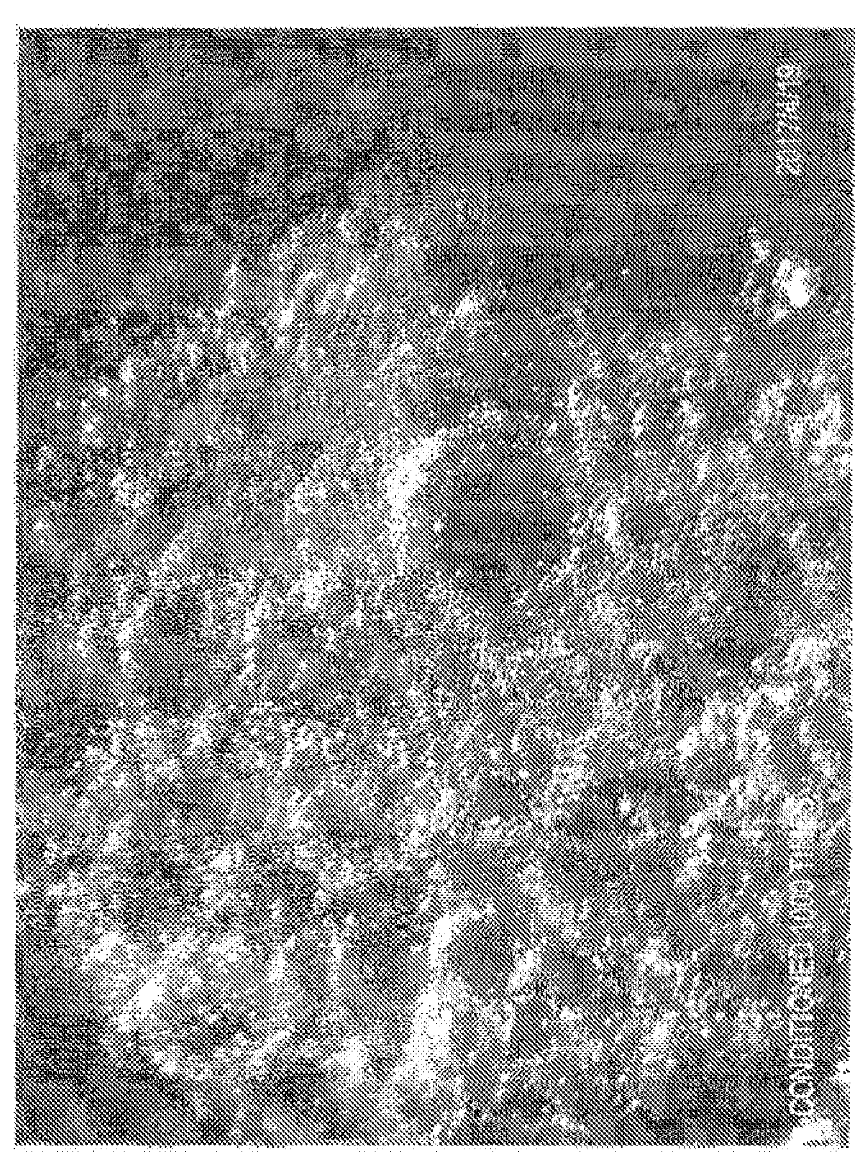

When contacts are new, they usually have the maximum vulnerability to point micro welding. This can be understood by considering how lightning strikes the carth. If a high point exists then lightning often will tend to strike that point in that one place. This is because that is the shortest path through what is a mostly uniform insulator, air. If lightning strikes an area where there are several points that are of the same height, then it will often split into multiple paths just before striking the ground and hit multiple points. This lowers the maximum energy each of those points experiences. This is exactly what happens when general purpose relays undergo the conditioning process. FIGS. 35A-35C show micro-photographs of an unused relay contact (FIG. 35A), one that has had 10 relay conditioning cycles on a relay conditioning apparatus (FIG. 35B), and one that has had 100 relay conditioning cycles on the apparatus (FIG. 35C). The effect is to increase the number of points that are very close in height on the contacts, which will then spread out the arc among those points, and reduce the current density at any given point, in a way that is similar to what occurs with lightning strike arcs as described above. Thus, in this case, both the shape (flattened) and the texture (roughened) are modified by the electromechanical conditioning process. This conditioning does lower the effective lifetime of the relay somewhat, but for ATS use, especially in data centers with controlled power quality, the reduction does not matter. This is because the number of times the ATS will cycle is usually quite low. A typical data center only does maintenance cycles that require ATS transfers from 3-24 times per year. The ATS unit will generally wear out due to other electrical component failure before the relay fails. A general purpose relay is often rated to 100k cycles, which shows that it will not be the component that fails first in typical data center or many other types of use, even if its service lifetime is significantly reduced by the relay conditioning process.

It is possible to manufacture relays with contact shapes that are more resistant to point micro-welding and arcing. This can be done by shaping the area of the contact that is designed to touch as a flat plateau with a set of high points of equal height. This can be done during the manufacturing of the contact or by stamping the contact into the desired shape after manufacture in a general purpose spherical shape. The contact material and plating can also be optimized to increase resistance to point micro-welding. The variety of methods described in the present invention allow the manufacturers of the contact and/or the OEM ATS or other equipment manufacturers to optimize the cost and contact characteristics to match the requirements of the intended application while allowing the contacts to be made and purchased economically. Zonit for example conditions general purpose relays because custom contacts would be much more expensive, due to insufficient volume.

Figure 37A:
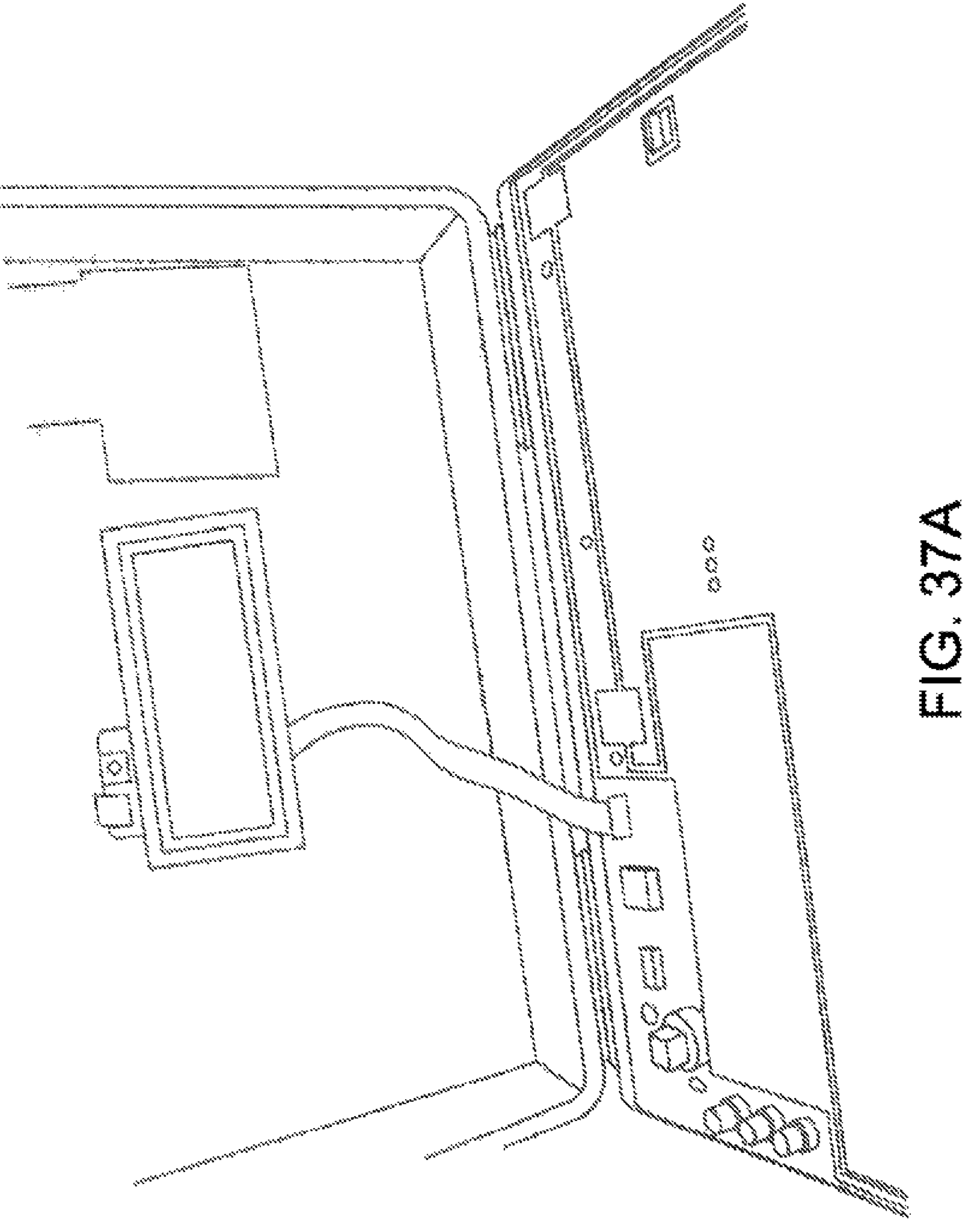
FIGS. 37A-37C show a form factor of the relay conditioner of FIG. 9.
Figure 37B:
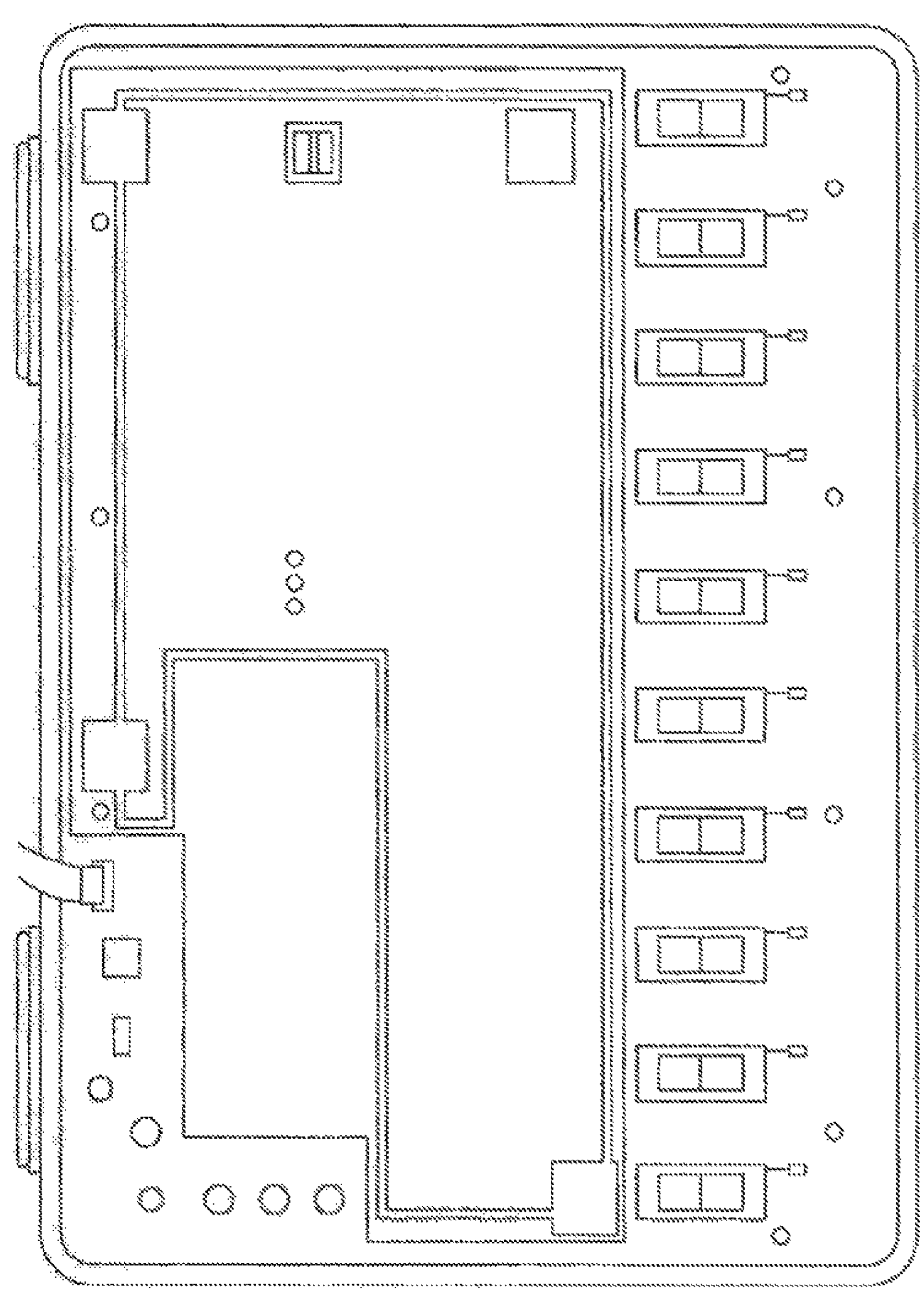
Figure 37C:
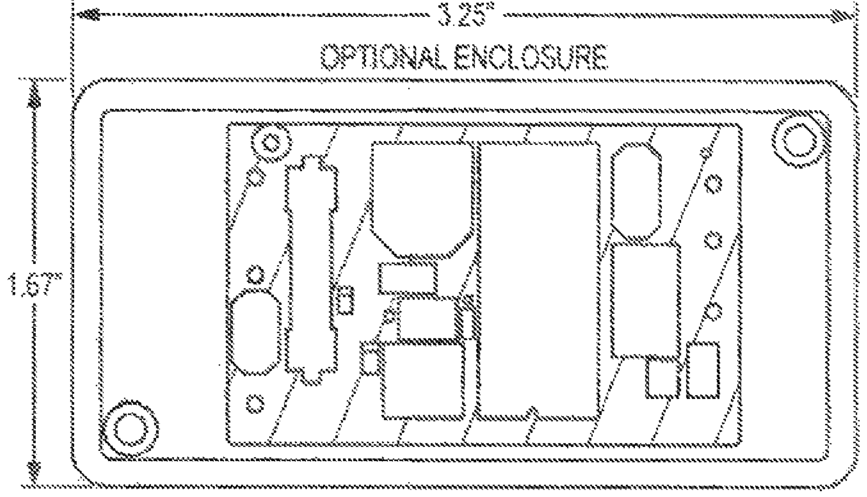
Figure 37C:
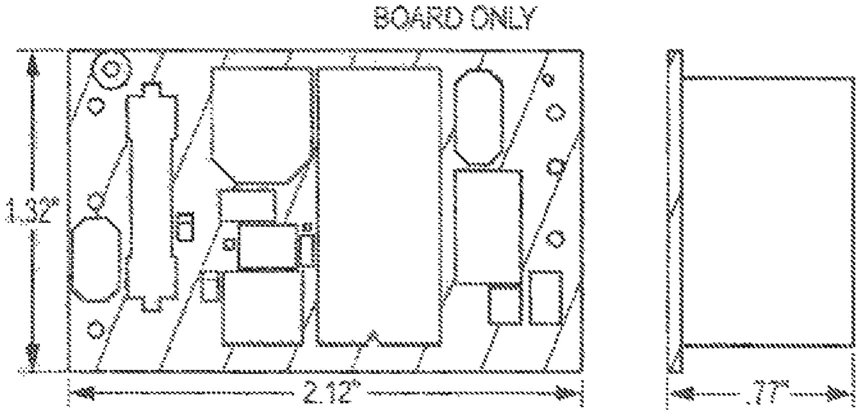

FIG. 36 shows one implementation of the relay conditioning circuit. FIGS. 37A-37C show photographs of the relay conditioning circuit. It will be appreciated that any signal source that provides signals sufficient to produce the desired changes in morphology, taking into account the specific design of the contact surface at issue and the expected operating environment of the contact surface, may be employed. The illustrated relay conditioning circuit, and a method of operating the circuit as described below have a couple of characteristics of particular note relating to optionally incrementally increasing the effective conditioning signal and sorting relays based on response time.

If the conditioning is implemented by way of a series of conditioning signal cycles, the contact surface will become progressively more conditioned with each such cycle as generally shown in FIGS. 35A-35C. For applications where the failure rate, even under the worst expected surge conditions, is low, it may be practical to simply apply surge signals in a series of cycles, where each surge signal matches the worst condition expected in the field. However, if the failure rate is higher, applying signals matching the worst expected conditions may result in an unacceptably high rate of waste associated with conditioning. Accordingly, in such cases, it may be useful to implement the conditioning process as a series of signal cycles of increasing effective power such that the earlier, lower power signal cycles have a lower probability of microwelding the surface to the point where it sticks, and later, higher power signal cycles fully condition the contact surface so that it is inoculated against the largest surges that are likely to occur in the field.

The illustrated conditioning circuit imitates the surge conditions anticipated in the field relating to a discharge surge from a charged capacitor against an AC signal. In the field, the largest power surge condition expected occurs when the discharge is timed to coincide with a point on the AC signal that is 180° out of phase with the surge voltage, whereas a discharge event occurring at a point where the AC signal is nearly in phase with the surge voltage will result in a relatively harmless surge.

The illustrated conditioning circuit employs a single set of discharge parameters, in terms of voltage and capacitance. In the case where progressively increasing power conditioning signals are desired, the conditioning circuit can be set to progressively vary the timing in relation to the AC signal from close to a matching voltage (deemed a phase angle of 0°) to the greatest voltage difference (deemed a phase angle of 180°). It will be appreciated that progressive conditioning could be accomplished with other circuits for applying an appropriate series of signal cycles. Moreover, the specific parameters (e.g., surge voltage, capacitance, AC signal voltage, number of cycles, phase difference between cycles) involve details of the specific application and trade-offs, e.g., between optimal conditioning and degradation of shelf life. It has been found, however, that a surge voltage of 300-400V, e.g., 339V, and a capacitance of 3 micro-farads against an AC signal of 240 V is effective to condition ATS relay contact surfaces for use in typical datacenter environments. In the ATS applications noted above, progressively increasing the phase angle has been found unnecessary. The surge signals are thus timed to be applied at a 180° phase angle and this process (cycle) is repeated, for example, 16 times. For cases with a higher failure rate, the phase angle could be increased from a small phase angle (e.g., 30° to 180°) over several cycles, followed by multiple cycles at the 180° phase angle, for example.

An additional feature of the invention is a method to measure, grade and group contacts based on their transfer time. General purpose contacts can vary significantly in their actuation time to open or close. This can be very important in ATS design, where you need to carefully control the movements and sequencing of one or more relays as part of how the ATS functions. There are a number of ways to deal with this issue, some of which are described in the other filings that are incorporated by reference. This invention adds another method to deal with this issue.

The relay actuation time variance may be too great to allow the precisely controlled movements of the relay set to achieve the required ATS transfer time. So, relay sorting is a method that allows the ATS to transfer fast enough to meet the intended design requirements at lower cost. The ATS can be designed to not have to measure and compensate for relay actuation time variations, which saves complexity and expense.

In one instantiation of the invention, the relay conditioning function can be combined with measurement of each individual relays actuation time. The relays can then be grouped together into sets, where every relay in the set falls within a required high-low range of actuation time. Further another apparatus can be provided that sorts the relays to be used in an ATS from slowest to fastest actuation speed. Each relay in the set used in one ATS unit can then be installed into specific locations in the ATS unit being constructed. This is because an ATS can be designed such that the relationship between the members of the set of relays it uses can benefit by this actuation speed sorting. This can further increase relay control accuracy and thus ATS transfer speed and reliability.

In another instantiation, the relay conditioning function can be performed on relays that are already installed in a working ATS unit. In this case, the apparatus is relatively simple, it consists of one or more plugstrips and an attached bank of capacitors to create a transient current of the desired value across the contacts in the relay when the connected ATS transfers. Additional devices such as a current interrupter switch controlled by a signal generator that can vary the time between control signals can be used to automate the test cycle by forcing the connected ATS to auto-switch as the power on the preferred side of the ATS is interrupted by the action of the signal generator combined with the current interrupter switch. The conditioning cycle can be repeated as many times as is deemed necessary and/or optimal.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A locking cord cap for securing an electrical connection between a male connector having one or more contact prongs and a female connector having one or more contact receptacles for receiving said prongs, said locking cord cap comprising:

a male connector housing having a forward end for engaging said female connector, wherein said one or more prongs extend from said forward end, and peripheral surfaces, extending transversely in relation to said forward end, said peripheral surfaces defining a spatial envelope of said housing relative to a reference plane of said forward end;

a locking mechanism, mounted on said male connector housing, for selectively securing said male and female connectors together in a secured state and releasing said male and female connectors in a release state so that they can be separated, wherein said locking mechanism includes a locking element that is movable on a major axis, wherein the major axis is relative to said male connector housing and said major axis points towards and away from said forward end; and an actuator for moving said locking element between said secured state and said release state, said actuator contained within said spatial envelope relative to said reference plane, wherein said locking element moves in response to rotating said actuator coaxially to said major axis.

2. The locking cord cap of claim 1, wherein an extent of said spatial envelope relative to said reference plane is defined by perpendicularly projecting said peripheral surfaces onto said reference plane and said reference plane is unlimited relative to an axis perpendicular to said reference plane.

3. The locking cord cap of claim 1, wherein said locking cord cap further includes a ramp for forcing said locking element against a surface of said female connector as a locking element moves to said secured state.

4. The locking cord cap of claim 1, wherein said male connector housing is formed as a first housing portion and a second housing portion that are interconnected to form said male connector housing.

5. The locking cord cap of claim 4, wherein said first housing portion and said second housing portion snap together.

6. The locking cord cap of claim 4, wherein said actuator extends about said first and second housing portions.

7. The locking cord cap of claim 4, wherein said first and second housing portions extend about an electrical cord and said locking cord cap further includes a flexible strain relief extending between said male connector housing and said electrical cord for relieving stress on a portion of said electrical cord.

8. The locking cord cap of claim 7, wherein said strain relief is formed from a plastic material and includes openings to provide a desired amount of flexibility.

9. The locking cord cap of claim 1, further comprising one or more identification rings removably connected to and extending about said peripheral surfaces.

10. The locking cord cap of claim 9, further comprising structure for retaining said identification rings on said peripheral surfaces.

11. A method for securing an electrical connection between a male connector having one or more contact prongs and a female connector having one or more contact receptacles for receiving said prongs, said locking cord cap comprising:

providing a male connector housing having a forward end for engaging said female connector, wherein said one or more prongs extend from said forward end, and peripheral surfaces, extending transversely in relation to said forward end, said peripheral surfaces defining a spatial envelope of said housing relative to a reference plane of said forward end, a locking mechanism, mounted on said male connector housing, for selectively securing said male and female connectors together in a secured state and releasing said male and female connectors in a release state so that they can be separated, wherein said locking mechanism includes a locking element that is movable on a major axis, wherein the major axis is relative to said male connector housing and said major axis points towards and away from said forward end, and an actuator for moving said locking element between said secured state and said release state, said actuator contained within said spatial envelope relative to said reference plane; and operating said actuator to move said locking element between said secured state and said release state, wherein said locking element moves in response to rotating said actuator coaxially to said major axis.

12. The method of claim 11, wherein said locking cord cap further includes a ramp and said method further includes using said ramp to force said locking element against a surface of said female connector as a locking element moves to said secured state.

13. The method of claim 11, wherein said male connector housing is formed as a first housing portion and a second housing portion, and said method comprises interconnecting said first and second housing portions to form said male connector housing by snapping said first and second housing portions together.

14. The method of claim 13, further comprising positioning said actuator about said first and second housing portions.

15. The method of claim 13, wherein said first and second housing portions extend about an electrical cord and said method further comprises positioning a flexible strain relief between said male connector housing and said electrical cord for relieving stress on a portion of said electrical cord.

16. The method of claim 15, wherein said strain relief is formed from a plastic material and said method further comprises providing openings in said strain relief to provide a desired amount of flexibility.

17. The method of claim 11, further comprising positioning one or more identification rings about said peripheral surfaces.

18. A method for using a ganged receptacle device having multiple receptacles for receiving male cord caps, comprising:

providing first and second locking cord caps, each said cord cap comprising a male connector housing, a locking mechanism mounted on said male connector housing for selectively securing said male connector housing to said ganged receptacle device and releasing said male cord cap from said ganged receptacle device, and an actuator for moving said locking mechanism between a secured state and a release state, wherein said actuator is rotatable in relation to said male connector housing;

first plugging said first cord cap into a first receptacle of said ganged receptacle device;

first operating a first actuator of said first cord cap to secure said first cord cap to said ganged receptacle device;

second plugging said second cord cap into a second receptacle of said ganged receptacle device adjacent to said first receptacle; and second operating a second actuator of said second cord cap to secure said second cord cap to said ganged receptacle device without interference between said first and second actuators;

wherein said first actuator comprises first radially extending elements, said second actuator comprises second radially extending elements, and said first and second radially extending elements mesh when said first and second cord caps are plugged into said ganged receptacle device and in said secured state.

19. The method of claim 18, wherein each of said first and second cord caps comprises a male connector housing having a forward end for engaging said ganged receptacle device and peripheral surfaces defining a spatial envelope of said housing relative to a reference plane of said forward end, and said actuator is contained within said spatial envelope.

* * * * *